US011221675B2

(12) United States Patent
Bernstein

(10) Patent No.: US 11,221,675 B2
(45) Date of Patent: Jan. 11, 2022

(54) DEVICE, METHOD, AND GRAPHICAL USER INTERFACE FOR PROVIDING TACTILE FEEDBACK FOR OPERATIONS PERFORMED IN A USER INTERFACE

(71) Applicant: Apple Inc., Cupertino, CA (US)

(72) Inventor: Jeffrey Traer Bernstein, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 39 days.

(21) Appl. No.: 16/240,672

(22) Filed: Jan. 4, 2019

(65) Prior Publication Data
US 2019/0138101 A1 May 9, 2019

Related U.S. Application Data

(63) Continuation of application No. 14/536,646, filed as application No. PCT/US2013/040070 on May 8, 2013, now Pat. No. 10,175,757.
(Continued)

(51) Int. Cl.
G06F 3/048 (2013.01)
G06F 3/01 (2006.01)
(Continued)

(52) U.S. Cl.
CPC ............ G06F 3/016 (2013.01); G06F 3/0488 (2013.01); G06F 3/04842 (2013.01); G06F 3/04883 (2013.01); G06F 2203/04105 (2013.01)

(58) Field of Classification Search
None
See application file for complete search history.

(56) References Cited

U.S. PATENT DOCUMENTS 4,864,520 A 9/1989 Setoguchi et al.
5,184,120 A 2/1993 Schultz
(Continued)

FOREIGN PATENT DOCUMENTS

CA 2780765 A1 5/2011
CN 1356493 A 7/2002
(Continued)

OTHER PUBLICATIONS

Patent, dated Apr. 14, 2020, received in Japanese Patent Application No. 2018-079290, which corresponds with U.S. Appl. No. 14/608,926, 5 pages.
(Continued)

Primary Examiner — Hua Lu
(74) Attorney, Agent, or Firm — Morgan, Lewis & Bockius LLP

(57) ABSTRACT

An electronic device with a touch-sensitive surface and a display displays a representation of a clock on the display, detects an input directed to the representation of the clock, while detecting the input directed to the representation of the clock, and provides tactile feedback that corresponds to the clock, wherein the tactile feedback includes a regular pattern of tactile outputs on the touch-sensitive surface. While providing the tactile feedback, the device detects that the input is no longer directed to the representation of the clock, and in response to detecting that the input is no longer directed to the representation of the clock, ceases to provide the tactile feedback corresponding to the clock.

21 Claims, 96 Drawing Sheets

Related U.S. Application Data

(60) Provisional application No. 61/778,284, filed on Mar. 12, 2013, provisional application No. 61/747,278, filed on Dec. 29, 2012, provisional application No. 61/688,227, filed on May 9, 2012.

(51) Int. Cl.
   *G06F 3/0488* (2013.01)
   *G06F 3/0484* (2013.01)

(56) References Cited

U.S. PATENT DOCUMENTS

| | | | |
|---|---|---|---|
| 5,374,787 A | 12/1994 | Miller et al. | |
| 5,428,730 A | 6/1995 | Baker et al. | |
| 5,463,722 A | 10/1995 | Venolia | |
| 5,510,813 A | 4/1996 | Makinwa et al. | |
| 5,555,354 A | 9/1996 | Strasnick et al. | |
| 5,559,301 A | 9/1996 | Bryan, Jr. et al. | |
| 5,589,855 A * | 12/1996 | Blumstein | G06F 3/04847 |
| | | | 235/379 |
| 5,710,896 A | 1/1998 | Seidl | |
| 5,717,438 A | 2/1998 | Kim et al. | |
| 5,793,360 A | 8/1998 | Fleck et al. | |
| 5,793,377 A | 8/1998 | Moore | |
| 5,801,692 A | 9/1998 | Muzio et al. | |
| 5,805,144 A | 9/1998 | Scholder et al. | |
| 5,805,167 A | 9/1998 | Van Cruyningen | |
| 5,809,267 A | 9/1998 | Moran et al. | |
| 5,819,293 A | 10/1998 | Comer et al. | |
| 5,825,352 A | 10/1998 | Bisset et al. | |
| 5,844,560 A | 12/1998 | Crutcher et al. | |
| 5,872,922 A | 2/1999 | Hogan et al. | |
| 5,946,647 A | 8/1999 | Miller et al. | |
| 5,973,670 A | 10/1999 | Barber et al. | |
| 6,002,397 A | 12/1999 | Jaaskelainen, Jr. | |
| 6,031,989 A | 2/2000 | Cordell | |
| 6,088,019 A | 7/2000 | Rosenberg | |
| 6,088,027 A | 7/2000 | Konar et al. | |
| 6,111,575 A | 8/2000 | Martinez et al. | |
| 6,121,960 A | 9/2000 | Carroll et al. | |
| 6,208,329 B1 | 3/2001 | Ballare | |
| 6,208,340 B1 | 3/2001 | Amin et al. | |
| 6,219,034 B1 * | 4/2001 | Elbing | G06F 3/016 |
| | | | 345/158 |
| 6,223,188 B1 * | 4/2001 | Albers | G06F 3/167 |
| | | | 715/205 |
| 6,232,891 B1 | 5/2001 | Rosenberg | |
| 6,243,080 B1 | 6/2001 | Molne | |
| 6,252,594 B1 | 6/2001 | Xia et al. | |
| 6,300,936 B1 * | 10/2001 | Braun | G05B 19/00 |
| | | | 345/156 |
| 6,313,836 B1 | 11/2001 | Russell, Jr. et al. | |
| 6,396,523 B1 | 5/2002 | Segal et al. | |
| 6,429,846 B2 | 8/2002 | Rosenberg et al. | |
| 6,448,977 B1 | 9/2002 | Braun et al. | |
| 6,459,442 B1 | 10/2002 | Edwards et al. | |
| 6,489,978 B1 | 12/2002 | Gong et al. | |
| 6,512,530 B1 | 1/2003 | Rzepkowski et al. | |
| 6,563,487 B2 | 5/2003 | Martin et al. | |
| 6,567,102 B2 | 5/2003 | Kung | |
| 6,583,798 B1 | 6/2003 | Hoek et al. | |
| 6,590,568 B1 | 7/2003 | Astala et al. | |
| 6,661,438 B1 | 12/2003 | Shiraishi et al. | |
| 6,735,307 B1 | 5/2004 | Volckers | |
| 6,750,890 B1 | 6/2004 | Sugimoto | |
| 6,806,893 B1 | 10/2004 | Kolawa et al. | |
| 6,822,635 B2 | 11/2004 | Shahoian et al. | |
| 6,906,697 B2 | 6/2005 | Rosenberg | |
| 6,919,927 B1 | 7/2005 | Hyodo | |
| 6,943,778 B1 | 9/2005 | Astala et al. | |
| 7,036,088 B2 | 4/2006 | Tunney | |
| 7,138,983 B2 | 11/2006 | Wakai et al. | |
| 7,312,791 B2 | 12/2007 | Hoshino et al. | |
| 7,411,575 B2 | 8/2008 | Hill et al. | |
| 7,434,177 B1 | 10/2008 | Ording et al. | |
| 7,453,439 B1 | 11/2008 | Kushler et al. | |
| 7,471,284 B2 | 12/2008 | Bathiche et al. | |
| 7,479,949 B2 | 1/2009 | Jobs et al. | |
| 7,516,404 B1 | 4/2009 | Colby et al. | |
| 7,533,352 B2 | 5/2009 | Chew et al. | |
| 7,552,397 B2 | 6/2009 | Holecek et al. | |
| 7,577,530 B2 | 8/2009 | Vignalou-Marche | |
| 7,614,008 B2 | 11/2009 | Ording | |
| 7,619,616 B2 | 11/2009 | Rimas Ribikauskas et al. | |
| 7,629,966 B2 | 12/2009 | Anson | |
| 7,656,413 B2 | 2/2010 | Khan et al. | |
| 7,657,849 B2 | 2/2010 | Chaudhri et al. | |
| 7,683,889 B2 | 3/2010 | Ribikauskas et al. | |
| 7,702,733 B2 | 4/2010 | Fleck et al. | |
| 7,743,348 B2 | 6/2010 | Robbins et al. | |
| 7,760,187 B2 | 7/2010 | Kennedy | |
| 7,787,026 B1 | 8/2010 | Flory et al. | |
| 7,797,642 B1 | 9/2010 | Karam et al. | |
| 7,801,950 B2 | 9/2010 | Eisenstadt et al. | |
| 7,812,826 B2 | 10/2010 | Ording et al. | |
| 7,890,862 B2 | 2/2011 | Kompe et al. | |
| 7,903,090 B2 | 3/2011 | Soss et al. | |
| 7,952,566 B2 | 5/2011 | Poupyrev et al. | |
| 7,956,847 B2 | 6/2011 | Christie | |
| 7,973,778 B2 | 7/2011 | Chen | |
| 8,000,694 B2 * | 8/2011 | Labidi | G04G 13/021 |
| | | | 455/418 |
| 8,040,142 B1 | 10/2011 | Bokma et al. | |
| 8,059,104 B2 * | 11/2011 | Shahoian | G06F 1/1616 |
| | | | 345/173 |
| 8,059,105 B2 | 11/2011 | Rosenberg et al. | |
| 8,106,856 B2 | 1/2012 | Matas et al. | |
| 8,125,440 B2 | 2/2012 | Guyot-Sionnest et al. | |
| 8,125,492 B1 | 2/2012 | Wainwright et al. | |
| RE43,448 E | 6/2012 | Kimoto et al. | |
| 8,209,628 B1 | 6/2012 | Davidson | |
| 8,271,900 B2 | 9/2012 | Walizaka et al. | |
| 8,300,005 B2 | 10/2012 | Tateuchi et al. | |
| 8,325,398 B2 | 12/2012 | Satomi et al. | |
| 8,363,020 B2 | 1/2013 | Li et al. | |
| 8,390,583 B2 | 3/2013 | Forutanpour et al. | |
| 8,423,089 B2 | 4/2013 | Song et al. | |
| 8,446,376 B2 | 5/2013 | Levy et al. | |
| 8,453,057 B2 | 5/2013 | Stallings et al. | |
| 8,456,431 B2 | 6/2013 | Victor | |
| 8,466,889 B2 | 6/2013 | Tong et al. | |
| 8,482,535 B2 * | 7/2013 | Pryor | G06F 3/04883 |
| | | | 345/173 |
| 8,499,243 B2 | 7/2013 | Yuki | |
| 8,508,494 B2 | 8/2013 | Moore | |
| 8,542,205 B1 | 9/2013 | Keller | |
| 8,553,092 B2 | 10/2013 | Tezuka et al. | |
| 8,570,296 B2 | 10/2013 | Birnbaum et al. | |
| 8,581,870 B2 | 11/2013 | Bokma et al. | |
| 8,587,542 B2 | 11/2013 | Moore | |
| 8,593,415 B2 | 11/2013 | Han et al. | |
| 8,593,420 B1 * | 11/2013 | Buuck | G06F 3/041 |
| | | | 345/173 |
| 8,625,882 B2 | 1/2014 | Backlund et al. | |
| 8,638,311 B2 | 1/2014 | Kang et al. | |
| 8,665,227 B2 | 3/2014 | Gunawan | |
| 8,669,945 B2 | 3/2014 | Coddington | |
| 8,698,765 B1 | 4/2014 | Keller | |
| 8,706,172 B2 | 4/2014 | Priyantha et al. | |
| 8,717,305 B2 | 5/2014 | Williamson et al. | |
| 8,726,198 B2 | 5/2014 | Rydenhag et al. | |
| 8,743,069 B2 | 6/2014 | Morton et al. | |
| 8,760,425 B2 | 6/2014 | Crisan | |
| 8,769,431 B1 | 7/2014 | Prasad | |
| 8,773,389 B1 | 7/2014 | Freed | |
| 8,788,964 B2 | 7/2014 | Shin et al. | |
| 8,793,577 B2 | 7/2014 | Schellingerhout et al. | |
| 8,799,816 B2 | 8/2014 | Wells et al. | |
| 8,816,989 B2 | 8/2014 | Nicholson et al. | |
| 8,854,316 B2 | 10/2014 | Shenfield | |
| 8,872,729 B2 | 10/2014 | Lyons et al. | |
| 8,872,773 B2 | 10/2014 | Mak et al. | |
| 8,875,044 B2 | 10/2014 | Ozawa et al. | |

(56) References Cited

U.S. PATENT DOCUMENTS

| | | |
|---|---|---|
| 8,881,062 B2 | 11/2014 | Kim et al. |
| 8,914,732 B2 | 12/2014 | Jun et al. |
| 8,952,987 B2 | 2/2015 | Momeyer et al. |
| 8,954,889 B2 | 2/2015 | Fujibayashi |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 * | 5/2015 | Freed .................. G06F 3/0488 345/173 |
| 9,030,436 B2 | 5/2015 | Ikeda |
| 9,032,321 B1 | 5/2015 | Cohen et al. |
| 9,043,732 B2 | 5/2015 | Nurmi et al. |
| 9,046,999 B1 | 6/2015 | Teller et al. |
| 9,052,820 B2 | 6/2015 | Jarrett et al. |
| 9,063,563 B1 | 6/2015 | Gray et al. |
| 9,063,731 B2 | 6/2015 | Heo et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,111,076 B2 | 8/2015 | Park et al. |
| 9,116,569 B2 | 8/2015 | Stacy et al. |
| 9,116,571 B2 | 8/2015 | Zeliff et al. |
| 9,122,364 B2 | 9/2015 | Kuwabara et al. |
| 9,128,605 B2 | 9/2015 | Nan et al. |
| 9,146,914 B1 | 9/2015 | Dhaundiyal |
| 9,164,779 B2 | 10/2015 | Brakensiek et al. |
| 9,170,607 B2 | 10/2015 | Bose et al. |
| 9,170,649 B2 * | 10/2015 | Ronkainen ............. G06F 3/016 |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,280,286 B2 * | 3/2016 | Commarford ...... G06F 3/04842 |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,383,887 B1 | 7/2016 | Khafizov et al. |
| 9,389,718 B1 | 7/2016 | Letourneur |
| 9,389,722 B2 | 7/2016 | Matsuki et al. |
| 9,395,800 B2 | 7/2016 | Liu et al. |
| 9,400,581 B2 | 7/2016 | Bokma et al. |
| 9,405,367 B2 | 8/2016 | Jung et al. |
| 9,405,428 B2 | 8/2016 | Roh et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,436 B2 | 1/2017 | Ohki et al. |
| 9,569,093 B2 | 2/2017 | Lipman et al. |
| 9,582,178 B2 | 2/2017 | Grant et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,625,987 B1 | 4/2017 | LaPenna et al. |
| 9,645,722 B1 | 5/2017 | Stasior et al. |
| 9,665,762 B2 | 5/2017 | Thompson et al. |
| 9,671,943 B2 | 6/2017 | Van der Velden |
| 9,678,571 B1 | 6/2017 | Robert et al. |
| 9,733,716 B2 | 8/2017 | Shaffer |
| 9,740,381 B1 | 8/2017 | Chaudhri et al. |
| 9,753,527 B2 | 9/2017 | Connell et al. |
| 9,760,241 B1 | 9/2017 | Lewbel |
| 9,785,305 B2 | 10/2017 | Alonso Ruiz et al. |
| 9,798,443 B1 | 10/2017 | Gray |
| 9,804,665 B2 | 10/2017 | DeBates et al. |
| 9,829,980 B2 | 11/2017 | Lisseman et al. |
| 9,891,747 B2 | 2/2018 | Jang et al. |
| 10,055,066 B2 | 8/2018 | Lynn et al. |
| 10,057,490 B2 | 8/2018 | Shin et al. |
| 10,095,396 B2 | 10/2018 | Kudershian et al. |
| 10,133,388 B2 | 11/2018 | Sudou |
| 10,133,397 B1 | 11/2018 | Smith |
| 10,180,722 B2 | 1/2019 | Lu |
| 10,222,980 B2 | 3/2019 | Alonso Ruiz et al. |
| 10,235,023 B2 | 3/2019 | Gustafsson et al. |
| 10,275,087 B1 * | 4/2019 | Smith .................... G06F 3/045 |
| 10,331,769 B1 | 6/2019 | Hill et al. |
| 10,386,960 B1 | 8/2019 | Smith |
| 10,469,767 B2 | 11/2019 | Shikata |
| 10,496,151 B2 | 12/2019 | Kim et al. |
| 10,547,895 B1 | 1/2020 | Morris |
| 10,739,896 B2 | 8/2020 | Kim et al. |
| 10,782,871 B2 | 9/2020 | Bernstein et al. |
| 2001/0024195 A1 | 9/2001 | Hayakawa et al. |
| 2001/0045965 A1 | 11/2001 | Orbanes et al. |
| 2002/0006822 A1 * | 1/2002 | Krintzman .......... G07F 17/3211 463/27 |
| 2002/0008691 A1 | 1/2002 | Hanajima et al. |
| 2002/0015064 A1 | 2/2002 | Robotham et al. |
| 2002/0042925 A1 | 4/2002 | Ebisu et al. |
| 2002/0054011 A1 | 5/2002 | Bruneau et al. |
| 2002/0057256 A1 | 5/2002 | Flack |
| 2002/0109668 A1 | 8/2002 | Rosenberg et al. |
| 2002/0109678 A1 | 8/2002 | Marmolin et al. |
| 2002/0140680 A1 | 10/2002 | Lu |
| 2002/0140740 A1 | 10/2002 | Chen |
| 2002/0163498 A1 | 11/2002 | Chang et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0013492 A1 | 1/2003 | Bokhari et al. |
| 2003/0068053 A1 | 4/2003 | Chu |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0122779 A1 | 7/2003 | Martin et al. |
| 2003/0128242 A1 | 7/2003 | Gordon |
| 2003/0151589 A1 | 8/2003 | Bensen et al. |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0056849 A1 | 3/2004 | Lohbihler et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155869 A1 | 8/2004 | Robinson et al. |
| 2004/0168131 A1 | 8/2004 | Blumberg |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0039141 A1 | 2/2005 | Burke et al. |
| 2005/0064911 A1 | 3/2005 | Chen et al. |
| 2005/0066207 A1 | 3/2005 | Fleck et al. |
| 2005/0076256 A1 | 4/2005 | Fleck et al. |
| 2005/0078093 A1 | 4/2005 | Peterson, Jr. et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0134578 A1 | 6/2005 | Chambers et al. |
| 2005/0156892 A1 * | 7/2005 | Grant .................... A63F 13/218 345/167 |
| 2005/0183017 A1 | 8/2005 | Cain |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 * | 10/2005 | Clay .................... G06F 3/0482 715/817 |
| 2005/0283726 A1 | 12/2005 | Lunati |

(56) References Cited

U.S. PATENT DOCUMENTS

| | | |
|---|---|---|
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0012577 A1 | 1/2006 | Kyrola |
| 2006/0022955 A1 | 2/2006 | Kennedy |
| 2006/0026536 A1 | 2/2006 | Hotelling et al. |
| 2006/0031776 A1 | 2/2006 | Glein et al. |
| 2006/0036945 A1 | 2/2006 | Radtke et al. |
| 2006/0036971 A1 | 2/2006 | Mendel et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0109252 A1 | 5/2006 | Kolmykov-Zotov et al. |
| 2006/0109256 A1* | 5/2006 | Grant ............... G06F 3/0485 345/173 |
| 2006/0119586 A1* | 6/2006 | Grant ............... G06F 3/016 345/173 |
| 2006/0132455 A1* | 6/2006 | Rimas-Ribikauskas ............... G06F 3/0414 345/173 |
| 2006/0132456 A1* | 6/2006 | Anson ............... G06F 3/0488 345/173 |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1* | 9/2006 | Hotelling ............... G06F 3/02 345/173 |
| 2006/0212812 A1 | 9/2006 | Simmons et al. |
| 2006/0213754 A1 | 9/2006 | Jarrett et al. |
| 2006/0224989 A1 | 10/2006 | Pettiross et al. |
| 2006/0233248 A1 | 10/2006 | Rynderman et al. |
| 2006/0236263 A1 | 10/2006 | Bathiche et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0024595 A1* | 2/2007 | Baker ............... G06F 3/045 345/173 |
| 2007/0024646 A1 | 2/2007 | Saarinen et al. |
| 2007/0080953 A1 | 4/2007 | Lii |
| 2007/0113681 A1 | 5/2007 | Nishimura et al. |
| 2007/0120834 A1 | 5/2007 | Boillot |
| 2007/0120835 A1* | 5/2007 | Sato ............... H04M 1/2747 345/173 |
| 2007/0124699 A1* | 5/2007 | Michaels ............... G06F 3/0482 715/837 |
| 2007/0152959 A1 | 7/2007 | Peters |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0200713 A1* | 8/2007 | Weber ............... H04L 67/18 340/573.1 |
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1* | 10/2007 | Colgate ............... G06F 3/041 345/156 |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |
| 2007/0288862 A1 | 12/2007 | Ording |
| 2007/0294295 A1 | 12/2007 | Finkelstein et al. |
| 2007/0299923 A1 | 12/2007 | Skelly et al. |
| 2008/0001924 A1 | 1/2008 | de los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1* | 4/2008 | Van De Ven ............... G06F 3/0488 345/173 |
| 2008/0094368 A1 | 4/2008 | Ording et al. |
| 2008/0094398 A1 | 4/2008 | NG et al. |
| 2008/0106523 A1 | 5/2008 | Conrad |
| 2008/0109753 A1 | 5/2008 | Karstens |
| 2008/0136790 A1* | 6/2008 | Hio ............... G06F 3/04886 345/173 |
| 2008/0155415 A1* | 6/2008 | Yoon ............... G06F 3/0482 715/716 |
| 2008/0163119 A1 | 7/2008 | Kim et al. |
| 2008/0165141 A1 | 7/2008 | Christie |
| 2008/0165160 A1 | 7/2008 | Kocienda et al. |
| 2008/0168379 A1* | 7/2008 | Forstall ............... H04M 1/72469 715/778 |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0189605 A1 | 8/2008 | Kay et al. |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1* | 9/2008 | Champion ............... G06F 3/0482 715/834 |
| 2008/0225007 A1 | 9/2008 | Nakadaira et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307359 A1 | 12/2008 | Louch et al. |
| 2008/0316171 A1 | 12/2008 | Shahoian et al. |
| 2008/0317378 A1 | 12/2008 | Steinberg et al. |
| 2008/0320419 A1 | 12/2008 | Matas et al. |
| 2009/0007017 A1 | 1/2009 | Anzures et al. |
| 2009/0016645 A1* | 1/2009 | Sako ............... H04N 1/00872 382/298 |
| 2009/0046110 A1* | 2/2009 | Sadler ............... G06F 3/0488 345/660 |
| 2009/0058828 A1 | 3/2009 | Jiang et al. |
| 2009/0061837 A1 | 3/2009 | Chaudhri et al. |
| 2009/0064031 A1* | 3/2009 | Bull ............... G06F 3/0485 715/784 |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1* | 6/2009 | Liu ............... G06F 3/011 345/168 |
| 2009/0150775 A1 | 6/2009 | Miyazaki et al. |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0169061 A1 | 7/2009 | Anderson et al. |
| 2009/0178008 A1* | 7/2009 | Herz ............... G06F 9/542 715/840 |

(56) References Cited

U.S. PATENT DOCUMENTS

| | | |
|---|---|---|
| 2009/0187824 A1 | 7/2009 | Hinckley et al. |
| 2009/0189866 A1 | 7/2009 | Haffenden et al. |
| 2009/0195959 A1 | 8/2009 | Ladouceur et al. |
| 2009/0198767 A1 | 8/2009 | Jakobson et al. |
| 2009/0201260 A1 | 8/2009 | Lee et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0244357 A1 | 10/2009 | Huang |
| 2009/0247112 A1 | 10/2009 | Lundy et al. |
| 2009/0247230 A1* | 10/2009 | Lundy ............... G06F 3/0486 455/566 |
| 2009/0251410 A1 | 10/2009 | Mori et al. |
| 2009/0251421 A1 | 10/2009 | Bloebaum |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1* | 11/2009 | Dahlke ................. G06F 3/016 455/556.1 |
| 2009/0282360 A1 | 11/2009 | Park et al. |
| 2009/0284478 A1 | 11/2009 | De la Torre Baltierra et al. |
| 2009/0288032 A1 | 11/2009 | Chang et al. |
| 2009/0293009 A1 | 11/2009 | Meserth et al. |
| 2009/0295713 A1 | 12/2009 | Piot et al. |
| 2009/0295739 A1 | 12/2009 | Nagara |
| 2009/0295943 A1 | 12/2009 | Kim et al. |
| 2009/0298546 A1 | 12/2009 | Kim et al. |
| 2009/0303187 A1 | 12/2009 | Pallakoff |
| 2009/0307583 A1* | 12/2009 | Tonisson ............ G06F 40/186 715/246 |
| 2009/0307633 A1 | 12/2009 | Haughay, Jr. et al. |
| 2009/0322893 A1 | 12/2009 | Stallings et al. |
| 2009/0325566 A1 | 12/2009 | Bell et al. |
| 2010/0007926 A1 | 1/2010 | Imaizumi et al. |
| 2010/0011304 A1 | 1/2010 | Van Os |
| 2010/0013613 A1* | 1/2010 | Weston ................. G06F 3/016 340/407.2 |
| 2010/0013777 A1* | 1/2010 | Baudisch ........... G06F 3/04812 345/173 |
| 2010/0017710 A1 | 1/2010 | Kim et al. |
| 2010/0020035 A1 | 1/2010 | Ryu et al. |
| 2010/0026640 A1* | 2/2010 | Kim .................... G06F 3/04817 345/173 |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0060548 A1 | 3/2010 | Choi et al. |
| 2010/0060605 A1 | 3/2010 | Rimas-Ribikauskas et al. |
| 2010/0061637 A1 | 3/2010 | Mochizuki et al. |
| 2010/0062803 A1 | 3/2010 | Yun et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088654 A1 | 4/2010 | Henhoeffer |
| 2010/0110082 A1 | 5/2010 | Myrick et al. |
| 2010/0111434 A1 | 5/2010 | Madden |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156807 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0159995 A1 | 6/2010 | Stallings et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0199227 A1 | 8/2010 | Xiao et al. |
| 2010/0211872 A1* | 8/2010 | Rolston ................ G06F 9/451 715/702 |
| 2010/0214135 A1 | 8/2010 | Bathiche et al. |
| 2010/0214239 A1 | 8/2010 | Wu |
| 2010/0220065 A1 | 9/2010 | Ma |
| 2010/0225456 A1 | 9/2010 | Eldering |
| 2010/0225604 A1 | 9/2010 | Homma et al. |
| 2010/0231534 A1* | 9/2010 | Chaudhri ............ G06F 3/0481 345/173 |
| 2010/0235726 A1 | 9/2010 | Ording et al. |
| 2010/0235746 A1 | 9/2010 | Anzures |
| 2010/0241955 A1 | 9/2010 | Price et al. |
| 2010/0248787 A1 | 9/2010 | Smuga et al. |
| 2010/0251168 A1 | 9/2010 | Fujita et al. |
| 2010/0259500 A1 | 10/2010 | Kennedy |
| 2010/0271312 A1* | 10/2010 | Alameh ............... G06F 3/0421 345/173 |
| 2010/0271500 A1* | 10/2010 | Park .................. H04N 5/23222 348/222.1 |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0287486 A1 | 11/2010 | Coddington |
| 2010/0289807 A1 | 11/2010 | Yu et al. |
| 2010/0295805 A1 | 11/2010 | Shin et al. |
| 2010/0302177 A1 | 12/2010 | Kim et al. |
| 2010/0302179 A1 | 12/2010 | Ahn et al. |
| 2010/0306702 A1* | 12/2010 | Warner ............... G06F 3/04817 715/811 |
| 2010/0308983 A1 | 12/2010 | Conte et al. |
| 2010/0309147 A1 | 12/2010 | Fleizach et al. |
| 2010/0313050 A1 | 12/2010 | Harrat et al. |
| 2010/0313124 A1 | 12/2010 | Privault et al. |
| 2010/0313156 A1* | 12/2010 | Louch ................ G06F 3/04817 715/769 |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0317410 A1 | 12/2010 | Song et al. |
| 2010/0321301 A1 | 12/2010 | Casparian et al. |
| 2010/0321312 A1 | 12/2010 | Han et al. |
| 2010/0325578 A1 | 12/2010 | Mital et al. |
| 2010/0328229 A1 | 12/2010 | Weber et al. |
| 2011/0010626 A1 | 1/2011 | Fino et al. |
| 2011/0012851 A1 | 1/2011 | Ciesla et al. |
| 2011/0018695 A1* | 1/2011 | Bells ................... G06F 3/016 340/407.2 |
| 2011/0026099 A1 | 2/2011 | Kwon et al. |
| 2011/0035145 A1 | 2/2011 | Yamasaki |
| 2011/0037706 A1 | 2/2011 | Pasquero et al. |
| 2011/0038552 A1 | 2/2011 | Lam |
| 2011/0039602 A1 | 2/2011 | McNamara et al. |
| 2011/0047368 A1 | 2/2011 | Sundaramurthy et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050628 A1 | 3/2011 | Homma et al. |
| 2011/0050629 A1 | 3/2011 | Homma et al. |
| 2011/0050630 A1* | 3/2011 | Ikeda .................. G06F 3/0488 345/174 |
| 2011/0050653 A1 | 3/2011 | Miyazawa et al. |
| 2011/0050687 A1 | 3/2011 | Alyshev et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |

(56) References Cited

U.S. PATENT DOCUMENTS

| | | |
|---|---|---|
| 2011/0061021 A1 | 3/2011 | Kang et al. |
| 2011/0061029 A1 | 3/2011 | Yeh et al. |
| 2011/0063248 A1* | 3/2011 | Yoon ............... G06F 3/0488 345/174 |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080349 A1 | 4/2011 | Holbein et al. |
| 2011/0080350 A1 | 4/2011 | Almalki et al. |
| 2011/0080367 A1 | 4/2011 | Marchand et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1* | 4/2011 | Gobeil ............... G06F 3/0482 715/825 |
| 2011/0093817 A1 | 4/2011 | Song et al. |
| 2011/0102340 A1 | 5/2011 | Martin et al. |
| 2011/0102829 A1* | 5/2011 | Jourdan ............. H04N 1/00127 358/1.14 |
| 2011/0107272 A1 | 5/2011 | Aquilar |
| 2011/0109617 A1 | 5/2011 | Snook et al. |
| 2011/0116716 A1 | 5/2011 | Kwon et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1* | 6/2011 | Fagans ............... G06F 16/50 715/781 |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins |
| 2011/0154199 A1 | 6/2011 | Maffitt et al. |
| 2011/0163971 A1* | 7/2011 | Wagner ............... G06F 3/04842 345/173 |
| 2011/0163978 A1 | 7/2011 | Park et al. |
| 2011/0164042 A1 | 7/2011 | Chaudhri |
| 2011/0167369 A1 | 7/2011 | van Os |
| 2011/0169765 A1* | 7/2011 | Aono ................. G06F 3/04886 345/173 |
| 2011/0175826 A1 | 7/2011 | Moore et al. |
| 2011/0175830 A1 | 7/2011 | Miyazawa et al. |
| 2011/0175832 A1 | 7/2011 | Miyazawa et al. |
| 2011/0179368 A1 | 7/2011 | King et al. |
| 2011/0179381 A1 | 7/2011 | King |
| 2011/0181521 A1 | 7/2011 | Reid et al. |
| 2011/0181538 A1* | 7/2011 | Aono ................. G06F 3/016 345/173 |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0191675 A1* | 8/2011 | Kauranen ........... G06F 3/048 715/702 |
| 2011/0193788 A1 | 8/2011 | King et al. |
| 2011/0193809 A1 | 8/2011 | Walley et al. |
| 2011/0193881 A1* | 8/2011 | Rydenhag ........... G06F 3/04815 345/647 |
| 2011/0197160 A1 | 8/2011 | Kim et al. |
| 2011/0201387 A1 | 8/2011 | Paek et al. |
| 2011/0202834 A1* | 8/2011 | Mandryk ............ G06F 3/04883 715/701 |
| 2011/0202853 A1 | 8/2011 | Mujkic |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210834 A1* | 9/2011 | Pasquero ............ G06F 3/04883 340/407.1 |
| 2011/0210926 A1* | 9/2011 | Pasquero ............ G06F 1/1613 345/173 |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0234639 A1 | 9/2011 | Shimotani et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246801 A1 | 10/2011 | Seethaler et al. |
| 2011/0246877 A1 | 10/2011 | Kwak et al. |
| 2011/0248916 A1 | 10/2011 | Griffin et al. |
| 2011/0248942 A1 | 10/2011 | Yana et al. |
| 2011/0248948 A1* | 10/2011 | Griffin ............... G06F 3/0488 345/174 |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0258537 A1 | 10/2011 | Rives et al. |
| 2011/0260994 A1 | 10/2011 | Saynac et al. |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1* | 11/2011 | Kuwabara ........... G06F 3/0488 345/173 |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0310049 A1 | 12/2011 | Homma et al. |
| 2011/0319136 A1 | 12/2011 | Labowicz et al. |
| 2012/0001856 A1 | 1/2012 | Davidson |
| 2012/0005622 A1 | 1/2012 | Park et al. |
| 2012/0007857 A1 | 1/2012 | Noda et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0013607 A1 | 1/2012 | Lee |
| 2012/0019448 A1 | 1/2012 | Pitkanen et al. |
| 2012/0026110 A1 | 2/2012 | Yamano |
| 2012/0030623 A1 | 2/2012 | Hoellwarth |
| 2012/0032979 A1 | 2/2012 | Blow et al. |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0047380 A1 | 2/2012 | Nurmi |
| 2012/0056837 A1* | 3/2012 | Park ................... G06F 3/0412 345/173 |
| 2012/0056848 A1 | 3/2012 | Yamano et al. |
| 2012/0060123 A1 | 3/2012 | Smith |
| 2012/0062470 A1 | 3/2012 | Chang |
| 2012/0062564 A1* | 3/2012 | Miyashita ........... G06F 3/0481 345/419 |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081326 A1 | 4/2012 | Heubel et al. |
| 2012/0081375 A1* | 4/2012 | Robert ............... G06F 9/451 345/522 |
| 2012/0084644 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0096393 A1* | 4/2012 | Shim ................. G06F 3/0485 715/784 |
| 2012/0096400 A1 | 4/2012 | Cho |
| 2012/0098780 A1 | 4/2012 | Fujisawa et al. |

(56) References Cited

U.S. PATENT DOCUMENTS

| | | |
|---|---|---|
| 2012/0102437 A1 | 4/2012 | Worley et al. |
| 2012/0105358 A1* | 5/2012 | Momeyer ........... G06F 3/04883 345/174 |
| 2012/0105367 A1* | 5/2012 | Son ................ G06F 3/04883 345/174 |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139844 A1 | 6/2012 | Ramstein et al. |
| 2012/0139864 A1 | 6/2012 | Sleeman et al. |
| 2012/0144330 A1 | 6/2012 | Flint |
| 2012/0146945 A1* | 6/2012 | Miyazawa ........... G06F 3/04883 345/174 |
| 2012/0147052 A1 | 6/2012 | Homma et al. |
| 2012/0154303 A1 | 6/2012 | Lazaridis et al. |
| 2012/0154328 A1 | 6/2012 | Kono |
| 2012/0158629 A1 | 6/2012 | Hinckley et al. |
| 2012/0159380 A1 | 6/2012 | Kocienda et al. |
| 2012/0169646 A1* | 7/2012 | Berkes ............... G06F 3/04817 345/174 |
| 2012/0169716 A1 | 7/2012 | Mihara |
| 2012/0176403 A1 | 7/2012 | Cha et al. |
| 2012/0179967 A1* | 7/2012 | Hayes ............... G06F 3/04883 715/719 |
| 2012/0180001 A1 | 7/2012 | Griffin et al. |
| 2012/0182226 A1* | 7/2012 | Tuli ................. G06F 3/04883 345/173 |
| 2012/0183271 A1 | 7/2012 | Forutanpour et al. |
| 2012/0192108 A1 | 7/2012 | Kolb |
| 2012/0200528 A1 | 8/2012 | Ciesla et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1 | 9/2012 | Laubach |
| 2012/0236037 A1* | 9/2012 | Lessing ............... G06F 3/0484 345/661 |
| 2012/0240044 A1 | 9/2012 | Johnson et al. |
| 2012/0242584 A1* | 9/2012 | Tuli ................... G06F 3/016 345/173 |
| 2012/0249575 A1 | 10/2012 | Krolczyk et al. |
| 2012/0249853 A1 | 10/2012 | Krolczyk et al. |
| 2012/0250598 A1 | 10/2012 | Lonnfors et al. |
| 2012/0256829 A1 | 10/2012 | Dodge |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260219 A1 | 10/2012 | Piccolotto |
| 2012/0260220 A1 | 10/2012 | Griffin |
| 2012/0274578 A1 | 11/2012 | Snow et al. |
| 2012/0274591 A1* | 11/2012 | Rimas-Ribikauskas ..................... G06F 3/04812 345/173 |
| 2012/0274662 A1* | 11/2012 | Kim ................. G11B 27/34 345/650 |
| 2012/0278744 A1 | 11/2012 | Kozitsyn et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0303548 A1 | 11/2012 | Johnson et al. |
| 2012/0304108 A1 | 11/2012 | Jarrett et al. |
| 2012/0304132 A1 | 11/2012 | Sareen et al. |
| 2012/0304133 A1* | 11/2012 | Nan ................. G06F 3/04883 715/863 |
| 2012/0306632 A1 | 12/2012 | Fleizach et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0014057 A1 | 1/2013 | Reinpoldt et al. |
| 2013/0016042 A1 | 1/2013 | Makinen et al. |
| 2013/0016056 A1* | 1/2013 | Shinozaki ............. G06F 3/0486 345/173 |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0042199 A1 | 2/2013 | Fong et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063364 A1 | 3/2013 | Moore |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0069889 A1 | 3/2013 | Pearce et al. |
| 2013/0074003 A1 | 3/2013 | Dolenc |
| 2013/0076649 A1 | 3/2013 | Myers et al. |
| 2013/0076676 A1 | 3/2013 | Gan |
| 2013/0077804 A1 | 3/2013 | Glebe et al. |
| 2013/0082824 A1 | 4/2013 | Colley |
| 2013/0082937 A1 | 4/2013 | Liu et al. |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0111345 A1 | 5/2013 | Newman et al. |
| 2013/0111378 A1 | 5/2013 | Newman et al. |
| 2013/0111398 A1 | 5/2013 | Lu et al. |
| 2013/0111415 A1 | 5/2013 | Newman et al. |
| 2013/0111579 A1 | 5/2013 | Newman et al. |
| 2013/0113715 A1 | 5/2013 | Grant et al. |
| 2013/0113720 A1 | 5/2013 | Van Eerd et al. |
| 2013/0113760 A1 | 5/2013 | Gossweiler, III et al. |
| 2013/0120278 A1 | 5/2013 | Cantrell |
| 2013/0120280 A1 | 5/2013 | Kukulski |
| 2013/0120295 A1 | 5/2013 | Kim et al. |
| 2013/0120306 A1 | 5/2013 | Furukawa |
| 2013/0125039 A1 | 5/2013 | Murata |
| 2013/0127755 A1 | 5/2013 | Lynn et al. |
| 2013/0135243 A1 | 5/2013 | Hirsch et al. |
| 2013/0135288 A1 | 5/2013 | King et al. |
| 2013/0135499 A1 | 5/2013 | Song |
| 2013/0141364 A1* | 6/2013 | Lynn ................. H03G 3/02 345/173 |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0185642 A1 | 7/2013 | Gammons |
| 2013/0187869 A1 | 7/2013 | Rydenhag et al. |
| 2013/0191791 A1* | 7/2013 | Rydenhag ............. G06F 3/017 715/863 |
| 2013/0194217 A1 | 8/2013 | Lee et al. |

(56) References Cited

U.S. PATENT DOCUMENTS

| | | |
|---|---|---|
| 2013/0194480 A1 | 8/2013 | Fukata et al. |
| 2013/0198690 A1 | 8/2013 | Barsoum et al. |
| 2013/0201139 A1 | 8/2013 | Tanaka |
| 2013/0212515 A1 | 8/2013 | Eleftheriou |
| 2013/0212541 A1* | 8/2013 | Dolenc ................ G06F 3/017 715/863 |
| 2013/0215079 A1* | 8/2013 | Johnson ................ G06F 3/041 345/174 |
| 2013/0222274 A1 | 8/2013 | Mori et al. |
| 2013/0222323 A1 | 8/2013 | McKenzie |
| 2013/0222333 A1 | 8/2013 | Miles et al. |
| 2013/0222671 A1 | 8/2013 | Tseng et al. |
| 2013/0227413 A1 | 8/2013 | Thorsander et al. |
| 2013/0227419 A1 | 8/2013 | Lee et al. |
| 2013/0227450 A1 | 8/2013 | Na et al. |
| 2013/0228023 A1 | 9/2013 | Drasnin et al. |
| 2013/0232353 A1 | 9/2013 | Belesiu et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0246954 A1 | 9/2013 | Gray et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0265452 A1 | 10/2013 | Shin et al. |
| 2013/0268875 A1 | 10/2013 | Han et al. |
| 2013/0271395 A1 | 10/2013 | Tsai et al. |
| 2013/0275422 A1 | 10/2013 | Silber et al. |
| 2013/0278520 A1 | 10/2013 | Weng et al. |
| 2013/0293496 A1 | 11/2013 | Takamoto |
| 2013/0305184 A1 | 11/2013 | Kim et al. |
| 2013/0307790 A1 | 11/2013 | Konttori et al. |
| 2013/0307792 A1* | 11/2013 | Andres ................ G11B 27/005 345/173 |
| 2013/0314359 A1 | 11/2013 | Sudou |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0326583 A1 | 12/2013 | Freihold et al. |
| 2013/0328770 A1* | 12/2013 | Parham ................ G06F 3/0304 345/157 |
| 2013/0328793 A1 | 12/2013 | Chowdhury |
| 2013/0328796 A1 | 12/2013 | Al-Dahle et al. |
| 2013/0332836 A1 | 12/2013 | Cho |
| 2013/0332892 A1 | 12/2013 | Matsuki |
| 2013/0335373 A1 | 12/2013 | Tomiyasu |
| 2013/0338847 A1 | 12/2013 | Lisseman et al. |
| 2013/0339001 A1 | 12/2013 | Craswell et al. |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0013271 A1 | 1/2014 | Moore et al. |
| 2014/0024414 A1 | 1/2014 | Fuji |
| 2014/0026098 A1 | 1/2014 | Gilman |
| 2014/0026099 A1 | 1/2014 | Andersson Reimer et al. |
| 2014/0028554 A1 | 1/2014 | De Los Reyes et al. |
| 2014/0028571 A1 | 1/2014 | St. Clair |
| 2014/0028601 A1 | 1/2014 | Moore |
| 2014/0028606 A1 | 1/2014 | Giannetta |
| 2014/0035804 A1 | 2/2014 | Dearman |
| 2014/0035826 A1 | 2/2014 | Frazier et al. |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1 | 3/2014 | Yamazaki |
| 2014/0067293 A1 | 3/2014 | Parivar et al. |
| 2014/0071060 A1 | 3/2014 | Santos-Gomez |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0092031 A1 | 4/2014 | Schwartz et al. |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0123080 A1 | 5/2014 | Gan |
| 2014/0139456 A1* | 5/2014 | Wigdor ................ G06F 3/14 345/173 |
| 2014/0139471 A1 | 5/2014 | Matsuki |
| 2014/0145970 A1 | 5/2014 | Cho |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0179377 A1 | 6/2014 | Song et al. |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0223381 A1 | 8/2014 | Huang et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282211 A1 | 9/2014 | Ady et al. |
| 2014/0282214 A1 | 9/2014 | Shirzadi et al. |
| 2014/0300569 A1 | 10/2014 | Matsuki et al. |
| 2014/0304599 A1 | 10/2014 | Alexandersson |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1* | 11/2014 | Bull ................ G06F 16/639 345/173 |
| 2014/0344765 A1 | 11/2014 | Hicks et al. |
| 2014/0351744 A1 | 11/2014 | Jeon et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0002664 A1 | 1/2015 | Eppinger et al. |
| 2015/0012861 A1 | 1/2015 | Loginov |
| 2015/0015763 A1 | 1/2015 | Lee et al. |
| 2015/0019997 A1 | 1/2015 | Kim et al. |
| 2015/0020032 A1 | 1/2015 | Chen |
| 2015/0020033 A1 | 1/2015 | Newham et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0026642 A1 | 1/2015 | Wilson et al. |
| 2015/0029149 A1 | 1/2015 | Andersson et al. |
| 2015/0033184 A1 | 1/2015 | Kim et al. |
| 2015/0040065 A1 | 2/2015 | Bianco et al. |

(56) References Cited

U.S. PATENT DOCUMENTS

| | | |
|---|---|---|
| 2015/0042588 A1 | 2/2015 | Park |
| 2015/0046876 A1* | 2/2015 | Goldenberg ........ G06F 3/04847 715/834 |
| 2015/0049033 A1 | 2/2015 | Kim et al. |
| 2015/0052464 A1 | 2/2015 | Chen et al. |
| 2015/0055890 A1 | 2/2015 | Lundin et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1* | 3/2015 | Bernstein ............ G06F 3/04847 715/702 |
| 2015/0067496 A1 | 3/2015 | Missig et al. |
| 2015/0067497 A1 | 3/2015 | Cieplinski et al. |
| 2015/0067513 A1* | 3/2015 | Zambetti ............... G06F 3/0488 715/716 |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1* | 3/2015 | Bernstein .............. G06F 3/0412 715/769 |
| 2015/0067596 A1* | 3/2015 | Brown .................. G06F 3/0488 715/808 |
| 2015/0067601 A1 | 3/2015 | Bernstein et al. |
| 2015/0067602 A1* | 3/2015 | Bernstein ............ G06F 3/04842 715/823 |
| 2015/0067605 A1 | 3/2015 | Zambetti et al. |
| 2015/0071547 A1 | 3/2015 | Keating et al. |
| 2015/0082162 A1 | 3/2015 | Cho et al. |
| 2015/0082238 A1 | 3/2015 | Meng |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0128092 A1 | 5/2015 | Lee et al. |
| 2015/0135108 A1 | 5/2015 | Pope et al. |
| 2015/0135109 A1* | 5/2015 | Zambetti ............... G06F 3/0482 715/767 |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0143294 A1 | 5/2015 | Piccinato et al. |
| 2015/0143303 A1 | 5/2015 | Sarrazin et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0169059 A1 | 6/2015 | Behles et al. |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0205775 A1 | 7/2015 | Berdahl et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0309573 A1 | 10/2015 | Brombach et al. |
| 2015/0321607 A1 | 11/2015 | Cho et al. |
| 2015/0332107 A1 | 11/2015 | Paniaras |
| 2015/0332607 A1 | 11/2015 | Gardner, Jr. et al. |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011725 A1 | 1/2016 | D'Argenio et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0077721 A1 | 3/2016 | Laubach et al. |
| 2016/0085385 A1 | 3/2016 | Gao et al. |
| 2016/0092071 A1 | 3/2016 | Lawson et al. |
| 2016/0124924 A1 | 5/2016 | Greenberg et al. |
| 2016/0125234 A1 | 5/2016 | Ota et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0246478 A1 | 8/2016 | Davis et al. |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0306507 A1 | 10/2016 | Defazio et al. |
| 2016/0320906 A1 | 11/2016 | Bokma et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0090617 A1 | 3/2017 | Jang et al. |
| 2017/0090699 A1 | 3/2017 | Pennington et al. |
| 2017/0091153 A1 | 3/2017 | Thimbleby |
| 2017/0109011 A1 | 4/2017 | Jiang |
| 2017/0115867 A1 | 4/2017 | Bargmann |
| 2017/0123497 A1 | 5/2017 | Yonezawa |
| 2017/0124699 A1 | 5/2017 | Lane |
| 2017/0139565 A1 | 5/2017 | Choi |
| 2017/0315694 A1 | 11/2017 | Alonso Ruiz et al. |
| 2017/0357403 A1 | 12/2017 | Geary et al. |
| 2018/0024681 A1 | 1/2018 | Bernstein et al. |
| 2018/0059866 A1 | 3/2018 | Drake et al. |
| 2018/0082522 A1 | 3/2018 | Bartosik |
| 2018/0275862 A1 | 9/2018 | Khoe et al. |
| 2018/0342103 A1 | 11/2018 | Schwartz et al. |
| 2018/0349362 A1 | 12/2018 | Sharp et al. |
| 2018/0364883 A1 | 12/2018 | Khoe et al. |
| 2018/0364898 A1 | 12/2018 | Chen |
| 2018/0364904 A1 | 12/2018 | Bernstein et al. |
| 2019/0004605 A1 | 1/2019 | Flint et al. |
| 2019/0012059 A1 | 1/2019 | Kwon et al. |
| 2019/0018562 A1 | 1/2019 | Bernstein et al. |
| 2019/0042075 A1 | 2/2019 | Bernstein et al. |
| 2019/0042078 A1 | 2/2019 | Bernstein et al. |
| 2019/0065043 A1 | 2/2019 | Zambetti et al. |

(56) References Cited

U.S. PATENT DOCUMENTS

| | | | |
|---|---|---|---|
| 2019/0121493 A1 | 4/2019 | Bernstein et al. |
| 2019/0121520 A1 | 4/2019 | Cieplinski et al. |
| 2019/0138102 A1 | 5/2019 | Missig |
| 2019/0138189 A1 | 5/2019 | Missig |
| 2019/0146643 A1 | 5/2019 | Foss et al. |
| 2019/0155503 A1 | 5/2019 | Alonso Ruiz et al. |
| 2019/0158727 A1 | 5/2019 | Penha et al. |
| 2019/0163358 A1 | 5/2019 | Dascola et al. |
| 2019/0171353 A1 | 6/2019 | Missig et al. |
| 2019/0171354 A1 | 6/2019 | Dascola et al. |
| 2019/0212896 A1 | 7/2019 | Karunamuni et al. |
| 2019/0332257 A1 | 10/2019 | Kudurshian et al. |
| 2019/0364194 A1 | 11/2019 | Penha et al. |
| 2019/0391658 A1 | 12/2019 | Missig et al. |
| 2020/0081614 A1 | 3/2020 | Zambetti |
| 2020/0142548 A1 | 5/2020 | Karunamuni et al. |
| 2020/0201472 A1 | 6/2020 | Bernstein et al. |
| 2020/0210059 A1 | 7/2020 | Hu et al. |
| 2020/0218445 A1 | 7/2020 | Alonso Ruiz et al. |
| 2020/0301556 A1 | 9/2020 | Alonso Ruiz et al. |
| 2020/0333936 A1 | 10/2020 | Khoe et al. |
| 2020/0371683 A1 | 11/2020 | Zambetti et al. |
| 2020/0396375 A1 | 12/2020 | Penha et al. |
| 2021/0081082 A1 | 3/2021 | Dascola et al. |
| 2021/0117054 A1 | 4/2021 | Karunamuni et al. |
| 2021/0191602 A1 | 6/2021 | Brown et al. |

FOREIGN PATENT DOCUMENTS

| | | |
|---|---|---|
| CN | 1620327 A | 5/2005 |
| CN | 1808362 A | 7/2006 |
| CN | 101118469 A | 2/2008 |
| CN | 101192097 A | 6/2008 |
| CN | 101202866 A | 6/2008 |
| CN | 101222704 A | 7/2008 |
| CN | 101227764 A | 7/2008 |
| CN | 101241397 A | 8/2008 |
| CN | 101320303 A | 12/2008 |
| CN | 101384977 A | 3/2009 |
| CN | 101390039 A | 3/2009 |
| CN | 101421707 A | 4/2009 |
| CN | 101464777 A | 6/2009 |
| CN | 101498979 A | 8/2009 |
| CN | 101526876 A | 9/2009 |
| CN | 101562703 A | 10/2009 |
| CN | 101593077 A | 12/2009 |
| CN | 101604208 A | 12/2009 |
| CN | 101609380 A | 12/2009 |
| CN | 101620507 A | 1/2010 |
| CN | 101627359 A | 1/2010 |
| CN | 101630230 A | 1/2010 |
| CN | 101650615 A | 2/2010 |
| CN | 101685370 A | 3/2010 |
| CN | 101692194 A | 4/2010 |
| CN | 101727179 A | 6/2010 |
| CN | 101739206 A | 6/2010 |
| CN | 101763193 A | 6/2010 |
| CN | 101784981 A | 7/2010 |
| CN | 101809526 A | 8/2010 |
| CN | 101896962 A | 11/2010 |
| CN | 101937304 A | 1/2011 |
| CN | 101965549 A | 2/2011 |
| CN | 101971603 A | 2/2011 |
| CN | 101998052 A | 3/2011 |
| CN | 102004575 A | 4/2011 |
| CN | 102004576 A | 4/2011 |
| CN | 102004577 A | 4/2011 |
| CN | 102004593 A | 4/2011 |
| CN | 102004602 A | 4/2011 |
| CN | 102004604 A | 4/2011 |
| CN | 102016777 A | 4/2011 |
| CN | 102053790 A | 5/2011 |
| CN | 102067068 A | 5/2011 |
| CN | 102112946 A | 6/2011 |
| CN | 102150018 A | 8/2011 |
| CN | 102160021 A | 8/2011 |
| CN | 102171629 A | 8/2011 |
| CN | 102195514 A | 9/2011 |
| CN | 102203702 A | 9/2011 |
| CN | 102214038 A | 10/2011 |
| CN | 102223476 A | 10/2011 |
| CN | 102243662 A | 11/2011 |
| CN | 102257460 A | 11/2011 |
| CN | 102301322 A | 12/2011 |
| CN | 102349038 A | 2/2012 |
| CN | 102349040 A | 2/2012 |
| CN | 102354269 A | 2/2012 |
| CN | 102365666 A | 2/2012 |
| CN | 102375605 A | 3/2012 |
| CN | 102385478 A | 3/2012 |
| CN | 102388351 A | 3/2012 |
| CN | 102438092 A | 5/2012 |
| CN | 102460355 A | 5/2012 |
| CN | 102483666 A | 5/2012 |
| CN | 102483677 A | 5/2012 |
| CN | 102546925 A | 7/2012 |
| CN | 102566908 A | 7/2012 |
| CN | 102576251 A | 7/2012 |
| CN | 102576282 A | 7/2012 |
| CN | 102646013 A | 8/2012 |
| CN | 102662571 A | 9/2012 |
| CN | 102662573 A | 9/2012 |
| CN | 102722312 A | 10/2012 |
| CN | 102752441 A | 10/2012 |
| CN | 102792255 A | 11/2012 |
| CN | 102819331 A | 12/2012 |
| CN | 102819401 A | 12/2012 |
| CN | 102841677 A | 12/2012 |
| CN | 103019586 A | 4/2013 |
| CN | 103092386 A | 5/2013 |
| CN | 103092406 A | 5/2013 |
| CN | 103097992 A | 5/2013 |
| CN | 103186345 A | 7/2013 |
| CN | 103201714 A | 7/2013 |
| CN | 103279295 A | 9/2013 |
| CN | 103518176 A | 1/2014 |
| CN | 103649885 A | 3/2014 |
| CN | 103699295 A | 4/2014 |
| CN | 103777850 A | 5/2014 |
| CN | 103777886 A | 5/2014 |
| CN | 103793134 A | 5/2014 |
| CN | 103838465 A | 6/2014 |
| CN | 103870190 A | 6/2014 |
| CN | 103970474 A | 8/2014 |
| CN | 104011637 A | 8/2014 |
| CN | 104020868 A | 9/2014 |
| CN | 104020955 A | 9/2014 |
| CN | 104021021 A | 9/2014 |
| CN | 104024985 A | 9/2014 |
| CN | 104077014 A | 10/2014 |
| CN | 104142798 A | 11/2014 |
| CN | 104160362 A | 11/2014 |
| CN | 104267902 A | 1/2015 |
| CN | 104331239 A | 2/2015 |
| CN | 104392292 A | 3/2015 |
| CN | 104412201 A | 3/2015 |
| CN | 104471521 A | 3/2015 |
| CN | 104487928 A | 4/2015 |
| CN | 104487929 A | 4/2015 |
| CN | 104487930 A | 4/2015 |
| CN | 101527745 A | 9/2015 |
| CN | 105264476 A | 1/2016 |
| DE | 100 59 906 A1 | 6/2002 |
| EP | 0 364178 A2 | 4/1990 |
| EP | 0 859 307 A1 | 3/1998 |
| EP | 0 880 090 A2 | 11/1998 |
| EP | 1 028 583 A1 | 8/2000 |
| EP | 1 406 150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 077 490 A2 | 7/2009 |

(56) References Cited

FOREIGN PATENT DOCUMENTS

| | | |
|---|---|---|
| EP | 2 112 586 A1 | 10/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 284 675 A2 | 2/2011 |
| EP | 2 299 351 A2 | 3/2011 |
| EP | 2 302 496 A1 | 3/2011 |
| EP | 2 363 790 A1 | 9/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 445 182 A2 | 4/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 402 105 A | 12/2004 |
| JP | 58-182746 | 10/1983 |
| JP | H06-161647 A | 6/1994 |
| JP | H07-98769 A | 4/1995 |
| JP | H07-098769 A | 4/1995 |
| JP | H07-104915 | 4/1995 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2001-078137 A | 3/2001 |
| JP | 2001-202192 A | 7/2001 |
| JP | 2001-222355 A | 8/2001 |
| JP | 2001-306207 A | 11/2001 |
| JP | 2002-044536 A | 2/2002 |
| JP | 2002-149312 A | 5/2002 |
| JP | 3085481 U | 5/2002 |
| JP | 2002-182855 A | 6/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-078957 A | 3/2004 |
| JP | 2004-086733 A | 3/2004 |
| JP | 2004-152217 A | 5/2004 |
| JP | 2004-288208 A | 10/2004 |
| JP | 2005-031786 A | 2/2005 |
| JP | 2005-092386 A | 4/2005 |
| JP | 2005-102106 A | 4/2005 |
| JP | 2005-135106 A | 5/2005 |
| JP | 2005-157842 A | 6/2005 |
| JP | 2005-196810 A | 7/2005 |
| JP | 2005-317041 A | 11/2005 |
| JP | 2005-352927 A | 12/2005 |
| JP | 2006-059238 A | 3/2006 |
| JP | 2006-185443 A | 7/2006 |
| JP | 2007-116384 A | 5/2007 |
| JP | 2007-148104 A | 6/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-516348 A | 5/2008 |
| JP | 2008-146453 A | 6/2008 |
| JP | 2008-191086 A | 8/2008 |
| JP | 2008-537615 A | 9/2008 |
| JP | 2008-305174 A | 12/2008 |
| JP | 2009-500761 A | 1/2009 |
| JP | 2009-110243 A | 5/2009 |
| JP | 2009-129171 A | 6/2009 |
| JP | 2009-129443 A | 6/2009 |
| JP | 2009-169452 A | 7/2009 |
| JP | 2009-211704 A | 9/2009 |
| JP | 2009-217543 A | 9/2009 |
| JP | 2009-294688 A | 12/2009 |
| JP | 2009-545805 A | 12/2009 |
| JP | 2010-009321 A | 1/2010 |
| JP | 2010-503126 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-181940 A | 8/2010 |
| JP | 2010-198385 A | 9/2010 |
| JP | 2010-536077 A | 11/2010 |
| JP | 2010-541071 A | 12/2010 |
| JP | 2011-501307 A | 1/2011 |
| JP | 2011-028635 A | 2/2011 |
| JP | 2011-048023 A | 3/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-054196 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-170538 A | 9/2011 |
| JP | 2011-192179 A | 9/2011 |
| JP | 2011-192215 A | 9/2011 |
| JP | 2011-197848 A | 10/2011 |
| JP | 2011-221640 A | 11/2011 |
| JP | 2011-232947 A | 11/2011 |
| JP | 2011-242386 A | 12/2011 |
| JP | 2011-250004 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-033061 A | 2/2012 |
| JP | 2012-043266 A | 3/2012 |
| JP | 2012-043267 A | 3/2012 |
| JP | 2012-053687 A | 3/2012 |
| JP | 2012-053754 | 3/2012 |
| JP | 2012-053926 A | 3/2012 |
| JP | 2012-073785 A | 4/2012 |
| JP | 2012-073873 A | 4/2012 |
| JP | 2012-509605 A | 4/2012 |
| JP | 2012-093820 A | 5/2012 |
| JP | 2012-118825 A | 6/2012 |
| JP | 2012-118993 A | 6/2012 |
| JP | 2012-123564 A | 6/2012 |
| JP | 2012-128825 A | 7/2012 |
| JP | 2012-168620 A | 9/2012 |
| JP | 2012-527685 A | 11/2012 |
| JP | 2013-025357 A | 2/2013 |
| JP | 2013-030050 A | 2/2013 |
| JP | 2013-058149 A | 3/2013 |
| JP | 2013-080521 A | 5/2013 |
| JP | 2013-093020 A | 5/2013 |
| JP | 2013-101465 A | 5/2013 |

(56) References Cited

FOREIGN PATENT DOCUMENTS

| | | |
|---|---|---|
| JP | 2013-105410 A | 5/2013 |
| JP | 2013-520727 A | 6/2013 |
| JP | 2013-131185 A | 7/2013 |
| JP | 2013-529339 A | 7/2013 |
| JP | 2013-200879 A | 10/2013 |
| JP | 2013-542488 A | 11/2013 |
| JP | 2013-250602 A | 12/2013 |
| JP | 2014-504419 | 2/2014 |
| JP | 2014-529137 A | 2/2014 |
| JP | 2014-052852 A | 3/2014 |
| JP | 2014-130567 A | 7/2014 |
| JP | 2014-140112 A | 7/2014 |
| JP | 2014-149833 A | 8/2014 |
| JP | 2014-519109 A | 8/2014 |
| JP | 2015-099555 A | 5/2015 |
| JP | 2015-521315 A | 7/2015 |
| JP | 2015-153420 A | 8/2015 |
| JP | 2015-185161 A | 10/2015 |
| KR | 2006-0071353 A | 6/2006 |
| KR | 100807738 B1 | 2/2008 |
| KR | 2008-0045143 A | 4/2008 |
| KR | 100823871 B1 | 4/2008 |
| KR | 2008-0054346 A | 6/2008 |
| KR | 2009-0108065 A | 10/2009 |
| KR | 2010-0010860 A | 2/2010 |
| KR | 2010-0014095 A | 2/2010 |
| KR | 2010 0070841 A | 6/2010 |
| KR | 2010 0133246 A | 12/2010 |
| KR | 2011 0026176 A | 3/2011 |
| KR | 2011 0086501 A | 7/2011 |
| KR | 20120130972 A | 1/2012 |
| KR | 2012 0103670 A | 9/2012 |
| KR | 20120135723 A | 12/2012 |
| KR | 2013 0099647 A | 9/2013 |
| KR | 2014 0016495 A | 2/2014 |
| KR | 2014 0029720 A | 3/2014 |
| KR | 2014 0043760 A | 4/2014 |
| KR | 2014 0079110 A | 6/2014 |
| KR | 2014 0122000 A | 10/2014 |
| KR | 20150013263 A | 2/2015 |
| KR | 20150021977 A | 3/2015 |
| RU | 2007145218 A | 7/2009 |
| WO | WO 2005/106637 A2 | 11/2005 |
| WO | WO 2006/013485 A2 | 2/2006 |
| WO | WO 2006/042309 A1 | 4/2006 |
| WO | WO 2006/094308 A2 | 9/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/032598 A1 | 2/2010 |
| WO | WO 2010/032598 A1 | 3/2010 |
| WO | WO 2010/090010 A1 | 8/2010 |
| WO | WO 2010/122813 A1 | 10/2010 |
| WO | WO 2010/134729 A2 | 11/2010 |
| WO | WO 2011/024389 A1 | 3/2011 |
| WO | WO 2011/024465 A1 | 3/2011 |
| WO | WO 2011/024521 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 A1 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/137946 A1 | 10/2012 |
| WO | WO 2012/150540 A2 | 11/2012 |
| WO | WO 2012/153555 A1 | 11/2012 |
| WO | WO 2013/022486 A1 | 2/2013 |
| WO | WO 2013/035725 A1 | 3/2013 |
| WO | WO 2013/112453 A1 | 8/2013 |
| WO | WO 2013/169299 A1 | 11/2013 |
| WO | WO 2013/169300 A1 | 11/2013 |
| WO | WO 2013/169302 A1 | 11/2013 |
| WO | WO 2013/169845 A1 | 11/2013 |
| WO | WO 2013/169846 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/152601 A1 | 9/2014 |
| WO | WO 2014/200733 A1 | 12/2014 |

OTHER PUBLICATIONS

Office Action, dated Jul. 3, 2020, received in Chinese Patent Application No. 201711425148.X, which corresponds with U.S. Appl. No. 14/536,646, 13 pages.

Certificate of Grant, dated May 21, 2020, received in Australian Patent Application No. 2018256616, which corresponds with U.S. Appl. No. 14/536,141, 3 pages.

Notice of Allowance, dated Apr. 29, 2020, received in Australian Patent Application No. 2018250481, which corresponds with U.S. Appl. No. 14/536,203, 3 pages.

Office Action, dated Apr. 20, 2020, received in Chinese Patent Application No. 201610537334.1, which corresponds with U.S. Appl. No. 14/536,267, 4 pages.

Notice of Allowance, dated Jun. 24, 2020, received in Chinese Patent Application No. 201710781246.0, which corresponds with U.S. Appl. No. 14/536,291, 5 pages.

Office Action, dated Jul. 17, 2020, received in Chinese Patent Application No. 2018100116175.X, which corresponds with U.S. Appl. No. 14/536,291, 15 pages.

Final Office Action, dated Jun. 15, 2020, received in U.S. Appl. No. 14/609,006, 19 pages.

Patent, dated Apr. 1, 2020, received in European Patent Application No. 16707356.8, which corresponds with U.S. Appl. No. 14/866,159, 3 pages.

Office Action, dated May 19, 2020, received in Chinese Patent Application No. 201680011338.4, which corresponds with U.S. Appl. No. 14/868,078, 4 pages.

Office Action, dated Jun. 30, 2020, received in Chinese Patent Application No. 201680011338.4, which correspondence with U.S. Appl. No. 14/868,078, 4 pages.

Patent, dated May 12, 2020, received in Chinese Patent Application No. 201610342313.4, which corresponds with U.S. Appl. No. 14/863,432, 7 pages.

Office Action, dated Jul. 17, 2020, received in Japanese Patent Application No. 2018-243773, which corresponds with U.S. Appl. No. 14/863,432, 5 pages.

Notice of Allowance, dated Jul. 13, 2020, received in Korean Patent Application No. 2020-7015964, which corresponds with U.S. Appl. No. 14/863,432, 6 pages.

Office Action, dated Apr. 24, 2020, received in Korean Patent Application No. 2020-7003065, which corresponds with U.S. Appl. No. 14/866,511, 3 pages.

Patent, dated Apr. 22, 2020, received in European Patent Application No. 18168939.9, which corresponds with U.S. Appl. No. 14/869,899, 3 pages.

Office Action, dated Jun. 30, 2020, received in Chinese Patent Application No. 201610658351.8, which corresponds with U.S. Appl. No. 14/866,992, 11 pages.

(56) References Cited

OTHER PUBLICATIONS

Office Action, dated Jul. 15, 2020, received in Chinese Patent Application No. 201680047125.7, which corresponds with U.S. Appl. No. 15/009,676, 11 pages.
Office Action, dated Jun. 29, 2020, received in Chinese Patent Application No. 201680047164.7, which corresponds with U.S. Appl. No. 15/009,688, 7 pages.
Office Action, dated Jul. 1, 2020, received in Chinese Patent Application No. 201711262953.5, which corresponds with U.S. Appl. No. 14/857,636, 13 pages.
Office Action, dated Jul. 14, 2020, received in Chinese Patent Application No. 201711261143.8, which corresponds with U.S. Appl. No. 14/857,663, 12 pages.
Intention to Grant, dated Apr. 14, 2020, received in European Patent Application No. 17188507.2, which corresponds with U.S. Appl. No. 14/866,361, 7 pages.
Office Action, dated Jun. 23, 2020, received in Brazilian Patent Application No. 11201701119-9, which corresponds with U.S. Appl. No. 14/871,236, 9 pages.
Patent, dated May 19, 2020, received in Chinese Patent Application No. 201610871466.8, which corresponds with U.S. Appl. No. 14/871,236, 8 pages.
Office Action, dated Jul. 20, 2020, received in Indian Patent Application No. 201617032293, which corresonds with U.S. Appl. No. 14/871,227, 9 pages.
Intention to Grant, dated Apr. 30, 2020, received in European Patent Application No. 18205283.7, which corresponds with U.S. Appl. No. 15/081,771, 7 pages.
Patent, dated Apr. 7, 2020, received in Chinese Patent Application No. 201810119007.3, which corresponds with U.S. Appl. No. 15/136,782, 7 pages.
Office Action, dated May 12, 2020, received in European Patent Application No. 18171453.6, which corresponds with U.S. Appl. No. 15/136,782, 5 pages.
Certificate of Grant, dated Apr. 2, 2020, received in Australian Patent Application No. 2018204234, which corresponds with U.S. Appl. No. 15/272,327, 1 page.
Patent, dated Mar. 3, 2020, received in Chinese Patent Application No. 201810071627.4, which corresponds with U.S. Appl. No. 15/272,343, 7 pages.
Notice of Allowance, dated Apr. 22, 2020, received in U.S. Appl. No. 15/272,345, 12 pages.
Notice of Allowance, dated Jul. 6, 2020, received in Chinese Patent Application No. 201680022696.5, which corresponds with U.S. Appl. No. 15/272,345, 5 pages.
Office Action, dated May 11, 2020, received in Australian Patent Application No. 2019203776, which corresponds with U.S. Appl. No. 15/499,693, 4 pages.
Office Action, dated Jul. 23, 2020, received in U.S. Appl. No. 15/785,372, 23 pages.
Notice of Allowance, dated May 19, 2020, received in U.S. Appl. No. 15/889,115, 9 pages.
Office Action, dated Jul. 14, 2020, received in U.S. Appl. No. 15/979,347, 10 pages.
Notice of Allowance, dated May 14, 2020, received in U.S. Appl. No. 16/049,725, 9 pages.
Final Office Action, dated Jun. 9, 2020, received in U.S. Appl. No. 16/136,163.
Office Action, dated May 4, 2020, received in Australian Patent Application No. 2019203175, which corresponds with U.S. Appl. No. 16/154,591, 4 pages.
Notice of Allowance, dated Jun. 1, 2020, received in Japanese Patent Application No. 2018-202048, which corresponds with U.S. Appl. No. 16/154,591, 3 pages.
Patent, dated Jun. 25, 2020, received in Japanese Patent Application No. 2018-202048, which corresponds with U.S. Appl. No. 16/154,591.
Notice of Allowance, dated Jun. 18, 2020, received in U.S. Appl. No. 16/174,170, 19 pages.
Notice of Allowance, dated May 22, 2020, received in Japanese Patent Application No. 2019-027634, which corresponds with U.S. Appl. No. 16/240,672, 5 pages.
Patent, dated Jun. 23, 2020, received in Japanese Patent Application No. 2019-027634, which corresponds with U.S. Appl. No. 16/240,672, 4 pages.
Office Action, dated Jun. 11, 2020, received in Australian Patent Application No. 2019257437, which corresponds with U.S. Appl. No. 16/252,478, 3 pages.
Office Action, dated May 14, 2020, received in U.S. Appl. No. 16/354,035, 16 pages.
Notice of Allowance, dated Jul. 6, 2020, received in Australian Patent Application No. 2019202417, 3 pages.
Office Action, dated May 14, 2020, received in U.S. Appl. No. 16/509,438, 16 pages.
Notice of Allowance, dated May 20, 2020, received in U.S. Appl. No. 16/534,214, 16 pages.
Notice of Allowance, dated May 4, 2020, received in Korean Patent Application No. 2019-7033444, 5 pages.
Patent, dated Jun. 3, 2020, received in Korean Patent Application No. 2019-7033444, 7 pages.
Apple, "Apple—Event Sep. 2014", https://www.youtube.com/watch?v=38lqQpqwPe7s, Sep. 10, 2014, 5 pages.
Nickinson, "Inside Android 4.2: Notifications and Quick Settings", https://www.andrloidcentral.com/inside-android-42-notifications-and-quick-settings, Nov. 3, 2012, 3 pages.
Viticci, "Apple Watch: Our Complete Overview—MacStories", https://www.macstories.net, Sep. 10, 2014, 21 pages.
Yatani, et al., SemFeel: A User Interface with Semantic Tactile Feedback for Mobile Touch-Screen Devices, Proceedings of the 22nd annual ACM symposium on user interface software and technology (UIST '09), Oct. 2009, 10 pages.
Notice of Allowance, dated May 24, 2019, received in Korean Patent Application No. 2018-7028236, which corresponds with U.S. Appl. No. 14/608,895, 4 pages.
Office Action, dated Apr. 12, 2019, received in Australian Patent Application No. 2018223021, which corresponds with U.S. Appl. No. 14/536,426, 3 pages.
Patent, dated Feb. 6, 2019, received in European Patent Application No. 15183980.0, which corresponds with U.S. Appl. No. 14/536,426, 4 pages.
Notice of Allowance, dated Jul. 2, 2019, received in U.S. Appl. No. 14/536,644, 5 pages.
Notice of Allowance, dated Apr. 10, 2019, received in U.S. Appl. No. 14/608,926, 16 pages.
Notice of Allowance, dated May 21, received in U.S. Appl. No. 14/608,926, 5 pages.
Office Action, dated Jun. 6, 2019, received in Australian Patent Application No. 2018256626, which corresponds with U.S. Appl. No. 14/536,646, 3 pages.
Certificate of Grant, dated Jan. 25, 2019, received in Hong Kong Patent Application No. 2015-511645, which corresponds with U.S. Appl. No. 14/536,646, 4 pages.
Office Action, dated Jun. 5, 2019, received in Australian Patent Application No. 2018256616, which corresponds with U.S. Appl. No. 14/536,141, 3 pages.
Office Action, dated Mar. 7, 2019, received in European Patent Application No. 13726053.5, which corresponds with U.S. Appl. No. 14/536,141, 5 pages.
Office Action, dated Jul. 5, 2019, received in Japanese Patent Application No. 2017-141953, which corresponds with U.S. Appl. No. 14/536,141, 6 pages.
Notice of Allowance, dated May 7, 2019, received in Chinese Patent Application No. 201380068295.X, which corresponds with U.S. Appl. No. 14/608,942, 3 pages.
Patent, dated Mar. 8, 2019, received in Korean Patent Application No. 2015-7018448, which corresponds with U.S. Appl. No. 14/608,942, 4 pages.
Intention to Grant, dated Mar. 18, 2019, received in European Patent Application No. 13724104.8, which corresponds with U.S. Appl. No. 14/536,203, 9 pages.

(56) References Cited

OTHER PUBLICATIONS

Office action, dated Apr. 3, 2019, received in Chinese Patent Application No. 201380074060.1, which corresponds with U.S. Appl. No. 14/608,965, 3 pages.
Patent, dated May 17, 2019, received in Chinese Patent Application No. 201380074060.1, which corresponds with U.S. Appl. No. 14/608,965, 6 pages.
Office Action, dated Mar. 15, 2019, received in Australian Patent Application No. 2018204236, which corresponds with U.S. Appl. No. 14/5326,267, 5 pages.
Notice of Acceptance, dated Apr. 29, 2019, received in Australian Patent Application No. 2018204236, which corresponds with U.S. Appl. No. 14/5326,267, 3 pages.
Patent, dated Mar. 4, 2019, received in Korean Patent Application No. 2017-7034838, which corresponds with U.S. Appl. No. 14/536,267, 4 pages.
Patent, dated Feb. 22, 2019, received in Japanese Patent Application No. 2017-083027, which corresponds with U.S. Appl. No. 14/536,291, 3 pages.
Final Office Action, dated May 23, 2019, received in U.S. Appl. No. 14/609,006, 14 pages.
Notice of Allowance, dated Jul. 2, 2019, received in U.S. Appl. No. 14/536,648, 5 pages.
Intention to Grant, dated Apr. 1, 2019, received in European Patent Application No. 17153418.3, which corresponds with U.S. Appl. No. 14/536,648, 7 pages.
Patent, dated Mar. 1, 2019, received in Japanese Patent Application No. 2017-008764, which corresponds with U.S. Appl. No. 14/536,648, 3 pages.
Notice of Allowance, dated Apr. 9, 2019, received in Japanese Patent Application No. 2017-113598, which corresponds with U.S. Appl. No. 14/609,042, 5 pages.
Patent, dated Apr. 19, 2019, received in Japanese Patent Application No. 2017-113598, which corresponds with U.S. Appl. No. 14/609,042, 2 pages.
Patent, dated Mar. 8, 2019, received in Korean Patent Application No. 2017-7008614, which corresponds with U.S. Appl. No. 14/609,042, 4 pages.
Notice of Acceptance, dated Mar. 12, 2019, received in Australian Patent Application No. 2016233792, which corresponds with U.S. Appl. No. 14/864,737, 5 pages.
Notice of Allowance, dated Apr. 17, 2019, received in Chinese Patent Application No. 201610159295.6, which corresponds with U.S. Appl. No. 14/864,737, 3 pages.
Patent, dated May 31, 2019, received in Chinese Patent Application No. 201610159295.6, which corresponds with U.S. Appl. No. 14/864,737, 7 pages.
Patent, dated Feb. 19, 2019, received in Chinese Patent Application No. 201610137839.9, which corresponds with U.S. Appl. No. 14/866,159, 6 pages.
Notice of Acceptance, dated Jun. 21, 2019, received in Australian Patent Application No. 2017258967, which corresponds with U.S. Appl. No. 14/868,078, 3 page.
Office Action, dated Feb. 26, 2019, received in Chinese Patent Application No. 01610130348.1, which corresponds with U.S. Appl. No. 14/686,078, 4 pages.
Notice of Allowance, dated May 6, 2019, received in Chinese Patent Application No. 01610130348.1. which corresponds with U.S. Appl. No. 14/868,078, 3 pages.
Intention to Grant, dated May 10, 2019, received in European Patent Application No. 16708916.8, which corresponds with U.S. Appl. No. 14/868,078, 5 pages.
Intention to Grant, dated May 22, 2019, received in European Patent Application No. 17184437.6, which corresponds with U.S. Appl. No. 14/868,078, 7 pages.
Office Action, dated Jun. 17, 2019, received in Chinese Patent Application No. 201610342313.4, which corresponds with U.S. Appl. No. 14/863,432, 4 pages.

Intention to Grant, dated Jul. 5, 2019, received in European Patent Application No. 16727900.9, which corresponds with U.S. Appl. No. 14/866,511, 5 pages.
Patent, dated Feb. 26, 2019, received in Danish Patent Application No. 201670594, which corresponds with U.S. Appl. No. 14/869,899, 3 pages.
Office Action, dated May 8, 2019, received in European Patent Application No. 18168939.9, which corresponds with U.S. Appl. No. 14/869,899, 10 pages.
Office Action, dated May 23, 2019, received in European Patent Application No. 18175195.9, which corresponds with U.S. Appl. No. 14/869,899, 10 pages.
Notice of Allowance, dated Mar. 1, 2019, received in Japanese Patent Application No. 2018-100827, which corresponds with U.S. Appl. No. 14/869,899, 5 pages.
Patent, dated Apr. 5, 2019, received in Japanese Patent Application No. 2018-100827, which corresponds with U.S. Appl. No. 14/869,899, 5 pages.
Office Action, dated March 22, 2019, received in Korean Patent Application No. 2018-7017213, which corresponds with U.S. Appl. No. 14/869,899, 6 pages.
Patent, dated May 10, 2019, received in Korean Patent Application No. 2018-7017213, which corresponds with U.S. Appl. No. 14/869,899, 8 pages.
Examiner's Answer, dated May 9, 2019, received in U.S. Appl. No. 14/866,992, 26 pages.
Notice of Acceptance, dated Mar. 12, 2019, received in Australian Patent Application No. 2016304890, which corresponds with U.S. Appl. No. 14/866,992, 5 pages.
Certificate of Grant, dated May 9, 2019, received in Australian Patent Application No. 201761478, which corresponds with U.S. Appl. No. 14/866,992, 3 pages.
Summons, dated May 8, 2019, received in European Patent Application No. 16758008.3, which corresponds with U.S. Appl. No. 14/866,992, 14 pages.
Notice of Allowance, dated Jun. 18, 2019, received in Japanese Patent Application No. 2018-506425, which corresponds with U.S. Appl. No. 14/866,992, 5 pages.
Office Action, dated Jun. 28, 2019, received in U.S. Appl. No. 15/009,661, 33 pages.
Final Office Action, dated Apr. 17, 2019, received in U.S. Appl. No. 14/856,520, 38 pages.
Certificate of Grant, dated May 16, 2019, received in Australian Patent Application No. 2017202816, which corresponds with U.S. Appl. No. 14/857,636, 4 pages.
Notice of Allowance, dated May 10, 2019, received in Korean Patent Application No. 20177036645, which corresponds with U.S. Appl. No. 14/857,636, 4 pages.
Office Action, dated Jul. 1, 2019, received in Australian Patent Application No. 2019200872, which corresponds with U.S. Appl. No. 14/864,580, 6 pages.
Notice of Allowance, dated Jun. 14, 2019, received in Chinese Patent Application No. 201610342151.4, which corresponds with U.S. Appl. No. 14/864,580, 3 pages.
Certificate of Grant, dated Feb. 21, 2019, received in Australian Patent Application No. 2016276030, which corresponds with U.S. Appl. No. 14/864,601, 4 pages.
Notice of Allowance, dated May 29, 2019, received in Korean Patent Application No. 2017-7033756, which corresponds with U.S. Appl. No. 14/864,601, 5 pages.
Patent, dated Jun. 25, 2019, received in Korean Patent Application No. 2017-7033756, which corresponds with U.S. Appl. No. 14/864,601, 8 pages.
Notice of Allowance, dated May 23, 2019, received in Chinese Patent Application No. 201610189298.4, which corresponds with U.S. Appl. No. 14/866,361, 3 pages.
Office Action, dated Jun. 10, 2019, received in Japanese Patent Application No. 2017-141962, which corresponds with U.S. Appl. No. 14/866,361, 6 pages.
Patent, dated Apr. 3, 2019, received in Korean Patent Application No. 2018-7013039, which corresponds with U.S. Appl. No. 14/866,361, 4 pages.

(56) References Cited

OTHER PUBLICATIONS

Notice of Allowance, dated Apr. 4, 2019, received in U.S. Appl. No. 14/866,987, 5 pages.
Rejection Decision, dated Apr. 28, 2019, received in Chinese Patent Application No. 201610342336.5, which corresponds with U.S. Appl. No. 14/866,987, 4 pages.
Intention to Grant, dated Jun. 14, 2019, received in European Patent Application No. 16189421.7, which corresponds with U.S. Appl. No. 14/866,987, 7 pages.
Certificate of Grant, dated Jun. 13, 2019, received in Australian Patent Application No. 2017201079, which corresponds with U.S. Appl. No. 14/866,989, 1 page.
Rejection Decision, dated Apr. 24, 2019, received in Chinese Patent Application No. 201610342314.9, which corresponds with U.S. Appl. No. 14/866,989, 3 pages.
Certificate of Grant, dated Feb. 28, 2019, received in Australian Patent Application No. 2016203040, which corresponds with U.S. Appl. No. 14/871,227, 1 pages.
Notice of Allowance, dated Jun. 5, 2019, received in Chinese Patent Application No. 201680000466.9, which corresponds with U.S. Appl. No. 14/871,227, 5 pages.
Notice of Allowance, dated Apr. 4, 2019, received in U.S. Appl. No. 14/869,997, 9 pages
Notice of Allowance, dated May 21, 2019, received in Chinese Patent Application No. 201610131507.X, which corresponds with U.S. Appl. No. 14/867,990, 3 pages.
Notice of Allowance, dated Mar. 12, 2019, received in U.S. Appl. No. 14/869,703, 6 pages.
Notice of Allowance, dated May 1, 2019, received in U.S. Appl. No. 15/009,668, 12 pages.
Certificate of Grant, dated May 23, 2019, received in Australian Patent Application No. 2017202058, which corresponds with U.S. Appl. No. 15/081,771, 1 page.
Office Action, dated Apr. 17, 2019, received in European Patent Application No. 18171453.6, which corresponds with U.S. Appl. No. 15/136,782, 4 pages.
Patent, dated Mar. 22, 2019, received in Japanese Patent Application No. 2018-062161, which corresponds with U.S. Appl. No. 15/136,782, 5 pages.
Notice of Allowance, dated Feb. 25, 2019, received in Korean Patent Application No. 2018-7020659, which corresponds with U.S. Appl. No. 15/136,782, 5 pages.
Patent, dated Apr. 3, 2019, received in Korean Patent Application No. 2018-7020659, which corresponds with U.S. Appl. No. 15/136,782, 5 pages.
Office Action, dated Mar. 22, 2019, received in Australian Patent Application No. 2018204234, which corresponds with U.S. Appl. No. 15/272,327, 7 pages.
Intention to Grant, dated Mar. 19, 2019, received in European Patent Application No. 15155939.4, which corresponds with U.S. Appl. No. 15/272,327, 6 pages.
Decision to Grant, dated Apr. 26, 2019, received in European Patent Application No. 15155939.4, which corresponds with U.S. Appl. No. 15/272,327, 2 pages.
Patent, dated May 22, 2019, received in European Patent Application No. 15155939.4, which corresponds with U.S. Appl. No. 15/272,327, 1 page.
Final Office Action, dated Mar. 25, 2019, received in U.S. Appl. No. 15/272,341, 25 pages.
Office Action, dated Jun. 5, 2019, received in Chinese Patent Application No. 201810071627.4, which corresponds with U.S. Appl. No. 15/272,343, 6 pages.
Intention to Grant, dated May 13, 2019, received in European Patent Application No. 17206374.5, which corresponds with U.S. Appl. No. 15/272,343, 7 pages.
Final Office Action, dated Apr. 2, 2019, received in U.S. Appl. No. 15/272,345. 28 pages.
Patent, dated Feb. 27, 2019, received in European Patent Application No. 16756862.5, which corresponds with U.S. Appl. No. 15/272,345, 3 pages.
Final Office Action, dated Jul. 1, 2019, received in U.S. Appl. No. 15/655,749, 24 pages.
Notice of Allowance, dated Apr. 18, 2019, received in Korean Patent Application No. 2017-7034248, which corresponds with U.S. Appl. No. 15/655,749, 5 pages.
Office Action, dated Apr. 11, 2019, received in U.S. Appl. No. 15/889,115, 9 pages.
Office Action, dated May 31, 2019, received in Australian Patent Application No. 2018253529, which corresponds with U.S. Appl. No. 16/049,725, 3 pages.
Office Action, dated May 22, 2019, received in U.S. Appl. No. 16/230,743, 7 pages.
Notice of Allowance, dated Apr. 19, 2019, received in U.S. Appl. No. 16/252,478, 11 pages.
Extended European Search Report, dated Mar. 8, 2019, received in European Patent Application No. 18205283.7, which corresponds with U.S. Appl. No. 15/081,771, 15 pages.
Geisler, "Enriched Links: A Framework For Improving Web Navigation Using Pop-Up Views", Journal of the American Society for Information Science, Chapel Hill, NC, Jan. 1, 2000, 13 pages.
Office Action, dated Feb. 18, 2020, received in Australian Patent Application No. 2018223021, which corresponds with U.S. Appl. No. 14/536,426, 3 pages.
Certificate of Grant, dated Jan. 23, 2020, received in Australian Patent Application No. 2019200872, which corresponds with U.S. Appl. No. 14/864,580, 3 pages.
Patent, dated Jan. 31, 2020, received in Chinese Patent Application No. 201610342336.5, which corresponds with U.S. Appl. No. 14/866,987, 7 pages.
Office Action, dated Feb. 3, 2020, received in European Patent Application No. 17163309.2, which corresponds with U.S. Appl. No. 14/866,987, 6 pages.
Office Action, dated Feb. 3, 2020, received in European Patent Application No. 16189425.8, which corresponds with U.S. Appl. No. 14/866,989, 6 pages.
Office Action, dated Feb. 21, 2020, received in European Patent Application No. 16711725.8, which corresponds with U.S. Appl. No. 14/867,990, 13 pages.
Office Action, dated Jan. 31, 2020, received in European Patent Application No. 16753795.0, which corresponds with U.S. Appl. No. 15/009,668, 9 pages.
Notice of Allowance, dated Feb. 20, 2020, received in U.S. Appl. No. 15/272,341, 12 pages.
Notice of Allowance, dated Feb. 20, 2020, received in U.S. Appl. No. 15/655,749, 10 pages.
Office Action, dated Feb. 3, 2020, received in Chinese Patent Application No. 201710331254.5, which corresponds with U.S. Appl. No. 15/655,749, 8 pages.
Final Office Action, dated Feb. 5, 2020, received in U.S. Appl. No. 15/785,372, 26 pages.
Final Office Action, dated Feb. 27, 2020, received in U.S. Appl. No. 15/979,347, 19 pages.
Patent, dated Jan. 31, 2020, received in Korean Patent Application No. 2019-7019100, 5 pages.
Notice of Allowance, dated Mar. 27, 2020, received in Australian Patent Application No. 2018223021, which corresponds with U.S. Appl. No. 14/536,426, 3 pages.
Notice of Allowance, dated Apr. 3, 2020, received in Japanese Patent Application No. 2018-079290, which corresponds with U.S. Appl. No. 14/608,926, 5 pages.
Patent, dated Feb. 19, 2020, received in European Patent Application No. 13726053.5, which corresponds with U.S. Appl. No. 14/536,141, 4 page.
Office Action, dated Mar. 16, 2020, received in Chinese Patent Application No. 201610131415.1, which corresponds with U.S. Appl. No. 14/866,981, 3 pages.
Decision to Grant, dated Mar. 5, 2020, received in European Patent Application No. 16707356.8, which corresponds with U.S. Appl. No. 14/866,159, 2 pages.
Notice of Allowance, dated Mar. 20, 2020, received in Chinese Patent Application No. 201610342313.4, which corresponds with U.S. Appl. No. 14/863,432, 6 pages.

(56) References Cited

OTHER PUBLICATIONS

Patent, dated Feb. 7, 2020, received in Chinese Patent Application No. 201610342264.4, which corresponds with U.S. Appl. No. 14/866,511, 7 pages.
Decision to Grant, dated Mar. 26, 2020, received in European Patent Application No. 18168939.9, which corresponds with U.S. Appl. No. 14/869,899, 3 pages.
Intention to Grant, dated Apr. 7, 2020, received in European Patent Application No. 16756866.6, which corresponds with U.S. Appl. No. 15/009,676, 8 pages.
Intention to Grant, dated Mar. 16, 2020, received in European Patent Application No. 16753796.8, which corresponds with U.S. Appl. No. 15/009,688, 6 pages.
Notice of Allowance, dated Mar. 4, 2020, received in U.S. Appl. No. 14/856,520, 6 pages.
Notice of Allowance, dated Mar. 24, 2020, received in Chinese Patent Application No. 201610871466.8, which corresponds with U.S. Appl. No. 14/871,236, 3 pages.
Office Action, dated Mar. 17, 2020, received in Chinese Patent Application No. 201810119007.3, which corresponds with U.S. Appl. No. 15/136,782, 3 pages.
Notice of Allowance, dated Feb. 26, 2020, received in Chinese Patent Application No. 201810119007.3, which corresponds with U.S. Appl. No. 15/136,782, 3 pages.
Patent, dated Feb. 7, 2020, received in Hong Kong Patent Application No. 18101477.0, which corresponds with U.S. Appl. No. 15/272,345, 6 pages.
Patent, dated Mar. 27, 2020, received in Korean Patent Application No. 2019-7009439, which corresponds with U.S. Appl. No. 15/499,693, 4 pages.
Notice of Acceptance, dated Apr. 2, 2020, received in Australian Patent Application No. 2018253539, which corresponds with U.S. Appl. No. 16/049,725, 3 pages.
Office Action, dated Mar. 9, 2020, received in U.S. Appl. No. 16/145,954, 15 pages.
Office Action, dated Mar. 6, 2020, received in U.S. Appl. No. 16/154,591, 16 pages.
Office Action, dated Feb. 27, 2020, received in Korean Patent Application No. 2019-7019946, which corresponds with U.S. Appl. No. 16/154,591, 5 pages.
Final Office Action, dated Mar. 19, 2020, received in U.S. Appl. No. 16/174,170, 35 pages.
Office Action, dated Mar. 6, 2020, received in U.S. Appl. No. 16/243,834, 19 pages.
Patent, dated Mar. 13, 2020, received in Korean Patent Application No. 2018-7037896, which corresponds with U.S. Appl. No. 16/243,834, 7 pages.
Patent, dated Mar. 12, 2020, received in Korean Patent Application No. 2019-7033444, which corresponds with U.S. Appl. No. 16/252,478, 6 pages.
Anonymous, "Acer Liquid Z5 Duo User's Manual", https://global-download.acer/com, Feb. 21, 2014, 65 pages.
Anonymous, "Event Handling Guide for iOS", https://github.com/Ionfee88/iOSDevelopeLibrary/raw/master/EventHandlingiPhoneOS.pdf, Mar. 9, 2015, 74 pages.
Anonymous, "Event Handling Guide for iOS—GitHub", https://github.com/Ionfee88/iOSDevelopeLibrary/blob/master/EventHandlingiPhoneOS.pdf, Apr. 15, 2015, 3 pages.
Bilibili, "Android 5.0 Lollipop", https://www.bilibili.com/video/av1636064?from=search&seid=3128140235778895126, Oct. 19, 2014, 3 pages.
Dachis, "All the Awesome Things You Can Do With a Long Press on Your iPhone, iPad, or iPad Touch", www.lifehacker.com, Jan. 25, 2012, 4 pages.
Jauregui et al, "Design and Evaluation of 3D Cursors and Motion Parallax for the Exploration of Desktop Virtual Environments,", IEEE Symposium on 3D User Interface 2012, Mar. 4, 2012, 8 pages.
McGarry, "Everything You Can Do With Force Touch on Apple Watch", Macworld, www.macworld.com, May 6, 2015, 4 pages.
Neuburg, "Detailed Explanation iOS SDK", Oreilly Japan, Dec. 22, 2014, vol. 4, p. 175-186, 15 pages.
Nickinson, "How to use Do Not Disturb on the HTC One M8", Android Central (Year: 2014), Apr. 7, 2014, 9 pages.
Ogino, iOS 7 Design Standard, Japan, Impress Japan Corporation, Nov. 21, 2013, 1st edition, pp. 58-59.
Plaisant et al, "Touchscreen Toggle Design", Proceedings of CHI '92, pp. 667-668, May 3-7, 1992, 2 pages.
Rubino et al., "How to Enable 'Living Images' on your Nokia Lumia with Windows Phone 8.1", https://www.youtube.com/watch?v=RX7vpoFy1Dg, Jun. 6, 2014, 5 pages.
Tweak, UltimateiDeviceVids, Cydia Tweak: Quick Center—Add 3-Touch Shortcuts to ControlCenter, https://www.youtube.com/watch?v=8rHOFpGvZFM, Mar. 22, 2016, 2 pages.
Tweak, "iCrackUriDevice, iOS 9.0.2 Jailbreak & 9.2.1-9.3 Support: QuickCenter 3D Touch Cydia Tweak!", https://www.youtube.com/watch?v=op-OBr3O_Fkl, Mar. 6, 2016, 3 pages.
UpDown-G, "Using Multiple Selection Mode in Android 4.0 / Getting Started", https://techbooster.org/android/13946, Mar. 7, 2012, 7 pages.
Youtube, "How to Use 3D touch Multitask on iPhone", https://www.youtube.com/watch?v=kDq05uRdrCg, Sep. 29, 2015, 1 page.
Notice of Allowance, dated Sep. 5, 2018, received in U.S. Appl. No. 14/535,671, 5 pages.
Office Action, dated Oct. 9, 2018, received in Chinese Patent Application No. 201380068493.6, which correspondes with U.S. Appl. No. 14/608,895, 3 pages.
Patent, dated Dec. 25, 2018, received in Chinese Patent Application No. 201380068493.6, which corresponds with U.S. Appl. No. 14/608,895, 4 pages.
Certificate of Grant, dated Dec. 26, 2018, received in European Patent Application No. 13795391.5, which corresponds with U.S. Appl. No. 14/536,426, 4 pages.
Office Action, dated Oct. 5, 2018, received in Korean Patent Application No. 2018-7028236, which corresponds with U.S. Appl. No. 14/608,895, 6 pages.
Notice of Allowance, dated Aug. 15, 2018, received in U.S. Appl. No. 14/536,235, 5 pages.
Certificate of Grant, dated Sep. 13, 2018, received in Australian Patent Application No. 2016216580, which corresponds with U.S. Appl. No. 14/536,426, 1 page.
Patent, dated Aug. 17, 2018, received in Chinese Patent Application No. 201380035982.1, which corresponds with U.S. Appl. No. 14/536,426, 4 pages.
Notice of Allowance, dated Aug. 8, 2018, received in Chinese Patent Application No. 201510566550.4, which corresponds with U.S. Appl. No. 14/536,426, 3 pages.
Patent, dated Oct. 23, 2018, received in Chinese Patent Application No. 201510566550.4, which corresponds with U.S. Appl. No. 14/536,426, 4 pages.
Decision to Grant, dated Jan. 10, 2019, received in European Patent Application No. 15183980.0, which corresponds with U.S. Appl. No. 14/536,426, 4 pages.
Office Action, dated Nov. 6, 2018, received in Japanese Patent Application No. 2018-000753, which corresponds with U.S. Appl. No. 14/536,426, 8 pages.
Office Action, dated Nov. 2, 2018, received in U.S. Appl. No. 14/536,644, 24 pages.
Office Action, dated Feb. 22, 2019, received in Japanese Patent Application No. 2018-079290, which corresponds with U.S. Appl. No. 14/608,926, 7 pages.
Notice of Allowance, dated Aug. 31, 2018, received in Chinese Patent Application No. 201380035893.7, which corresponds with U.S. Appl. No. 14/536,141, 6 pages.
Patent, dated Oct. 23, 2018, received in Chinese Patent Application No. 201380035893.7, which corresponds with U.S. Appl. No. 14/536,141, 4 pages.
Office Action, dated Oct. 8, 2018, received in Chinese Patent Application No. 201380068295.X, which corresponds with U.S. Appl. No. 14/608,942, 3 pages.
Decision to Grant, dated Sep. 13, 2018, received in European Patent Application No. 13798464.7, which corresponds with U.S. Appl. No. 14/608,942, 2 pages.

(56) References Cited

OTHER PUBLICATIONS

Notice of Allowance, dated Jan. 15, 2019, recieved in Korean Patent Application No. 2015-7018448, which corresponds with U.S. Appl. No. 14/608,942, 5 pages.
Certificate of Grant, dated Nov. 1, 2018, received in Australian Patent Application No. 2016238917, which corresponds with U.S. Appl. No. 14/536,203, 1 page.
Decision to Grant, dated Oct. 24, 2018, received in European Application No. 13724104.8, which corresponds with U.S. Appl. No. 14/536,203, 5 pages.
Office Action, dated Oct. 19, 2018, received in Japanese Patent Application No. 2018-022394, which corresponds with U.S. Appl. No. 14/536,203, 4 pages.
Final Office Action, dated Jan. 10, 2019, received in U.S. Appl. No. 14/608,965, 17 pages.
Office action, dated Nov. 1, 2018, received in Chinese Patent Application No. 201380074060.1, which corresponds with U.S. Appl. No. 14/608,965, 3 pages.
Decision to Grant, dated Sep. 6, 2018, received in European Patent Application No. 13798465.4, which corresponds with U.S. Appl. No. 14/608,965, 2 pages.
Office Action, dated Nov. 28, 2018, received in Chinese Patent Application No. 201610537334.1, which corresponds with U.S. Appl. No. 14/536,267, 5 pages.
Decision to Grant, dated Oct. 18, 2018. received in European Patent Application No. 13724106.3, which corresponds with U.S. Appl. No. 14/536,267, 3 pages.
Grant Certificate, dated Nov. 14, 2018, received in European Patent Application No. 13724106.3, which corresponds with U.S. Appl. No. 14/536,267, 3 pages. 4 pages.
Decision to Grant, dated Nov. 29, 2018, received in European Patent Application No. 16177863.4, which corresponds with U.S. Appl. No. 14/536,267, 4 pages.
Patent, dated Dec. 26, 2018, received in European Patent Application No. 16177863.4, which corresponds with U.S. Appl. No. 14/536,267, 4 pages.
Office Action, dated Feb. 4, 2019, received in Japanese Patent Application No. 2017-237035, which corresponds with U.S. Appl. No. 14/536,267, 7 pages.
Patent, dated Oct. 24, 2016, received in Korean Patent Application No. 2014-7034530, which corresponds with U.S. Appl. No. 14/536,267, 4 pages.
Office Action, dated Jan. 29, 2018, received in Korean Patent Application No. 2017-7034838, which corresponds with U.S. Appl. No. 14/536,267, 4 pages.
Notice of Allowance, dated Dec. 3, 2018, received in Korean Patent Application No. 2017-7034838, which corresponds with U.S. Appl. No. 14/536,267, 5 pages.
Patent, dated Nov. 30, 2018, received in Australian Patent Application No. 2016216658, which corresponds with U.S. Appl. No. 14/536,291, 4 pages.
Intention to Grant, dated Jan. 8, 2019, received in European Patent Application No. 17186744.3, which corresponds with U.S. Appl. No. 14/536,291, 7 pages.
Notice of Allowance, dated Jan. 15, 2019, received in Japanese Patent Application No. 2017-083027, which corresponds with U.S. Appl. No. 14/536,291, 5 pages.
Intention to Grant, dated Jan. 16, 2019, received in European Patent Application No. 13811032.5, which corresponds with U.S. Appl. No. 14/608,985, 9 pages.
Office Action, dated Oct. 11, 2018, received in U.S. Appl. No. 14/609,006, 12 pages.
Office Action, dated Jan. 2, 2019, received in U.S. Appl. No. 14/536,648 12 pages.
Notice of Allowance, dated February 4, 2019, received in Japanese Patent Application No. 2017-008764, which corresponds with U.S. Appl. No. 14/536,648, 5 pages.
Office Action, dated Aug. 24, 2018, received in Japanese Patent Application No. 2017-113598, which corresponds with U.S. Appl. No. 14/609,042, 6 pages.
Notice of Allowance, dated Dec. 17, 2018, received in Korean Patent Application No. 2017-7008614, which corresponds with U.S. Appl. No. 14/609,042, 5 pages.
Office Action, dated Sep. 11, 2018, received in Chinese Patent Application No. 201610159295.6, which corresponds with U.S. Appl. No. 14/864,737, 6 pages.
Patent, dated Dec. 26, 2018, received in Korean Patent Application No. 2017-7030129, which corresponds with U.S. Appl. No. 14/864,737, 4 pages.
Office Action, dated Nov. 5, 2018, received in Chinese Patent Application No. 201610131415.1, which corresponds with U.S. Appl. No. 14/866,981, 6 pages.
Notice of Allowance, dated Dec. 6, 2018, received in Chinese Patent Application No. 201610137839.9, which corresponds with U.S. Appl. No. 14/866,159, 3 pages.
Office Action, dated Feb. 7, 2019, received in Australian Patent Application No. 2017258967, which corresponds with U.S. Appl. No. 14/868,078, 3 page.
Office Action, dated Aug. 20, 2018, received in Chinese Patent Application No. 01610130348.1, which corresponds with. U.S. Appl. No. 14/868,078, 6 pages.
Office Action, dated Oct. 25, 2018, received in European Patent Application No. 17184437.6, which corresponds with U.S. Appl. No. 14/868,078, 6 pages.
Office Action, dated Dec. 4, 2018, received in Chinese Patent Application No. 201610342313.4, which corresponds with U.S. Appl. No. 14/863,432, 5 pages.
Office Action, dated Dec. 5, 2018, received in Chinese Patent Application No. 201610342264.4, which corresponds with U.S. Appl. No. 14/866,511, 4 pages.
Office Action, dated Jan. 2, 2019, received in European Patent Application No. 16727900.9, which corresponds with U.S. Appl. No. 14/866,511, 5 pages.
Notice of Acceptance, dated Aug. 23, 2018, received in Australian Patent Application No. 2018204611, which corresponds with U.S. Appl. No. 14/869,899, 3 pages.
Office Action, dated Oct. 9, 2018, received in Danish Patent Application No. 201670594, which corresponds with U.S. Appl. No. 14/869,899, 2 pages.
Office Action, dated Sep. 21, 2018, recieved in Japanese Patent Application No. 2018-100827, which corresponds with U.S. Appl. No. 14/869,899, 4 pages.
Office Action, dated Oct. 5, 2018, received in Korean Patent Application No. 2018-7017213, which corresponds with U.S. Appl. No. 14/869,899, 3 pages.
Final Office Action, dated Aug. 28, 2018, received in U.S. Appl. No. 14/866,992, 52 pages.
Office Action, dated Oct. 12, 2018, received in European Patent Application No. 16758008.3, which corresponds with U.S. Appl. No. 14/866,992, 11 pages.
Office Action, dated Jan. 11, 2019, received in Japanese Patent Application No. 2018-506425, which corresponds with U.S. Appl. No. 14/866,992, 6 pages.
Final Office Action, dated Sep. 19, 2018, received in U.S. Appl. No. 15/009,661, 28 pages.
Notice of Allowance, dated Nov. 15, 2018, received in U.S. Appl. No. 15/009,676, 6 pages.
Notice of Allowance, dated Nov. 6, 2018, received in U.S. Appl. No. 15/009,688, 10 pages.
Office Action, dated Nov. 20, 2018, received in U.S. Appl. No. 14/856,520, 36 pages.
Notice of Allowance, dated Aug. 16, 2018, received in U.S. Appl. No. 14/857,636, 5 pages.
Office Action, dated Jan. 15, 2019, received in Australian Patent Application No. 2017202816, which corresponds with U.S. Appl. No. 14/857,636, 3 pages.
Office Action, dated Nov. 28, 2018, recieved in Korean Patent Application No. 20177036645, which corresponds with U.S. Appl. No. 14/857,636, 6 pages.
Notice of Allowance, dated Aug. 16, 2018, received in U.S. Appl. No. 14/857,663, 5 pages.
Notice of Allowance, dated Oct. 9, 2018, received in U.S. Appl. No. 14/864,529, 11 pages.

(56) References Cited

OTHER PUBLICATIONS

Office Action, dated Nov. 7, 2018, received in Chinese Patent Application No. 201610342151.4, which corresponds with U.S. Appl. No. 14/864,580, 3 pages.
Office Action, dated Aug. 31, 2018, received in Australian Patent Application No. 2016276030, which corresponds with U.S. Appl. No. 14/864,601, 3 pages.
Office Action, dated Feb. 4, 2019, received in European Patent Application No. 16730554.9, which corresponds with U.S. Appl. No. 14/864,601, 10 pages.
Notice of Allowance, dated Dec. 10, 2018, received in Japanese Patent Application No. 2017-561375, which corresponds with U.S. Appl. No. 14/864,601, 5 pages.
Patent, dated Jan. 11, 2019, received in Japanese Patent Application No. 2017-561375, which corresponds with U.S. Appl. No. 14/864,601, 3 pages.
Office Action, dated Jan. 25, 2019, received in Korean Patent Application No. 2017-7033756, which corresponds with U.S. Appl. No. 14/864,601, 8 pages.
Office Action, dated Oct. 19, 2018, received in Chinese Patent Application No. 201610189298.4, which corresponds with U.S. Appl. No. 14/866,361, 6 pages.
Office Action, dated Jan. 30, 2019, received in European Patent Application No. 17188507.2, which corresponds with U.S. Appl. No. 14/866,361, 13 pages.
Office Action, dated Oct. 12, 2018, received in Japanese Patent Application No. 2017-141962, which corresponds with U.S. Appl. No. 14/866,361, 6 pages.
Office Action, dated Sep. 14, 2018, received in Korean Patent Application No. 2018-7013039, which corresponds with U.S. Appl. No. 14/866,361, 2 pages.
Notice of Allowance, dated Jan. 30, 2019, received in Korean Patent Application No. 2018-7013039, which corresponds with U.S. Appl. No. 14/866,361, 5 pages.
Final Office Action, dated Oct. 11, 2018, received in U.S. Appl. No. 14/866,987, 20 pages.
Office Action, dated Dec. 4, 2018, received in Chinese Patent Application No. 201610342336.5, which corresponds with U.S. Appl. No. 14/866,987, 5 pages.
Office Action, dated Dec. 11, 2018, received in European Patent Application No. 16189421.7, which corresponds with U.S. Appl. No. 14/866,987, 6 pages.
Notice of Allowance, dated Jan. 17, 2019, received in U.S. Appl. No. 14/866,989, 8 pages.
Notice of Acceptance, dated Feb. 14, 2019, received in Australian Patent Application No. 2017201079, which corresponds with U.S. Appl. No. 14/866,989, 3 pages.
Office Action, dated Sep. 19, 2018, received in Chinese Patent Application No. 201610342314.9, which corresponds with U.S. Appl. No. 14/866,989, 6 pages.
Office Action, dated Feb. 26, 2019, received in Chinese Patent Application No. 201610342314.9, which corresponds with U.S. Appl. No. 14/866,989, 3 pages.
Patent, dated Feb. 15, 2019, received in Russian Patent Application No. 2017131408, which corresponds with U.S. Appl. No. 14/871,236, 2 pages.
Notice of Allowance, dated Dec. 3, 2018, received in U.S. Appl. No. 14/870,754, 8 pages.
Notice of Allowance, dated Dec. 5, 2018, received in U.S. Appl. No. 14/870,882, 8 pages.
Office Action, dated Feb. 11, 2019, received in European Patent Application No. 17171972.7, which corresponds with U.S. Appl. No. 14/870,882, 7 pages.
Notice of Allowance, dated Aug. 27, 2018, received in U.S. Appl. No. 14/870,988, 11 pages.
Notice of Acceptance, dated Oct. 30, 2018, received in Australian Patent Application No. 2016203040, which corresponds with U.S. Appl. No. 14/871,227, 4 pages.
Office Action, dated Oct. 11, 2018, received in Australian Patent Application No. 2017245442, which corresponds with U.S. Appl. No. 14/871,227, 4 pages.
Office Action, dated Nov. 16, 2018, received in Chinese Patent Application No. 201680000466.9, which corresponds with U.S. Appl. No. 14/871,227, 5 pages.
Intent to Grant, dated Sep. 17, 2018, received in European Patent Application No. 16711743.1, which corresponds with U.S. Appl. No. 14/871,227, 5 pages.
Patent, dated Nov. 28, 2018, received in European Patent Application No. 16711743.1, which corresponds with U.S. Appl. No. 14/871,227, 1 page.
Notice of Allowance, dated Oct. 1, 2018, received in Korean Patent Application No. 2016-7019816, which corresponds with U.S. Appl. No. 14/871,227, 6 pages.
Patent, dated Dec. 28, 2018, received in Korean Patent Application No. 2016-7019816, which corresponds with U.S. Appl. No. 14/871,227, 8 pages.
Office Action, dated Nov. 5, 2018, received in U.S. Appl. No. 14/871,336, 24 pages.
Notice of Allowance, dated Feb. 5, 2019, received in U.S. Appl. No. 14/871,336, 10 pages.
Office Action, dated Feb. 12, 2019, received in European Patent Application No. 17172266.3, which corresponds with U.S. Appl. No. 14/871,336, 6 pages.
Notice of Allowance, dated Oct. 12, 2018, received in Japanese Patent Application No. 2018-020324, which corresponds with U.S. Appl. No. 14/871,336, 5 pages.
Patent, dated Nov. 16, 2018, received in Japanese Patent Application No. 2018-020324, which corresponds with U.S. Appl. No. 14/871,336, 4 pages.
Final Office Action, dated Oct. 17, 2018, received in U.S. Appl. No. 14/867,892, 48 pages.
Final Office Action, dated Oct. 4, 2018, received in U.S. Appl. No. 14/869,361, 28 pages.
Office Action, dated Feb. 27. 2019, received in U.S. Appl. No. 14/869,361, 28 pages.
Office Action, dated Sep. 7, 2018, received in U.S. Appl. No. 14/869,997, 23 pages.
Final Office Action, dated Oct. 26, 2018, received in U.S. Appl. No. 14/869,703, 19 pages.
Office Action, dated Jan. 10, 2019, received in U.S. Appl. No. 15/009,668, 17 pages.
Notice of Acceptance, dated Jan. 24, 2019, received in Australian Patent Application No. 2017202058, which corresponds with U.S. Appl. No. 15/081,771, 3 pages.
Notice of Allowance, dated Oct. 12, 2018, received in Japanese Patent Application No. 2017-086460, which corresponds with U.S. Appl. No. 15/081,771, 5 pages.
Patent, dated Sep. 28, 2018, received in Korean Patent Application No. 2017-7014536, which corresponds with U.S. Appl. No. 15/081,771, 3 pages.
Notice of Acceptance, dated Sep. 10, 2018, received in Australian Patent Application No. 2018202855, which corresponds with U.S. Appl. No. 15/136,782, 3 pages.
Certificate of Grant, dated Jan. 17. 2015, received in Australian Patent Application No. 2018202855, which corresponds with U.S. Appl. No. 15/136,782, 4 pages.
Office Action, dated Nov. 12, 2018, received in Japanese Patent Application No. 2018-026161, which corresponds with U.S. Appl. No. 15/136,782, 5 pages.
Notice of Allowance, dated Feb. 18, 2019, received in Japanese Patent Application No. 2018-062161, which corresponds with U.S. Appl. No. 15/136,782, 5 pages.
Office Action, dated Oct. 31, 2018, received in Korean Patent Application No. 2018-7020659, which corresponds with U.S. Appl. No. 15/136,782, 5 pages.
Office Action, dated Dec. 18, 2018, received in Danish Patent Application No. 201670587, which corresponds with U.S. Appl. No. 15/231,745, 4 pages.
Office Action, dated Nov. 23, 2018, received in Danish Patent Application No. 201670591, which corresponds with U.S. Appl. No. 15/231,745, 7 pages.

(56) References Cited

OTHER PUBLICATIONS

Notice of Allowance, dated Oct. 4, 2018, received in U.S. Appl. No. 15/272,327, 46 pages.
Office Action, dated Sep. 14, 2018, received in European Patent Application No. 15155939.4, which corresponds with U.S. Appl. No. 15/272,327, 5 pages.
Patent, dated Aug. 31, 2018, received in Japanese Patent Application No. 2018-506989, which corresponds with U.S. Appl. No. 15/272,327, 3 pages.
Office Action, dated Oct. 26, 2018, received in U.S. Appl. No. 15/272,341, 22 pages.
Notice of Allowance, dated Sep. 20, 2018, received in U.S. Appl. No. 15/272,343, 44 pages.
Office Action, dated Jan. 8, 2019, received in European Patent Application No. 17206374.5, which corresponds with U.S. Appl. No. 15/272,343, 5 pages.
Office Action, dated Oct. 15, 2018, received in U.S. Appl. No. 15/272,345, 31 pages.
Office Action, dated Nov. 13, 2018, received in European Patent Application No. 16756862.5, which corresponds with U.S. Appl. No. 15/272,345, 5 pages.
Decision to Grant, dated Jan. 31, 2019, received in European Patent Application No. 16756862.5, which corresponds with U.S. Appl. No. 15/272,345, 5 pages.
Notice of Allowance, dated Aug. 15, 2018, received in U.S. Appl. No. 15/482,618, 7 pages.
Notice of Allowance, dated Oct. 12, 2018, received in U.S. Appl. No. 15/499,693, 8 pages.
Office Action, dated Jan. 24, 2019, received in U.S. Appl. No. 15/655,749, 25 pages.
Extended European Search Report, dated Dec. 5, 2018, received in European Patent Application No. 18194127.9, which corresponds with U.S. Appl. No. 14/608,942, 8 pages.
Extended European Search Report, dated Oct. 30, 2018, received in European Patent Application No. 18183789.9, which corresponds with U.S. Appl. No. 14/536,267, 11 pages.
Extended European Search Report, dated Aug. 24, 2018, received in European Patent Application No. 18171453.6, which corresponds with U.S. Appl. No. 15/136,782, 9 pages.
Patent, dated Jul. 9, 2019, received in Korean Patent Application No. 2018-7028236, which corresponds with U.S. Appl. No. 14/608,895, 4 pages.
Certificate of Grant, dated Jul. 5, 2019, received in Hong Kong Patent Application No. 15108892.5, which corresponds with U.S. Appl. No. 14/536,426, 5 pages.
Notice of Acceptance, dated Aug. 1, 2019, received in Australian Patent Application No. 2018256626, which corresponds with U.S. Appl. No. 14/536,646, 3 pages.
Patent, dated Jul. 5, 2019, received in Chinese Patent Application No. 201380068295.X, which corresponds with U.S. Appl. No. 14/608,942, 8 pages.
Certificate of Grant, dated Jul. 26, 2019, received in Hong Kong, which corresponds with U.S. Appl. No. 14/608,942, 4 pages.
Office Action, dated Aug. 20, 2018, received in Australian Patent Application No. 201850481, which corresponds with U.S. Appl. No. 14/536,203, 2 pages.
Decision to Grant, dated Aug. 8, 2019, received in European Patent Application No. 13724104.8, which corresponds with U.S. Appl. No. 14/536,203, 1 page.
Office Action, dated Jul. 11, 2019, received in Chinese Patent Application No. 201610537334.1, which corresponds with U.S. Appl. No. 14/536,267, 3 pages.
Office Action, dated Aug. 29, 2019, received in European Patent Application No. 18183789.9, which corresponds with U.S. Appl. No. 16/262,800, 9 pages.
Decision Grant, dated Aug. 1, 2019, received in European Patent Application No. 13811032.5, which corresponds with U.S. Appl. No. 14/608,985, 2 pages.
Decision to Grant, dated Aug. 16, 2019, received in European Patent Application No. 17153418.3, which corresponds with U.S. Appl. No. 14/536,648, 1 page.
Certificate of Grant, dated Jul. 4, 2019, received in Australian Patent Application No. 2016233792, which corresponds with U.S. Appl. No. 14/864,737, 1 page.
Office Action, dated Jul. 16, 2019, received in Chinese Patent Application No. 201610131415.1, which corresponds with U.S. Appl. No. 14/866,981, 4 pages.
Patent, dated Jul. 5, 2019, received in Chinese Patent Application No. 201610130348.1, which corresponds with U.S. Appl. No. 14/868,078, 6 pages.
Office Action, dated Jul. 11, 2019, received in Chinese Patent Application No. 201610342264.4, which corresponds with U.S. Appl. No. 14/866,511, 4 pages.
Certificate of Grant, dated Jul. 4, 2019, received in Australian Patent Application No. 2016304890, which corresponds with U.S. Appl. No. 14/866,992, 1 page.
Patent, dated Jul. 26, 2019, received in Japanese Patent Application No. 2018-506425, which corresponds with U.S. Appl. No. 14/866,992, 3 pages.
Patent, dated Jul. 11, 2019, received in Korean Patent Application No. 20177036645, which corresponds with U.S. Appl. No. 14/857,636, 8 pages.
Patent, dated Jul. 30, 2019, received in Chinese Patent Application No. 201610342151.4, which corresponds with U.S. Appl. No. 14/864,580, 3 pages.
Notice of Allowance, dated Aug. 14, 2019, received in Korean Patent Application No. 2019-7018317, which corresponds with U.S. Appl. No. 14/864,580, 6 pages.
Intention to Grant, dated Jul. 18, 2019, received in European Patent Application No. 16730554.9, which corresponds with U.S. Appl. No. 14/864,601, 5 pages.
Patent, dated Jul. 23, 2019, received in Chinese Patent Application No. 201610189298.4, which corresponds with U.S. Appl. No. 14/866,361, 7 pages.
Office Action, dated Aug. 15, 2019, received in Chinese Patent Application No. 201610342336.5, which corresponds with U.S. Appl. No. 14/866,987, 3 pages.
Patent, dated Aug. 9, 2019, received in Chinese Patent Application No. 201680000466.9, which corresponds with U.S. Appl. No. 14/871,227, 8 pages.
Examiner's Answer, dated Jul. 18, 2019, received in U.S. Appl. No. 14/867,892, 17 pages.
Patent, dated Jul. 19, 2019, received in Chinese Patent Application No. 201610131507.X, which corresponds with U.S. Appl. No. 14/867,990, 6 pages.
Office Action, dated Aug. 2, 2019, received in Korean Patent Application No. 2019-7009439, which corresponds with U.S. Appl. No. 15/499,693, 3 pages.
Patent, dated Jul. 3, 2019, received in Korean Patent Application No. 2017-7034248, which corresponds with U.S. Appl. No. 15/655,749, 5 pages.
Office Action, dated Aug. 1, 2019, received in U.S. Appl. No. 15/785,372, 22 pages.
Office Action, dated Jul. 25, 2019, received in U.S. Appl. No. 15/979,347, 14 pages.
Office Action, dated Aug. 20, 2019, received in Korean Patent Application No. 2019-7019946, which corresponds with U.S. Appl. No. 16/154,591, 6 pages.
Office Action, dated Jul. 5, 2019, received in Korean Patent Application No. 2018-7037896, which corresponds with U.S. Appl. No. 16/243,834, 2 pages.
Office Action, dated Jul. 15, 2019, received in U.S. Appl. No. 16/258,394, 8 pages.
Certificate of Grant, dated Dec. 5, 2019, received in Australian Patent Application No. 2018256626, which corresponds with U.S. Appl. No. 14/536,646, 3 pages.
Notice of Acceptance, dated Jan. 22, 2020, received in Australian Patent Application No. 2018256616, which corresponds with U.S. Appl. No. 14/536,141, 3 pages.

(56) References Cited

OTHER PUBLICATIONS

Decision to Grant, dated Jan. 23, 2020, received in European Patent Application No. 13726053.5, which corresponds with U.S. Appl. No. 14/536,141, 1 page.
Notice of Allowance dated Jan. 2, 2020, received in U.S. Appl. No. 14/608,965, 5 pages.
Office Action, dated Dec. 20, 2019, received in Chinese Patent Application No. 201610537334.1, which corresponds with U.S. Appl. No. 14/536,267, 3 pages.
Office Action, dated Jan. 7, 2020, received in U.S. Appl. No. 14/609,006, 17 pages.
Patent, dated Feb. 8, 2017, received in Chinese Patent Application No. 201620470063.8, which corresponds with U.S. Appl. No. 14/863,432, 5 pages.
Office Action, dated Jan. 10, 2020, received in Japanese Patent Application No. 2018-243773, which corresponds with U.S. Appl. No. 14/863,432, 6 pages.
Patent, dated Jan. 1, 2020, received in European Patent Application No. 16727900.9, which corresponds with U.S. Appl. No. 14/866,511, 3 pages.
Office Action, dated Jan. 13, 2020, received in Chinese Patent Application No. 201610658351.8, which corresponds with U.S. Appl. No. 14/866,992, 3 pages.
Final Office Action, dated Dec. 30, 2019, received in U.S. Appl. No. 15/009,661, 33 pages.
Notice of Allowance, dated Jan. 6, 2020, received in U.S. Appl. No. 14/856,520, 5 pages.
Office Action, dated Jan. 20, 2020, received in Japanese Patent Application No. 2017-029201, which corresponds with U.S. Appl. No. 14/857,636, 21 pages.
Patent, dated Dec. 11, 2019, received in European Patent Application No. 16189421.7, which corresponds with U.S. Appl. No. 14/866,987, 3 pages.
Office Action, dated Jan. 24, 2020, received in European Patent Application No. 18205283.7, which corresponds with U.S. Appl. No. 15/081,771, 4 pages.b.
Patent, dated Nov. 29, 2019, received in Japanese Patent Application No. 2018-158502, which corresponds with U.S. Appl. No. 15/231,745, 3 pages.
Notice of Acceptance, dated Dec. 10, 2019, received in Australian Patent Application No. 2018204234, which corresponds with U.S. Appl. No. 15/272,327, 3 pages.
Notice of Allowance, dated Dec. 27, 2019, received in Korean Patent Application No. 2019-7009439, which corresponds with U.S. Appl. No. 15/499,693, 5 pages.
Office Action, dated Dec. 18, 2019, received in Australian Patent Application No. 2018282409, which corresponds with U.S. Appl. No. 16/243,834, 3 pages.
Office Action, dated Dec. 23, 2019, received in Korean Patent Application No. 2018-7037896, which corresponds with U.S. Appl. No. 16/243,834, 6 pages.
Notice of Allowance, dated Dec. 13, 2019, received in Korean Patent Application No. 2019-7033444, which corresponds with U.S. Appl. No. 16/252,478, 6 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Angelov, "Sponsor Flip Wall with Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "Android—What Should Status Bar Toggle Button Behavior Be?", https://ux.stackechange.com/questions/34814, Jan. 15, 2015, 2 pages.

Anonymous, "Google Android 5.0 Release Date, Specs and Editors Hands On Review—CNET", http://www.cnet.com/products/google-an-android-5-0-lollipop/, Mar. 12, 2015, 10 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27, 2013, 6 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Azundris, "A Fire in the Pie," http://web.archive.org/web/20140722062639/http://blog.azundrix.com/archives/168-A-fire-in-the-sky.html, Jul. 22, 2014, 8 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Brownlee, "Android 5.0 Lollipop Feature Review!", https//www.youtube.com/watch?v=pEDQ1z1-PvU, Oct. 27, 2014, 5 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gestures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Dzyre, "10 Android Notification Features You Can Fiddle With", http://www.hongkiat.com/blog/android-notification-features, Mar. 10, 2014, 10 pages.
Easton-Ellett, "Three Free Cydia Utilities To Remove iOS Notification Badges", http://www.ijailbreak.com/cydia/three-free-cydia-utilies-to-remove-ios-notification-badges, Apr. 14, 2012, 2 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs—Preview And Convert Pictures From Windows Context Menu", https://web.addictivetips.com/windows-tips/sagethumbs-preview-and-convert-photos-from-windows-context-menu, Aug. 8, 2011, 5 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.

(56) References Cited

OTHER PUBLICATIONS

Flaherty, "Is Apple Watch's Pressure-Sensitive Screen A Bigger Deal Than The Gadget Itself?", http://www.wired.com/2014/09/apple-watchs-pressure-sensitive-screen-bigger-deal-gadget, Sep. 15, 2014, 3 pages.
Flixel, "Cinemagraph Pro For Mac", https://flixel.com/products/mac/cinemagraph-pro, 2014, 7 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
Gardner, "Recenz—Recent Apps In One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Grant, "Android's Notification Center", https://www.objc.io/issues/11-android/android-notifications, Apr. 30, 2014, 26 pages.
Ibm et al., "Pressure-Sensitive Icons", IBM Technical Disclosure Bulletin, vol. 33, No. 1B, Jun. 1, 1990, 3 pages.
ICIMS Recruiting Software, "Blackberry Playbook Review," http://www.tested.com/tech.tablets/5749-blackberry-playbook-review/, 2015, 11 pages.
IPhoneHacksTV, "Confero allows you to easily manage your Badge notifications—iPhone Hacks", youtube, https://wwwyoutube.com/watch?v=JCk61pnL4SU, Dec. 26, 2014, 3 pages.
IPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
IPodHacks 142: "Water Ripple Effects On The Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Kronfli, "HTC Zoe Comes To Google Play, Here's Everything You Need To Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside The Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
MacKenzie et al., "The Tactile Touchpad", Chi '97 Extended Abstracts on Human Factors in Computing Systems Looking to the Future, Chi '97, Mar. 22, 1997, 5 pages.
Mahdi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Matthew, "How to Preview Photos and Images From Right-Click Context Menue in Windows [Tip]", http://www.dottech.org/159009/add-image-preview-in-windows-context-menu-tip, Jul. 4, 2014, 5 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Lumia—How to Personalize Your Start Screen", https://www.youtube.com/watch?v=6GI5Z3TrSEs, Nov. 11, 2014, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics The Sandpaper System for Synthesizing Texture for a Force-Feedback Display," Massachusetts Institute of Technology, Jun. 1978, 217 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Oh, et al., "Moving Objects with 2D Input Devices in CAD Systems and Desktop Virtual Environments", Proceedings of Graphics Interface 2005, 8 pages, May 2005.
O'Hara, et al., "Pressure-Sensitive Icons", ip.com Journal, ip.com Inc., West Henrietta, NY, US, Jun. 1, 1990, 2 Pages.
Pallenberg, "Wow, the new iPad had gestures." https://plus.google.com/+-SaschaPallenberg/posts/aaJtJogu8ac, Mar. 7, 2012, 2 pages.
Phonebuff, "How To Pair Bluetooth On The iPhone", https://www.youtube.com/watch?v=LudNwEar9A8, Feb. 8, 2012, 3 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents On Gestures Supported On Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Sony, "Intelligent Scene Recognition," https://www.sony-asia.com/article/252999/section/product/product/dsc-t77, downloaded on May 20, 2016, 5 pages.
Sood, "MultitaskingGestures", http://cydia.saurik.com/package/org.thebigboxx.multitaskinggestures/, Mar. 3, 2014, 2 pages.

(56) References Cited

OTHER PUBLICATIONS

Stewart, et al., "Characteristics of Pressure-Based Input for Mobile Devices", Proceedings of the SIGCHI Conference on Human Factors in Computing Systems, Apr. 2010, 10 pages.
Stross, "Wearing A Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
VGJFeliz, "How to Master Android Lollipop Notifications in Four Minutes!", https://www.youtube.com/watch?v=S-zBRG7GJgs, Feb. 8, 2015, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
YouTube, "Android Lollipop Lock-Screen Notification Tips", https://www.youtube.com/watch?v=LZTxHBOwzIU, Nov. 13, 2014, 3 pages.
YouTube, "Blackberry Playbook bezel interaction," https://www.youtube.com/watch?v=YGkzFqnOwXI, Jan. 10, 2011, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "HTC One Favorite Camera Features", http://www.youtube.com/watch?v=sUYHfcjl4RU, Apr. 28, 2013, 3 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in A Tap", https://www.youtube.com/watch?v=qailSHRgsTo, May 15, 2015, 1 page.
Office Action, dated Mar. 15, 2017, received in U.S. Appl. No. 14/535,671, 13 pages.
Office Action, dated Nov. 30, 2017, received in U.S. Appl. No. 14/535,671, 21 pages.
Office Action, dated Jun. 29, 2017, received in U.S. Appl. No. 14/608,895, 30 pages.
Final Office Action, dated Feb. 22, 2018, received in U.S. Appl. No. 14/608,895, 20 pages.
Notice of Allowance, dated Jun. 26, 2018, received in U.S. Appl. No. 14/608,895, 9 pages.
Office Action, dated Dec. 18, 2015, received in Australian Patent Application No. 2013368440, which corresponds with U.S. Appl. No. 14/536,426, 3 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Office Action, dated Jul. 21, 2016, received in European Patent Application No. 13795391.5, which corresponds with U.S. Appl. No. 14/536,426, 9 pages.
Office Action, dated Mar. 9, 2018, received in European Patent Application No. 13795391.5, which corresponds with U.S. Appl. No. 14/536,426, 4 pages.
Intention to Grant, dated Jul. 6, 2018, received in European Patent Application No. 13795391.5, which corresponds with U.S. Appl. No. 14/536,426, 5 pages.
Office Action, dated Sep. 13, 2016, received in Japanese Patent Application No. 2015-547948, which corresponds with U.S. Appl. No. 14/536,426, 5 pages.
Patent, dated May 12, 2017, received in Japanese Patent Application No. 2015-547948, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Feb. 24, 2017, received in Korean Patent Application No. 10-2015-7018851, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.
Final Office Action, dated Feb. 26, 2018, received in U.S. Appl. No. 14/536,235, 13 pages.
Office Action, dated Apr. 5, 2017, received in U.S. Appl. No. 14/536,367, 16 pages.
Notice of Allowance, dated Nov. 30, 2017, received in U.S. Appl. No. 14/536,367, 9 pages.
Notice of Allowance, dated May 16, 2018, received in U.S. Appl. No. 14/536,367, 5 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Office action, dated Aug. 3, 2017, received in U.S. Appl. No. 14/536,426, 10 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Office Action, dated Nov. 18, 2015, received in Australian Patent Application No. 2015101231, which corresponds with U.S. Appl. No. 14/536,426, 3 pages.
Office Action, dated May 15, 2017, received in Australian Patent Application No. 2016216580, which corresponds with U.S. Appl. No. 14/536,426, 3 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.

(56) References Cited

OTHER PUBLICATIONS

Notice of Allowance, dated May 10, 2018, received in Chinese Patent Application No. 201380035982.1, which corresponds with U.S. Appl. No. 14/536,426, 2 pages.
Office Action, dated Sep. 20, 2017, received in Chinese Patent Application No. 201510566550.4, which corresponds with U.S. Appl. No. 14/536,426, 11 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Aug. 21, 2017, received in European Patent Application No. 15183980.0, which corresponds with U.S. Appl. No. 14/536,426, 3 pages.
Intention to Grant, dated Mar. 9, 2018, received in European Patent Application No. 15183980.0, which corresponds with U.S. Appl. No. 14/536,426, 5 pages.
Intention to Grant, dated Aug. 14, 2018, received in European Patent Application No. 15183980.0, which corresponds with U.S. Appl. No. 14/536,426, 5 pages.
Certificate of Grant, dated Nov. 10, 2017, received in Hong Kong Patent Application No. 15107535.0, which corresponds with U.S. Appl. No. 14/536,426, 2 pages.
Office Action, dated Mar. 4, 2016, received in Japanese Patent Application No. 2015-511644, which corresponds with U.S. Appl. No. 14/536,426, 3 pages.
Office Action, dated Feb. 6, 2017, received in Japanese Patent Application No. 2015-511644, which corresponds with U.S. Appl. No. 14/536,426, 6 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Mar. 9, 2017, received in U.S. Appl. No. 14/536,464, 21 pages.
Final Office Action, dated Aug. 25, 2017, received in U.S. Appl. No. 14/536,464, 30 pages.
Office Action, dated Feb. 12, 2018, received in U.S. Appl. No. 14/536,464, 33 pages.
Final Office Action, dated Jun. 22, 2018, received in U.S. Appl. No. 14/536,464, 32 pages.
Office Action, dated Sep. 25, 2017, received in U.S. Appl. No. 14/536,644, 29 pages.
Final Office Action, dated May 3, 2018, received in U.S. Appl. No. 14/536,644, 28 pages.
Office Action, dated Oct. 19, 2017, received in U.S. Appl. No. 14/608,926, 14 pages.
Final Office Action, dated Jun. 6, 2018, received in U.S. Appl. No. 14/608,926, 19 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Notice of Acceptance, dated Dec. 20, 2017, received in Australian Patent Application No. 2016201451, which corresponds with U.S. Appl. No. 14/608,926, 3 pages.
Certificate of Grant, dated May 3, 2018, received in Australian Patent Application No. 2016201451, which corresponds with U.S. Appl. No. 14/608,926, 1 page.
Office Action, dated May 4, 2017, received in Chinese Patent Application No. 201380068414.1, which corresponds with U.S. Appl. No. 14/608,926, 5 pages.
Notice of Allowance, dated Feb. 8, 2018, received in Chinese Patent Application No. 201380068414.1, which corresponds with U.S. Appl. No. 14/608,926, 2 pages.
Patent, dated May 4, 2018, received in Chinese Patent Application No. 201380068414.1, which corresponds with U.S. Appl. No. 14/608,926, 4 pages.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Nov. 11, 2016, received in European Patent Application No. 13795392.3, which corresponds with U.S. Appl. No. 14/608,926, 6 pages.
Office Action, dated Jul. 4, 2017, received in European Patent Application No. 13795392.3, which corresponds with U.S. Appl. No. 14/608,926, 4 pages.
Oral Summons, dated Feb. 13, 2017, received in European Patent Application No. 13795392.3, which corresponds with U.S. Appl. No. 14/608,926, 11 pages.
Office Action, dated Mar. 14, 2016, received in Japanese Patent Application No. 2015-549392, which corresponds with U.S. Appl. No. 14/608,926, 4 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Patent, dated Apr. 27, 2018, received in Japanese Patent Application No. 2017-024234, which corresponds with U.S. Appl. No. 14/608,926, 3 pages.
Office Action, dated May 12, 2016, received in Korean Patent Application No. 10-2015-7018853, which corresponds with U.S. Appl. No. 14/608,926, 4 pages.
Notice of Allowance, dated Mar. 31, 2017, received in Korean Patent Application No. 2015-7018853, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 2017-7018250, which corresponds with U.S. Appl. No. 14/608,926, 2 pages.
Notice of Allowance, dated Dec. 29, 2017, received in Korean Patent Application No. 2017-7018250, which corresponds with U.S. Appl. No. 14/608,926, 3 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Dec. 1, 2016, received in Chinese Patent Application No. 2013800362059, which corresponds with U.S. Appl. No. 14/536,646, 3 pages.
Notice of Allowance, dated Oct. 9, 2017, received in Chinese Patent Application No. 2013800362059, which corresponds with U.S. Appl. No. 14/536,646, 3 pages.

(56) References Cited

OTHER PUBLICATIONS

Office Action, dated Oct. 19, 2017, received in U.S. Appl. No. 14/536,646, 21 pages.
Notice of Allowance, dated Aug. 9, 2018, received in U.S. Appl. No. 14/536,646, 5 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Notice of Allowance, dated Jan. 4, 2017, received in European Patent Application No. 13724102.2, which corresponds with U.S. Appl. No. 14/536,646, 5 pages.
Patent, dated May 26, 2017, received in European Patent Application No. 13724102.2, which corresponds with U.S. Appl. No. 14/536,646, 1 page.
Office Action, dated Feb. 29, 2016, received in Japanese Patent Application No. 2015-511645, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Notice of Allowance, dated Sep. 20, 2017, received in U.S. Appl. No. 14/536,141, 10 pages.
Office Action, dated Aug. 27, 2015, received in Australian Patent Application No. 2013259614, which corresponds with U.S. Appl. No. 14/536,141, 4 pages.
Notice of Allowance, dated Aug. 15, 2016, received in Australian Patent Application No. 2013259614, which corresponds with U.S. Appl. No. 14/536,141, 1 page.
Office Action, dated Jul. 21, 2017, received in Australian Patent Application No. 2016262773, which corresponds with U.S. Appl. No. 14/536,141, 3 pages.
Notice of Acceptance, dated Jul. 19, 2018, received in Australian Patent Application No. 2016262773, which corresponds with U.S. Appl. No. 14/536,141, 2 pages.
Office Action, dated Mar. 3, 2017, received in Chinese Patent Application No. 201380035893.7, which corresponds with U.S. Appl. No. 14/536,141, 8 pages.
Office Action, dated Feb. 2, 2018, received in Chinese U.S. Appl. No. 14/536,141.7 (5847CN), which corresponds with U.S. Appl. No. 14/536,141, 5 pages.
Office Action, dated Jan. 7, 2016, received in European Patent Application No. 13726053.5, which corresponds with U.S. Appl. No. 14/536,141, 10 pages.
Office Action, dated Aug. 31, 2016, received in European Patent Application No. 13726053.5, which corresponds with U.S. Appl. No. 14/536,141, 10 pages.
Office Action, dated Apr. 9, 2018, received in European Patent Application No. 13726053.5, which corresponds with U.S. Appl. No. 14/536,141, 9 pages.
Office Action, dated Feb. 29, 2016, received in Japanese Patent Application No. 2015-511646, which corresponds with U.S. Appl. No. 14/536,141, 3 pages.
Office Action, dated Oct. 25, 2016, received in Japanese Patent Application No. 2015-511646, which corresponds with U.S. Appl. No. 14/536,141, 6 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Office Action, dated Aug. 13, 2018, received in Japanese Patent Application No. 2017-141953, which corresponds with U.S. Appl. No. 14/536,141, 6 pages.
Office Action, dated Dec. 8, 2016, received in U.S. Appl. No. 14/608,942, 9 pages.
Notice of Allowance, dated May 12, 2017, received in U.S. Appl. No. 14/608,942, 10 pages.
Office Action, dated Jan. 29, 2016, received in Australian Patent Application No. 2013368443, which corresponds with U.S. Appl. No. 14/608,942, 3 pages.
Notice of Allowance, dated Mar. 11, 2016, received in Australian Patent Application No. 2013368443, which corresponds with U.S. Appl. No. 14/608,942, 2 pages.
Certificate of Grant, dated Jul. 7, 2016, received in Australian Patent Application No. 2013368443, which corresponds with U.S. Appl. No. 14/608,942, 3 pages.
Office Action, dated Mar. 29, 2017, received in Australian Patent Application No. 2016201303, which corresponds with U.S. Appl. No. 14/608,942, 3 pages.
Notice of Acceptance, dated Mar. 7, 2018, received in Australian Patent Application No. 2016201303, which corresponds with U.S. Appl. No. 14/608,942, 3 pages.
Certificate of Grant, dated Jul. 5, 2018, received in Australian Patent Application No. 2016201303, which corresponds with U.S. Appl. No. 14/608,942, 4 pages.
Office Action, dated Jun. 16, 2017, received in Chinese Patent Application No. 201380068295.X, which corresponds with U.S. Appl. No. 14/608,942, 6 pages.
Office Action, dated Mar. 28, 2018, received in Chinese Patent Application No. 201380068295.X, which corresponds with U.S. Appl. No. 14/608,942, 5 pages.
Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/608,942, 4 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Apr. 5, 2016, received in Korean Patent Application No. 2015-7018448, which corresponds with U.S. Appl. No. 14/608,942, 6 pages.
Office Action, dated Feb. 24, 2017, received in Korean Patent Application No. 2015-7018448, which corresponds with U.S. Appl. No. 14/608,942, 4 pages.
Office Action, dated Jul. 17, 2017, received in U.S. Appl. No. 14/536,166, 19 pages.
Notice of Allowance, dated Feb. 28, 2018, received in U.S. Appl. No. 14/536,166, 5 pages.
Office Action, dated Aug. 1, 2016, received in U.S. Appl. No. 14/536,203, 14 pages.
Notice of Allowance, dated Feb. 1, 2017, received in U.S. Appl. No. 14/536,203, 9 pages.
Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.
Office Action, dated Jul. 4, 2017, received in Australian Patent Application No. 2016238917, which corresponds with U.S. Appl. No. 14/536,203, 5 pages.
Notice of Acceptance, dated Jul. 19, 2018, received in Australian Patent Application No. 2016238917, which corresponds with U.S. Appl. No. 14/536,203, 3 pages.
Office Action, dated Oct. 25, 2017, received in Chinese Patent Application No. 201380035977.0, which corresponds with U.S. Appl. No. 14/536,203, 5 pages.

(56) References Cited

OTHER PUBLICATIONS

Notice of Allowance, dated Apr. 4, 2018, received in Chinese Patent Application No. 201380035977.0, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Dec. 6, 2017, received in European Patent Application No. 13724104.8, which corresponds with U.S. Appl. No. 14/536,203, 9 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Office Action, dated Jun. 23, 2017, received in Japanese Patent Application No. 2016173113, which corresponds with U.S. Appl. No. 14/536,203, 5 pages.
Notice of Allowance, dated Jan. 12, 2018, received in Japanese Patent Application No. 2016173113, which corresponds with U.S. Appl. No. 14/536,203, 5 pages.
Patent, dated Feb. 16, 2018, received in Japanese Patent Application No. 2016173113, which corresponds with U.S. Appl. No. 14/536,203, 3 pages.
Office Action, dated Dec. 4, 2015, received in Korean Patent Application No. 2014-7034520, which corresponds with U.S. Appl. No. 14/536,203, 4 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Notice of Allowance, dated Oct. 30, 2017, received in Korean Patent Application No. 2016-7033834, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Office Action, dated Oct. 20, 2017, received in U.S. Appl. No. 14/608,965, 14 pages.
Office Action, dated Jul. 2, 2018, received in U.S. Appl. No. 14/608,965, 16 pages.
Office action, dated Oct. 11, 2017, received in Chinese Patent Application No. 201380074060.1, which corresponds with U.S. Appl. No. 14/608,965, 5 pages.
Office action, dated Aug. 1, 2018, received in Chinese Patent Application No. 201380074060.1, which corresponds with U.S. Appl. No. 14/608,965, 5 pages.
Office Action, dated Jul. 22, 2016, received in European Office Action No. 13798465.4, which corresponds with U.S. Appl. No. 14/608,965, 8 pages.
Oral Proceedings, dated Mar. 7, 2018, received in European Office Action No. 13798465.4, which corresponds with U.S. Appl. No. 14/608,965, 5 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Notice of Allowance, dated Nov. 22, 2017, received in U.S. Appl. No. 14/536,247, 6 pages.
Office Action, dated Mar. 24, 2017, received in U.S. Appl. No. 14/536,267, 12 pages.
Notice of Allowance, dated Nov. 9, 2017, received in U.S. Appl. No. 14/536,267, 8 pages.
Notice of Allowance, dated Jun. 1, 2018, received in U.S. Appl. No. 14/536,267, 5 pages.
Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.
Office Action, dated Mar. 24, 2017, received in Australian Patent Application No. 2016204411, which corresponds with U.S. Appl. No. 14/536,267, 3 pages.
Notice of Acceptance, dated Feb. 27, 2018, received in Australian Patent Application No. 2016204411, which correpsonds with U.S. Appl. No. 14/536,267, 3 pages.
Certificate of Grant, dated Jun. 28, 2018, received in Australian Patent Application No. 2016204411, which corresponds with U.S. Appl. No. 14/536,267, 4 pages.
Office Action, dated Dec. 9, 2016, received in Chinese Patent Application No. 2016120601564130, which corresponds with U.S. Appl. No. 14/536,267, 4 pages.
Notice of Allowance, dated Jan. 29, 2018, received in Chinese Patent Application No. 201380035968.1, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Office Action, dated Jun. 13, 2018, received in Chinese Patent Application No. 201810332044.2, which corresponds with U.S. Appl. No. 14/536,267, 2 pages.
Office Action, dated Jan. 25, 2018, received in European Patent Application No. 13724106.3, which corresponds with U.S. Appl. No. 14/536,267, 5 pages.
Intention to Grant, dated Jun. 27, 2018, received in European Patent Application No. 13724106.3, which corresponds with U.S. Appl. No. 14/536,267, 5 pages.
Office Action, dated Sep. 13, 2017, received in European Patent Application No. 16177863.4, which corresponds with U.S. Appl. No. 14/536,267, 6 pages.
Office Action, dated Jan. 29, 2016, received in Japanese Patent Application No. 2015-511652, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Notice of Allowance, dated Nov. 17, 2017, received in Japanese Patent Application No. 2016-125839, which corresponds with U.S. Appl. No. 14/536,267, 5 pages.
Office Action, dated Dec. 4, 2015, received in Korean Patent Application No. 2014-7034530, which corresponds with U.S. Appl. No. 14/536,267, 3 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 2016-7029533, which corresponds with U.S. Appl. No. 14/536,267, 2 pages.
Notice of Allowance, dated Sep. 1, 2017, received in Korean Patent Application No. 2016-7029533, which corresponds with U.S. Appl. No. 14/536,267, 4 pages.

(56) References Cited

OTHER PUBLICATIONS

Patent, dated Dec. 1, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Notice of Allowance, dated Dec. 1, 2017, received in U.S. Appl. No. 14/536,291, 19 pages.
Notice of Allowance, dated Mar. 20, 2018, received in U.S. Appl. No. 14/536,291, 5 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Office Action, dated Jul. 21, 2017, received in Australian Patent Application No. 2016216658, which corresponds with U.S. Appl. No. 14/536,291, 3 pages.
Notice of Acceptance, dated Jul. 19, 2018, received in Australian Patent Application No. 2016216658, which corresponds with U.S. Appl. No. 14/536,291, 3 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Oct. 23, 2017, received in Chinese Patent Application No. 201380035986.X, which corresponds with U.S. Appl. No. 14/536,291, 9 pages.
Office Action, dated Jan. 7, 2016, received in European Patent Application No. 13724107.1, which corresponds with U.S. Appl. No. 14/536,291, 11 pages.
Office Action, dated Aug. 22, 2016, received in European Patent Application No. 13724107.1, which corresponds with U.S. Appl. No. 14/536,291, 7 pages.
Office Action, dated Mar. 23, 2017, received in European Patent Application No. 13724107.1, which corresponds with U.S. Appl. No. 14/536,291, 8 pages.
Office Action, dated Mar. 8, 2016, received in Japanese Patent Application No. 2015-511655, which corresponds with U.S. Appl. No. 14/536,291, 4 pages.
Final Office Action, dated Dec. 22, 2016, received in Japanese Patent Application No. 2015-511655, which corresponds with U.S. Appl. No. 14/536,291, 3 pages.
Office Action, dated Jun. 29, 2018, received in Japanese Patent Application No. 2017-083027, which corresponds with U.S. Appl. No. 14/536,291, 5 pages.
Office Action, dated Oct. 19, 2017, received in U.S. Appl. No. 14/608,985, 13 pages.
Notice of Allowance, dated Apr. 20, 2018, received in U.S. Appl. No. 14/608,985, 5 pages.
Office Action, dated Jan. 15, 2016, received in Australian Patent Application No. 2013368445, which corresponds with U.S. Appl. No. 14/608,985, 3 pages.
Notice of Allowance, dated Jan. 18, 2017, received in Australian Patent Application No. 2013368445, which corresponds with U.S. Appl. No. 14/608,985, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Notice of Allowance, dated Sep. 19, 2017, received in Chinese Patent Application No. 201380068399.0, which corresponds with U.S. Appl. No. 14/608,985, 3 pages.
Patent, dated Dec. 8, 2017, received in Chinese Patent Application No. 201380068399.0, which corresponds with U.S. Appl. No. 14/608,985, 4 pages.
Office Action, dated Jul. 25, 2016, received in European Patent Application No. 13811032.5, which corresponds with U.S. Appl. No. 14/608,985, 8 pages.
Office Action, dated Feb. 27, 2017, received in European Patent Application No. 13811032.5, which corresponds with U.S. Appl. No. 14/608,985, 6 pages.
Summons, dated Oct. 6, 2017, received in European Patent Application No. 13811032.5, which corresponds with U.S. Appl. No. 14/608,985, 6 pages.
Certificate of Grant, dated Jun. 29, 2018, received in Hong Kong Patent Application No. 15112851.6, which corresponds with U.S. Appl. No. 14/608,985, 2 pages.
Office Action, dated Apr. 25, 2016, received in Japanese Patent Application No. 2015-550384, which corresponds with U.S. Appl. No. 14/608,985, 4 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 2015-7019984, which corresponds with U.S. Appl. No. 14/608,985, 8 pages.
Notice of Allowance, dated Sep. 19, 2017, received in Korean Patent Application No. 2015-7019984, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Office Action, dated Mar. 24, 2017, received in U.S. Appl. No. 14/609,006, 13 pages.
Final Office Action, dated Sep. 21, 2017, received in U.S. Appl. No. 14/609,006, 17 pages.
Office Action, dated Mar. 20, 2018, received in U.S. Appl. No. 14/609,006, 13 pages.
Office Action, dated Apr. 19, 2017, received in U.S. Appl. No. 14/536,296, 12 pages.
Final Office Action, dated Nov. 2, 2017, received in U.S. Appl. No. 14/536,296, 13 pages.
Notice of Allowance, dated Mar. 14, 2018, received in U.S. Appl. No. 14/536,296, 8 pages.
Office Action, dated Nov. 1, 2017, received in U.S. Appl. No. 14/536,648, 22 pages.
Final Office Action, dated Aug. 7, 2018, received in U.S. Appl. No. 14/536,648, 14 pages.
Office Action, dated Jul. 21, 2017, received in Australian Patent Application No. 2016247194, which corresponds with U.S. Appl. No. 14/536,648, 3 pages.
Notice of Acceptance, dated Jul. 19, 2018, received in Australian Patent Application No. 2016247194, which corresponds with U.S. Appl. No. 14/536,648, 3 pages.
Office Action, dated Apr. 27, 2018, received in Japanese Patent Application No. 2017-008764, which corresponds with U.S. Appl. No. 14/536,648, 5 pages.
Office Action, dated Jan. 19, 2017, received in U.S. Appl. No. 14/609,042, 12 pages.
Notice of Allowance, dated Jul. 10, 2017, received in U.S. Appl. No. 14/609,042, 8 pages.
Office Action, dated Mar. 31, 2016, received in U.S. Appl. No. 14/864,737, 17 pages.
Notice of Allowance, dated Feb. 27, 2017, received in U.S. Appl. No. 14/864,737, 9 pages.
Notice of Allowance, dated Jun. 19, 2017, received in U.S. Appl. No. 14/864,737, 8 pages.

(56) References Cited

OTHER PUBLICATIONS

Office Action, dated Apr. 16, 2018, received in Australian Patent Application No. 2016233762, which corresponds with U.S. Appl. No. 14/864,737, 2 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Grant Certificate, dated Apr. 25, 2018, received in European Patent Application No. 16710871.1, which corresponds with U.S. Appl. No. 14/864,737, 2 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Feb. 14, 2018, received in Korean Patent Application No. 2017-7030129, which corresponds with U.S. Appl. No. 14/864,737, 17 pages.
Patent, dated Jul. 12, 2017, received in Dutch Patent Application No. 2016452, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated Jul. 7, 2017, received in Danish Patent Application No. 201500575, 4 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Notice of Allowance, dated May 18, 2018, received in U.S. Appl. No. 14/866,159, 8 pages.
Office Action, dated May 19, 2016, received in Australian Patent Application No. 2016100251, which corresponds with U.S. Appl. No. 14/866,159, 5 pages.
Office Action, dated Jun. 5, 2018, received in Chinese Patent Application No. 201610137839.9, which corresponds with U.S. Appl. No. 14/866,159, 11 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14,866,159, 3 pages.
Office Action, dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Office Action, dated Jul. 6, 2017, received in Danish Patent Application No. 201500574, which corresponds with U.S. Appl. No. 14/866,159, 3 pages.
Office Action, dated Jan. 10, 2018, received in Danish Patent Application No. 201500574, which corresponds with U.S. Appl. No. 14/866,159, 2 pages.
Notice of Allowance, dated Mar. 21, 2018, received in Danish Patent Application No. 201500574, which corresponds with U.S. Appl. No. 14/866,159, 2 pages.
Patent, dated May 22, 2018, received in Danish Patent Application No. 201500574, which corresponds with U.S. Appl. No. 14/866,159, 2 pages.
Patent, dated Sep. 7, 2017, received in Dutch Patent Application No. 2016377, which corresponds with U.S. Appl. No. 14/866,159, 4 pages.
Office Action, dated October 6, 2017, received in U.S. Appl. No. 14/868,078, 40 pages.
Notice of Allowance, dated May 24, 2018, received in U.S. Appl. No. 14/868,078, 6 pages.
Innovation Patent, dated Aug. 4, 2016, received in Australian Patent Application No. 2016101201, which corresponds with U.S. Appl. No. 14/868,078, 1 page.
Office Action, dated Oct. 12, 2016, received in Australian Patent Application No. 2016101201, which corresponds with U.S. Appl. No. 14/868,078, 3 pages.
Notice of Allowance, dated Sep. 1, 2017, received in Australian Patent Application No. 2016229421, which corresponds with U.S. Appl. No. 14/868,078, 3 pages.
Certificate of Grant, dated Jan. 3, 2018, received in Australian Patent Application No. 2016229421, which corresponds with U.S. Appl. No. 14/868,078, 1 page.
Notice of Allowance, dated Oct. 1, 2016, received in Chinese Patent Application No. 201620175847.8, which corresponds with U.S. Appl. No. 14/868,078, 1 page.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Danish Patent Application No. 201500588, which corresponds with U.S. Appl. No. 14/868,078, 9 pages.
Office Action, dated Sep. 2, 2016, received in Danish Patent Application No. 201500588, which corresponds with U.S. Appl. No. 14/868,078, 4 pages.

(56) References Cited

OTHER PUBLICATIONS

Notice of Allowance, dated Jan. 30, 2017, received in received in Danish Patent Application No. 20150588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Patent, dated Sep. 11, 2017, received in Danish Patent Application No. 201500588, which corresponds with U.S. Appl. No. 14/868,078, 5 pages.
Office Action, dated Apr. 25, 2018, received in European Patent Application No. 16708916.8, which corresponds with U.S. Appl. No. 14/868,078, 6 pages.
Patent, dated Jul. 12, 2017, received in Dutch Patent Application No. 2016376, which corresponds with U.S. Appl. No. 14/868,078, 2 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Notice of Allowance, dated Sep. 18, 2017, received in U.S. Appl. No. 14/863,432, 8 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action, dated Apr. 4, 2016, received in Danish Patent Application No. 201500582, which corresponds with U.S. Appl. No. 14/863,432, 10 pages.
Office Action, dated Oct. 7, 2016, received in Danish Patent Application No. 201500582, which corresponds with U.S. Appl. No. 14/863,432, 6 pages.
Office Action, dated Jun. 12, 2017, received in Danish Patent Application No. 201500582, which corresponds with U.S. Appl. No. 14/863,432, 5 pages.
Grant, dated Jul. 21, 2017, received in Dutch Patent Application No. 2016801, which corresponds with U.S. Appl. No. 14/871,227, 8 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Notice of Allowance, dated Oct. 4, 2017, received in U.S. Appl. No. 14/866,511, 37 pages.
Patent, dated Aug. 8, 2016, received in Australian Patent Application No. 2016100653, which corresponds with U.S. Appl. No. 14/866,511, 1 page.
Notice of Allowance, dated Jan. 12, 2017, received in Chinese Patent Application No. 201620470281.1, which corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated Nov. 24, 2017, received in European Patent Application No. 16727900.9, which corresponds with U.S. Appl. No. 14/866,511, 5 pages.
Office Action, dated May 24, 2018, received in European Patent Application No. 16727900.9, which corresponds with U.S. Appl. No. 14/866,511, 7 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Jul. 3, 2017, received in Danish Patent Application No. 201500592, which corresponds with U.S. Appl. No. 14/869,899, 5 pages.
Office Action, dated Jan. 29, 2018, received in Danish Patent Application No. 201500592, which corresponds with U.S. Appl. No. 14/869,899, 2 pages.
Notice of Allowance, dated Apr. 24, 2018, received in Danish Patent Application No. 201500592, which corresponds with U.S. Appl. No. 14/869,899, 2 pages.
Patent, dated May 28, 2018, received in Danish Patent Application No. 201500592, which corresponds with U.S. Appl. No. 14/869,899, 2 pages.
Office Action, dated Nov. 22, 2016, received in Danish Patent Application No. 201670594, which corresponds with U.S. Appl. No. 14/869,899, 9 pages.
Office Action, dated Dec. 14, 2017, received in Danish Patent Application No. 201670594, which corresponds with U.S. Appl. No. 14/869,899, 3 pages.
Office Action, dated May 1, 2018, received in Danish Patent Application No. 201670594, which corresponds with U.S. Appl. No. 14/896,899, 2 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Apr. 13, 2017, received in U.S. Appl. No. 14/866,992, 34 pages.
Final Office Action, dated Oct. 3, 2017, received in U.S. Appl. No. 14/866,992, 37 pages.
Office Action, dated Jan. 29, 2018, received in U.S. Appl. No. 14/866,992, 44 pages.

(56) References Cited

OTHER PUBLICATIONS

Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Mar. 26, 2018, received in Australian Patent Application No. 2016304890, which corresponds with U.S. Appl. No. 14/866,992, 3 pages.
Office Action, dated Jan. 19, 2018, received in Australian Patent Application No. 201761478, which corresponds with U.S. Appl. No. 14/866,992, 6 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Feb. 6, 2017, received in Danish Patent Application No. 201500593, which corresponds with U.S. Appl. No. 14/866,992, 4 pages.
Office Action, dated Sep. 5, 2017, received in Danish Patent Application No. 201500593, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 Pages.
Notice of Allowance, dated Aug. 3, 2018, received in U.S. Appl. No. 15/009,676, 6 pages.
Office Action, dated Mar. 13, 2018, received in U.S. Appl. No. 15/009,688, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated May 2, 2017, received in U.S. Appl. No. 14/856,517, 34 pages.
Final Office Action, dated Oct. 4, 2017, received in U.S. Appl. No. 14/856,517, 33 pages.
Notice of Allowance, dated Jun. 29, 2018, received in U.S. Appl. No. 14/856,517, 11 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated May 18, 2017, received in U.S. Appl. No. 14/856,519, 35 pages.
Final Office Action, dated Nov. 15, 2017, received in U.S. Appl. No. 14/856,519, 31 pages.
Notice of Allowance, dated Jan. 31, 2018, received in U.S. Appl. No. 14/856,519, 9 pages.
Notice of Allowance, dated May 2, 2018, received in U.S. Appl. No. 14/856,519, 10 pages.
Office Action, dated Jun. 9, 2017, received in U.S. Appl. No. 14/856,520, 36 pages.
Final Office Action, dated Nov. 16, 2017, received in U.S. Appl. No. 14/856,520, 41 pages.
Office Action, dated Jun. 30, 2017, received in U.S. Appl. No. 14/856,522, 22 pages.
Notice of Allowance, dated Feb. 9, 2018, received in U.S. Appl. No. 14/856,522, 9 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Notice of Allowance, dated Jun. 16, 2017, received in in U.S. Appl. No. 14/857,645, 5 pages.
Office Action, dated Nov. 30, 2017, received in U.S. Appl. No. 14/857,636, 19 pages.
Office Action, dated Jan. 17, 2018, received in Australian Patent Application No. 2017202816, which corresponds with U.S. Appl. No. 14/857,636, 3 pages.
Office Action, dated Sep. 22, 2017, received in Japanese Patent Application No. 2017-029201, which corresponds with U.S. Appl. No. 14/857,636, 8 pages.
Office Action, dated Jun. 25, 2018, received in Japanese Patent Application No. 2017-029201, which corresponds with U.S. Appl. No. 14/857,636, 4 pages.
Office Action, dated Dec. 1, 2017, received in U.S. Appl. No. 14/857,663, 15 pages.
Office Action, dated Mar. 31, 2017, received in U.S. Appl. No. 14/857,700, 14 pages.
Final Office Action, dated Oct. 11, 2017, received in U.S. Appl. No. 14/857,700, 13 pages.
Notice of Allowance, dated Feb. 12, 2018, received in U.S. Appl. No. 14/857,700, 13 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Office Action, dated Jan. 25, 2016, received in U.S. Appl. No. 14,864,580, 29 pages.
Notice of Allowance, dated May 23, 2016, received in U.S. Appl. No. 14/864,580, 9 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 202016000032349, which corresponds with U.S. Appl. No. 14/864,580, 3 pages.
Office Action, dated Apr. 8, 2016, received in Danish Patent Application No. 201500584, which corresponds with U.S. Appl. No. 14/864,580, 9 pages.
Office Action, dated Oct. 7, 2016, received in Danish Patent Application No. 201500584, which corresponds with U.S. Appl. No. 14/864,580, 3 pages.
Office Action, dated May 5, 2017, received in Danish Patent Application No. 201500584, which corresponds with U.S. Appl. No. 14/864,580, 3 pages.
Office Action, dated Dec. 15, 2017, received in Danish Patent Application No. 201500584, which corresponds with U.S. Appl. No. 14/864,580, 4 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Office Action, dated Apr. 19, 2016, received in U.S. Appl. No. 14/864,627, 9 pages.

(56) References Cited

OTHER PUBLICATIONS

Notice of Allowance, dated Jan. 31, 2017, received in U.S. Appl. No. 14/864,627, 7 pages.
Office Action, dated Apr. 8, 2016, received in Danish Patent Application No. 201500585, which corresponds with U.S. Appl. No. 14/864,627, 9 pages.
Office Action, dated Oct. 7, 2016, received in Danish Patent Application No. 201500585, which corresponds with U.S. Appl. No. 14/864,627, 3 pages.
Office Action, dated May 5, 2017, received in Danish Patent Application No. 201500585, which corresponds with U.S. Appl. No. 14/864,627, 4 pages.
Office Action, dated Dec. 15, 2017, received in Danish Patent Application No. 201500585, which corresponds with U.S. Appl. No. 14/864,627, 5 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Certificate of Examination, dated Dec. 8, 2016, received in Australian Patent Application No. 2016100292, which corresponds with U.S. Appl. No. 14/866,361, 1 page.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Office Action, dated Oct. 28, 2016, received in Danish Patent Application No. 201500579, which corresponds with U.S. Appl. No. 14/866,361, 3 pages.
Office Action, dated Jun. 15, 2017, received in Danish Patent Application No. 201500579, which corresponds with U.S. Appl. No. 14/866,361, 2 pages.
Office Action, dated Jan. 4, 2018, received in Danish Patent Application No. 201500579, which corresponds with U.S. Appl. No. 14/866,361, 2 pages.
Notice of Allowance, dated Mar. 16, 2018, received in Danish Patent Application No. 201500579, which corresponds with U.S. Appl. No. 14/866,361, 2 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Office Action, dated Jan. 22, 2018, received in U.S. Appl. No. 14/866,987, 22 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.

Office Action, dated Mar. 22, 2016, received in Danish Patent Application No. 201500587, which corresponds with U.S. Appl. No. 14/866,987, 8 pages.
Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.
Office Action, dated Sep. 9, 2016, received in Danish Patent Application No. 201670463, which corresponds with U.S. Appl. No. 14/866,987, 7 pages.
Notice of Allowance, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Office Action, dated May 7, 2018, received in European Patent Application No. 16189421.7, which corresponds with U.S. Appl. No. 14/866,987, 5 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Jul. 31, 2017, received in Japanese Patent Application No. 2017126445, which corresponds with U.S. Appl. No. 14/866,987, 6 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Office Action, dated Nov. 29, 2017, received in U.S. Appl. No. 14/866,989, 31 pages.
Final Office Action, dated Jul. 3, 2018, received in U.S. Appl. No. 14/866,989, 17 pages.
Certificate of Exam, dated Jul. 21, 2016, received in Australian Patent Application No. 2016100652, which corresponds with U.S. Appl. No. 14/866,989, 1 page.
Office Action, dated Feb. 26, 2018, received in Australian Patent Application No. 2017201079, which corresponds with U.S. Appl. No. 14/866,989, 6 pages.
Office Action, dated Jun. 16, 2017, received in Japanese Patent Application No. 2016-233450, which corresponds with U.S. Appl. No. 14/866,989, 6 pages.
Patent, dated Mar. 9, 2018, received in Japanese Patent Application No. 2016-233450, which corresponds with U.S. Appl. No. 14/866,989, 4 pages.
Office Action, dated Apr. 1, 2016, received in Danish Patent Application No. 201500589, which corresponds with U.S. Appl. No. 14/866,989, 8 pages.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Notice of Allowance, dated Feb. 5, 2018, received in Japanese Patent Application No. 2016-233450, which corresponds with U.S. Appl. No. 14/866,989, 5 pages.
Office Action, dated Apr. 11, 2016, received in U.S. Appl. No. 14/871,236, 23 pages.

(56) References Cited

OTHER PUBLICATIONS

Office Action, dated Jun. 28, 2016, received in U.S. Appl. No. 14/871,236, 21 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Sep. 30, 2016, received in Danish Patent Application No. 201500595, which corresponds with U.S. Appl. No. 14/871,236, 10 pages.
Office Action, dated Jun. 15, 2017, received in Danish Patent Application No. 201500595, which corresponds with U.S. Appl. No. 14/871,236, 4 pages.
Office Action, dated Jan. 29, 2018, received in Danish Patent Application No. 201500595, which corresponds with U.S. Appl. No. 14/871,236, 2 pages.
Notice of Allowance, dated Apr. 26, 2018, received in Danish Patent Application No. 201500595, which corresponds with U.S. Appl. No. 14/871,236, 2 pages.
Patent, dated Jun. 18, 2018, received in Danish Patent Application No. 201500595, which corresponds with U.S. Appl. No. 14/871,236, 3 pages.
Office Action, dated Jul. 19, 2018, received in Russian Patent Application No. 2017131408, which corresponds with U.S. Appl. No. 14/871,236, 8 pages.
Office Action, dated Sep. 1, 2017, received in U.S. Appl. No. 14/870,754, 22 pages.
Final Office Action, dated Mar. 9, 2018, received in U.S. Appl. No. 14/870,754, 19 pages.
Notice of Allowance, dated Jul. 2, 2018, received in U.S. Appl. No. 14/870,754, 9 pages.
Office Action, dated Nov. 14, 2017, received in U.S. Appl. No. 14/870,882, 25 pages.
Final Office Action, dated Apr. 20, 2018, received in U.S. Appl. No. 14/870,882, 7 pages.
Notice of Allowance, dated Jul. 12, 2018, received in U.S. Appl. No. 14/870,882, 5 pages.
Innovation Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016610138, which corresponds with U.S. Appl. No. 14/871,236, 6 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Notice of Allowance, dated Oct. 31, 2017, received in Danish Patent Application No. 201500596, which corresponds with U.S. Appl. No. 14/870,882, 2 pages.
Patent, dated Jan. 29, 2018, received in Danish Patent Application No. 201500596, which corresponds with U.S. Appl. No. 14/870,882, 4 pages.
Office Action, dated Sep. 1, 2017, received in U.S. Appl. No. 14/870,988, 14 pages.
Final Office Action, dated Feb. 16, 2018, received in U.S. Appl. No. 14/870,988, 18 pages.
Office Action, dated Nov. 22, 2017, received in U.S. Appl. No. 14/871,227, 24 pages.
Notice of Allowance, dated Jun. 11, 2018, received in U.S. Appl. No. 14/871,227, 11 pages.
Office Action, dated Oct. 17, 2016, received in Australian Patent Application No. 2016203040, which corresponds with U.S. Appl. No. 14/871,227, 7 pages.
Office Action, dated Oct. 16, 2017, received in Australian Patent Application No. 2016203040, which corresponds with U.S. Appl. No. 14/871,227, 5 pages.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Intention to Grant, dated Apr. 7, 2016, received in Danish Patent Application No. 201500597, which corresponds with U.S. Appl. No. 14/871,227, 7 pages.
Grant, dated Jun. 21, 2016, received in Danish Patent Application No. 20500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Mar. 24, 2017, received in Japanese Patent Application No. 2016-533201, which corresponds with U.S. Appl. No. 14/871,227, 6 pages.
Office Action, dated Aug. 4, 2017, received in Japanese Patent Application No. 2016-533201, which corresponds with U.S. Appl. No. 14/871,227, 6 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Office Action, dated Oct. 26, 2017, received in U.S. Appl. No. 14/871,336, 22 pages.
Final Office Action, dated Mar. 15, 2018, received in U.S. Appl. No. 14/871,336, 23 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action, dated Apr. 18, 2016, received in Danish Patent Application No. 201500601, which corresponds with U.S. Appl. No. 14/871,336, 8 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Patent, dated Oct. 30, 2017, Danish Patent Application No. 201500601, which corresponds with U.S. Appl. No. 14/871,336, 5 pages.
Office Action, dated Apr. 2, 2018, received in Japanese Patent Application No. 2018-020324, which corresponds with U.S. Appl. No. 14/871,336, 4 pages.
Office Action, dated Oct. 16, 2017, received in U.S. Appl. No. 14/871,462, 26 pages.
Innovation Patent, dated Aug. 25, 2016, received in Australian Patent Application No. 2016101435, which corresponds with U.S. Appl. No. 14/871,462, 1 page.

(56) References Cited

OTHER PUBLICATIONS

Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Apr. 20, 2017, received in Chinese Patent Application No. 201621044346.2, which corresponds with U.S. Appl. No. 14/871,462, 3 pages.
Intention to Grant, dated Apr. 18, 2016, received in Danish Patent Application No. 201500600, which corresponds with U.S. Appl. No. 14/871,462, 7 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Office Action, dated Nov. 13, 2017, received in Japanese Patent Application No. 2016-183289, which corresponds with U.S. Appl. No. 14/871,462, 5 pages.
Office Action, dated Apr. 29, 2016, received in U.S. Appl. No. 14/867,823, 28 pages.
Final Office Action, dated Sep. 28, 2016, received in U.S. Appl. No. 14/867,823, 31 pages.
Office Action, dated May 11, 2017, received in U.S. Appl. No. 14/867,823, 42 pages.
Final Office Action, dated Nov. 29, 2017, received in U.S. Appl. No. 14/867,823, 47 pages.
Notice of Allowance, dated Apr. 18, 2018, received in U.S. Appl. No. 14/867,823, 10 pages.
Notice of Allowance, dated Aug. 7, 2018, received in U.S. Appl. No. 14/867,823, 8 pages.
Office Action, dated Mar. 18, 2016, received in Danish Patent Application No. 201500594, which corresponds with U.S. Appl. No. 14/867,823, 10 pages.
Office Action, dated Sep. 7, 2016, received in Danish Patent Application No. 201500594, which corresponds with U.S. Appl. No. 14/867,823, 4 pages.
Office Action, dated May 15, 2017, received in Danish Patent Application No. 201500594, which corresponds with U.S. Appl. No. 14/867,823, 4 pages.
Office Action, dated Jan. 23, 2018, received in Danish Patent Application No. 201500594, which corresponds with U.S. Appl. No. 14/867,823, 8 pages.
Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, dated Jul. 6, 2017, received in U.S. Appl. No. 14/867,892, 55 pages.
Final Office Action, dated Dec. 14, 2017, received in U.S. Appl. No. 14/867,892, 53 pages.
Office Action, dated Apr. 24, 2018, received in U.S. Appl. No. 14/867,892, 63 pages.
Office Action, dated Mar. 21, 2016, received in Danish Patent Application No. 201500598, which corresponds with U.S. Appl. No. 14/867,892, 9 pages.
Office Action, dated Sep. 14, 2016, received in Danish Patent Application No. 201500598, which corresponds with U.S. Appl. No. 14/867,892, 4 pages.
Office Action, dated May 4, 2017, received in Danish Patent Application No. 201500598, which corresponds with U.S. Appl. No. 14/867,892, 4 pages.
Office Action, dated Oct. 31, 2017, received in Danish Patent Application No. 201500598, which corresponds with U.S. Appl. No. 14/867,892, 2 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,361, 26 pages.
Office Action, dated Mar. 1, 2017, received in U.S. Appl. No. 14/869,855, 14 pages.
Final Office Action, dated Oct. 10, 2017, received in U.S. Appl. No. 14/869,855, 16 pages.
Office Action, dated Jan. 23, 2018, received in U.S. Appl. No. 14/869,855, 24 pages.
Notice of Allowance, dated May 31, 2018, received in U.S. Appl. No. 14/869,855, 10 pages.
Office Action, dated Feb. 9, 2017, received in U.S. Appl. No. 14/869,873, 17 pages.
Final Office Action, dated Aug. 18, 2017, received in U.S. Appl. No. 14/869,873, 20 pages.
Office Action, dated Jan. 18, 2018, received in U.S. Appl. No. 14/869,873, 25 pages.
Final Office Action, dated May 23, 2018, received in U.S. Appl. No. 14/869,873, 18 pages.
Notice of Allowance, dated Jul. 30, 2018, received in U.S. Appl. No. 14/869,873, 8 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Notice of Allowance, dated Mar. 30, 3018, received in U.S. Appl. No. 14/867,990, 5 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Mar. 18, 2016, received in Danish Patent Application No. 201500581, which corresponds with U.S. Appl. No. 14/867,990, 9 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Feb. 19, 2018, received in Danish Patent Application No. 201500581, which corresponds with U.S. Appl. No. 14/867,990, 4 pages.
Office Action, dated Apr. 19, 2018, received in U.S. Appl. No. 14/869,703, 19 pages.
Office Action, dated Dec. 12, 2017, received in U.S. Appl. No. 15/009,668, 32 pages.
Final Office Action, dated Jul. 3, 2018, received in U.S. Appl. No. 15/009,668, 19 pages.
Office Action, dated Nov. 25, 2016, received in U.S. Appl. No. 15/081,771, 17 pages.
Final Office Action, dated Jun. 2, 2017, received in U.S. Appl. No. 15/081,771, 17 pages.
Notice of Allowance, dated Dec. 4, 2017, received in U.S. Appl. No. 15/081,771, 10 pages.

(56) References Cited

OTHER PUBLICATIONS

Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Aug. 29, 2017, received in Korean Patent Application No. 2017-7014536, which corresponds with U.S. Appl. No. 15/081,771, 5 pages.
Notice of Allowance, dated Jun. 28, 2018, received in Korean Patent Application No. 2017-7014536, which corresponds with U.S. Appl. No. 15/081,771, 4 pages.
Final Office Action, dated May 1, 2017, received in U.S. Appl. No. 15/136,782, 18 pages.
Notice of Allowance, dated Oct. 20, 2017, received in U.S. Appl. No. 15/136,782, 9 pages.
Office Action, dated May 4, 2018, received in Australian Patent Application No. 2018202855, which corresponds with U.S. Appl. No. 15/136,782, 3 pages.
Office Action, dated May 23, 2017, received in Danish Patent Application No. 201770190, which corresponds with U.S. Appl. No. 15/136,782, 7 pages.
Office Action, dated Jan. 8, 2018, received in Danish Patent Application No. 201770190, which corresponds with U.S. Appl. No. 15/136,782, 2 pages.
Notice of Allowance, dated Mar. 19, 2018, received in Danish Patent Application No. 201770190, which corresponds with U.S. Appl. No. 15/136,782, 2 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018-062161, which corresponds with U.S. Appl. No. 15/136,782, 5 pages.
Office Action, dated Jan. 20, 2017, received in U.S. Appl. No. 15/231,745, 21 pages.
Notice of Allowance, dated Jul. 6, 2017, received in U.S. Appl. No. 15/231,745, 18 pages.
Office Action, dated Oct. 17, 2016, received in Danish Patent Application No. 201670587, which corresponds with U.S. Appl. No. 15/231,745, 9 pages.
Office Action, dated Jun. 29, 2017, received in Danish Patent Application No. 201670587, which corresponds with U.S. Appl. No. 15/231,745, 4 pages.
Office Action, dated Feb. 22, 2018, received in Danish Patent Application No. 201670587, which corresponds with U.S. Appl. No. 15/231,745, 4 pages.
Office Action, dated Dec. 14, 2016, received in Danish Patent Application No. 201670590, which corresponds with U.S. Appl. No. 15/231,745, 9 pages.
Office Action, dated Jul. 6, 2017, received in Danish Patent Application No. 201670590, which corresponds with U.S. Appl. No. 15/231,745, 3 pages.
Office Action, dated Jan. 10, 2018, received in Danish Patent Application No. 201670590, which corresponds with U.S. Appl. No. 15/231,745, 2 pages.
Patent, dated May 28, 2018, received in Danish Patent Application No. 201670590, which corresponds with U.S. Appl. No. 15/231,745, 2 pages.
Office Action, dated Nov. 10, 2016, received in Danish Patent Application No. 201670591, which corresponds with U.S. Appl. No. 15/231,745, 12 pages.
Office Action, dated Apr. 11, 2018, received in Danish Patent Application No. 201670591, which corresponds with U.S. Appl. No. 15/231,745, 3 pages.
Office Action, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action, dated Jan. 30, 2018, received in Danish Patent Application No. 201670592, which corresponds with U.S. Appl. No. 15/231,745, 2 pages.
Notice of Allowance, dated Mar. 27, 2018, received in Danish Patent Application No. 201670592, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Office Action, dated Oct. 12, 2016, received in Danish Patent Application No. 201670593, which corresponds with U.S. Appl. No. 15/231,745, 7 pages.
Patent, dated Oct. 30, 2017, received in Danish Patent Application No. 201670593, which corresponds with U.S. Appl. No. 15/231,745, 3 pages.
Notice of Acceptance, dated Mar. 2, 2018, received in Australian Patent Application No. 2018200705, which corresponds with U.S. Appl. No. 15/272,327, 3 pages.
Certificate of Grant, dated Jun. 28, 2018, received in Australian Patent Application No. 2018200705, which corresponds with U.S. Appl. No. 15/272,327, 4 pages.
Notice of Allowance, dated Jul. 30, 2018, received in Japanese Patent Application No. 2018-506989, which corresponds with U.S. Appl. No. 15/272,327, 4 pages.
Office Action, dated Jul. 27, 2017, received in Australian Patent Application No. 2017100535, which corresponds with U.S. Appl. No. 15/272,341, 4 pages.
Notice of Acceptance, dated Mar. 2, 2018, received in Australian Patent Application No. 2016304832, which corresponds with U.S. Appl. No. 15/272,345, 3 pages.
Certificate of Grant, dated Jun. 28, 2018, received in Australian Patent Application No. 2016304832, which corresponds with U.S. Appl. No. 15/272,345, 4 pages.
Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.
Office Action, dated Apr. 23, 2018, received in U.S. Appl. No. 15/499,691, 29 pages.
Office Action, dated Aug. 30, 2017, received in U.S. Appl. No. 15/655,749, 22 pages.
Final Office Action, dated May 10, 2018, received in U.S. Appl. No. 15/655,749, 19 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.

(56) References Cited

OTHER PUBLICATIONS

International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
Extended European Search Report, dated Jul. 30, 2018, received in European Patent Application No. 18180503.7, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/US2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14,536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Extended European Search Report, dated Oct. 7, 2016, received in European Patent Application No. 16177863.4, which corresponds with U.S. Appl. No. 14/536,267, 12 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Extended European Search Report, dated Nov. 24, 2017, received in European Patent Application No. 17186744.3, which corresponds with U.S. Appl. No. 14/536,291, 10 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
Extended European Search Report, dated Mar. 15, 2017, received in European Patent Application No. 17153418.3, which corresponds with U.S. Appl. No. 14/536,648, 7 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
International Search Report and Written Opinion, dated Oct. 14, 2016, received in International Patent Application No. PCT/US2016/020697, which corresponds with U.S. Appl. No. 14/866,981, 21 pages.
Search Report, dated Jun. 19, 2017, received in Dutch Patent Application No. 2016377, which corresponds with U.S. Appl. No. 14/866,159, 13 pages.
International Search Report and Written Opinion, dated Apr. 25, 2016, received in International Patent Application No. PCT/US2016/018758, which corresponds with U.S. Appl. No. 14/866,159, 15 pages.
Extended European Search Report, dated Oct. 17, 2017, received in European Patent Application No. 17184437.6, which corresponds with U.S. Appl. No. 14/868,078, 8 pages.
Search Report, dated Apr. 13, 2017, received in Dutch Patent Application No. 2016376, which corresponds with U.S. Appl. No. 14/868,078, 15 pages.
International Search Report and Written Opinion, dated Jul. 21, 2016, received in International Patent Application No. PCT/US2016/019913, which corresponds with U.S. Appl. No. 14/868,078, 16 pages.

(56) References Cited

OTHER PUBLICATIONS

Search Report, dated Apr. 18, 2017, received in Dutch Patent Application No. 2016801, which corresponds with U.S. Appl. No. 14/863,432, 34 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
Extended European Search Report, dated Aug. 17, 2018, received in European Patent Application No. 18175195.9, which corresponds with U.S. Appl. No. 14/869,899, 13 pages.
International Search Report and Written Opinion, dated Aug. 29, 2016, received in International Patent Application No. PCT/US2016/021400, which corresponds with U.S. Appl. No. 14/869,899, 48 pages.
International Preliminary Report on Patentability, dated Sep. 12, 2017, received in International Patent Application No. PCT/US2016/021400, which corresponds with U.S. Appl. No. 14/869,899, 39 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
International Preliminary Report on Patentability, dated Feb. 13, 2018, received in International Patent Application No. PCT/US2016/046407, which corresponds with U.S. Appl. No. 15/009,688, 20 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated Oct. 10, 2017, received in European Patent Application No. 17188507.2, which corresponds with U.S. Appl. No. 14/866,361, 9 pages.
Extended European Search Report, dated Jun. 22, 2017, received in European Patent Application No. 16189421.7, which corresponds with U.S. Appl. No. 14/866,987, 7 pages.
Extended European Search Report, dated Sep. 11, 2017, received in European Patent Application No. 17163309.2, which corresponds with U.S. Appl. No. 14/866,987, 8 pages.
Extended European Search Report, dated Jun. 8, 2017, received in European Patent Application No. 16189425.8, which corresponds with U.S. Appl. No. 14/866,989, 8 pages.
Extended European Search Report, dated Aug. 2, 2018, received in European Patent Application No. 18168941.5, which corresponds with U.S. Appl. No. 14/871,236, 11 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Extended European Search Report, dated May 30, 2018, received in European Patent Application No. 18155939.4, which corresponds with U.S. Appl. No. 15/272,327, 8 pages.
Extended European Search Report, dated Mar. 2, 2018, received in European Patent Application No. 17206374.5, which corresponds with U.S. Appl. No. 15/272,343, 11 pages.
Office Action, dated Sep. 6, 2019, received in European Patent Application No. 18180503.7, which corresponds with U.S. Appl. No. 14/536,426, 5 pages.
Office Action, dated Oct. 7, 2019, received in Japanese Patent Application No. 2018-000753, which corresponds with U.S. Appl. No. 14/536,426, 5 pages.
Office Action, dated Sep. 30, 2019, received in Japanese Patent Application No. 2018-079290, which corresponds with U.S. Appl. No. 14/608,926, 5 pages.
Intention to Grant, dated Sep. 6, 2019, received in European Patent Application No. 13726053.5, which corresponds with U.S. Appl. No. 14/536,141, 7 pages.
Certificate of Grant, dated Sep. 4, 2019, received in European Patent Application No. 13724104.8, which corresponds with U.S. Appl. No. 14/536,203, 4 pages.
Patent, dated Sep. 27, 2019, received in Hong Kong Patent Application No. 15108904.1, which corresponds with U.S. Appl. No. 14/536,203, 6 pages.
Office Action, dated Sep. 30, 2019, received in Japanese Patent Application No. 2018-022394, which corresponds with U.S. Appl. No. 14/536,203, 5 pages.
Certificate of Grant, dated Aug. 28, 2019, received in Australian Patent Application No. 2018204236, which corresponds with U.S. Appl. No. 14/5326,267, 4 pages.
Office Action, dated Sep. 30, 2019, received in Chinese Patent Application No. 201610537334.1, which corresponds with U.S. Appl. No. 14/536,267, 3 pages.
Patent, dated Aug. 30, 2019, received in Hong Kong Patent Application No. 15107537.8, which corresponds with U.S. Appl. No. 14/536,267, 9 pages.
Notice of Allowance, dated Sep. 9, 2019, received in Japanese Patent Application No. 2017-237035, which corresponds with U.S. Appl. No. 14/536,267, 5 pages.
Certificate of Grant, dated Aug. 28, 2019, received in European Patent Application No. 13811032.5, which corresponds with U.S. Appl. No. 14/608,985, 4 pages.
Grant Certificate, dated Sep. 11, 2019, received in European Patent Application No. 17153418.3, which corresponds with U.S. Appl. No. 14/536,648, 3 pages.
Decision to Grant, dated Sep. 12, 2019, received in European Patent Application No. 16708916.8, which corresponds with U.S. Appl. No. 14/868,078, 2 pages.
Decision to Grant, dated Sep. 19, 2019, received in European Patent Application No. 17184437.6, which corresponds with U.S. Appl. No. 14/868,078, 2 pages.
Office Action, dated Sep. 17, 2019, received in Chinese Patent Application No. 201610342264.4, which corresponds with U.S. Appl. No. 14/866,511, 3 pages.
Office Action, dated Sep. 12, 2019, received in Chinese Patent Application No. 201610658351.8, which corresponds with U.S. Appl. No. 14/866,992, 5 pages.
Notice of Allowance, dated Sep. 10, 2019, received in Korean Patent Application No. 2018-7003890, which corresponds with U.S. Appl. No. 14/866,992, 5 pages.
Notice of Acceptance, dated Sep. 19, 2019, received in Australian Patent Application No. 2019200872, which corresponds with U.S. Appl. No. 14/864,580, 3 pages.
Decision to Grant, dated Sep. 12, 2019, received in European Patent Application No. 16730554.9, which corresponds with U.S. Appl. No. 14/864,601, 2 pages.
Office Action, dated Oct. 8, 2019, received in European Patent Application No. 17188507.2, which corresponds with U.S. Appl. No. 14/866,361, 6 pages.

(56) References Cited

OTHER PUBLICATIONS

Notice of Allowance, dated Oct. 7, 2019, received in Japanese Patent Application No. 2017-141962, which corresponds with U.S. Appl. No. 14/866,361, 5 pages.
Office Action, dated Sep. 30, 2019, received in Chinese Patent Application No. 201610871466.8, which corresponds with U.S. Appl. No. 14/871,236, 4 pages.
Office Action, dated Sep. 27, 2019, received in Chinese Patent Application No. 201810119007.3, which corresponds with U.S. Appl. No. 15/136,782, 6 pages.
Office Action, dated Oct. 2, 2019, received in European Patent Application No. 18171753.6, which corresponds with U.S. Appl. No. 15/136,782, 5 pages.
Decision to Grant, dated Sep. 12, 2019, received in European Patent Application No. 17206374.5, which corresponds with U.S. Appl. No. 15/272,343, 3 pages.
Notice of Allowance, dated Oct. 10, 2019, received in U.S. Appl. No. 16/102,409, 9 pages.
Notice of Allowance, dated Sep. 11, 2019, received in U.S. Appl. No. 16/230,743, 5 pages.
Office Action, dated Oct. 11, 2019, received in Australian Patent Application No. 2019202417, 4 pages.
Office Action, dated Aug. 30, 2019, received in Korean Patent Application No. 2019-7019100, 2 pages.
Extended European Search Report, dated Oct. 9, 2019, received in European Patent Application No. 19181042.3, which corresponds with U.S. Appl. No. 15/272,343, 10 pages.
Borowska, "6 Types of Digital Affordance that Impact Your Ux", https://www.webdesignerdepot.com/2015/04/6-types-of-digital-affordance-that-implact-your-ux, Apr. 7, 2015, 6 pages.
Yang, et al., "Affordance Application on Visual Interface Design of Desk-Top Virtual Experiments", 2014 International Conference on Information Science, Electronics and Electrical Engineering, IEEE, vol. 1, Apr. 26, 2014, 5 pages.
Office Action, dated Nov. 18, 2019, received in Australian Patent Application No. 2018223021, which corresponds with U.S. Appl. No. 14/536,426, 3 pages.
Patent, dated Nov. 22, 2019, received in Hong Kong Patent Application No. 16107033.6, which corresponds with U.S. Appl. No. 14/536,426, 6 pages.
Intention to Grant, dated Nov. 8, 2019, received in European Patent Application No. 18194127.9, which corresponds with U.S. Appl. No. 14/608,942, 7 pages.
Notice of Allowance dated Nov. 7, 2019, received in U.S. Appl. No. 14/608,965, 17 pages.
Patent, dated Nov. 8, 2019, received in Hong Kong Patent Application No. 15108890.7, which corresponds with U.S. Appl. No. 14/536,267, 4 pages.
Patent, dated Sep. 27, 2019, received in Japanese Patent Application No. 2017-237035, which corresponds with U.S. Appl. No. 14/536,267, 3 pages.
Decision to Grant, dated Oct. 31, 2019, received in European Patent Application No. 17186744.3, which corresponds with U.S. Appl. No. 14/536,291, 3 pages.
Patent, dated Nov. 27, 2019, received in European Patent Application No. 17186744.3, which corresponds with U.S. Appl. No. 14/536,291, 4 pages.
Intention to Grant, dated Oct. 28, 2019, received in European Patent Application No. 16707356.8, which corresponds with U.S. Appl. No. 14/866,159, 7 pages.
Certificate of Grant, dated Oct. 17, 2019, received in Australian Patent Application No. 2017258967, which corresponds with U.S. Appl. No. 14/868,078, 4 page.
Office Action, dated Nov. 21, 2019, received in Chinese Patent Application No. 201680011338.4, which corresponds with U.S. Appl. No. 14/868,078, 8 pages.
Patent, dated Oct. 9, 2019, received in European Patent Application No. 16708916.8, which corresponds with U.S. Appl. No. 14/868,078, 3 pages.
Patent, dated Oct. 16, 2019, received in European Patent Application No. 17184437.6, which corresponds with U.S. Appl. No. 14/868,078, 3 pages.
Office Action, dated Nov. 5, 2019, received in Chinese Patent Application No. 201610342313.4, which corresponds with U.S. Appl. No. 14/863,432, 4 pages.
Notice of Allowance, dated Nov. 28, 2019, received in Chinese Patent Application No. 201610342264.4, which corresponds with U.S. Appl. No. 14/866,511, 3 pages.
Decision to Grant, dated Dec. 5, 2019, received in European Patent Application No. 16727900.9, which corresponds with U.S. Appl. No. 14/866,511, 2 pages.
Intention to Grant, dated Oct. 25, 2019, received in European Patent Application No. 18168939.9, which corresponds with U.S. Appl. No. 14/869,899, 8 pages.
Oral Summons, dated Dec. 6, 2019, received in European Patent Application No. 18175195.9, which corresponds with U.S. Appl. No. 14/869,899, 9 pages.
Patent, dated Oct. 11, 2019, received in Korean Patent Application No. 2018-7003890, which corresponds with U.S. Appl. No. 14/866,992, 5 pages.
Office Action, dated Nov. 11, 2019, received in Japanese Patent Application No. 2018-201076, which corresponds with U.S. Appl. No. 14/857,663, 7 pages.
Patent, dated Nov. 12, 2019, received in Korean Patent Application No. 2019-7018317, which corresponds with U.S. Appl. No. 14/864,580, 6 pages.
Patent, dated Oct. 9, 2019, received in European Patent Application No. 16730554.9, which corresponds with U.S. Appl. No. 14/864,601, 3 pages.
Patent, dated Nov. 8, 2019, received in Japanese Patent Application No. 2017-141962, which corresponds with U.S. Appl. No. 14/866,361, 4 pages.
Notice of Allowance, dated Dec. 3, 2019, received in Chinese Patent Application No. 201610342336.5, which corresponds with U.S. Appl. No. 14/866,987, 3 pages.
Intention to Grant, dated Oct. 25, 2019, received in European Patent Application No. 16189421.7, which corresponds with U.S. Appl. No. 14/866,987, 7 pages.
Decision to Grant, dated Nov. 14, 2019, received in European Patent Application No. 16189421.7, which corresponds with U.S. Appl. No. 14/866,987, 2 pages.
Intention to Grant, dated Dec. 4, 2019, received in European Patent Application No. 18168941.5, which corresponds with U.S. Appl. No. 14/871,236, 8 pages.
Office Action, dated Nov. 28, 2019, received in Chinese Patent Application No. 201610870912.3, which corresponds with U.S. Appl. No. 14/870,882, 10 pages.
Office Action, dated Nov. 4, 2019, received in Chinese Patent Application No. 201610871323.7, which corresponds with U.S. Appl. No. 14/871,336, 12 pages.
Notice of Allowance, dated Nov. 1, 2019, received in Japanese Patent Application No. 2018-158502, which corresponds with U.S. Appl. No. 15/231,745, 5 pages.
Notice of Allowance, dated Dec. 11, 2019, received in Chinese Patent Application No. 201810071627.4, which corresponds with U.S. Appl. No. 15/272,343, 4 pages.
Patent, Oct. 9, 2019, received in European Patent Application No. 17206374.5, which corresponds with U.S. Appl. No. 15/272,343, 3 pages.
Office Action, dated Oct. 22, 2019, received in Chinese Patent Application No. 201680022696.5, which corresponds with U.S. Appl. No. 15/272,345, 7 pages.
Final Office Action, dated Oct. 28, 2019, received in U.S. Appl. No. 15/889,115, 12 pages.
Office Action, dated Nov. 25, 2019, received in U.S. Appl. No. 16/049,725, 9 pages.
Office Action, dated Nov. 29, 2019, received in U.S. Appl. No. 16/136,163, 9 pages.
Office Action, dated Dec. 2, 2019, received in Japanese Patent Application No. 2018-202048, which corresponds with U.S. Appl. No. 16/154,591, 6 pages.

(56) References Cited

OTHER PUBLICATIONS

Office Action, dated Nov. 25, 2019, received in U.S. Appl. No. 16/174,170, 31 pages.
Notice of Allowance, dated Nov. 6, 2019, received in U.S. Appl. No. 16/258,394, 8 pages.
Notice of Allowance, dated Nov. 1, 2019, received in Korean Patent Application No. 2019-7019100, 5 pages.
Extended European Search Report, dated Nov. 14, 2019, received in European Patent Application No. 19194418.0, which corresponds with U.S. Appl. No. 14/864,580, 8 pages.
Extended European Search Report, dated Oct. 28, 2019, received in European Patent Application No. 19195414.8, which corresponds with U.S. Appl. No. 16/240,672, 6 pages.
Extended European Search Report, dated Nov. 13, 2019, received in European Patent Application No. 19194439.6, which corresponds with U.S. Appl. No. 16/262,800, 12 pages.
Certificate of Grant, dated Jul. 23, 2020, received in Australian Patent Application No. 2018223021, which corresponds with U.S. Appl. No. 14/536,426, 4 pages.
Patent, dated Jul. 31, 2020, received in Chinese Patent Application No. 201710781246.0, which corresponds with U.S. Appl. No. 14/536,291, 6 pages.
Office Action, dated Jul. 24, 2020, received in Chinese Patent Application No. 201711422121.5, which corresponds with U.S. Appl. No. 14/536,648, 10 pages.
Notice of Allowance, dated Jul. 29, 2020, received in Korean Patent Application No. 2020-7003065, which corresponds with U.S. Appl. No. 14/866,511, 5 pages.
Office Action, dated Jul. 24, 2020, received in Chinese Patent Application No. 201680041559.6, which corresponds with U.S. Appl. No. 14/866,992, 13 pages.
Brewster, "The Design and Evaluation of a Vibrotactile Progress Bar", Glasgow Interactive Systems Group, University of Glasgow, Glasgow, G12 8QQ, UK, 2005, 2 pages.
Jones, "Touch Screen with Feeling", IEEE Spectrum, , spectrum.ieee.org/commuting/hardware/touch-screens-with-feeling, May 1, 2009, 2 pages.
Nishino, "A Touch Screen Interface Design with Tactile Feedback", Computer Science, 2011 International Conference on Complex, Intelligent, and Software Intensive Systems, 2011, 4 pages.
Office Action, dated Oct. 26, 2020, received in Chinese Patent Application No. 201711422092.2, which corresponds with U.S. Appl. No. 14/536,464, 20 pages.
Decision to Grant, dated Aug. 20, 2020, received in European Patent Application No. 18194127.9, which corresponds with U.S. Appl. No. 14/608,942, 4 pages.
Certificate of Grant, dated Sep. 3, 2020, received in Australian Patent Application No. 2018250481, which corresponds with U.S. Appl. No. 14/536,203, 4 pages.
Patent, dated Sep. 29, 2020, received in Chinese Patent Application No. 201610537334.1, which corresponds with U.S. Appl. No. 14/536,267, 7 pages.
Office Action, dated Aug. 21, 2020, received in European Patent Application No. 18183789.9, which corresponds with U.S. Appl. No. 16/262,800, 9 pages.
Patent, dated Oct. 12, 2020, received in Korean Patent Application No. 2020-7015964, which corresponds with U.S. Appl. No. 14/863,432, 8 pages.
Patent, dated Oct. 29, 2020, received in Korean Patent Application No. 2020-7003065, which corresponds with U.S. Appl. No. 14/866,511, 5 pages.
Office Action, dated Sep. 16, 2020, received in U.S. Appl. No. 15/009,661, 37 pages.
Decision to Grant, dated Aug. 27, 2020, received in European Patent Application No. 16756866.6, which corresponds with U.S. Appl. No. 15/009,676, 4 pages.
Notice of Allowance, dated Oct. 9, 2020, received in Chinese Patent Application No. 201680047164.7, which corresponds with U.S. Appl. No. 15/009,688, 5 pages.
Patent, dated Nov. 10, 2020, received in Chinese Patent Application No. 201680047164.7, which corresponds with U.S. Appl. No. 15/009,688, 6 pages.
Decision to Grant, dated Sep. 24, 2020), received in European Patent Application No. 16753796.8, which corresponds with U.S. Appl. No. 15/009,688, 4 pages.
Notice of Allowance, dated Oct. 1, 2020, received in U.S. Appl. No. 14/856,520, 5 pages.
Notice of Allowance, dated Oct. 16, 2020, received in Japanese Patent Application No. 2017-029201, which corresponds with U.S. Appl. No. 14/857,636, 4 pages.
Notice of Allowance, dated Sep. 18, 2020, received in Japanese Patent Application No. 2018-201076, which corresponds with U.S. Appl. No. 14/857,663, 5 pages.
Office Action, dated Aug. 26, 2020, received in Indian Patent Application No. 201617032291, which corresponds with U.S. Appl. No. 14/866,987, 9 pages.
Intention to Grant, dated Oct. 5, 2020, received in European Patent Application No. 18168941.5, which corresponds with U.S. Appl. No. 14/871,236, 8 pages.
Notice of Allowance, dated Sep. 7, 2020, received in Mx/a/2017/011610, which corresponds with U.S. Appl. No. 14/871,236, 12 pages.
Office Action, dated Aug. 3, 2020, received in Chinese Patent Application No. 2016108709.3, which corresponds with U.S. Appl. No. 14/870,882, 4 pages.
Office Action, dated Aug. 4, 2020, received in Chinese Patent Application No. 201610871323.7, which corresponds with U.S. Appl. No. 14/871,336, 18 pages.
Office Action, dated Aug. 20, 2020, received in Chinese Patent Application No. 201680046985.9, which corresponds with U.S. Appl. No. 15/009,668, 15 pages.
Decision to Grant, dated Aug. 27, 2020, received in European Patent Application No. 18205283.7, which corresponds with U.S. Appl. No. 15/081,771, 4 pages.
Office Action, dated Aug. 31, 2020, received in Chinese Patent Application No. 201810151593.X, which corresponds with U.S. Appl. No. 15/272,327, 10 page.
Patent, dated Sep. 18, 2020, received in Chinese Patent Application No. 201680022696.5, which corresponds with U.S. Appl. No. 15/272,345, 6 pages.
Notice of Acceptance, dated Jul. 22, 2020, received in Australian Patent Application No. 2019203776, which corresponds with U.S. Appl. No. 15/499,693, 3 pages.
Office Action, dated Sep. 25, 2020, received in U.S. Appl. No. 15/994,843, 5 pages.
Office Action, dated Sep. 17, 2020, received in U.S. Appl. No. 16/136,163, 13 pages.
Final Office Action, dated Oct. 1, 2020, received in U.S. Appl. No. 16/154,591, 19 pages.
Office Action, dated Oct. 13, 2020, received in Australian Patent Application No. 2019203175, which corresponds with U.S. Appl. No. 16/154,591, 5 pages.
Notice of Allowance, dated Aug. 26, 2020, received in U.S. Appl. No. 16/240,669, 18 pages.
Office Action, dated Sep. 24, 2020, received in Australian Patent Application No. 2019268116, which corresponds with U.S. Appl. No. 16/240,672, 4 pages.
Notice of Allowance, dated Sep. 24, 2020, received in U.S. Appl. No. 16/243,834, 10 pages.
Office Action, dated Sep. 18, 2020, received in Australian Patent Application No. 2018282409, which corresponds with U.S. Appl. No. 16/243,834, 3 pages.
Notice of Acceptance, dated Oct. 21, 2020, received in Australian Patent Application No. 2018282409, which corresponds with U.S. Appl. No. 16/243,834, 3 pages.
Office Action, dated Aug. 7, 2020, received in Japanese Patent Application No. 2019-058800, which corresponds with U.S. Appl. No. 16/243,834, 8 pages.
Office Action, dated Sep. 15, 2020, received in European Patent Application No. 19194439.6, which corresponds with U.S. Appl. No. 16/262,800, 6 pages.

(56) References Cited

OTHER PUBLICATIONS

Notice of Allowance, dated Sep. 15, 2020, received in Australian Patent Application No. 2019257437, which corresponds with U.S. Appl. No. 16/252,478, 3 pages.
Office action, dated Aug. 27, 2020, received in U.S. Appl. No. 16/241,883, 11 pages.
Notice of Allowance, dated Sep. 28, 2020, received in U.S. Appl. No. 16/241,883, 10 pages.
Notice of Allowance, dated Aug. 25, 2020, received in U.S. Appl. No. 16/354,035, 14 pages.
Office Action, dated Aug. 21, 2020, received in Japanese Patent Application No. 2019-047319, which corresponds with U.S. Appl. No. 16/896,141, 6 pages.
Office Action, dated Oct. 7, 2020, received in U.S. Appl. No. 16/563,505, 20 pages.
Office Action, dated Oct. 19, 2020, received in U.S. Appl. No. 16/685,773, 15 pages.
Office Action, dated Oct. 30, 2020, received in U.S. Appl. No. 16/824,490, 15 pages.
Office Action, dated Sep. 21, 2020, received in U.S. Appl. No. 16/803,904, 5 pages.
Extended European Search Report, dated Oct. 6, 2020, received in European Patent Application No. 20188553.0, which corresponds with U.S. Appl. No. 15/499,693, 11 pages.
Garcia-Hernandez et al., "Orientation Discrimination of Patterned Surfaces through an Actuated and Non-Actuated Tactile Display", 2011 IEEE World Haptics Conference, Istanbul, Jun. 21-24, 2011, 3 pages.
Office Action, dated Jan. 4, 2021, received in Chinese Patent Application No. 201810826224.6, which corresponds with U.S. Appl. No. 14/536,426, 6 pages.
Office Action, dated Feb. 8, 2021, received in Japanese Patent Application No. 2018-000753, which corresponds with U.S. Appl. No. 14/536,426, 2 pages.
Notice of Allowance, dated Jan. 25, 2021, received in U.S. Appl. No. 14/536,464, 5 pages.
Notice of Allowance, dated Feb. 23, 2021, received in U.S. Appl. No. 14/536,464, 5 pages.
Office Action, dated Dec. 1, 2020, received in Chinese Patent Application No. 201810369259.1, which corresponds with U.S. Appl. No. 14/608,926, 14 pages.
Notice of Allowance, dated Mar. 22, 2021, received in Chinese Patent Application No. 201711422092.2, which corresponds with U.S. Appl. No. 14/536,646, 2 pages.
Certificate of Grant, dated Apr. 13, 2021, received in Chinese Patent Application No. 201711422092.2, which corresponds with U.S. Appl. No. 14/536,646, 8 pages.
Office Action, dated Mar. 10, 2021, received in Chinese Patent Application No. 201811142423.1, which corresponds with U.S. Appl. No. 14/536,141, 6 pages.
Patent, dated Sep. 16, 2020, received in European Patent Application No. 18194127.9, which corresponds with U.S. Appl. No. 14/608,942, 4 pages.
Office Action, dated Jan. 22, 2021, received in Japanese Patent Application No. 2018-022394, which corresponds with U.S. Appl. No. 14/536,203, 2 pages.
Office Action, dated Jan. 20, 2021, received in Chinese Patent Application No. 201810332044.2, which corresponds with U.S. Appl. No. 14/536,267, 15 pages.
Office Action, dated Nov. 17, 2020, received in Chinese Patent Application No. 2018100116175.X, which corresponds with U.S. Appl. No. 14/536,291, 16 pages.
Notice of Allowance, dated Mar. 29, 2021, received in Chinese Patent Application No. 2018100116175.X, which corresponds with U.S. Appl. No. 14/536,291, 1 page.
Patent, dated Apr. 27, 2021, received in Chinese Patent Application No. 2018100116175.X, which corresponds with U.S. Appl. No. 14/536,291, 6 pages.
Notice of Allowance, dated Feb. 2, 2021, received in Chinese Patent Application No. 201711422121.5, which corresponds with U.S. Appl. No. 14/536,648, 1 page.
Patent, dated Mar. 9, 2021, received in Chinese Patent Application No. 201711422121.5, which corresponds with U.S. Appl. No. 14/536,648, 7 pages.
Notice of Allowance, dated Dec. 4, 2020, received in Chinese Patent Application No. 201610131415.1, which corresponds with U.S. Appl. No. 14/866,981, 3 pages.
Patent, dated Jan. 22, 2021, received in Chinese Patent Application No. 201610131415.1, which corresponds with U.S. Appl. No. 14/866,981, 6 pages.
Patent, dated Dec. 11, 2020, received in Chinese Patent Application No. 201680011338.4, which corresponds with U.S. Appl. No. 14/868,078, 3 pages.
Notice of Allowance, dated Dec. 4, 2020, received in Japanese Patent Application No. 2018-243773, which corresponds with U.S. Appl. No. 14/863,432, 5 pages.
Patent, dated Jan. 5, 2021, received in Japanese Patent Application No. 2018-243773 (7270JP), which corresponds with U.S. Appl. No. 14/863,432, 4 pages.
Office Action, dated Nov. 6, 2020, received in Chinese Patent Application No. 201610871595.7, which corresponds with U.S. Appl. No. 14/869,899, 15 pages.
Notice of Allowance, dated Mar. 30, 2021, received in Chinese Patent Application No. 201610871595.7, which corresponds with U.S. Appl. No. 14/869,899, 1 page.
Office Action, dated Nov. 25, 2020, received in Chinese Patent Application No. 201610658351.8, which corresponds with U.S. Appl. No. 14/866,992, 9 pages.
Notice of Allowance, dated Apr. 26, 2021, received in Chinese Patent Application No. 201680041559.6, which corresponds with U.S. Appl. No. 14/866,992, 1 page.
Final Office Action, dated Feb. 26, 2021, received in U.S. Appl. No. 15/009,661, 46 pages.
Office Action, dated Nov. 30, 2020, received in Chinese Patent Application No. 201680047125.7, which corresponds with U.S. Appl. No. 15/009,676, 11 pages.
Notice of Allowance, dated Feb. 24, 2021, received in Chinese Patent Application No. 201680047125.7, which corresponds with U.S. Appl. No. 15/009,676, 1 page.
Patent, dated Apr. 27, 2021, received in Chinese Patent Application No. 201680047125.7, which corresponds with U.S. Appl. No. 15/009,676, 8 pages.
Patent, dated Sep. 23, 2020, received in European Patent Application No. 16756866.6, which corresponds with U.S. Appl. No. 15/009,676, 4 pages.
Certificate of Grant, dated Oct. 21, 2020, received in European Patent Application No. 16753796.8, which corresponds with U.S. Appl. No. 15/009,688, 4 pages.
Patent, dated Nov. 27, 2020, received in Chinese Patent Application No. 201711262953.5, which corresponds with U.S. Appl. No. 14/857,636, 6 pages.
Patent, dated Nov. 12, 2020, received in Japanese Patent Application No. 2017-029201, which corresponds with U.S. Appl. No. 14/857,636, 3 pages.
Notice of Allowance, dated Dec. 2, 2020, received in Chinese Patent Application No. 201711261143.8, which corresponds with U.S. Appl. No. 14/857,663, 3 pages.
Patent, dated Jan. 22, 2021, received in Chinese Patent Application No. 201711261143.8, which corresponds with U.S. Appl. No. 14/857,663, 6 pages.
Patent, dated Oct. 19, 2020, received in Japanese Patent Application No. 2018-201076, which corresponds with U.S. Appl. No. 14/857,663, 4 pages.
Office Action, dated Dec. 21, 2020, received in Korean Patent Application No. 2020-7029178, which corresponds with U.S. Appl. No. 14/870,882, 2 pages.
Intention to Grant, dated Feb. 3, 2021, received in European Patent Application No. 17188507.2, which corresponds with U.S. Appl. No. 14/866,361, 7 pages.

(56) References Cited

OTHER PUBLICATIONS

Patent, dated Feb. 5, 2021, received in Hong Kong Patent Application No. 1235878, which corresponds with U.S. Appl. No. 14/866,987, 6 pages.
Patent, dated Jan. 8, 2021, received in Hong Kong Patent Application No. 18100151.5, which corresponds with U.S. Appl. No. 14/866,987, 6 pages.
Intention to Grant, dated Dec. 3, 2020, received in European Patent Application No. 16189425.8, which corresponds with U.S. Appl. No. 14/866,989, 7 pages.
Decision to Grant, dated Feb. 25, 2021, received in European Patent Application No. 16189425.8, which corresponds with U.S. Appl. No. 14/866,989, 1 page.
Decision to Grant, dated Mar. 25, 2021, received in European Patent Application No. 18168941.5, which corresponds with U.S. Appl. No. 14/871,236, 2 pages.
Patent, dated Dec. 2, 2020, received in Mx/a/2017/011610, which corresponds with U.S. Appl. No. 14/871,236, 4 pages.
Office Action, dated Dec. 21, 2020, received in Chinese Patent Application No. 201610870912.3, which corresponds with U.S. Appl. No. 14/870,882, 5 pages.
Notice of Allowance, dated Mar. 22, 2021, received in Chinese Patent Application No. 201610870912.3, which corresponds with U.S. Appl. No. 14/870,882, 1 pages.
Office Action, dated Feb. 9, 2021, received in Chinese Patent Application No. 201610871323.7, which corresponds with U.S. Appl. No. 14/871,336, 1 page.
Notice of Allowance, dated Apr. 20, 2021, received in Chinese Patent Application No. 201680046985.9, which corresponds with U.S. Appl. No. 15/009,668, 1 page.
Office Action, dated Mar. 19, 2021, received in European Patent Application No. 16753795.0, which corresponds with U.S. Appl. No. 15/009,668, 5 pages.
Patent, dated Sep. 23, 2020, received in European Patent Application No. 18205283.7, which corresponds with U.S. Appl. No. 15/081,771, 4 pages.
Patent, dated Feb. 5, 2021, received in Hong Kong Patent Application No. 1257553, which corresponds with U.S. Appl. No. 15/136,782, 14 pages.
Notice of Allowance, dated Jan. 27, 2021, received in Chinese Patent Application No. 15/272,327, 3 pages.
Patent, dated Mar. 19, 2021, received in Chinese Patent Application No. 201810151593.X, which corresponds with U.S. Appl. No. 15/272,327, 6 pages.
Office Action, dated Dec. 4, 2020, received in Japanese Patent Application No. 2019-212493, which corresponds with U.S. Appl. No. 15/272,345, 5 pages.
Certificate of Grant, dated Nov. 26, 2020, received in Australian Patent Application No. 2019203776, which corresponds with U.S. Appl. No. 15/449,693, 3 pages.
Office action, dated Nov. 20, 2020, received in Japanese Patent Application No. 2019-200174, which corresponds with U.S. Appl. No. 15/499,693, 6 pages.
Office Action, dated Mar. 22, 2021, received in Chinese Patent Application No. 201710331254.5, which corresponds with U.S. Appl. No. 15/655,749, 4 pages.
Final Office Action, dated Nov. 18, 2020, received in U.S. Appl. No. 15/785,372, 27 pages.
Final Office Action, dated Jan. 25, 2021, received in U.S. Appl. No. 15/979,347, 12 pages.
Notice of Allowance, dated Jan. 22, 2021, received in U.S. Appl. No. 15/994,843, 8 pages.
Office Action, dated Dec. 10, 2020, received in U.S. Appl. No. 16/145,954, 5 pages.
Office Action, dated Mar. 4, 2021, received in U.S. Appl. No. 16/154,591, 20 pages.
Office Action, dated Mar. 29, 2021, received in Korean Patent Application No. 2019-7019946, which corresponds with U.S. Appl. No. 16/154,591, 6 pages.
Office Action, dated Oct. 30, 2020, received in U.S. Appl. No. 16/230,707, 20 pages.
Notice of Allowance, dated Feb. 18, 2021, received in U.S. Appl. No. 16/230,707, 9 pages.
Office Action, dated Jan. 28, 2021, received in Australian Patent Application No. 2019268116, which corresponds with U.S. Appl. No. 16/240,672, 4 pages.
Office Action, dated Apr. 21, 2021, received in European Patent Application No. 19195414.8, which corresponds with U.S. Appl. No. 16/240,672, 7 pages.
Certificate of Grant, dated Feb. 18, 2021, received in Australian Patent Application No. 2018282409, which corresponds with U.S. Appl. No. 16/243,834, 3 pages.
Office Action, dated Feb. 12, 2021, received in Japanese Patent Application No. 2019-058800, which corresponds with U.S. Appl. No. 16/243,834, 2 pages.
Notice of Allowance, dated Nov. 20, 2020, received in U.S. Appl. No. 16/262,784, 8 pages.
Office action, dated Feb. 25, 2021, received in Australian Patent Application No. 2020201648, which corresponds with U.S. Appl. No. 16/262,784, 3 pages.
Office Action, dated Feb. 5, 2021, received in U.S. Appl. No. 16/262,800, 53 pages.
Office Action, dated Mar. 25, 2021, received in European Patent Application No. 19194439.6, which corresponds with U.S. Appl. No. 16/262,800, 5 pages.
Certificate of Grant, dated Nov. 5, 2020, received in Australian Patent Application No. 2019202417, which corresponds with U.S. Appl. No. 16/896,141, 4 pages.
Office Action, dated Apr. 9, 2021, received in Japanese Patent Application No. 2019-047319, which corresponds with U.S. Appl. No. 16/896,141, 2 pages.
Notice of Allowance, dated Jan. 6, 2021, received in U.S. Appl. No. 16/509,438, 5 pages.
Notice of Allowance, dated Apr. 29, 2021, received in U.S. Appl. No. 16/509,438, 9 pages.
Final Office Action, dated Feb. 2, 2021, received in U.S. Appl. No. 16/685,773, 20 pages.
Notice of Allowance, dated Feb. 24, 2021, received in U.S. Appl. No. 16/824,490, 8 pages.
Notice of Allowance, dated Jan. 6, 2021, received in U.S. Appl. No. 16/803,904, 9 pages.
Office Action, dated Feb. 23, 2021, received in Korean Patent Application No. 2020-7031330, which corresponds with U.S. Appl. No. 15/272,398, 6 pages.
Patent, dated May, 25, 2021, received in Chinese Patent Application No. 201610870912.3, which corresponds with U.S. Appl. No. 14/870,882, 8 pages.
Notice of Allowance, dated May 26, 2021, received in U.S. Appl. No. 14/867,892, 7 pages.
Office Action, dated May 14, 2021, received in European Patent Application No. 16711725.8, which corresponds with U.S. Appl. No. 14/867,990, 7 pages.
Final Office Action, dated May 20, 2021, received in U.S. Appl. No. 16/136,163, 13 pages.
Final Office Action, dated May 12, 2021, received in U.S. Appl. No. 16/563,505, 19 pages.
Office Action. dated May 26, 2021, received in U.S. Appl. No. 16/988,509, 25 pages.
Apple, "Final Cut Express 4 User Manual", https://wsi.li.dl/mBGZWEQ8fh556f/, Jan. 1, 2007, 1,152 pages.
Office Action, dated Jun. 24, 2021, received in Chinese Patent Application No. 201810826224.6, which corresponds with U.S. Appl. No. 14/536,426, 3 pages.
Office Action, dated Jul. 14, 2021, received in Chinese Patent Applcation No. 201810369259.1, which corresponds with U.S. Appl. No. 14/608,926, 5 pages.
Office Action, dated Jun. 10, 2021, received in Chinese Patent Application No. 201711425148.X, which corresponds with U.S. Appl. No. 14/536,646, 2 pages.
Office Action, dated Jul. 19, 2021, received in Chinese Patent Application No. 201810332044.2, which corresponds with U.S. Appl. No. 14/536,267, 1 page.

(56) References Cited

OTHER PUBLICATIONS

Patent, dated Jun. 4, 2021, received in Chinese Patent Application No. 201610871595.7, which corresponds with U.S. Appl. No. 14/869,899, 7 pages.
Patent, dated May 28, 2021, received in Chinese Patent Application No. 201680041559.6, which corresponds with U.S. Appl. No. 14/866,992, 7 pages.
Office Action, dated Jul. 1, 2021, received in U.S. Appl. No. 15/009,661, 52 pages.
Notice of Allowance, dated Jun. 28, 2021, received in Korean Patent Application No. 2020-7029178, which corresponds with U.S. Appl. No. 14/870,882, 2 pages.
Office Action, dated Jun. 17, 2021, received in European Patent Application No. 19194418.0, which corresponds with U.S. Appl. No. 14/864,580, 7 pages.
Patent, dated May 26, 2021, received in European Patent Applicationo No. 17188507.2, which corresponds with U.S. Appl. No. 14/866,361, 3 pages.
Office Action, dated Jun. 1, 2021, received in Chinese Patent Application No. 201610871323.7, which corresponds with U.S. Appl. No. 14/871,336, 1 page.
Notice of Allowance, dated Jul. 13, 2021, received in U.S. Appl. No. 14/867,892, 8 pages.
Notice of Allowance, dated Jul. 16, 2021, received in Japanese Patent Application No. 2019-200174, which corresponds with U.S. Appl. No. 15/499,693, 2 pages.
Notice of Allowance, dated May 27, 2021, received in Chinese Patent Application No. 201710331254.5, which corresponds with U.S. Appl. No. 15/655,749, 1 page.
Patent, dated Jun. 25, 2021, received in Chinese Patent Application No. 201710331254.5, which corresponds with U.S. Appl. No. 15/655,749, 7 pages.
Notice of Allowance, dated Jul. 14, 2021, received in U.S. Appl. No. 15/785,372, 11 pages.
Final Office Action, dated Jun. 4, 2021, received in U.S. Appl. No. 16/262,800, 65 pages.
Office Action, dated Jun. 9, 2021, received in U.S. Appl. No. 16/896,141, 21 pages.
Patent, dated Apr. 21, 2021, received in European Patent Application No. 18168941.5, which corresponds with U.S. Appl. No. 14/871,236, 3 pages.
Office Action, dated Aug. 12, 2021, received in Chinese Patent Application No. 201811142423.1, which corresponds with U.S. Appl. No. 14/536, 3, 6 pages.
Office Action, dated Jan. 26, 2021, received in Chinese Patent Application No. 201810632507.7, 5 pages.
Notice of Allowance, dated Aug. 11, 2021, received in Chinese Patent Application No. 201810632507.7, which corresponds with U.S. Appl. No. 14/536,203, 1 page.
Office Action, dated Aug. 10, 2021, received in European Patent Application No. 19181042.3, which corresponds with U.S. Appl. No. 16/241,883, 7 pages.
Sleepfreaks, "How to Easily Play/Loop an Event Range in Cubase", https://sleepfreaks-dtm.com/for-advance-cubase/porition-3, Apr. 4, 2011, 14 pages.
Notice of Allowance, dated Aug. 27, 2021, received in Japanese Patent Application No. 2019-212493, which corresponds with U.S. Appl. No. 15/272,345, 2 pages.
Notice of Allowance, dated Aug. 26, 2021, received in Korean Patent Application No. 2019-7019946, which corresponds with U.S. Appl. No. 16/154,591, 2 pages.
Office Action, dated Sep. 6, 2021, received in Chinese Patent Applicatin No. 201910718931.8, 6 pages.
Office Action, dated Aug. 30, 2021, received in Australian Patent Application No. 2020244406, which corresponds with U.S. Appl. No. 17/003,869, 4 pages.
Office Action, dated Sep. 8, 2021, received in Japanese Patent Application No. 2020-106360, 2 pages.
Final Office Action, dated Aug. 27, 2021, received in Korean Patent Application No. 2020-7031330, which corresponds with U.S. Appl. No. 15/272,398, 3 pages.

\* cited by examiner

10600

```
┌─────────────────────────────────────────────────────────────────┐
│ Display a plurality of user interface objects on a display,     │──10602
│ wherein: the plurality of user interface objects have a         │
│ z-order; the plurality of user interface objects includes a     │
│ first user interface object and a second user interface         │
│ object; and the first user interface object is above the        │
│ second user interface object in the z-order                     │
└─────────────────────────────────────────────────────────────────┘
                                │
                                ▼
┌─────────────────────────────────────────────────────────────────┐
│ While detecting a contact on a touch-sensitive surface, receive │──10604
│ a request to move the first user interface object below the     │
│ second user interface object in the z-order                     │
│ ┌─────────────────────────────────────────────────────────────┐ │
│ │ Receiving the request to move the first user interface      │ │──10606
│ │ object below the second user interface object includes,     │ │
│ │ while a focus selector is over the first user interface     │ │
│ │ object, detecting an increase in intensity of the contact   │ │
│ │ above a respective intensity threshold                      │ │
│ └─────────────────────────────────────────────────────────────┘ │
│ ┌─────────────────────────────────────────────────────────────┐ │
│ │ Receiving the request to move the first user interface      │ │──10608
│ │ object below the second user interface object includes,     │ │
│ │ while displaying a control for changing a z-order of the    │ │
│ │ first user interface object, detecting an input on the      │ │
│ │ control that corresponds to moving the first user interface │ │
│ │ object downward in the z-order                              │ │
│ └─────────────────────────────────────────────────────────────┘ │
│ ┌─────────────────────────────────────────────────────────────┐ │
│ │ Receiving the request to move the first user interface      │ │──10610
│ │ object below the second user interface object includes,     │ │
│ │ while displaying a control for changing a z-order of the    │ │
│ │ second user interface object, detecting an input on the     │ │
│ │ control that corresponds to moving the second user          │ │
│ │ interface object upward in the z-order                      │ │
│ └─────────────────────────────────────────────────────────────┘ │
└─────────────────────────────────────────────────────────────────┘
                                │
                                ▼
```

Figure 9A

In response to the request: — 10612

The first tactile output is generated by movement of the touch-sensitive surface that includes a first dominant movement component; the second tactile output is generated by movement of the touch-sensitive surface that includes a second dominant movement component; and the first dominant movement component and the second dominant movement component have different wavelengths — 10640

The wavelength of the first tactile output is determined based on a position of the intervening user interface object in the z-order; and the wavelength of the second tactile output is determined based on a position of the second user interface object in the z-order — 10642

The wavelength of the first tactile output is determined based on a number of user interface objects that the first user interface object overlaps that are between the first user interface object and the intervening user interface object in the z-order — 10644

The wavelength of the second tactile output is determined based on a number of user interface objects that the first user interface object overlaps that are between the first user interface object and the second user interface object in the z-order — 10646

The first user interface overlaps a plurality of other user interface objects arranged in a respective z-order sequence and a next tactile output corresponding to movement of the first user interface object below a next user interface object in the z-order sequence is based on a mathematical progression from a prior tactile output corresponding to movement of the first user interface object below a prior user interface object in the z-order sequence — 10648

The first user interface overlaps a plurality of other user interface objects arranged in a respective z-order sequence and a next tactile output corresponding to movement of the first user interface object below a next user interface object in the z-order sequence is based on a musical progression from a prior tactile output corresponding to movement of the first user interface object below a prior user interface object in the z-order sequence — 10650

Figure 9D

DEVICE, METHOD, AND GRAPHICAL USER INTERFACE FOR PROVIDING TACTILE FEEDBACK FOR OPERATIONS PERFORMED IN A USER INTERFACE

RELATED APPLICATIONS

This application is a continuation of U.S. patent application Ser. No. 14/536,646, filed Nov. 9, 2014, which is continuation of PCT Patent Application Serial No. PCT/US2013/040070, filed on May 8, 2013, entitled "Device, Method, and Graphical User Interface for Providing Tactile Feedback for Operations Performed in a User Interface," which claims the benefit of and priority to U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with more methods and interfaces for providing tactile feedback for operations performed in a user interface. Such methods and interfaces may complement or replace conventional methods for providing feedback for operations performed in a user interface. Such methods and interfaces reduce the cognitive burden on a user and produce a more efficient human-machine interface.

In accordance with some embodiments, a method is performed at an electronic device with a display and a touch-sensitive surface. The method includes displaying a user interface object on the display, detecting a contact on the touch-sensitive surface, and detecting a first movement of the contact across the touch-sensitive surface, the first movement corresponding to performing an operation on the user interface object, and, in response to detecting the first movement, performing the operation and generating a first tactile output on the touch-sensitive surface. The method further includes detecting a second movement of the contact across the touch-sensitive surface, the second movement corresponding to reversing the operation on the user interface object, and in response to detecting the second movement, reversing the operation and generating a second tactile output on the touch-sensitive surface, wherein the second tactile output is different from the first tactile output.

In accordance with some embodiments, an electronic device includes a display unit configured to display a user interface object, a touch-sensitive surface unit configured to detect user contacts, and a processing unit coupled to the display unit and the touch-sensitive surface unit. The processing unit is configured to detect a contact on the touch-sensitive surface unit, detect a first movement of the contact across the touch-sensitive surface unit, the first movement corresponding to performing an operation on the user interface object, in response to detecting the first movement; perform the operation and generate a first tactile output on the touch-sensitive surface unit. The processing unit is further configured to detect a second movement of the contact across the touch-sensitive surface unit, the second movement corresponding to reversing the operation on the user interface object, and in response to detecting the second movement; reverse the operation and generate a second tactile output on the touch-sensitive surface unit, where the second tactile output is different from the first tactile output.

Thus, electronic devices with displays and touch-sensitive surfaces are provided with more methods and interfaces for providing tactile feedback for operations performed in a user interface, thereby increasing the effectiveness, efficiency, and user satisfaction with such devices. Such methods and interfaces may complement or replace conventional methods for providing feedback for operations performed in a user interface.

There is a need for electronic devices with faster, more efficient methods and interfaces for indicating changes in the z-order of user interface objects. Such methods and interfaces may complement or replace conventional methods for indicating changes in the z-order of user interface objects. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a touch-sensitive surface. The method includes: displaying a plurality of user interface objects on the display, where: the plurality of user interface objects have a z-order, the plurality of user interface objects includes a first user interface object and a second user interface object, and the first user interface object is above the second user interface object in the z-order; while detecting a contact on the touch-sensitive surface, receiving a request to move the first user interface object below the second user interface object in the z-order; and in response to the request: moving the first user interface object below the second user interface object in the z-order; in accordance with a determination that the first user interface object overlaps at least a portion of the second user interface object, generating a tactile output associated with moving the first user interface object below the second user interface object on the touch-sensitive surface in conjunction with moving the first user interface object below the second user interface object; and in accordance with a determination that the first user interface object does not overlap the second user interface object, forgoing generating the tactile output associated with moving the first user interface object below the second user interface object.

In accordance with some embodiments, an electronic device includes a display unit configured to display a plurality of user interface objects on the display unit, where: the plurality of user interface objects have a z-order, the plurality of user interface objects includes a first user interface object and a second user interface object, and the first user interface object is above the second user interface object in the z-order; a touch-sensitive surface unit configured to receive contacts; and a processing unit coupled to the display unit and the touch-sensitive surface unit. The processing unit is configured to: while detecting a contact on the touch-sensitive surface unit, receive a request to move the first user interface object below the second user interface object in the z-order; and in response to the request: move the first user interface object below the second user interface object in the z-order; in accordance with a determination that the first user interface object overlaps at least a portion of the second user interface object, generate a tactile output associated with moving the first user interface object below the second user interface object on the touch-sensitive surface unit in conjunction with moving the first user interface object below the second user interface object; and in accordance with a determination that the first user interface object does not overlap the second user interface object, forgo generating the tactile output associated with moving the first user interface object below the second user interface object.

Thus, electronic devices with displays and touch-sensitive surfaces are provided with faster, more efficient methods and interfaces for indicating changes in the z-order of user interface objects, thereby increasing the effectiveness, efficiency, and user satisfaction with such devices. Such methods and interfaces may complement or replace conventional methods for indicating changes in the z-order of user interface objects.

There is a need for electronic devices with faster, more efficient methods and interfaces for providing feedback when an action will result in the adjustment of a parameter beyond a predefined limit. Such methods and interfaces may complement or replace conventional methods for providing feedback when an action will result in the adjustment of a parameter beyond a predefined limit. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface. The method includes: displaying, on the display, a control for controlling a parameter associated with respective content. The method further includes: detecting a gesture on the touch-sensitive surface for adjusting the parameter. The method further includes, in response to detecting the gesture: determining an adjustment of the parameter that corresponds to an extent of the gesture; in accordance with a determination that the adjustment of the parameter would cause one or more predefined adjustment limits to be exceeded, generating a respective tactile output on the touch-sensitive surface; and in accordance with a determination that the adjustment of the parameter would not cause the one or more predefined adjustment limits to be exceeded, performing the adjustment of the parameter without generating the respective tactile output on the touch-sensitive surface.

In accordance with some embodiments, an electronic device includes a display unit configured to display a control for controlling a parameter associated with respective content; a touch-sensitive surface unit configured to receive user contacts; and a processing unit coupled to the display unit and the touch-sensitive surface unit. The processing unit is configured to: enable display of a control for controlling a parameter associated with respective content on the display unit; and detect a gesture on the touch-sensitive surface unit for adjusting the parameter. The processing unit is further configured to, in response to detecting the gesture: determine an adjustment of the parameter that corresponds to an extent of the gesture; in accordance with a determination that the adjustment of the parameter would cause one or more predefined adjustment limits to be exceeded, generate a respective tactile output on the touch-sensitive surface unit; and in accordance with a determination that the adjustment of the parameter would not cause the one or more predefined adjustment limits to be exceeded, perform the adjustment of the parameter without generating the respective tactile output on the touch-sensitive surface unit.

Thus, electronic devices with displays, touch-sensitive surfaces are provided with faster, more efficient methods and interfaces for providing feedback when an action will result in the adjustment of a parameter beyond a predefined limit, thereby increasing the effectiveness, efficiency, and user satisfaction with such devices. Such methods and interfaces may complement or replace conventional methods for providing feedback when an action will result in the adjustment of a parameter beyond a predefined limit.

There is a need for electronic devices with more methods and interfaces for providing feedback corresponding to a clock. Such methods and interfaces may complement or replace conventional methods for displaying a clock. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a touch-sensitive surface. The method includes displaying a representation of a clock on the display, detecting movement of a focus selector over the representation of the clock; while detecting the focus selector over the representation of the clock, providing tactile feedback that corresponds to the clock, where the tactile feedback includes a regular pattern of tactile outputs on the touch-sensitive surface. The method further includes, while providing the tactile feedback, detecting movement of the focus selector away from the representation of the clock, and in response to detecting movement of the focus selector away from the representation of the clock, ceasing to provide the tactile feedback corresponding to the clock.

In accordance with some embodiments, an electronic device includes a display unit configured to display a representation of a clock, a touch-sensitive surface unit, and a processing unit coupled to the display unit and the touch-sensitive surface unit. The processing unit is configured to: detect movement of a focus selector over the representation of the clock, while detecting the focus selector over the representation of the clock, provide tactile feedback that corresponds to the clock, where the tactile feedback includes a regular pattern of tactile outputs on the touch-sensitive surface unit. The processing unit is further configured to, while providing the tactile feedback, detect movement of the focus selector away from the representation of the clock, and in response to detecting movement of the focus selector away from the representation of the clock, cease to provide the tactile feedback corresponding to the clock.

Thus, electronic devices with displays and touch-sensitive surfaces are provided with more methods and interfaces for providing feedback corresponding to a clock, thereby increasing the effectiveness, efficiency, and user satisfaction with such devices. Such methods and interfaces may complement or replace conventional methods for providing feedback corresponding to a clock.

There is a need for electronic devices with faster, more efficient methods and interfaces for providing feedback that corresponds to beats of a piece of music. Such methods and interfaces may complement or replace conventional methods for providing feedback that corresponds to beats of a piece of music. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface. The method includes displaying a representation of a piece of music on the display. The method further includes detecting movement of a focus selector over the representation of the piece of music. The method further includes, while detecting the focus selector over the representation of the piece of music, providing tactile feedback that corresponds to at least a subset of beats of the piece of music. The method further includes, after providing the tactile feedback, detecting movement of the focus selector away from the representation of the piece of music. The method further includes, in response to detecting movement of the focus selector away from the representation of the piece of music, ceasing to provide the tactile feedback that corresponds to the beats of the piece of music.

In accordance with some embodiments, an electronic device includes a display unit configured to display a representation of a piece of music; a touch-sensitive surface unit configured to receive user contacts; and a processing unit coupled to the display unit and the touch-sensitive surface unit. The processing unit is configured to: enable display of a representation of a piece of music; and detect movement of a focus selector over the representation of the piece of music. The processing unit is further configured to, while detecting the focus selector over the representation of the piece of music, provide tactile feedback that corresponds to at least a subset of beats of the piece of music. The processing unit is further configured to, after providing the tactile feedback, detect movement of the focus selector away from the representation of the piece of music. The processing unit is further configured to, in response to detecting movement of the focus selector away from the representation of the piece of music, cease to provide the tactile feedback that corresponds to the beats of the piece of music.

Thus, electronic devices with displays, touch-sensitive surfaces are provided with faster, more efficient methods and interfaces for providing feedback that corresponds to beats of a piece of music, thereby increasing the effectiveness, efficiency, and user satisfaction with such devices. Such methods and interfaces may complement or replace conventional methods for providing feedback that corresponds to beats of a piece of music.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9D are flow diagrams illustrating a method of indicating changes in z-order of user interface objects in accordance with some embodiments.

DESCRIPTION OF EMBODIMENTS

Figure 1A:
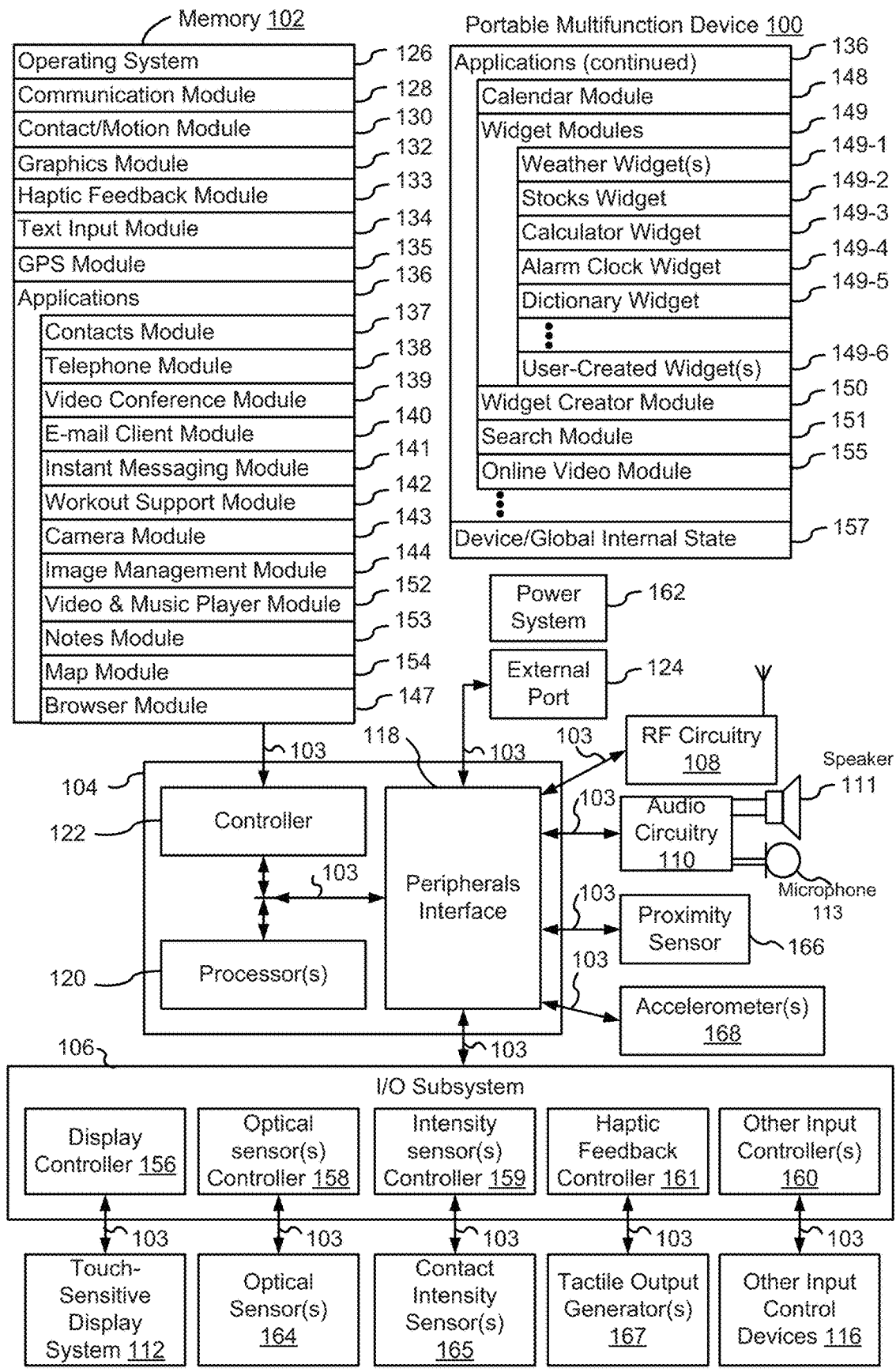
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

Figure 5A:
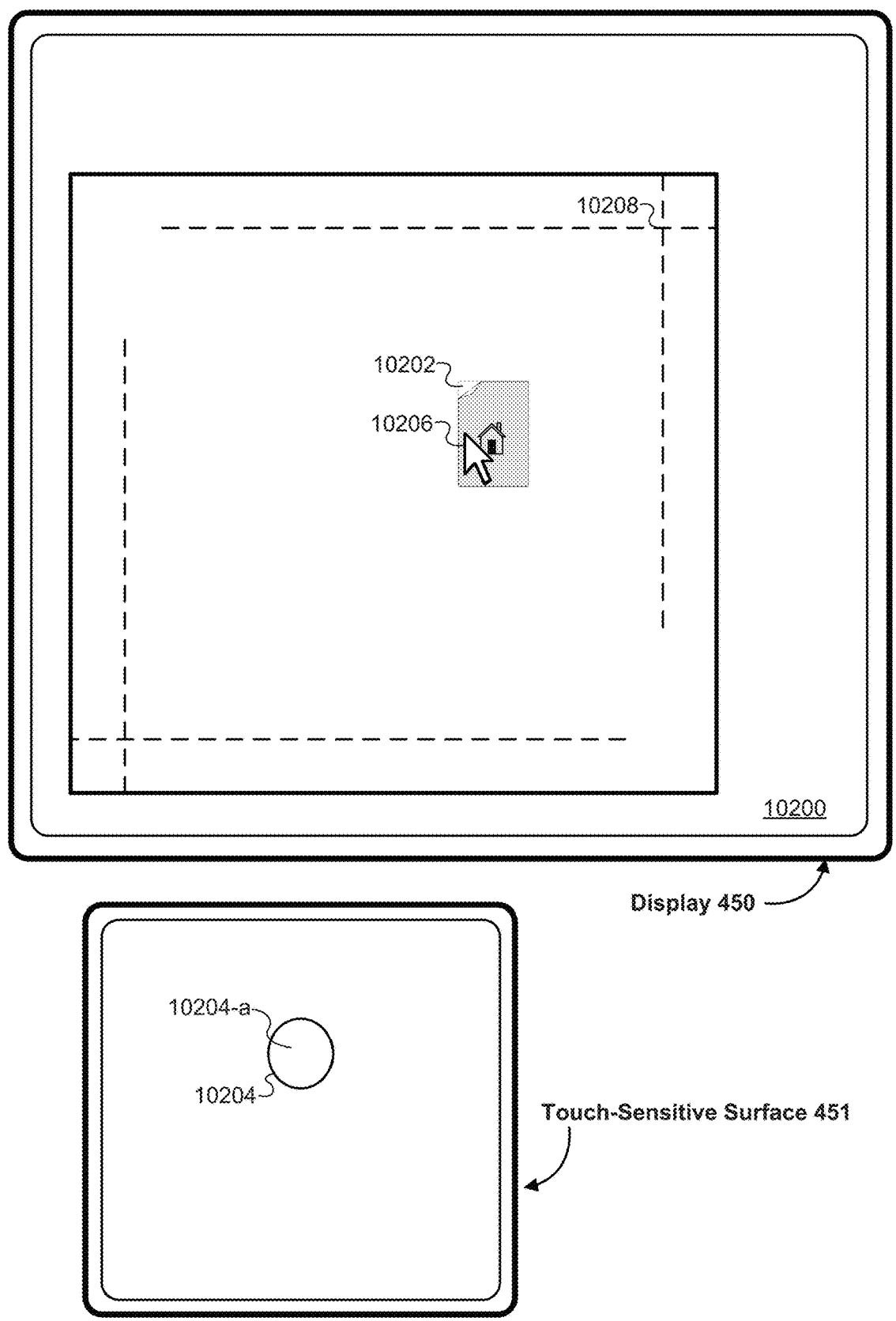
FIGS. 5A-5O illustrate exemplary user interfaces for providing tactile feedback for operations performed in a user interface in accordance with some embodiments.
Figure 5B:
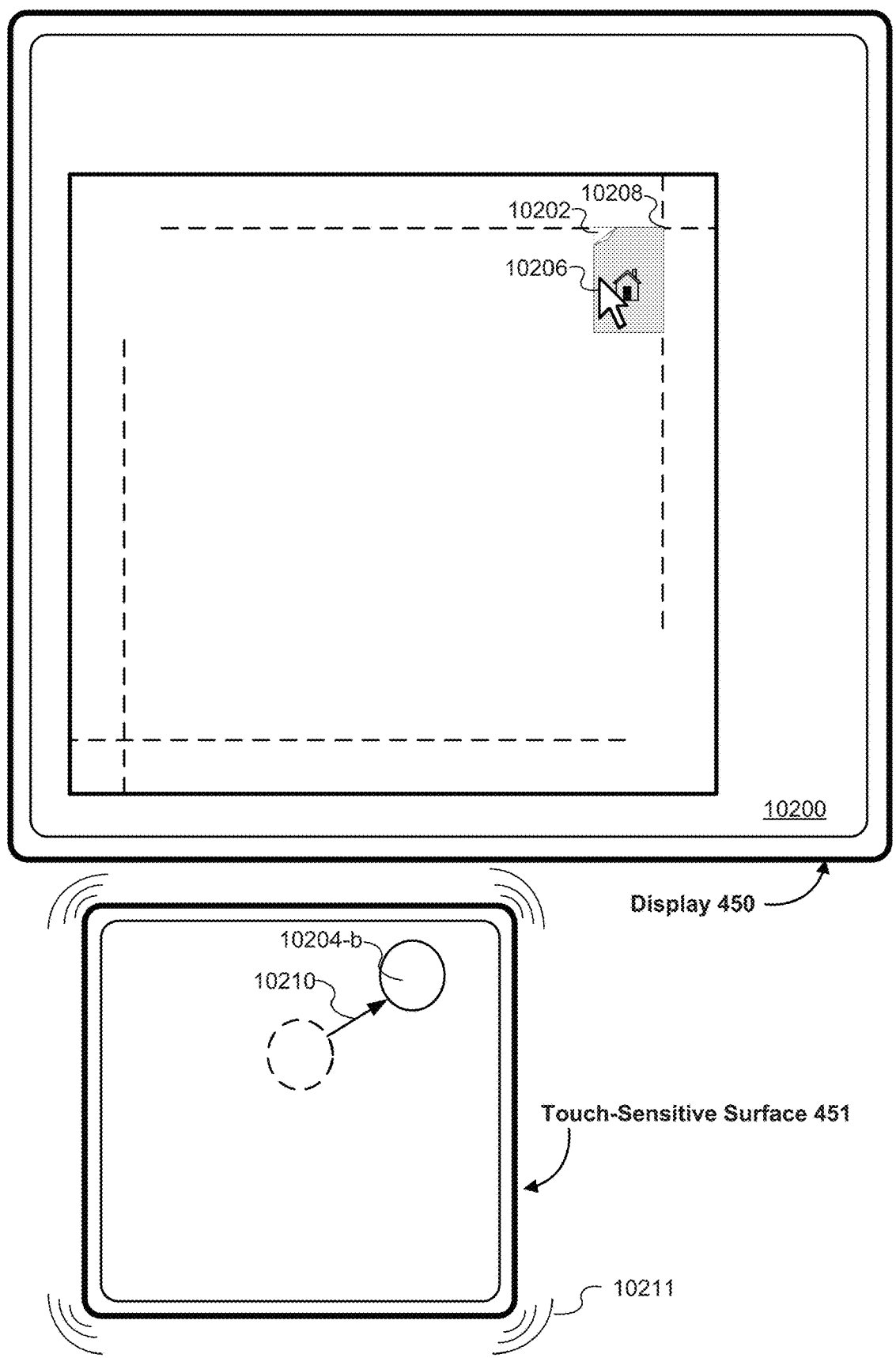
Figure 5C:
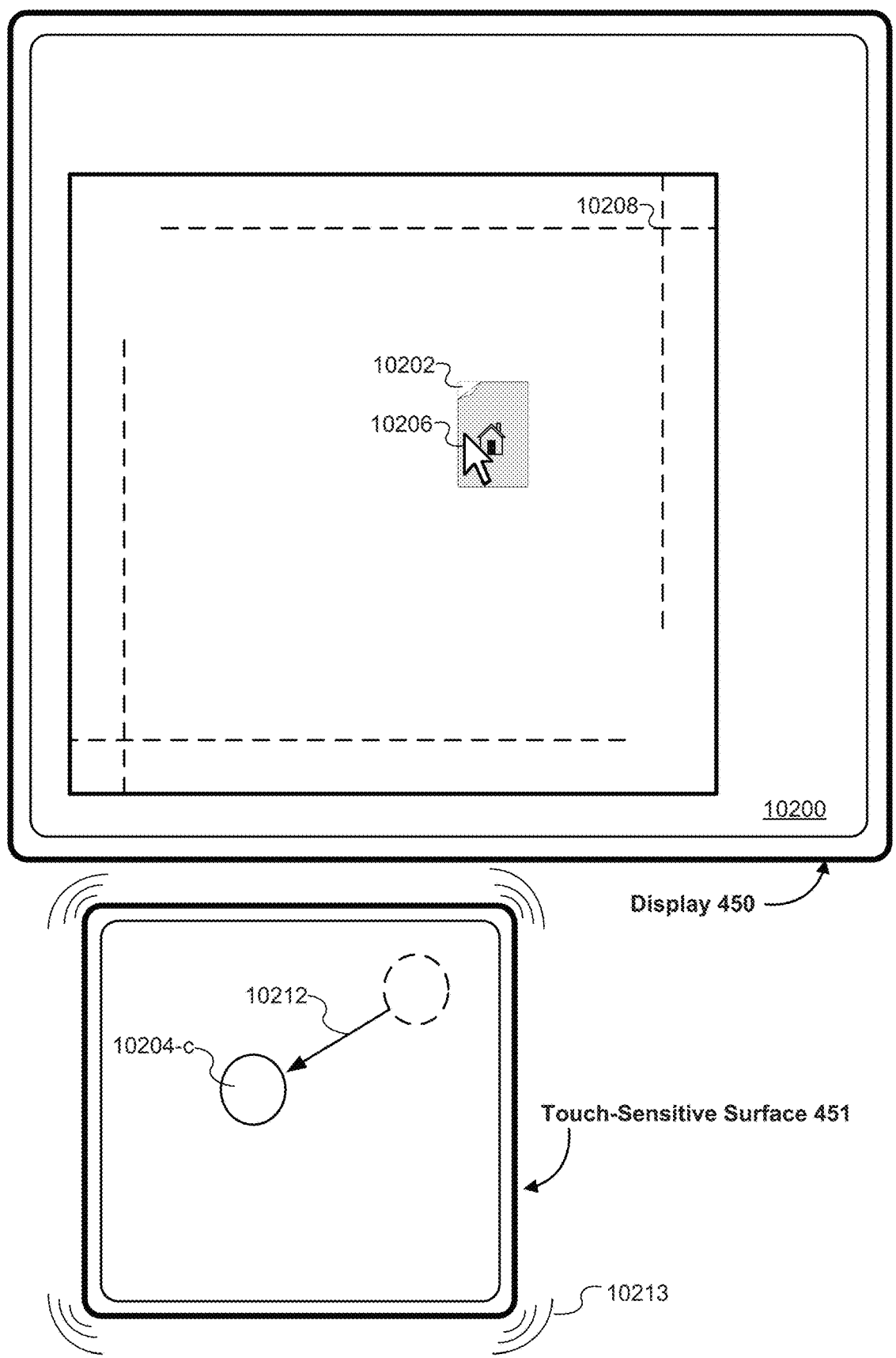

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces that include user interface objects. There are usually many operations which can be performed on the interface objects. For example, an interface object can be snapped to a guideline or removed from a guideline. Some user interfaces provide visual feedback indicating whether an operation has been performed or reversed. However, in some situations, a user will not notice the visual feedback and thus will be confused as to whether the operation has been performed or reversed. The embodiments described below improve on these methods by generating tactile outputs for the user corresponding to the operations performed, thereby providing a more convenient and efficient user interface. In particular, FIGS. 5A-5O illustrate exemplary user interfaces for providing tactile feedback for operations performed in a user interface. FIGS. 6A-6C are flow diagrams illustrating a method of providing tactile feedback for operations performed in a user interface. The user interfaces in FIGS. 5A-5O are further used to illustrate the processes described below with reference to FIGS. 6A-6C.

Figure 8A:
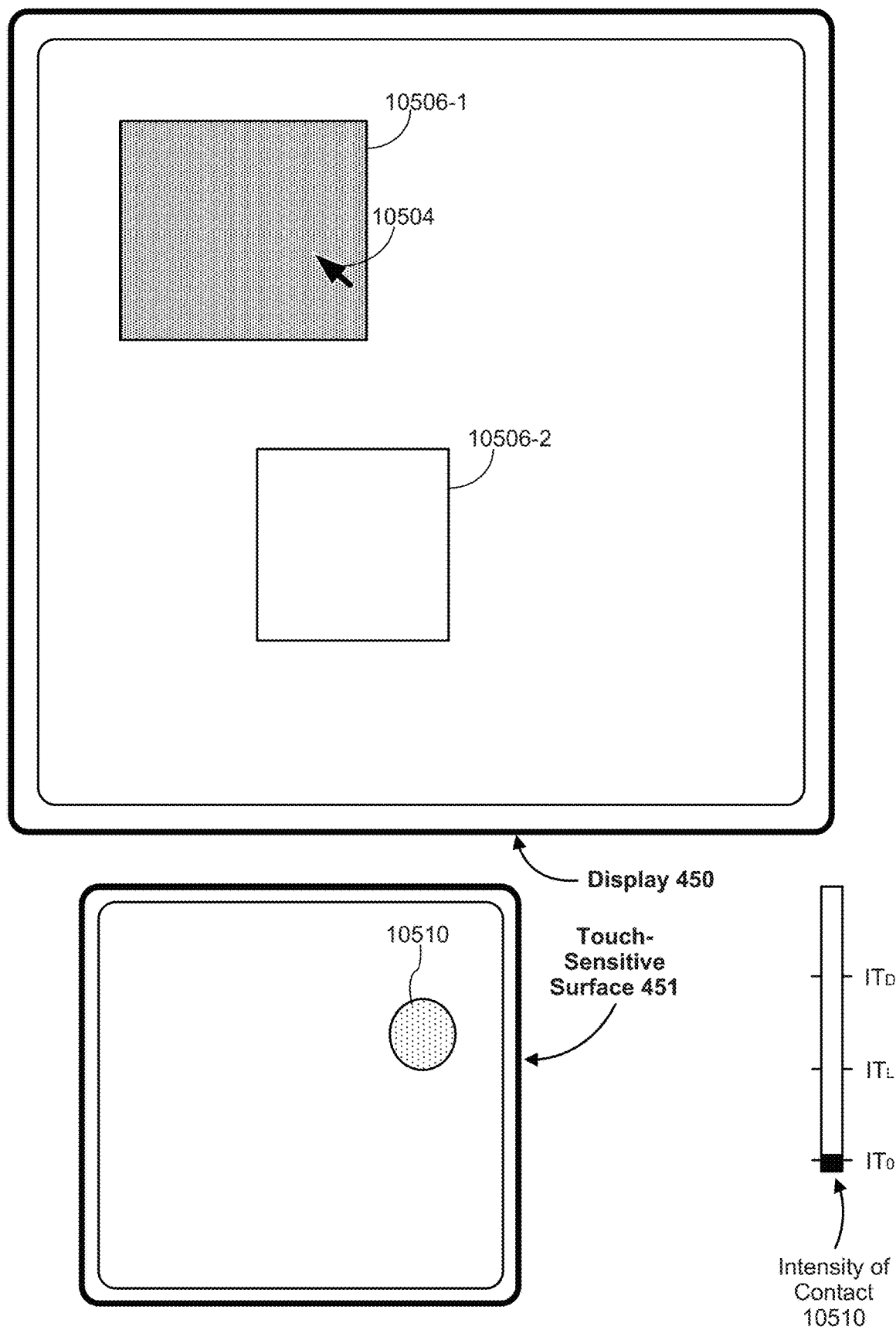
FIGS. 8A-8S illustrate exemplary user interfaces for indicating changes in z-order of user interface objects in accordance with some embodiments.

Many electronic devices display user interface objects that have a layer order (e.g., a z-order or front-to-back order of the user interface objects). In some circumstances, a user interacts with such objects by repositioning them on the display, and overlapping objects are displayed on the display in accordance with their front-to-back order (e.g., an object that is "in front" of another object is displayed where the two objects overlap). In addition to repositioning the objects on the display, a user often wants to change the front-to-back order of the objects on the display. In some methods, changes in the z-order are indicated with visual feedback. However, in some situations, a user will not notice the visual feedback and thus will be confused as to whether the operation has been performed. The embodiments described below improve on these methods by providing for tactile outputs when objects overlap each other and their z-order changes, thereby providing a more convenient and efficient user interface. In particular, FIGS. 8A-8S illustrate exemplary user interfaces for indicating changes in the z-order of user interface objects. FIGS. 9A-9D are flow diagrams illustrating a method of indicating changes in the z-order of user interface objects. The user interfaces in FIGS. 8A-8S are used to illustrate the processes in FIGS. 9A-9D.

Figure 11A:
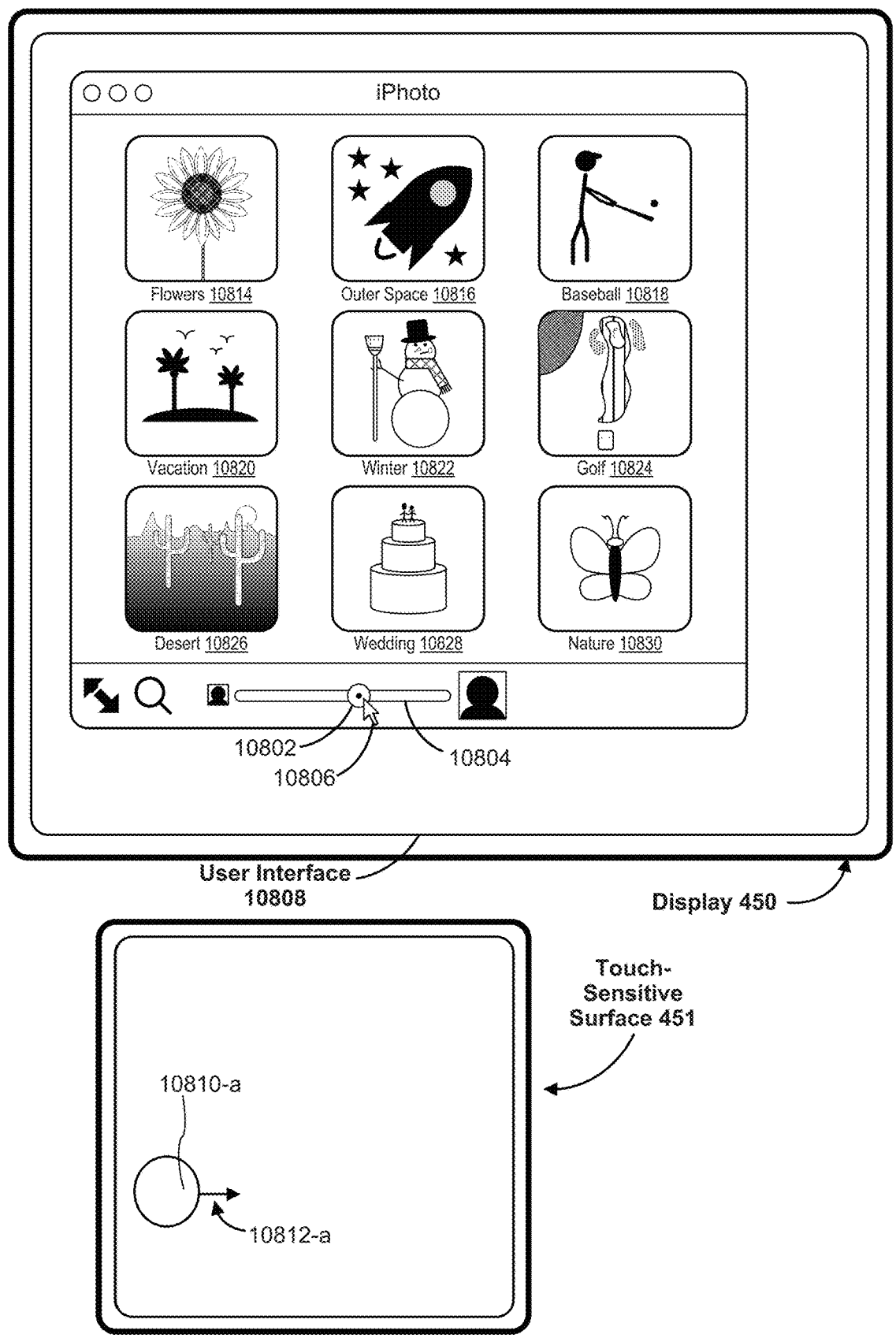
FIGS. 11A-11T illustrate exemplary user interfaces for providing feedback when an action will result in the adjustment of a parameter beyond a predefined limit in accordance with some embodiments.

Many electronic devices have graphical user interfaces that display user interface objects that can be manipulated by adjusting one or more associated parameter such as the size of a user interface object. For practical reasons, some of these parameters have predefined adjustment limits are commonly assigned to these user interface object, limiting the extent to which their properties can be adjusted. Some user interfaces provide visual feedback indicating whether a predefined adjustment limit has been exceeded. However, in some situations, a user will not notice the visual feedback and thus will be confused as to whether or not the predefined adjustment limit has been exceeded. The embodiments described below provide improved methods and user interfaces for generating feedback to a user navigating a complex user interface by providing tactile feedback when an action will result in the adjustment of a parameter beyond a predefined adjustment limit, thereby providing a more convenient and efficient user interface. In particular, FIGS. 11A-11T illustrate exemplary user interfaces for providing feedback when an action will result in the adjustment of a parameter beyond a predefined limit. FIGS. 12A-12B are flow diagrams illustrating a method of providing feedback when an action will result in the adjustment of a parameter beyond a predefined limit. The user interfaces in FIGS. 11A-11T are used to illustrate the processes in FIGS. 12A-12B.

Many electronic devices have graphical user interfaces that include a representation of a clock. There is often a need to provide efficient and convenient ways for users to receive feedback corresponding to the clock. Some user interfaces provide visual feedback indicating advancement of time on a clock. However, in some situations, a user will look away from the clock or be distracted and will not be able to pay attention to the visual feedback while performing another task. The embodiments below improve on the these methods by generating tactile outputs for the user that correspond to the clock (e.g., a 'tick tock' pattern of tactile outputs), thereby providing a more convenient and efficient user interface by enabling the user to pay attention to different visual element while monitoring the advancement of time on the clock. In particular, FIGS. 14A-14J illustrate exemplary user interfaces for providing tactile feedback corresponding to a clock in accordance with some embodiments. The user interfaces in these figures are used to illustrate the processes described below, including the processes described below with reference to FIGS. 15A-15B.

Many electronic devices have graphical user interfaces that display application windows showing representations of a piece of music (e.g., a graphical representation of a piece of cover art for an album of the piece of music, a region indicating that a piece of music is being currently being played or notes of a piece of music in a graphical representation of a music score corresponding to a piece of music). Given the complexity of user interface environment that includes application windows corresponding to applications having both audio and visual components (e.g., music playback, music composition, video playback or video composition applications), there is a need to provide feedback that enables the user to more efficiently and conveniently navigate through the user interface environment. Some user interfaces provide visual feedback indicating notes of a piece of music. However, in some situations, a user will look away from the region of the user interface providing visual feedback indicating notes of a piece of music or be distracted and will not be able to pay attention to the visual feedback while performing another task. The embodiments described below provide improved methods and user interfaces for generating feedback to a user navigating a complex user interface environment by generating tactile outputs corresponding to notes in a piece of music, thereby providing a more convenient and efficient user interface by enabling the user to pay attention to different visual element while monitoring the notes in the piece of music. More specifically, these methods and user interfaces provide feedback that corresponds to beats of a piece of music represented on a display. Below, FIGS. 17A-17L illustrate exemplary user interfaces for providing feedback that corresponds to beats of a piece of music. FIGS. 18A-18B are flow diagrams illustrating a method of providing feedback that corresponds to beats of a piece of music. The user interfaces in FIGS. 17A-17L are used to illustrate the processes in FIGS. 18A-18B.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
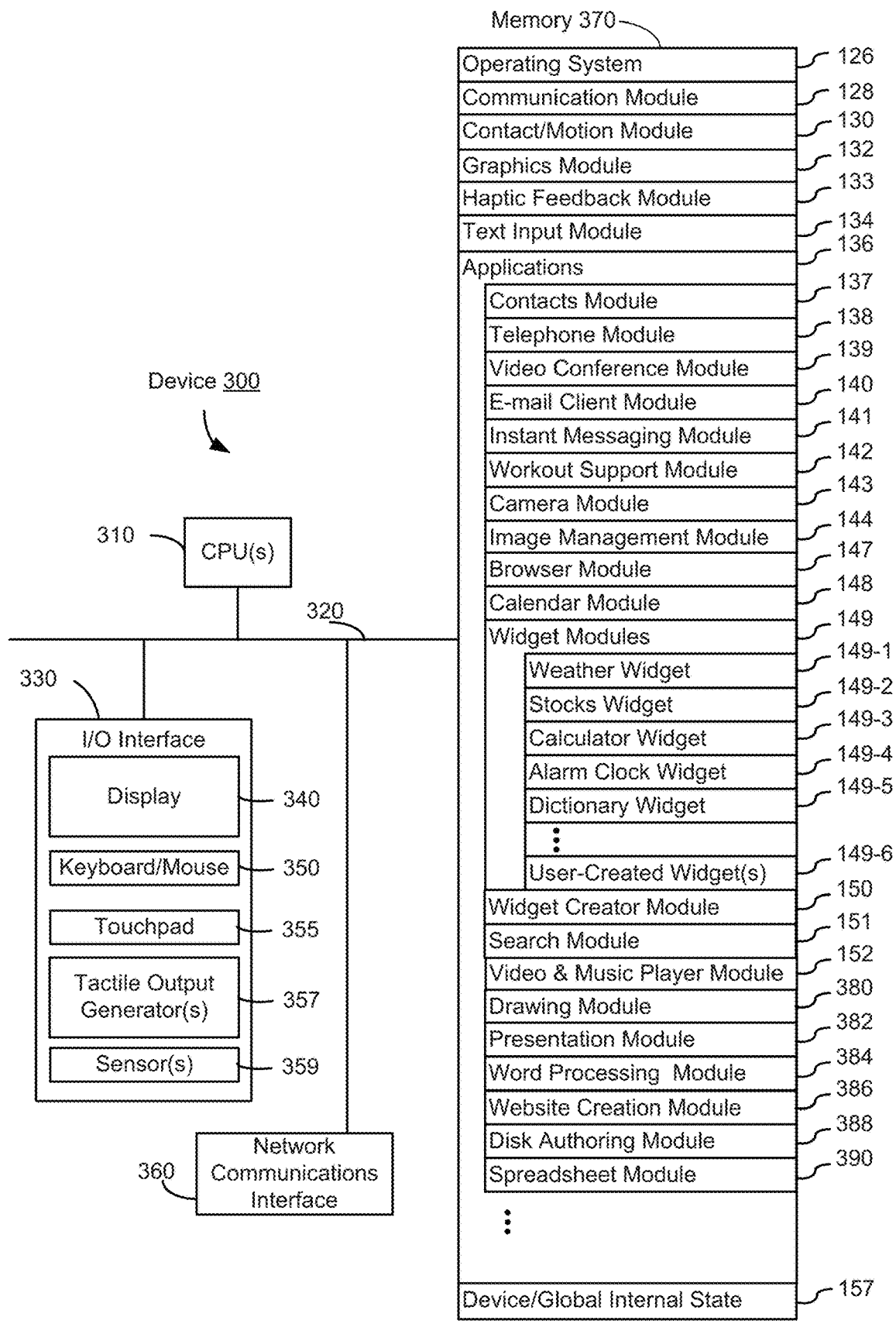
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
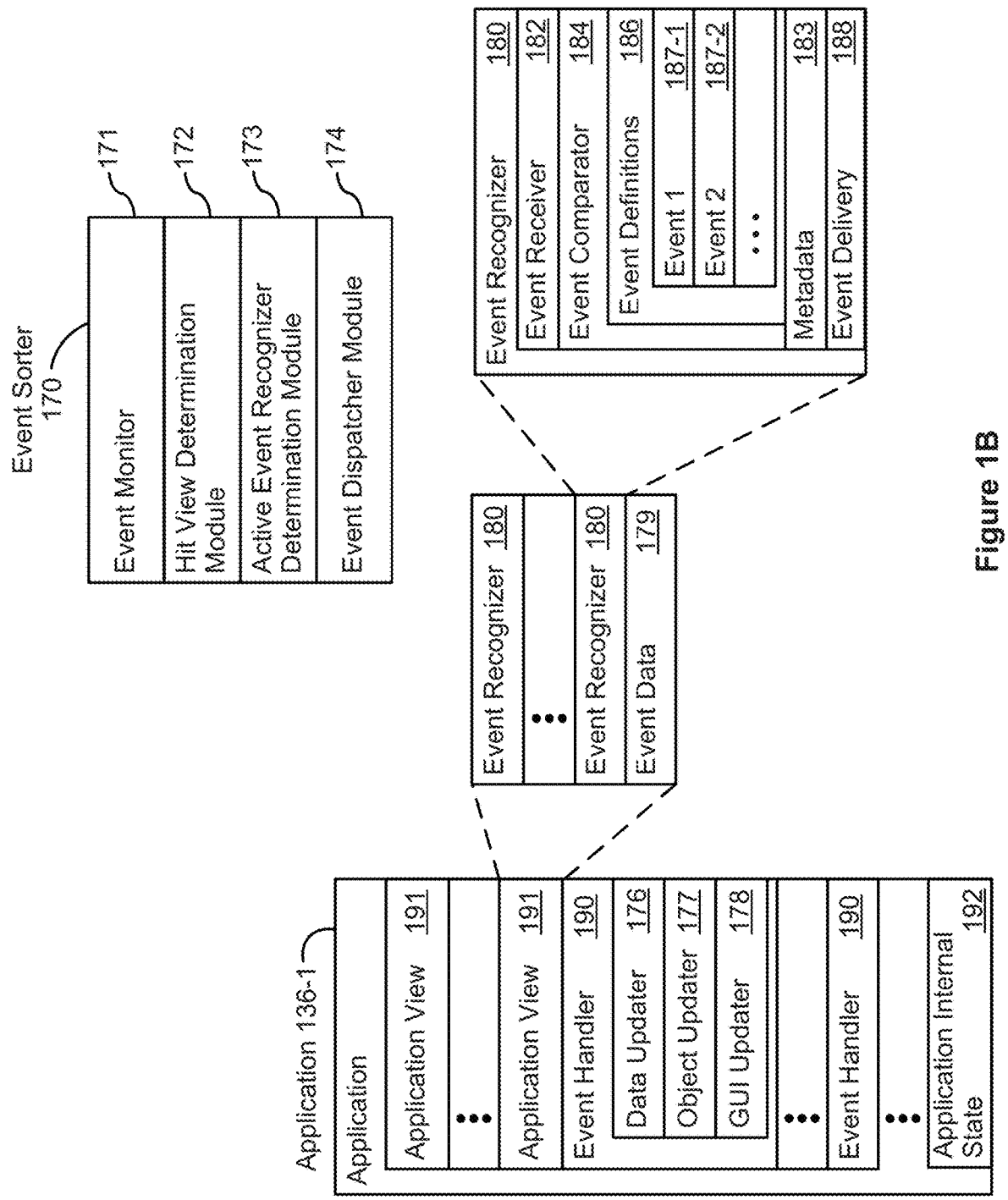
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
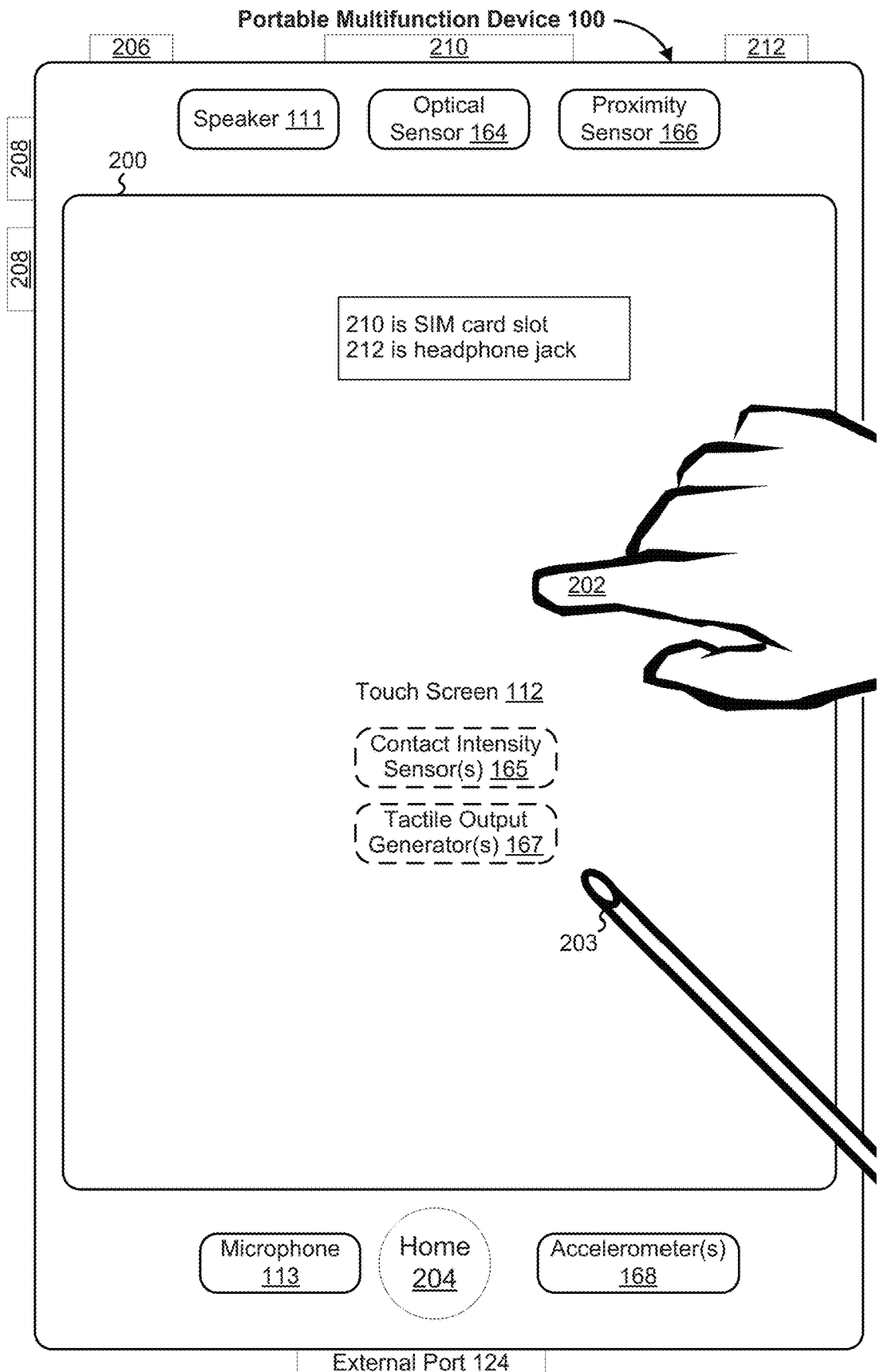
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
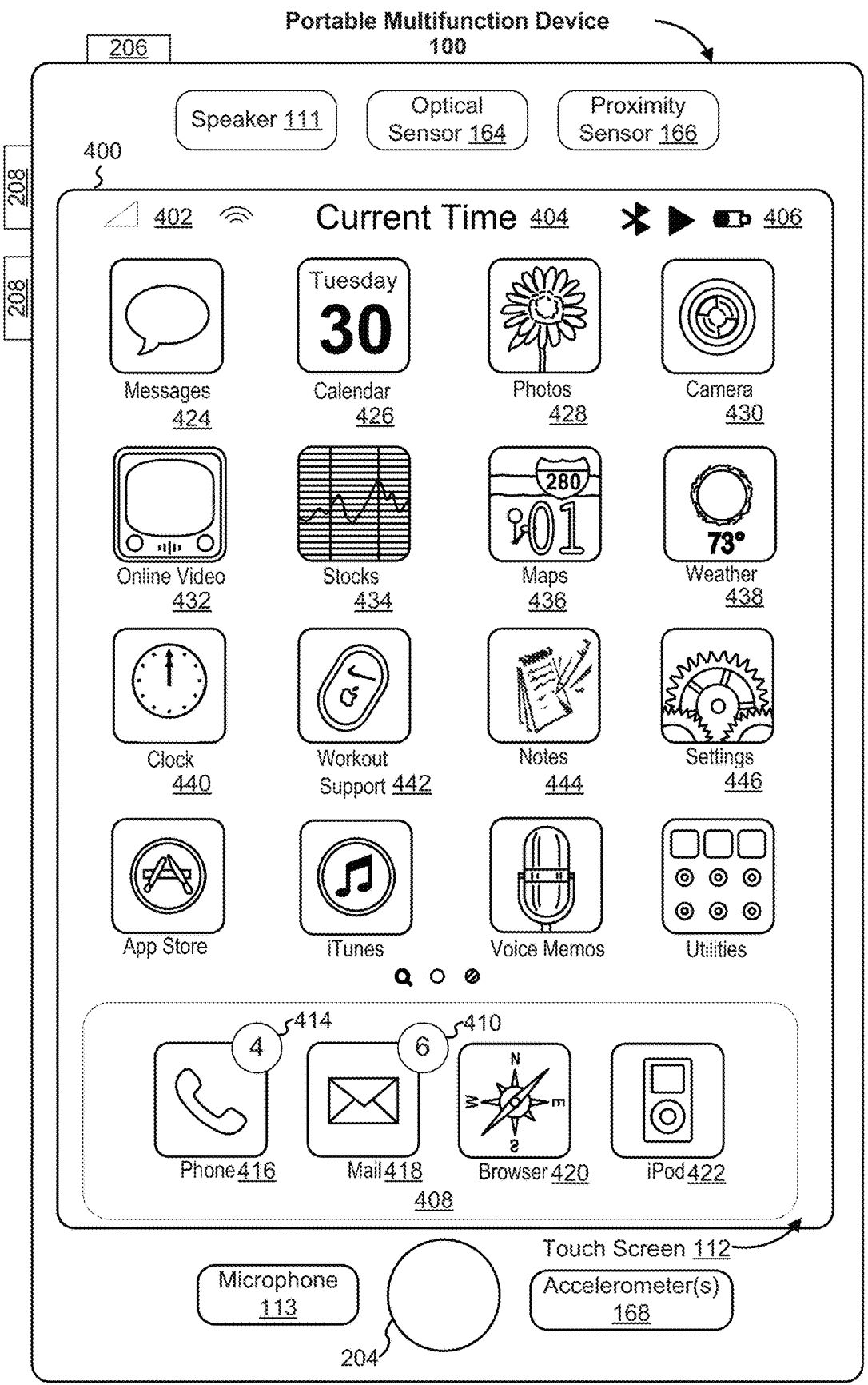
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"

Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
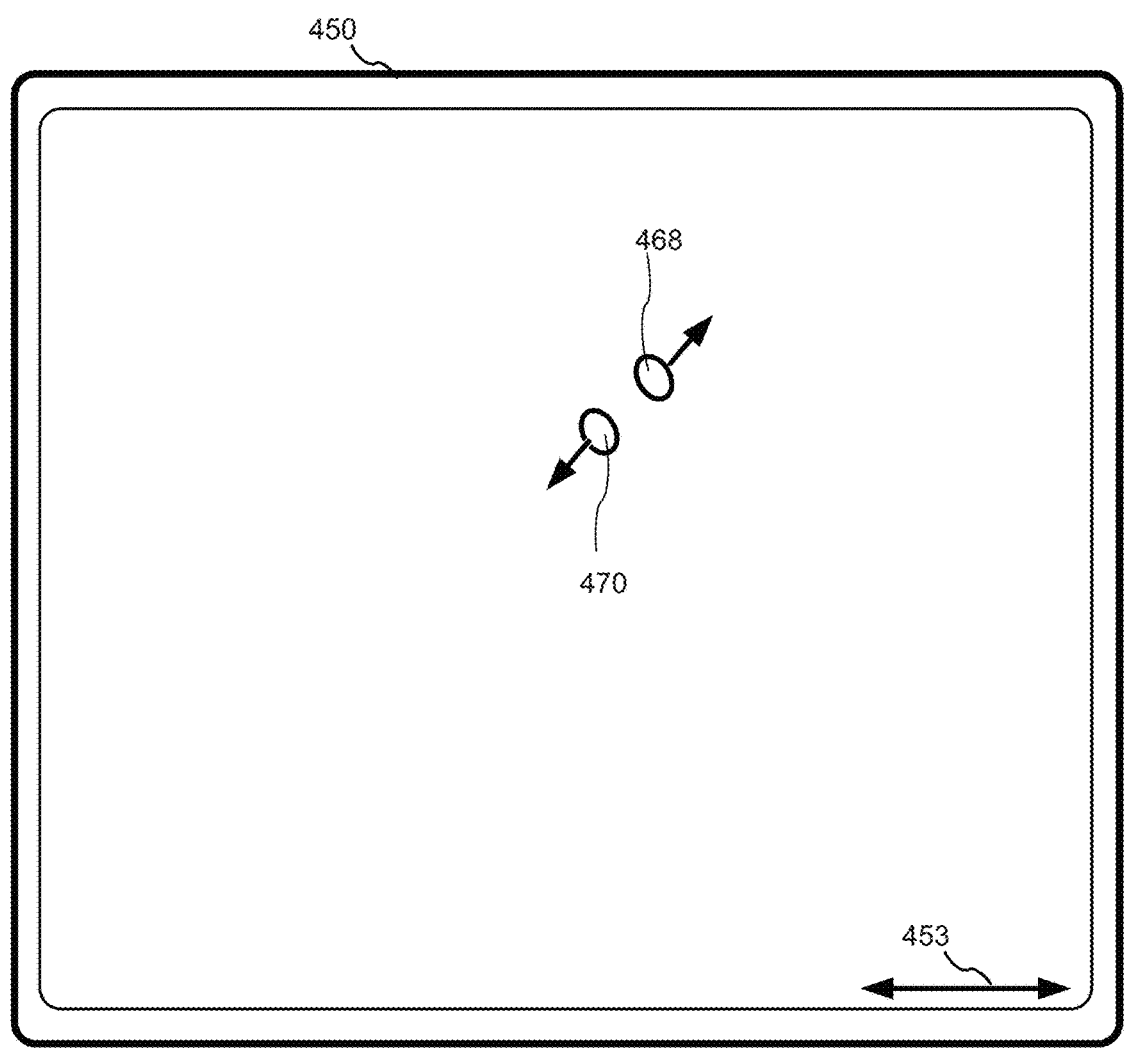
FIG. 4B illustrates an exemplary user interface for a multifunction device with a touch-sensitive surface that is separate from the display in accordance with some embodiments.
Figure 4B:
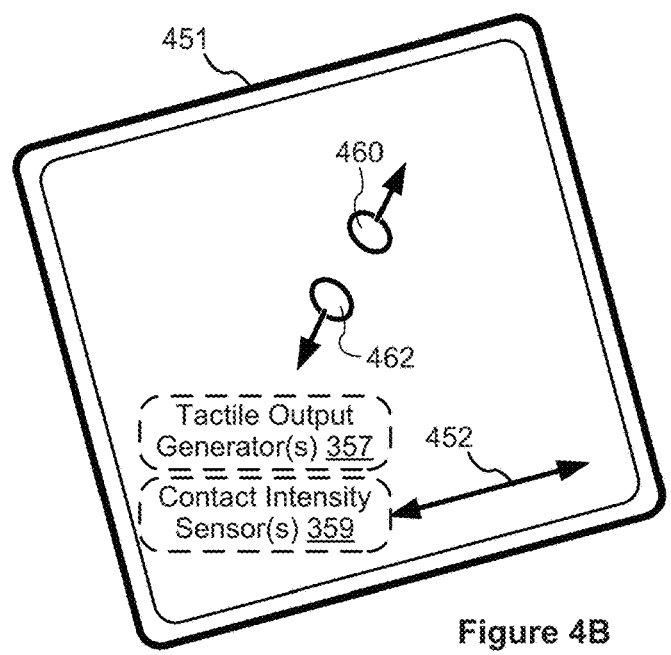

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Providing Tactile Feedback for Operations Performed on in a User Interface

Many electronic devices have graphical user interfaces that include user interface objects. There are usually many operations which can be performed on the interface objects. For example, an interface object can be snapped to a guideline or removed from a guideline. Another example would be moving a user interface object (e.g., a file) into or out of a folder. There is often a need to provide efficient and convenient ways for users to receive feedback for operations performed on these user interface objects. The embodiments below improve on existing methods by generating tactile outputs for the user corresponding to the operations performed.

FIGS. 5A-5O illustrate exemplary user interfaces for providing tactile feedback for operations performed in a user interface in accordance with some embodiments. The user interfaces in these figures are used to illustrate the processes described below, including the processes described below with reference to FIGS. 6A-6C.

FIG. 5A illustrates an example of a user interface that includes a user interface object. User interface 10200 in FIGS. 5A-5C is displayed on display 450 of a device (e.g., device 300) and is responsive to contacts (e.g., a finger contact) on touch-sensitive surface 451. User interface 10200 includes user interface object 10202 and, per some embodiments, object placement guide 10208. FIG. 5A further illustrates contact 10204 at position 10204-*a* on touch-sensitive surface 451 and a displayed representation of a focus selector (e.g., cursor 10206) corresponding to contact 10204.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5O and FIGS. 6A-6C will be discussed with reference to display 450 and a separate touch-sensitive surface 451, however analogous operations are, optionally, performed on a device with a touch-sensitive display system 112 in response to detecting the contacts described in FIGS. 5A-5O on the touch-sensitive display system 112 while displaying the user interfaces shown in FIGS. 5A-5O on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 10206.

FIGS. 5A-5B illustrate an example of performing an operation that includes snapping a user interface object into a respective object placement guide. In this example, the device detects contact 10204 and movement 10210 of contact 10204 from position 10204-a in FIG. 5A to position 10204-b in FIG. 5B on touch-sensitive surface 451. In response to detecting movement 10210, which corresponds to moving user interface object 10206 within a snapping distance of object placement guide 10208, the device snaps user interface object 10202 into object placement guide 10208 and generates tactile output 10211 on touch-sensitive surface 451.

FIGS. 5B-5C illustrate an example of reversing the operation shown in FIGS. 5B-5C by snapping a user interface object out of a respective object placement guide. In this example, the device detects contact 10204 and movement 10212 of contact 10204 from position 10204-b in FIG. 5B to position 10204-c in FIG. 5C on touch-sensitive surface 451. In response to detecting movement 10212, which corresponds to moving user interface object 10206 at or beyond an unsnapping distance of object placement guide 10208, the device snaps user interface object 10202 out of object placement guide 10208 (e.g., reversing the operation described above with reference to FIGS. 5A-5B). The device also generates tactile output 10213 on touch-sensitive surface 451 in response to movement 10212 of contact 10204 that corresponds to snapping user interface object 10202 out of object placement guide 10208.

In some embodiments, the device compares a respective amount of time between movement 10210 in FIG. 5B and movement 10212 in FIG. 5C with a predefined time threshold (e.g., the device determines a magnitude of a pause time between the end of the movement 10210 and the beginning of movement 10212 and compares the magnitude of the pause time with the predefined time threshold). In some embodiments, in accordance with a determination that the respective amount of time (e.g., the pause time) between movement 10210 and movement 10212 is less than the predefined time threshold, the device forgoes generating tactile output 10211 and/or tactile output 10213. In contrast, in some embodiments, in accordance with a determination that the respective amount of time (e.g., the pause time) between movement 10210 and movement 10212 is greater than the predefined time threshold, the device generates tactile output 10211 and tactile output 10213, as described in greater detail above. In some embodiments, when the respective amount of time is less than the predefined time threshold, the tactile output corresponding to performing the operation (e.g., tactile output 10211) is generated and the tactile output corresponding to reversing the operation (e.g., tactile output 10213) is not generated. In some embodiments, when the respective amount of time is less than the predefined time threshold, the tactile output corresponding to performing the operation (e.g., tactile output 10211) and the tactile output corresponding to reversing the operation (e.g., tactile output 10213) are both not generated. In some embodiments, when the respective amount of time is less than the predefined time threshold, the tactile output corresponding to performing the operation (e.g., tactile output 10211) is not generated and the tactile output corresponding to reversing the operation (e.g., tactile output 10213) is generated. Forgoing generating one or more tactile outputs corresponding to performing and reversing the operation when the operation is performed and reversed quickly (e.g., before the predefined time threshold has elapsed) prevents tactile outputs from being generated when the user accidentally performs and then reverses the operation. These tactile outputs, would likely, if generated, confuse the user or distract the user from other more important tactile and visual feedback. As such, selectively suppressing (e.g., forgoing) generating tactile outputs based on one or more predefined time thresholds, as described above, provides a more efficient and intuitive user interface, thereby improving the user experience when interacting with the user interface.

Figure 5D:
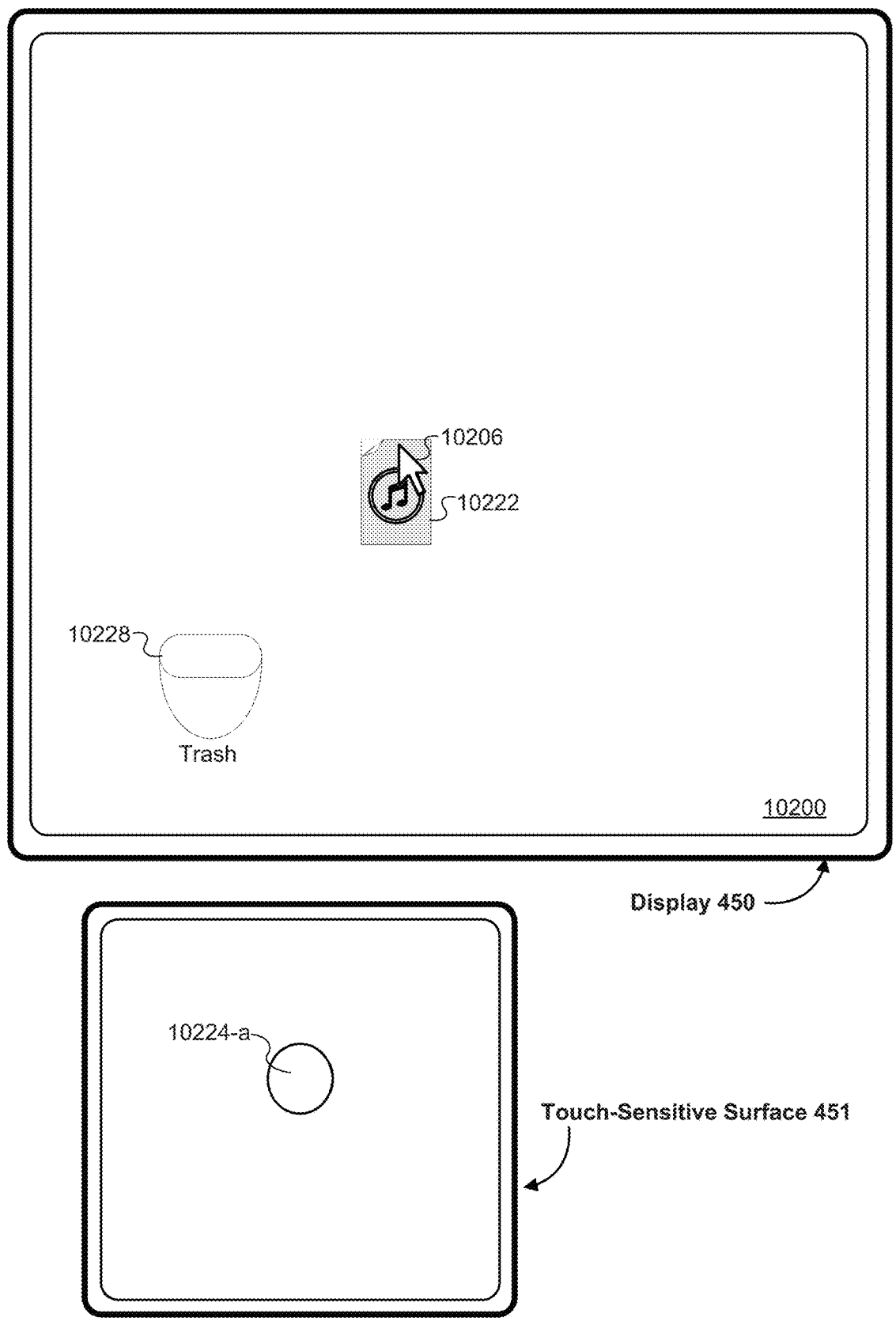

FIG. 5D illustrates another example of a user interface that includes a user interface object. In this example, user interface 10200 in FIGS. 5D-5F includes user interface object 10222 and folder 10228 which is a trash folder used to mark data for deletion. FIG. 5D further illustrates contact 10224 at position 10224-a on touch-sensitive surface 451 and a displayed representation of a focus selector (e.g., cursor 10206) corresponding to contact 10224.

Figure 5E:
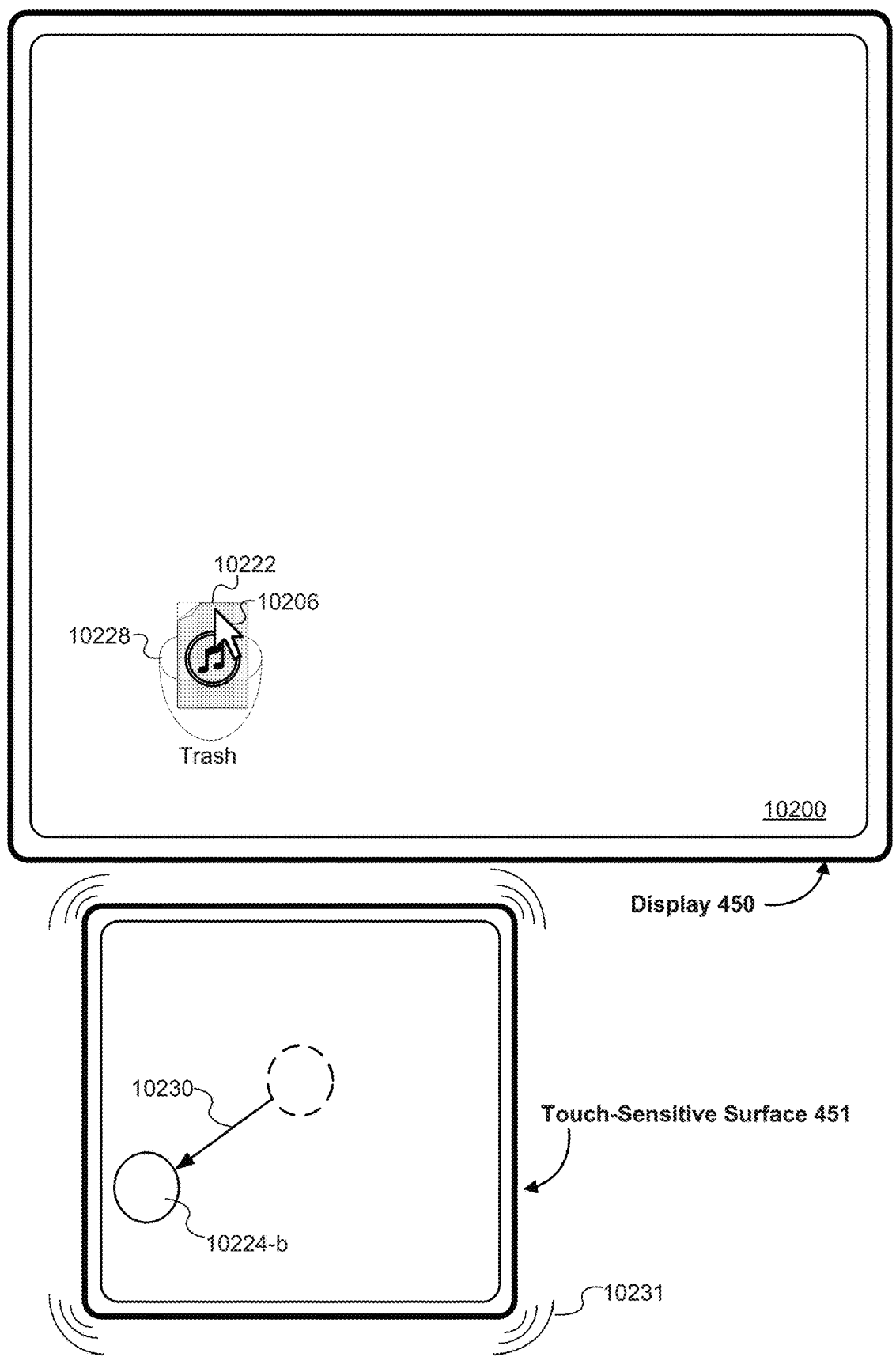

FIGS. 5D-5E illustrate an example of performing an operation. In this example, performing an operation includes marking data corresponding to a user interface object for deletion. In this example, the device detects contact 10224 and movement 10230 of contact 10224 from position 10224-a in FIG. 5D to position 10224-b in FIG. 5E on touch-sensitive surface 451. In response to detecting movement 10230, the device moves user interface object 10222 over folder 10228, as shown in FIG. 5E and the device marks data corresponding to user interface object 10222 for deletion and generates tactile output 10231 on touch-sensitive surface 451. Optionally, marking the user interface object for deletion is performed in response to detecting an input such as liftoff of the contact.

Figure 5F:
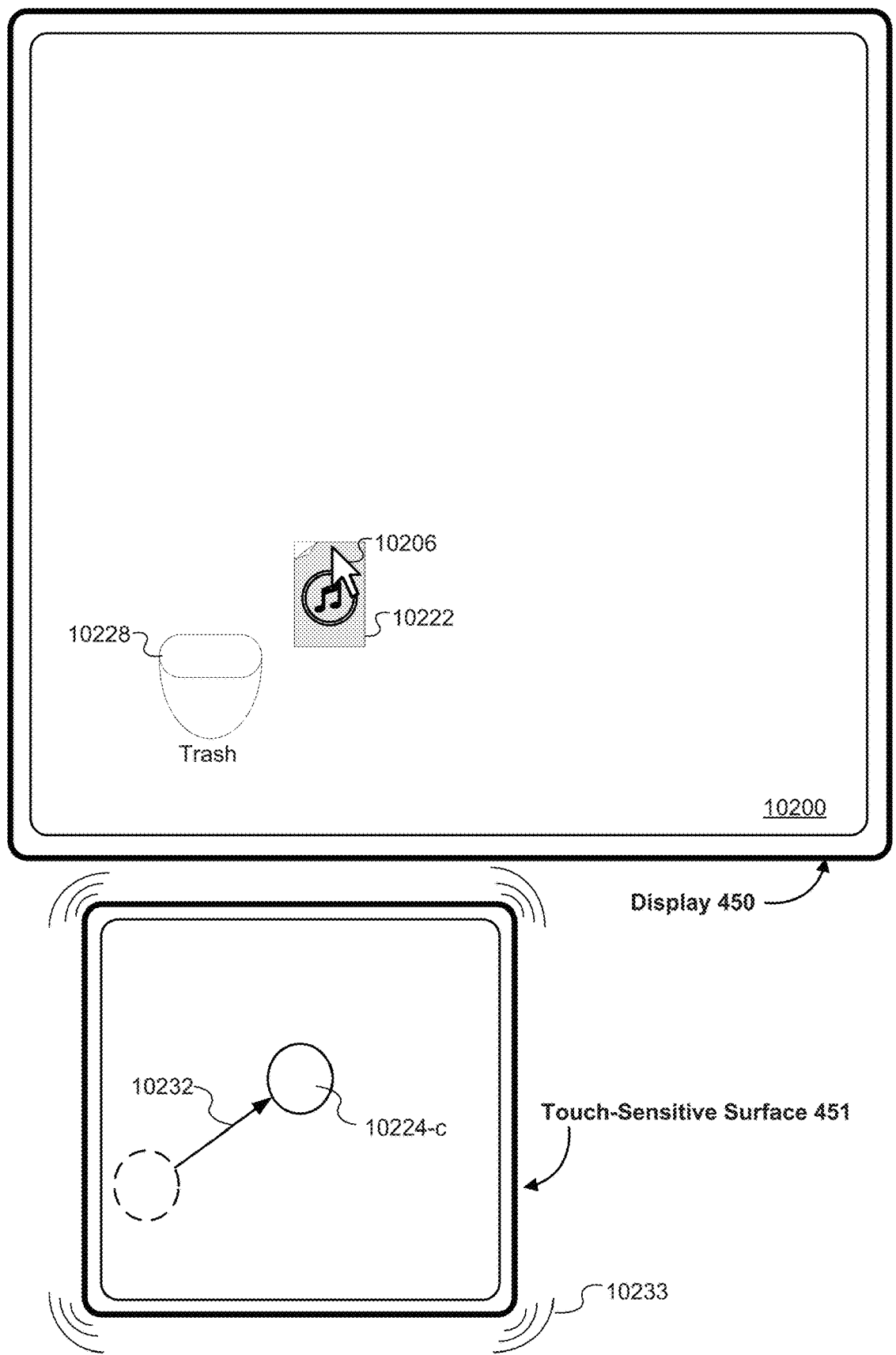

FIGS. 5E-5F illustrate an example of reversing the operation shown in FIGS. 5D-5E, by unmarking data corresponding to a user interface object for deletion. In this example, the device detects contact 10224 and movement 10232 of contact 10224 from position 10224-b in FIG. 5E to position 10224-c in FIG. 5F on touch-sensitive surface 451. In response to detecting movement 10232, the device moves user interface object 102 away from folder icon 10228 and unmarks data corresponding to user interface object 10202 for deletion (e.g., reversing the data marking operation described above with reference to FIGS. 5D-5E). The device also generates tactile output 10233 on touch-sensitive surface 451 in response to movement 10232 of contact 10224 that corresponds to unmarking data user interface object 10222 for deletion. In circumstances where marking the user interface object for deletion is performed in response to detecting an input such as liftoff of the contact, contact 10224 in FIG. 5F is optionally a different contact from contact 10224 in FIG. 5E.

Figure 5G:
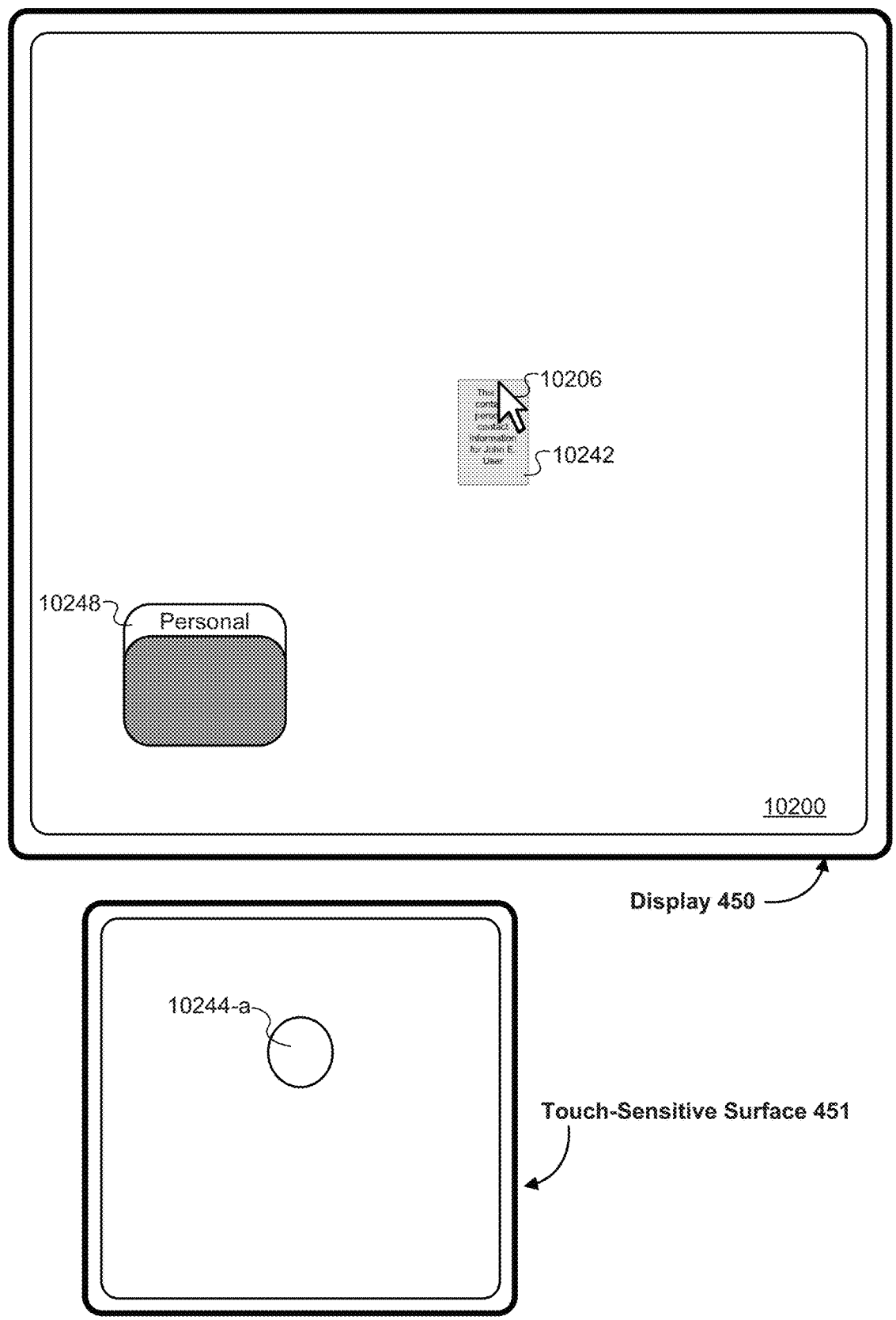

FIG. 5G illustrates another example of a user interface that includes a user interface object. In this example, user interface 10200 in FIGS. 5G-5I includes user interface object 10242, representing a file in this example, and folder 10248 representing a directory in a file system. FIG. 5G further illustrates contact 10244 at position 10244-*a* on touch-sensitive surface 451 and a displayed representation of a focus selector (e.g., cursor 10206) corresponding to contact 10244.

Figure 5H:
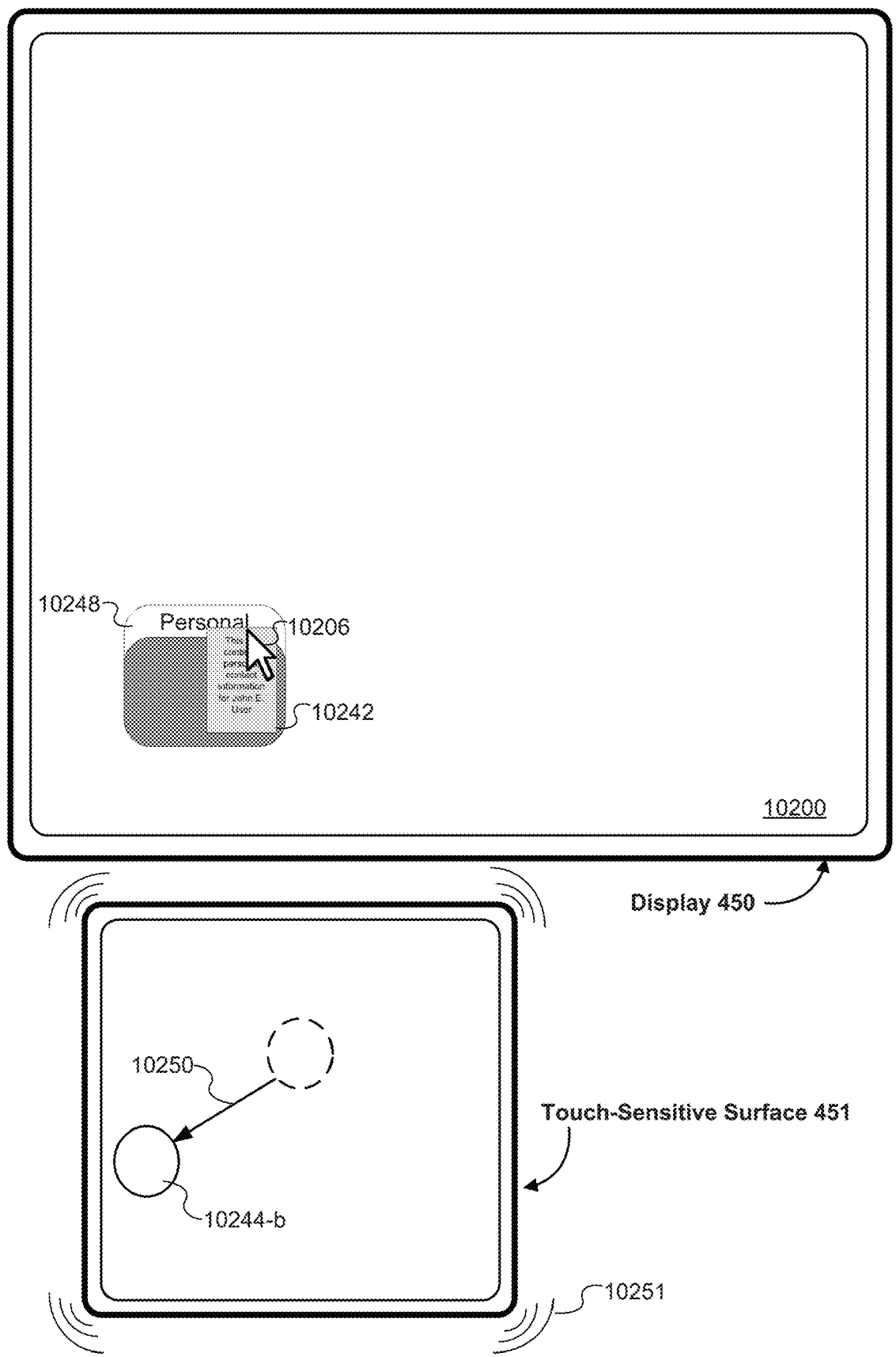

FIGS. 5G-5H illustrate another example of performing an operation. In this example the operation includes placing a file in a directory. In this example, the device detects contact 10244 and movement 10250 of contact 10244 from position 10244-*a* in FIG. 5G to position 10244-*b* in FIG. 5H on touch-sensitive surface 451. In response to detecting movement 10250, the device moves user interface object 10242 over folder 10248 and the device places the file, represented by user interface object 10242, in the directory, represented by folder 10248 and generates tactile output 10251 on touch-sensitive surface 451. Optionally, placing the file represented by the user interface object in the folder is performed in response to detecting an input such as liftoff of the contact.

Figure 5I:
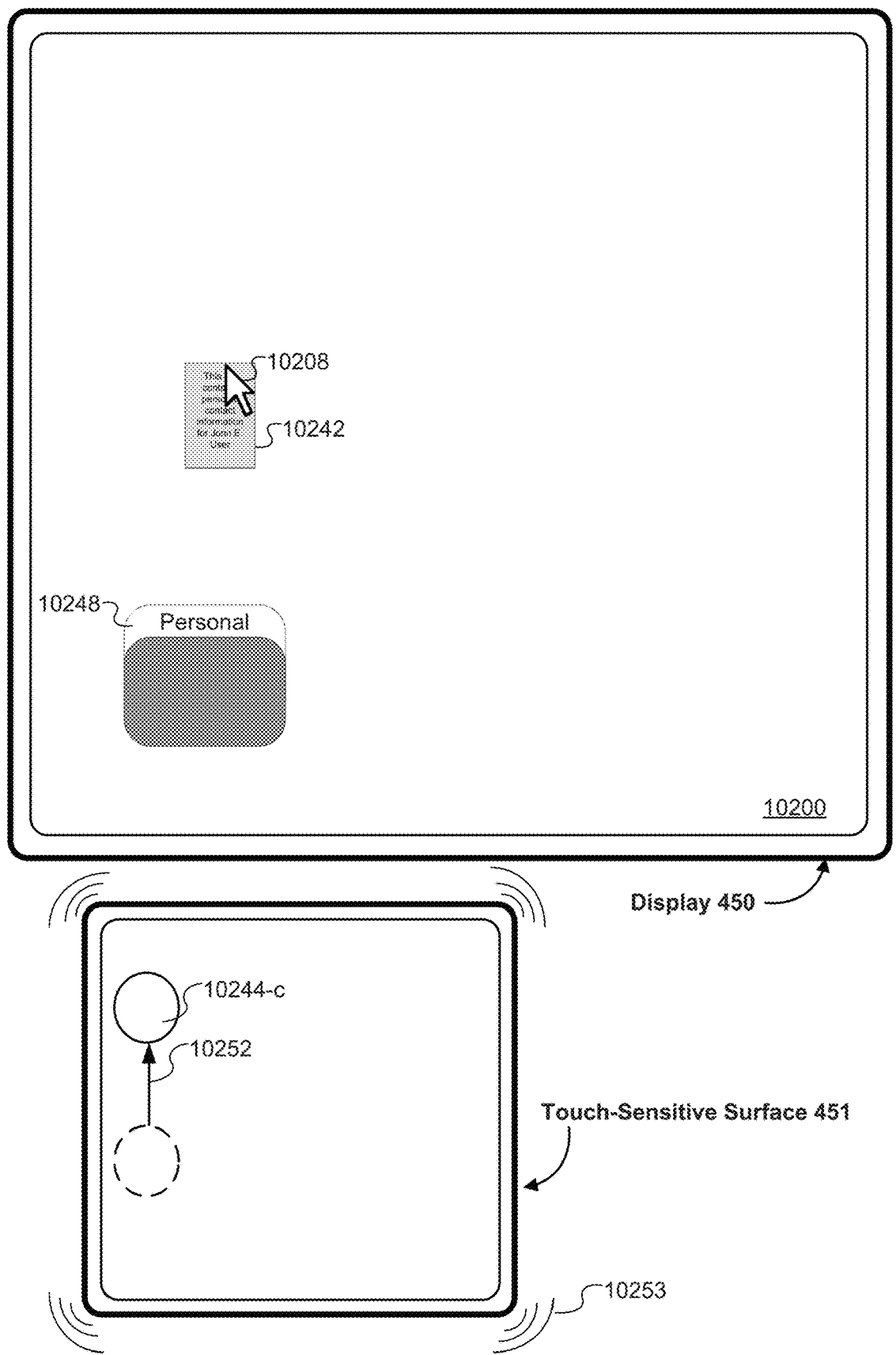

FIGS. 5H-5I illustrate an example of reversing the operation shown in FIGS. 5G-5H by removing a file from a directory. In this example, the device detects contact 10244 and movement 10252 of contact 10244 from position 10244-*b* in FIG. 5H to position 10244-*c* in FIG. 5I on touch-sensitive surface 451. In response to detecting movement 10252, the device moves user interface object 10242 away from folder icon 10248 and removes the file represented by user interface object 10242 from the directory represented by folder 10248 (e.g., reversing the operation described above with reference to FIGS. 5G-5H). The device also generates tactile output 10253 on touch-sensitive surface 451 in response movement 10252 of contact 10244 that corresponds to removing the file from the directory. In circumstances where placing the file represented by the user interface object in the folder is performed in response to detecting an input such as liftoff of the contact, contact 10244 in FIG. 5I is optionally a different contact from contact 10244 in FIG. 5H.

Figure 5J:
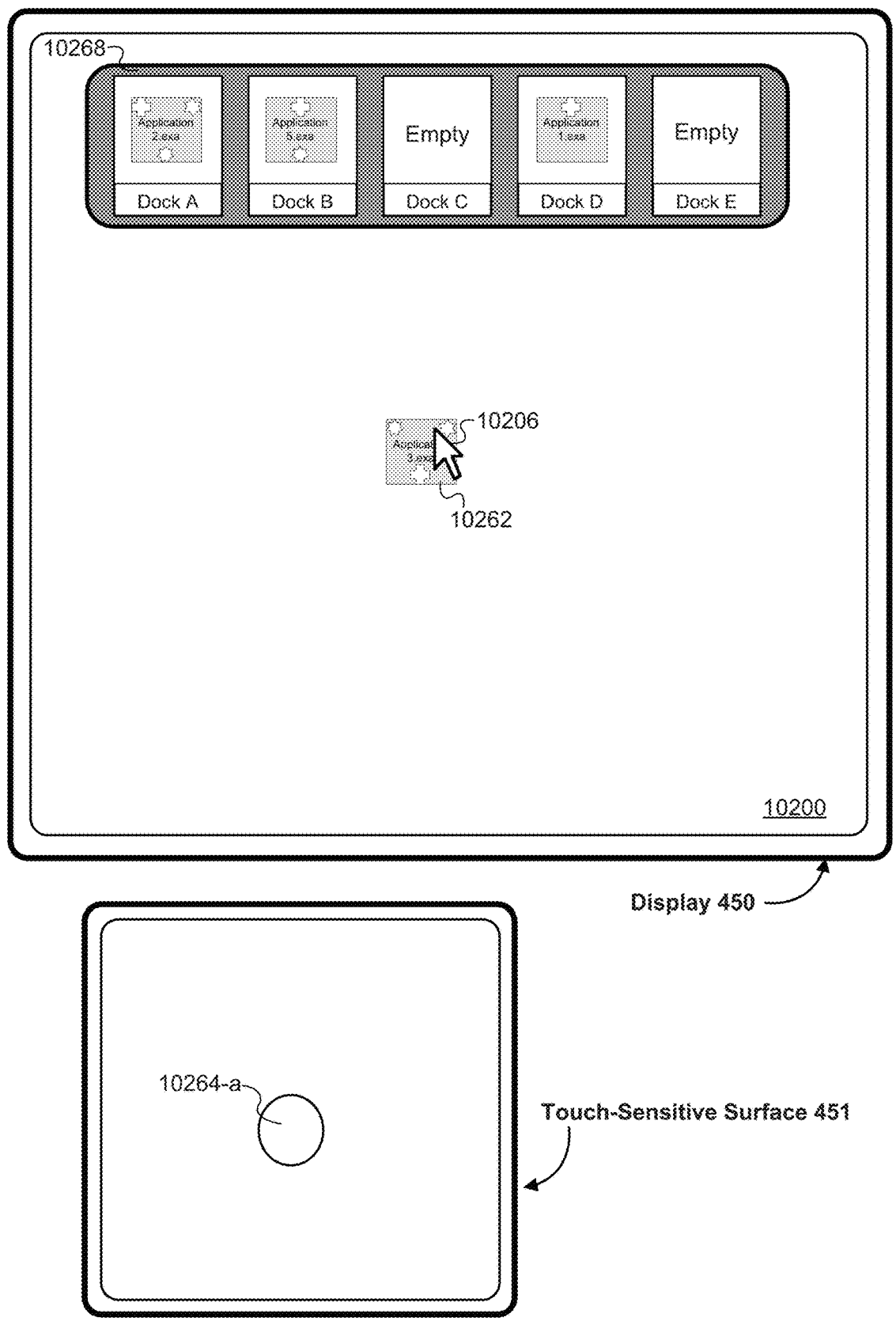

FIG. 5J illustrates another example of a user interface that includes a user interface object. In this example, user interface 10200 in FIGS. 5J-5L includes user interface object 10262, corresponding to an application (or an application launch icon) and application launch region 10268. FIG. 5J further illustrates contact 10264 at position 10264-*a* on touch-sensitive surface 451 and a displayed representation of a focus selector (e.g., cursor 10206) corresponding to contact 10264.

Figure 5K:
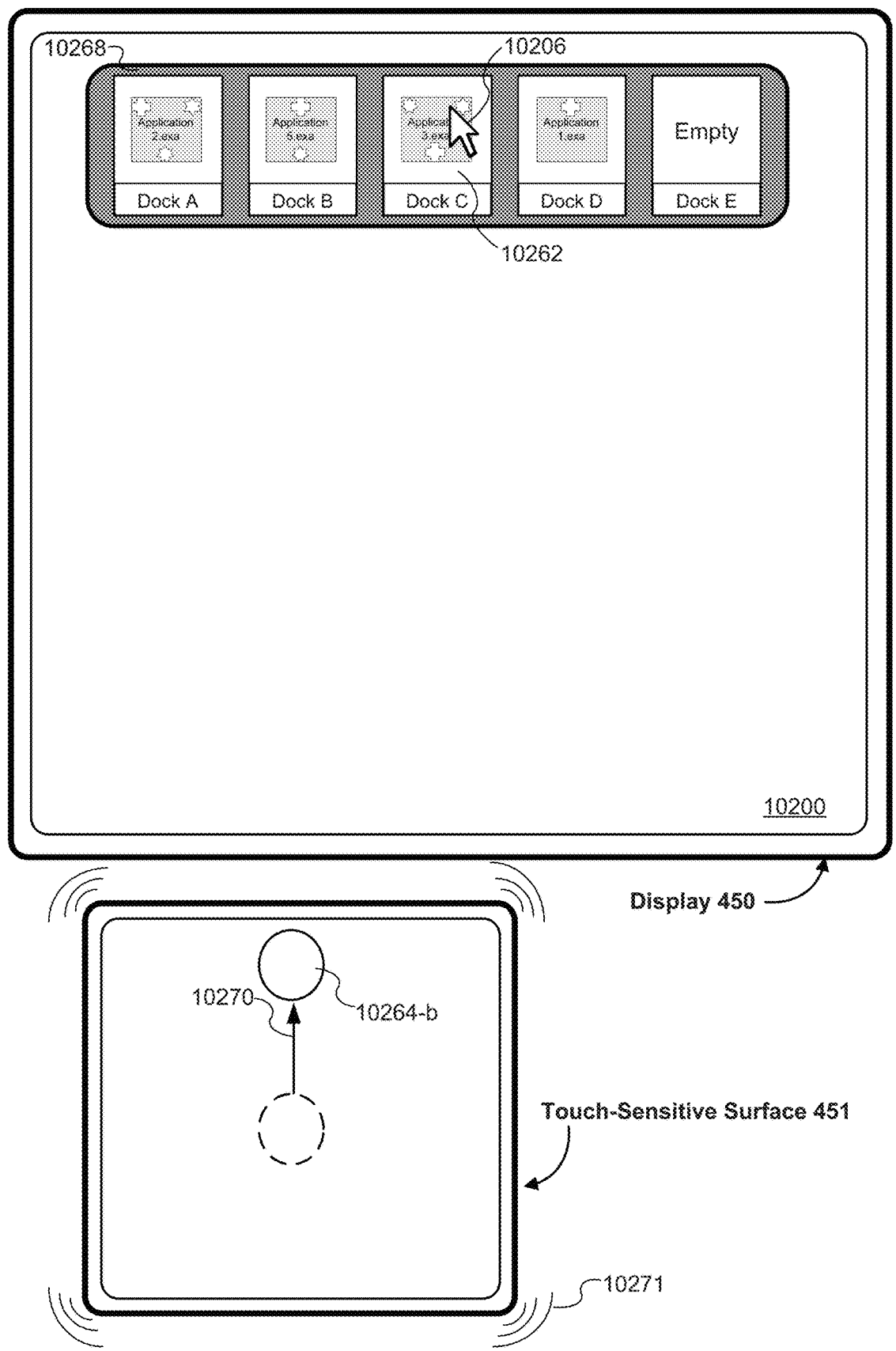

FIGS. 5J-5K illustrate an example of performing an operation. In this example the operation includes placing a user interface object in an application launch region. In this example, the device detects contact 10264 and movement 10270 of contact 10264 from position 10264-*a* in FIG. 5J to position 10264-*b* in FIG. 5K on touch-sensitive surface 451. In response to detecting movement 10270, the device moves user interface object 10262 over application launch region 10268 and places user interface object 10262 in application launch region 10268 and generates tactile output 10271 on touch-sensitive surface 451. Optionally, placing the user interface object in the application launch region is performed in response to detecting an input such as liftoff of the contact.

Figure 5L:
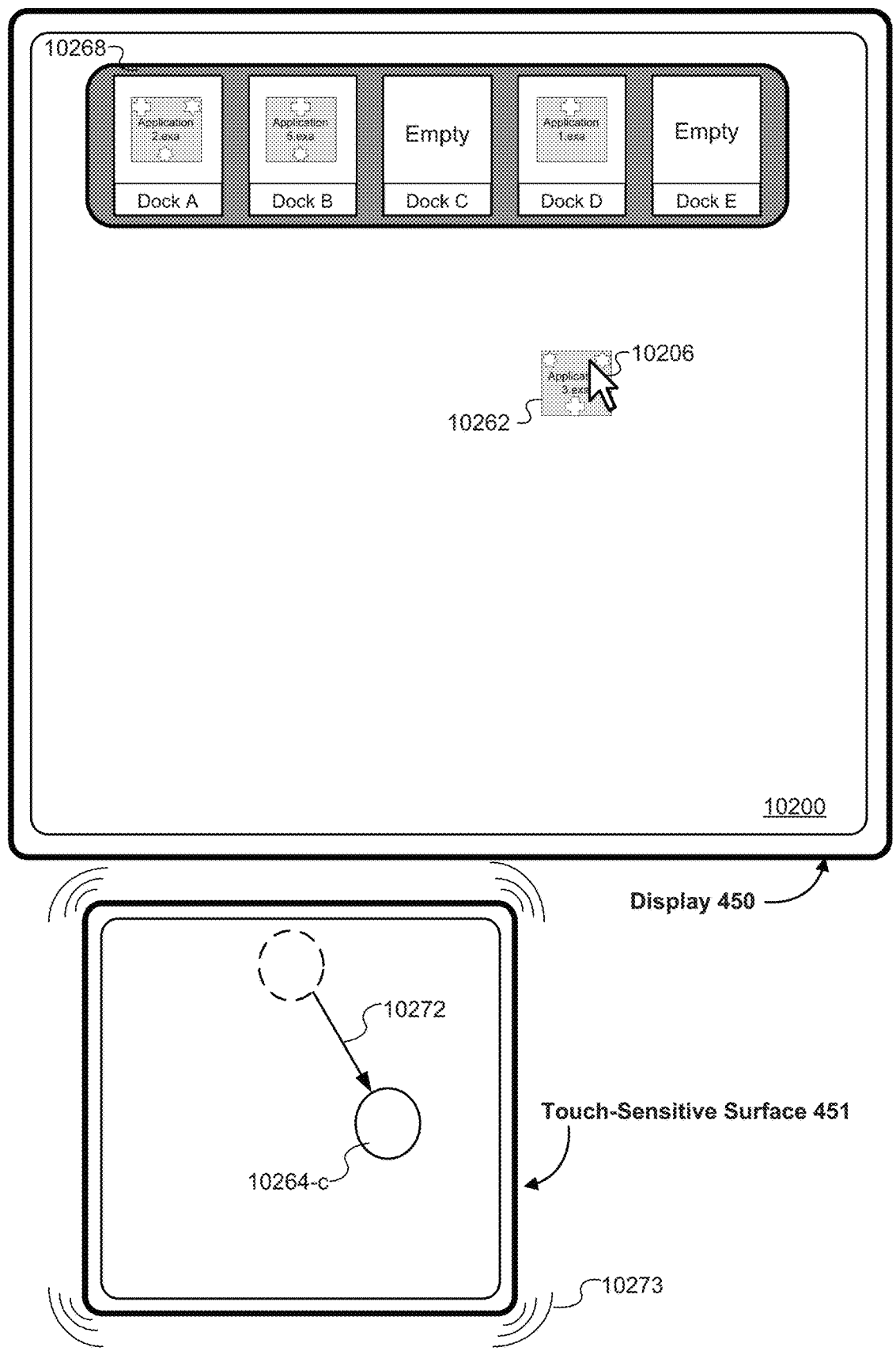

FIGS. 5K-5L illustrate an example of reversing the operation shown in FIGS. 5J-5K by removing a user interface object from an application launch region. In this example, the device detects contact 10264 and movement 10272 of contact 10264 from position 10264-*b* in FIG. 5K to position 10264-*c* in FIG. 5L on touch-sensitive surface 451. In response to detecting movement 10272, the device moves user interface object 10262 away from application launch region 10268 and removes user interface object 10262 from application launch region 10268 (e.g., reversing the operation described above with reference to FIGS. 5J-5K). The device also generates tactile output 10273 on touch-sensitive surface 451 in response to movement 10272 of contact 10264 that corresponds to removing user interface object 10262 from application launch region 10268. In circumstances where placing the user interface object in the application launch region is performed in response to detecting an input such as liftoff of the contact, contact 10264 in FIG. 5L is optionally a different contact from contact 10264 in FIG. 5K.

Figure 5M:
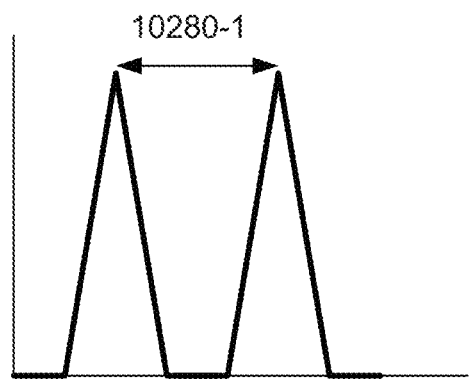
Figure 5N:
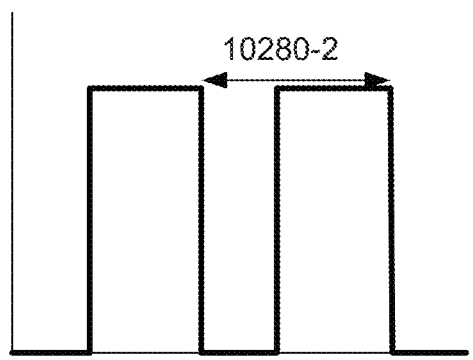
Figure 5O:
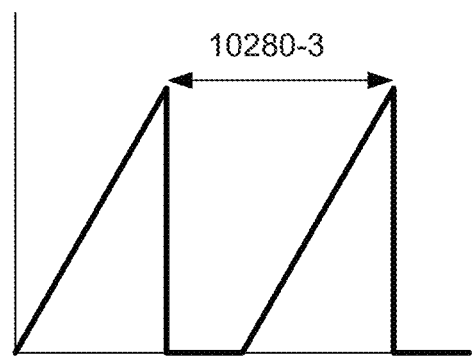
Figure 6A:
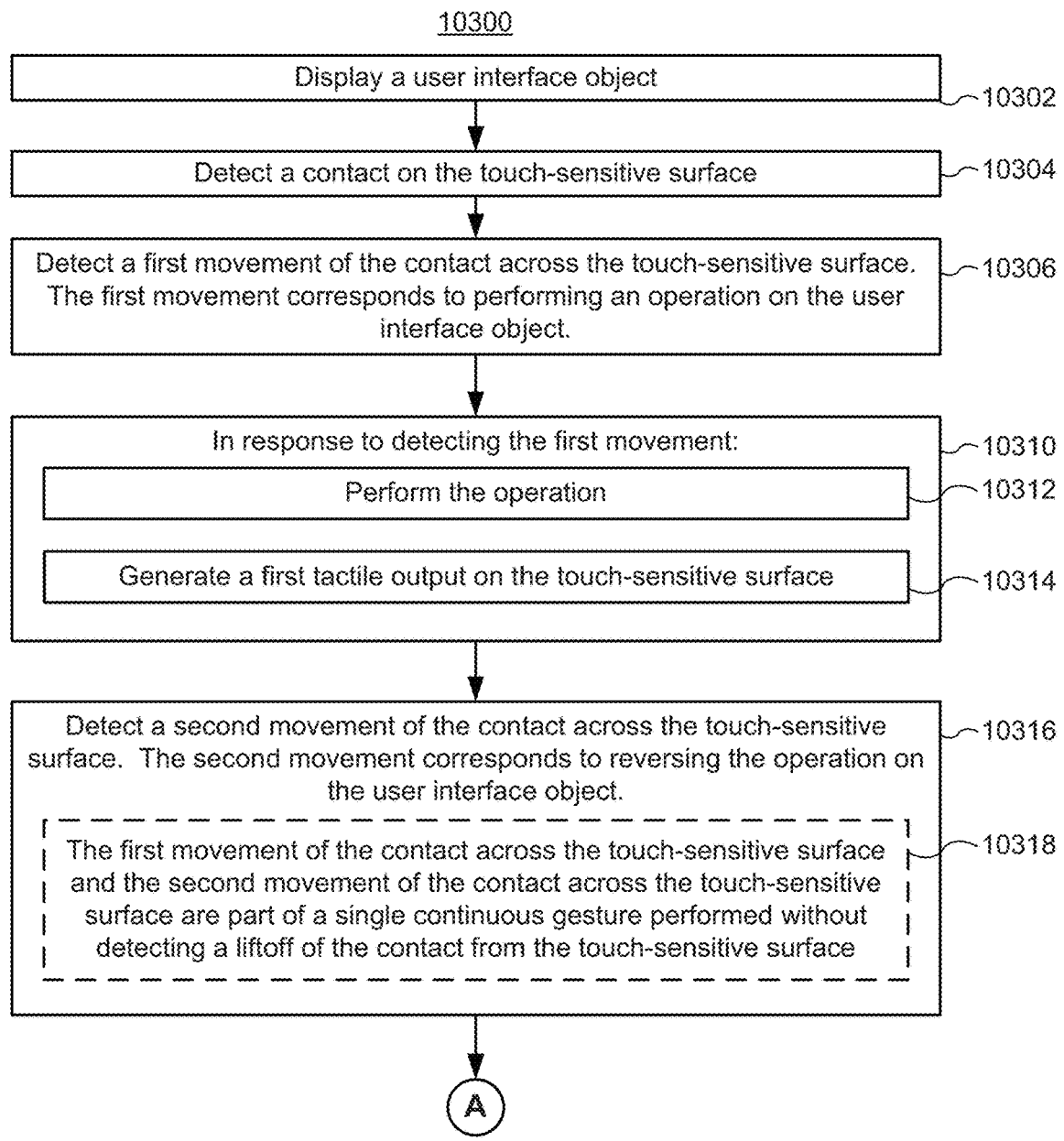
FIGS. 6A-6C are flow diagrams illustrating a method of providing tactile feedback for operations performed in a user interface in accordance with some embodiments.
Figure 6B:
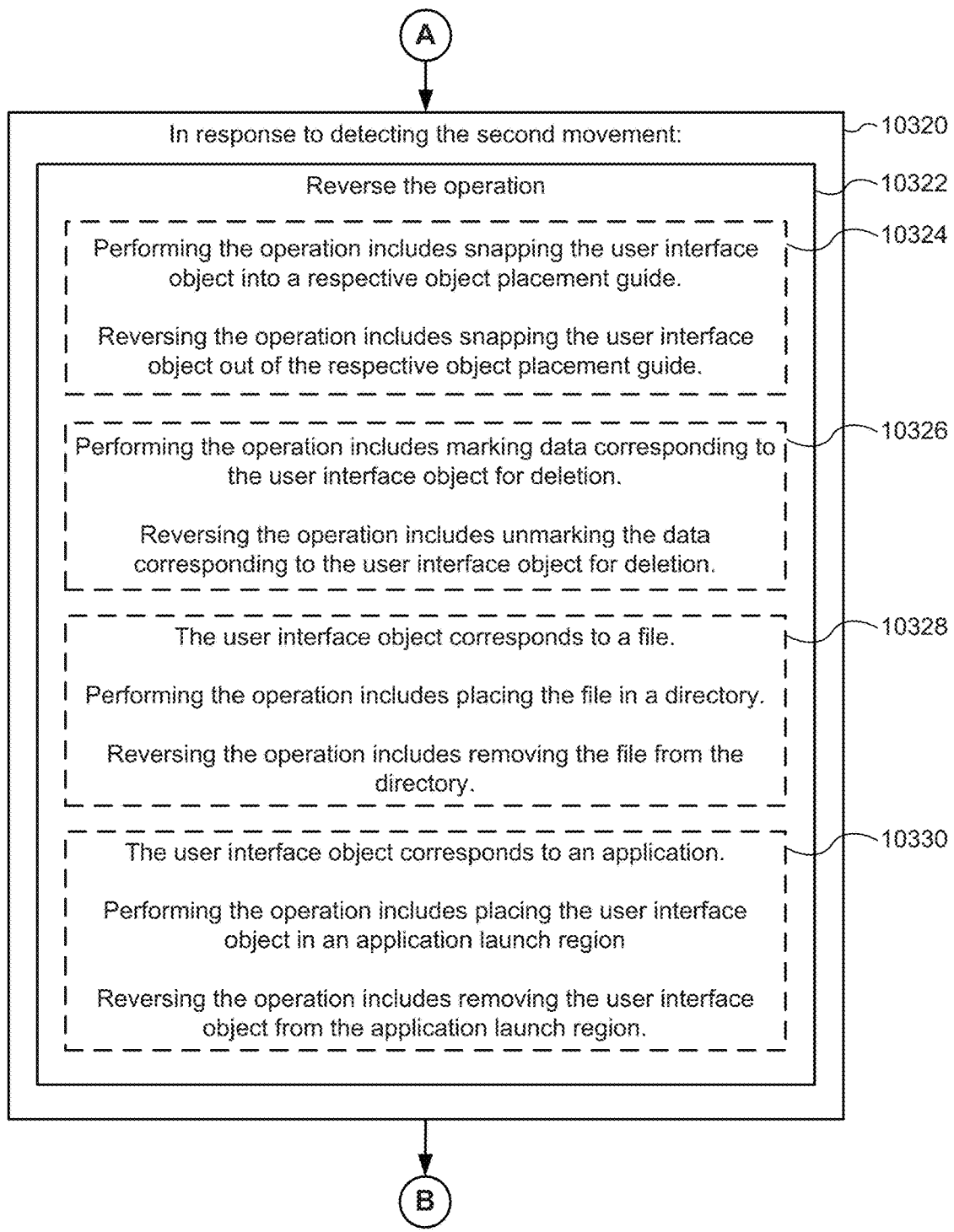
Figure 6C:
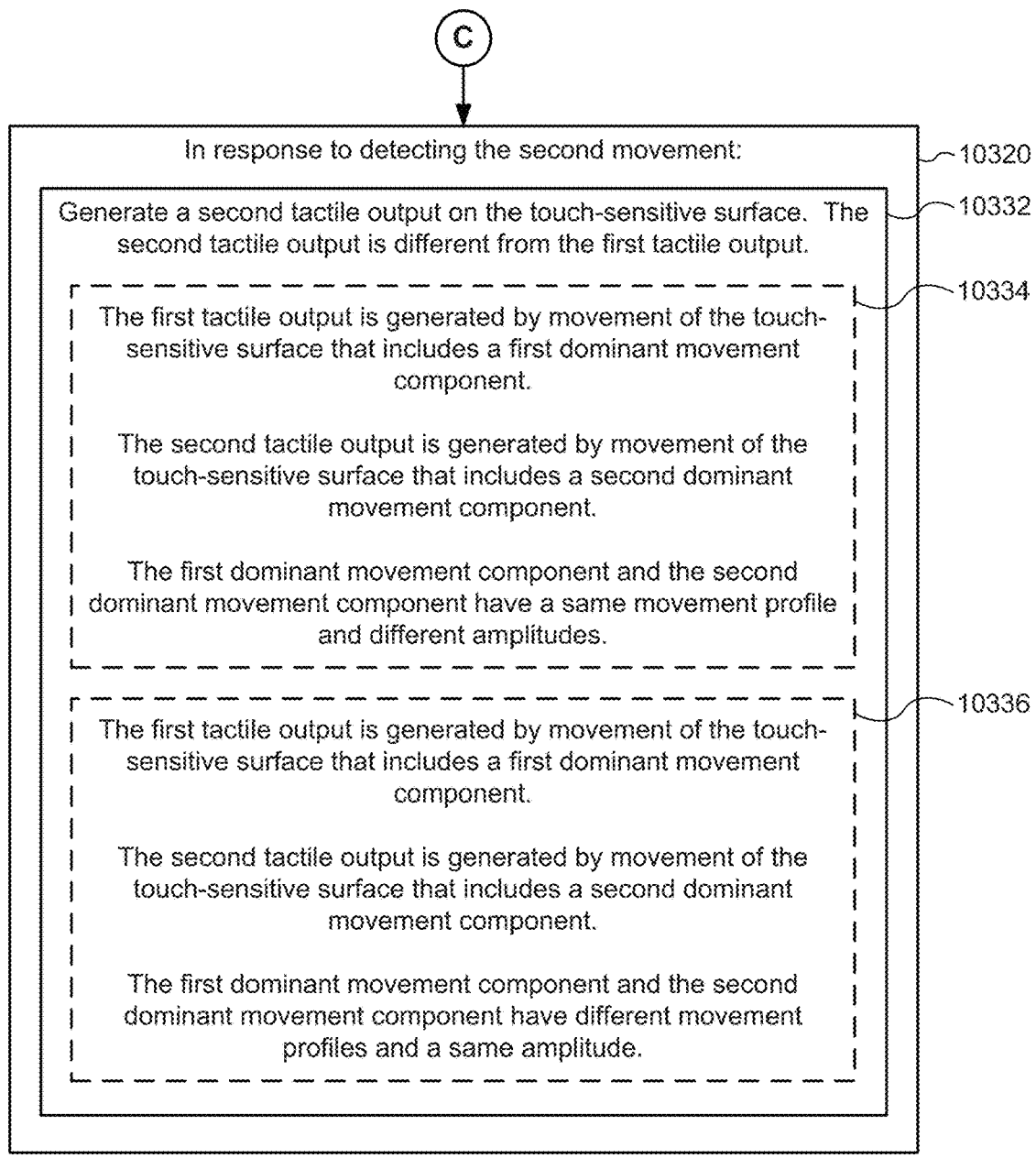

FIGS. 5M-5O illustrate example waveforms of movement profiles for generating the tactile output. FIG. 5M illustrates a triangle waveform with period 10280-1. FIG. 5N illustrates a square waveform with period 10280-2 and FIG. 5O illustrates a sawtooth waveform with period 10280-3. One of these movement profiles illustrated in FIGS. 5M-5O is, optionally, be utilized when generating a tactile output corresponding performing an operation (e.g., tactile outputs 10211, 10231, 10251 or 10271) or reversing a performed operation (e.g., tactile outputs 10213, 10233, 10253 or 10273), as discussed above. In some embodiments, another waveform is used to generate tactile outputs corresponding to the different operations described with reference to FIGS. 5A-5L, above. In some embodiments the tactile outputs corresponding to performing an operation (e.g., tactile outputs 10211, 10231, 10251 or 10271) are generated using the same waveform. In some embodiments the tactile outputs corresponding to reversing an operation (e.g., tactile outputs 10213, 10233, 10253 or 10273) are generated using the same waveform. In some embodiments the tactile outputs corresponding to performing an operation (e.g., tactile outputs 10211, 10231, 10251 or 10271) are generated using a first waveform that is different from a second waveform used to generate the tactile outputs corresponding to reversing an operation (e.g., tactile outputs 10213, 10233, 10253 or 10273).

FIGS. 6A-6C are flow diagrams illustrating a method 10300 of providing tactile feedback for operations performed in a user interface in accordance with some embodiments. Method 10300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 10300 are, optionally, combined and/or the order of some operations is, optionally, changed.

As described below, the method 10300 provides an intuitive way to provide tactile feedback for operations performed in a user interface. The method reduces the cognitive burden on a user when performing operations in a user interface, thereby creating a more efficient human-machine interface. For battery-operated electronic devices, enabling a user to perform operations in a user interface faster and more efficiently conserves power and increases the time between battery charges.

The device displays (10302) a user interface object. FIG. 5A, for example, shows user interface object 10202, displayed in graphical user interface 10200. The device detects (10304) a contact (e.g., a finger contact) on the touch-sensitive surface. For example, FIG. 5A shows contact 10204 at position 10204-*a* on touch-sensitive surface 451.

The device detects (10306) a first movement of the contact across the touch-sensitive surface, where the first movement corresponds to performing an operation on the user interface object. For example, FIG. 5B shows contact 10204 and subsequent movement 10210 on touch-sensitive surface 451 corresponding to snapping user interface object 10202 into object placement guide 10208. In response to detecting (10310) the first movement, the device performs (10312) the operation and generates (10314) a first tactile output on the touch-sensitive surface. FIG. 5B, for example, shows user interface object 10202 snapping into object placement guide 10208 and tactile output 10211 generated on touch-sensitive surface 451.

The device detects (10316) a second movement of the contact across the touch-sensitive surface, where the second movement corresponds to reversing the operation on the user interface object. For example, FIG. 5C shows contact 10204 and subsequent movement 10212 on touch-sensitive surface corresponding to snapping user interface object 10202 out of object placement guide 10208.

In some embodiments or circumstances, the first movement of the contact across the touch-sensitive surface and the second movement of the contact across the touch-sensitive surface are (10318) part of a single continuous gesture performed without detecting a liftoff of the contact from the touch-sensitive surface. In some embodiments, even if there is a pause in movement of the contact, the first movement and the second movement are considered to be part of the same continuous gesture as long as the contact continues to be detected on the touch-sensitive surface. In some embodiments, if the same first and second movement are detected as part of two different gestures (e.g., there is a liftoff of the contact between when the first movement is detected and when the second movement is detected), then the same tactile output is generated in response to both performing the operation and reversing the operation). In some embodiments, if the same first and second movement are detected as part of two different gestures (e.g., there is a liftoff of the contact between when the first movement is detected and when the second movement is detected) then different tactile outputs are still generated in response to both performing the operation and reversing the operation. For example, FIGS. 5A-5C show contact 10204 moving from position 10204-*a* to position 10204-*b* (shown in FIGS. 5A-5B) which corresponds to snapping user interface object 10202 to object placement guide 10208, then moving from position 10204-*b* to position 10204-*c* (shown in FIGS. 5B-5C) which corresponds to unsnapping user interface object 10202 from object placement guide 10208. In this example, tactile output 10211 is generated in response to contact 10204 moving from position 10204-*a* to position 10204-*b* and tactile output 10213 is generated in response to contact 10204 moving from position 10204-*b* to position 10204-*c*. In some embodiments, tactile output 10213 (sometimes called the second tactile output) is generated in response to detecting a movement corresponding to reversing a prior operation on a respective user interface object. In some embodiments, tactile output 10211 (sometimes called the first tactile output) is generated in response to detecting a movement corresponding to perform an operation that is not a reversal of a prior operation (e.g., an immediately prior operation) on a respective user interface object.

In response to detecting (10320) the second movement, the device reverses (10322) the operation. It should be understood that reversing an operation does not necessarily entail performing an exact mirror image of the procedure undertaken to perform the operation. For example, to snap an object to a guide the object is moved to a position within a snapping distance from the guide, while to move an object away from the guide, movement of a contact is detected that corresponds to movement of the object more than an unsnapping distance from the guide, without respect to the particular path taken by the contact or the object. FIG. 5C, for example, shows user interface object 10202 unsnapping from object placement guide 10208 and tactile output 10213, different from tactile output 10211 shown in FIG. 5B, is generated on touch-sensitive surface 451.

In some embodiments, performing the operation includes snapping (10324) the user interface object (e.g., a picture, text box, shape or some other moveable user interface object) into a respective object placement guide and reversing the operation includes snapping the user interface object out of the respective object placement guide. In some embodiments, snapping a user interface object into a respective object placement guide includes detecting user-controlled movement of the user interface object within a predefined distance from the respective object placement guide and, in response to detecting the user-controlled movement of the user interface object within the predefined distance of the respective object placement guide, automatically moving (e.g., via device-controlled movement) the respective user interface object adjacent to the respective object placement guide. In some embodiments, once the user interface object has been snapped into a respective object placement guide, subsequent movement of the contact across the touch-sensitive surface does not cause movement of the user interface object until a predefined precondition is met. In particular, in some embodiments, snapping a user interface object out of a respective object placement guide includes detecting movement of a contact that would correspond to user-controlled movement of the user interface object more than a predefined distance away from the respective object placement guide if the object were not snapped to the respective object placement guide and in response to detecting the movement of the contact, automatically moving (e.g., via device-controlled movement) the respective user interface object to a location on the display that is away from the respective object placement guide in accordance with the movement of the contact on the touch-sensitive surface. For example, FIGS. 5A-5C show user interface object 10202 snapping to object placement guide 10208 (FIGS. 5A-5B), then snapping user interface object 10202 out of object placement guide 10208 (FIGS. 5B-5C).

In some embodiments, performing the operation includes marking (10326) data corresponding to the user interface object for deletion (e.g., placing an icon corresponding to a file in a trash or recycle folder) and reversing the operation includes unmarking the data corresponding to the user interface object for deletion (e.g., removing/restoring an icon corresponding to a file from a trash or recycle folder). FIGS. 5D-5F, for example, show user interface object 10222 moving over trash folder 10228 and causing the device to, in response, mark data corresponding to user interface object 10222 for deletion (FIGS. 5D-5E) then moving user interface object 10222 away from trash folder 10228 and causing the device to, in response, unmark data corresponding to user interface object 10222 for deletion (FIGS. 5E-5F).a In some embodiments, the user interface object corresponds to a file, performing the operation includes placing (10328) the file in a directory and reversing the operation includes removing the file from the directory. For example, in some embodiments, performing the operation includes moving a user interface object that is a graphical representation of a file to a location corresponding to a folder icon that represents the directory and reversing the operation includes removing the icon from a graphical representation of the folder/directory. FIGS. 5G-5I, for example, show user interface object 10242, corresponding to a file, moving over folder 10248 and causing the device to, in response, place the file in a directory represented by folder 10248 (FIGS. 5G-5H) then moving user interface object 10242 away from folder 10248 causing the device to, in response, remove the file from the directory (FIGS. 5H-5I).

In some embodiments, the user interface object corresponds to an application, performing the operation includes placing (10330) the user interface object in an application launch region and reversing the operation includes removing the user interface object from the application launch region. Examples of an application launch region include a dock or a quick launch bar. FIGS. 5J-5L, for example, show user interface object 10262, corresponding to an application, moving over application launch region 10268 and causing the device to, in response, place user interface object 10262 in application launch region 10268 (FIGS. 5J-5K) then moving user interface object 10262 away from application launch region 10268 and causing the device to, in response, remove user interface object 10262 from application launch region 10268 (FIGS. 5K-5L).

In response to detecting (10320) the second movement, in addition to reversing the operation, the device generates (10332) a second tactile output on the touch-sensitive surface, where the second tactile output is different from the first tactile output. As a result, the device undoes the previously performed operation. In some embodiments the first tactile output is different from the second tactile output based on differences in amplitudes of the tactile outputs. In some embodiments, the first type of tactile output is generated by movement of the touch-sensitive surface that includes a first dominant movement component. For example, the generated movement corresponds to an initial impulse of the first tactile output, ignoring any unintended resonance. In some embodiments, the second type of tactile output is generated by movement of the touch-sensitive surface that includes a second dominant movement component. For example, the generated movement corresponds to an initial impulse of the second tactile output, ignoring any unintended resonance. In some embodiments, the first dominant movement component and the second dominant movement component have (10334) a same movement profile and different amplitudes. For example, the first dominant movement component and the second dominant movement component have the same movement profile when the first dominant movement component and the second dominant movement component have a same waveform shape, such as square, sine, sawtooth or triangle, and approximately the same period.

In some embodiments the first tactile output is different from the second tactile output based on differences in movement profiles of the tactile outputs. In some embodiments, the first type of tactile output is generated by movement of the touch-sensitive surface that includes a first dominant movement component. For example, the generated movement corresponds to an initial impulse of the first tactile output, ignoring any unintended resonance. In some embodiments, the second type of tactile output is generated by movement of the touch-sensitive surface that includes a second dominant movement component. For example, the generated movement corresponds to an initial impulse of the second tactile output, ignoring any unintended resonance. In some embodiments, the first dominant movement component and the second dominant movement component have (10336) different movement profiles and a same amplitude. For example, the first dominant movement component and the second dominant movement component have different movement profiles when the first dominant movement component and the second dominant movement component have a different waveform shape, such as square, sine, sawtooth or triangle, and/or approximately the same period.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein (e.g., those listed in the fifth paragraph of the Description of Embodiments) with respect to other methods described herein are also applicable in an analogous manner to method 10300 described above with respect to FIGS. 6A-6C. For example, the contacts, movements, user interface objects, focus selectors, and tactile outputs described above with reference to method 10300 optionally have one or more of the characteristics of contacts, movements, user interface objects, focus selectors, and tactile outputs described herein with reference to other methods described herein (e.g., those listed in the fifth paragraph of the Description of Embodiments). For brevity, these details are not repeated here.

Figure 7:
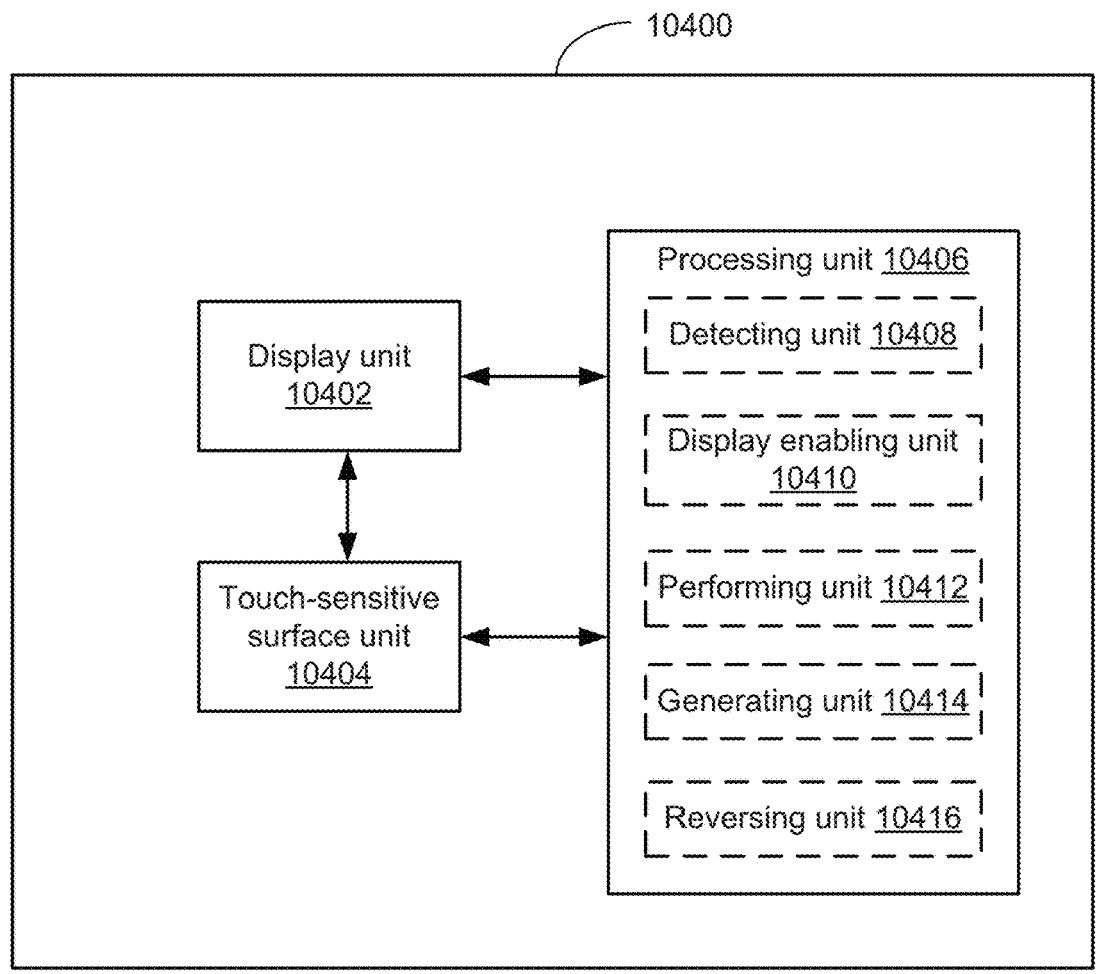
FIG. 7 is a functional block diagram of an electronic device in accordance with some embodiments.

In accordance with some embodiments, FIG. 7 shows a functional block diagram of an electronic device 10400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 10400 includes a display unit 10402 configured to display a user interface object; a touch-sensitive surface unit 10404 configured to detect user contacts; and a processing unit 10406 coupled to display unit 10402 and touch-sensitive surface unit 10404. In some embodiments, the processing unit includes a detecting unit 10408, a display enabling unit 10410, a performing unit 10412, a generating unit 10414, and a reversing unit 10416.

The processing unit 10406 is configured to detect a contact on the touch-sensitive surface unit, detect a first movement of the contact across the touch-sensitive surface unit (e.g., with detecting unit 10408), the first movement corresponding to performing an operation on the user interface object, and in response to detecting the first movement; perform the operation (e.g., with performing unit 10412) and generate a first tactile output on the touch-sensitive surface unit (e.g., with generating unit 10414). The processing unit 10406 is further configured to detect a second movement of the contact across the touch-sensitive surface unit (e.g., with detecting unit 10408), the second movement corresponding to reversing the operation on the user interface object; and in response to detecting the second movement, reverse the operation (e.g., with reversing unit 10416) and generate a second tactile output on the touch-sensitive surface unit (e.g., with generating unit 10414), where the second tactile output is different from the first tactile output.

In some embodiments, the first movement of the contact across the touch-sensitive surface unit and the second movement of the contact across the touch-sensitive surface unit are part of a single continuous gesture performed without detecting a liftoff of the contact from the touch-sensitive surface unit 10404.

In some embodiments, performing the operation (e.g., with the performing unit 10412) includes snapping the user interface object into a respective object placement guide and reversing the operation (e.g., with the reversing unit 10416) includes snapping the user interface object out of the respective object placement guide.

In some embodiments, performing the operation (e.g., with the performing unit 10412) includes marking data corresponding to the user interface object for deletion and reversing the operation (e.g., with reversing unit 10416) includes unmarking the data corresponding to the user interface object for deletion.

In some embodiments, the user interface object corresponds to a file, performing the operation (e.g., with the performing unit 10412) includes placing the file in a directory and reversing the operation (e.g., with the reversing unit 10416) includes removing the file from the directory.

In some embodiments, the user interface object corresponds to an application, performing the operation (e.g., with the performing unit 10412) includes placing the user interface object in an application launch region and reversing the operation (e.g., with the reversing unit 10416) includes removing the user interface object from the application launch region.

In some embodiments, the first tactile output is generated (e.g., with the generating unit 10414) by movement of the touch-sensitive surface unit that includes a first dominant movement component, the second tactile output is generated (e.g., with the generating unit 10414) by movement of the touch-sensitive surface unit that includes a second dominant movement component, and the first dominant movement component and the second dominant movement component have a same movement profile and different amplitudes.

In some embodiments, the first tactile output is generated (e.g., with the generating unit 10414) by movement of the touch-sensitive surface unit that includes a first dominant movement component, the second tactile output is generated (e.g., with the generating unit 10414) by movement of the touch-sensitive surface unit that includes a second dominant movement component, and the first dominant movement component and the second dominant movement component have different movement profiles and a same amplitude.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B or FIG. 7. For example, detection operations 10304 and 10306, performing operation 10312, generating operations 10314 and 10332, and reversing operation 10322 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Indicating Changes in the Z-Order of User Interface Objects

Many electronic devices display user interface objects that have a layer order (e.g., a z-order or front-to-back order of the user interface objects). A user typically interacts with such objects by repositioning them on the display, and overlapping objects are displayed on the display in accordance with their front-to-back order (e.g., an object that is "in front" of another object is displayed where the two objects overlap). In addition to repositioning the objects on the display, a user often wants to change the front-to-back order of the objects on the display. In some methods, changes in the z-order are indicated visually. The embodiments described below improve on these methods by providing for tactile outputs when objects overlap each other and their z-order changes. Thus, the user has tactile as well as visual indication of the change in z-order when the objects overlap, and thus their covering of each other changes with the change in z-order.

FIGS. 8A-8S illustrate exemplary user interfaces for indicating changes in the z-order of user interface objects in accordance with some embodiments. The user interfaces in these figures are used to illustrate the processes described below, including the processes in FIGS. 9A-9D. FIGS. 8A-8S include intensity diagrams that show the current intensity of the contact on the touch-sensitive surface relative to a plurality of intensity thresholds including a light press intensity threshold (e.g., "$IT_L$") and a deep press intensity threshold (e.g., "$IT_D$"). In some embodiments, operations similar to those described below with reference to "$IT_D$" are performed with reference to a different intensity threshold (e.g., "$IT_L$").

FIG. 8A shows user interface objects 10506-1 and 10506-2 displayed on display 450 (e.g., display 340, touch screen 112) of a device (e.g., device 300, 100). Objects 10506 are, optionally, windows of respective applications, shapes or other graphics in a drawing, or objects (e.g., text block, picture, etc.) in a presentation. Objects 10506-1 and 10506-2 are displayed with a z-order. In FIG. 8A, object 10506-1 is in front of (or "above") object 10506-2 in the z-order, and, likewise, object 10506-2 is in back of (or "behind" or "below") object 10506-1 in the z-order. If two objects do not overlap (e.g., objects 10506-1 and 10506-2 in FIG. 8A), their z-order relative to each other may not be visually displayed to a user. In FIG. 8D, object 10506-1 is in front of object 10506-2 in the z-order and that relative z-order is visually displayed to the user, as objects 10506-1 and 10506-2 overlap, and object 10506-1 covers at least a part of object 10506-2.

FIG. 8A also shows cursor 10504 displayed on display 450. Cursor 10504 is an example of a focus selector. A user optionally positions cursor 10504 over an object 10506 to bring that object into focus. In FIG. 8A, cursor 10504 is located over object 10506-1.

Figure 8B:
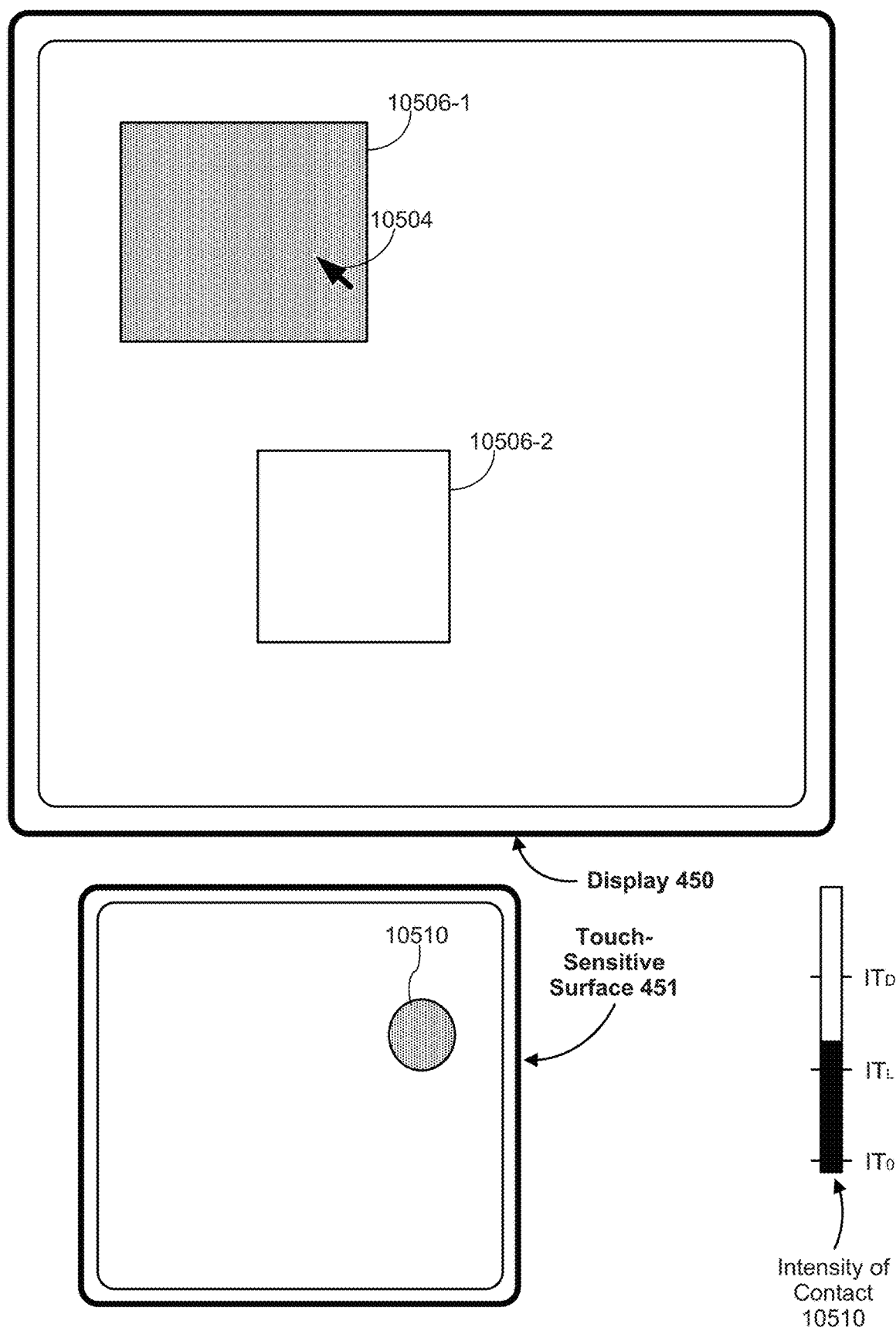
Figure 8C:
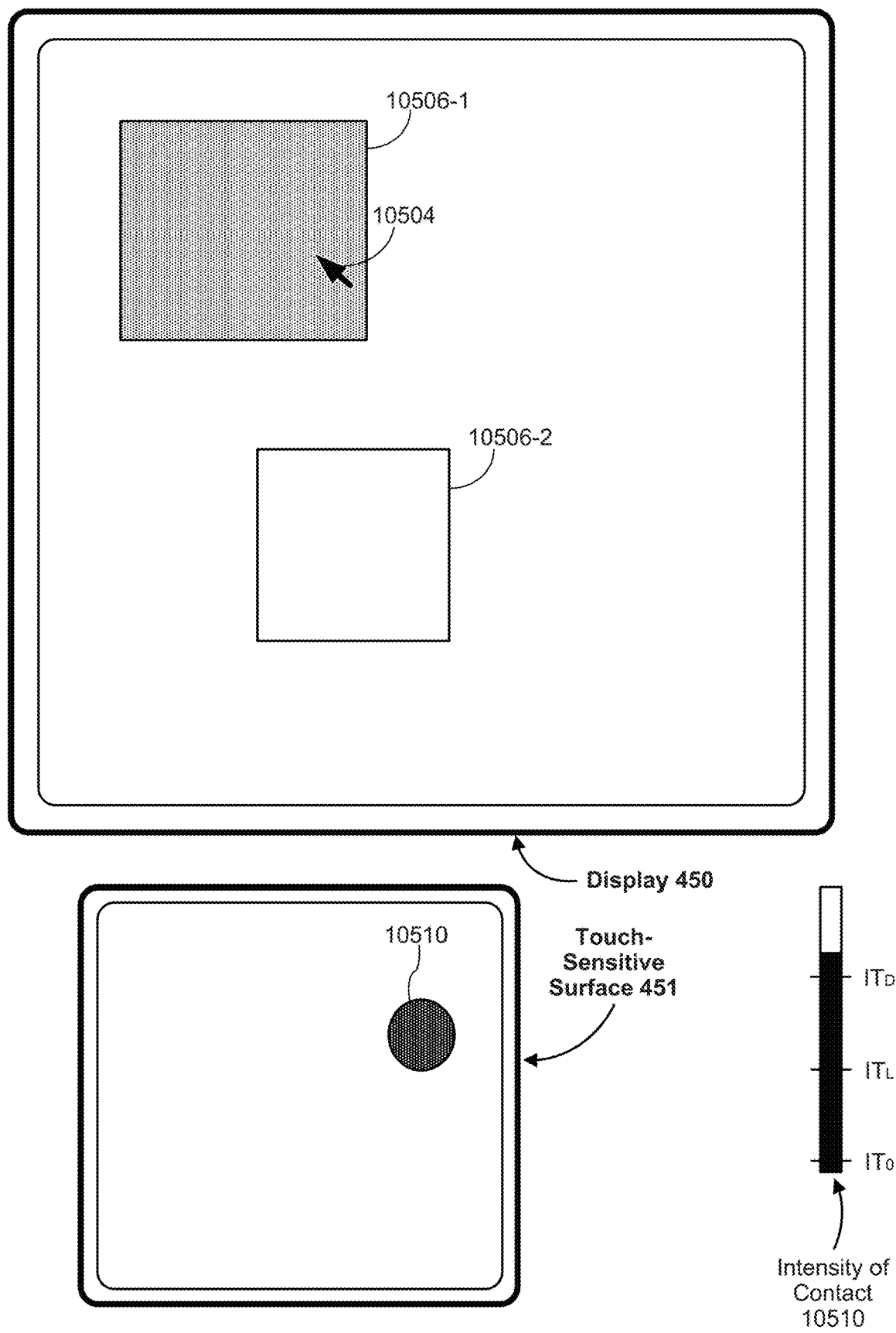
Figure 8D:
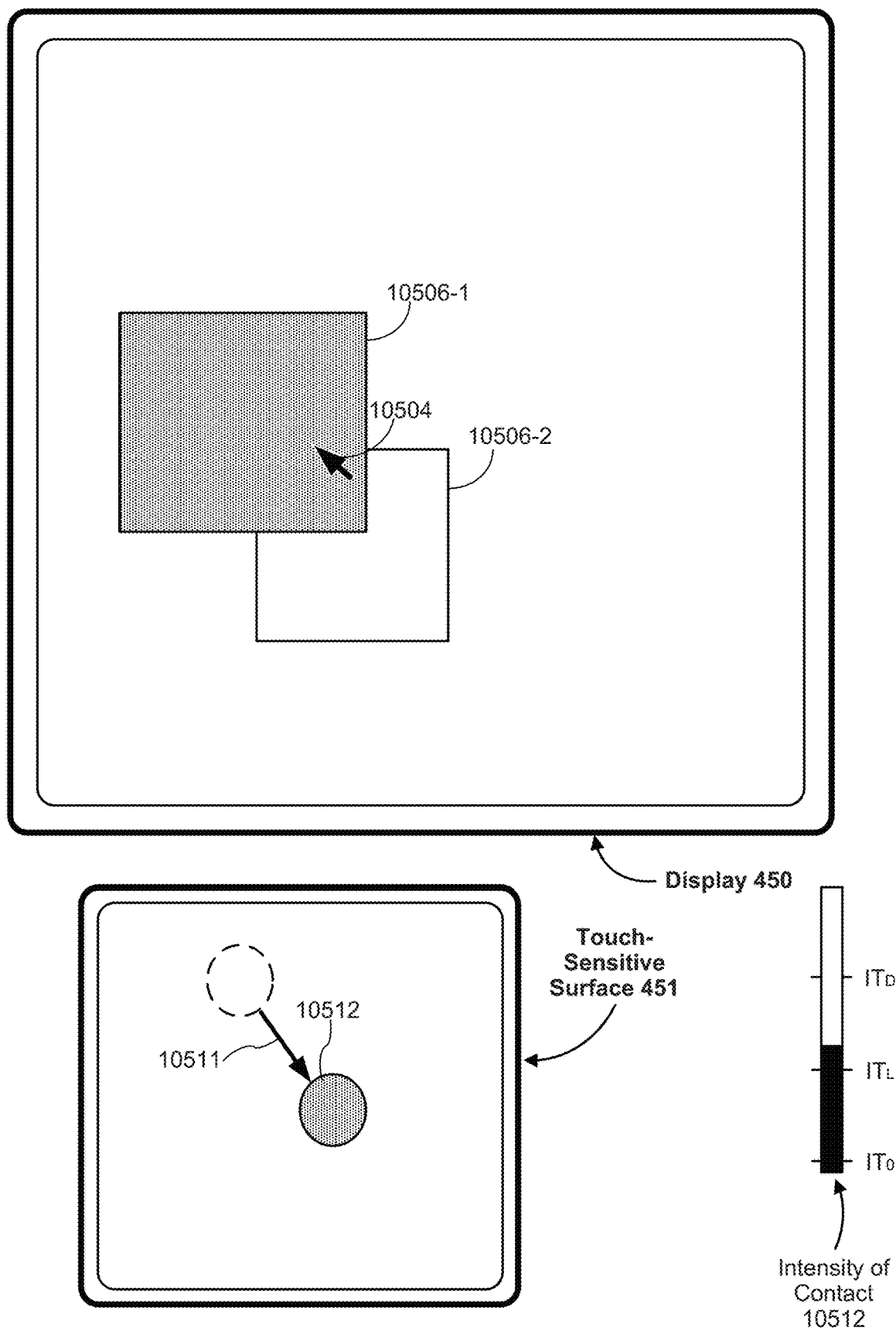

FIG. 8B shows contact 10510 detected on touch-sensitive surface 451. While contact 10510 is detected on touch-sensitive surface 451, a request to move object 10506-1 below object 10506-2 in the z-order is received by the device (e.g., as shown in FIG. 8C). The device optionally receives the request in the form of, for example, a gesture input performed on touch-sensitive surface 451 (e.g., a gesture performed with contact 10510) while cursor 10504 is located over object 10506-1, an increase in the intensity of contact 10510 above an intensity threshold while cursor 10504 is located over object 10506-1, or an input made using a keyboard or other input device (e.g., a keyboard shortcut, a selection of a menu option using the keyboard or other input device). The intensity (and the change in intensity) is, optionally, detected by one or more sensors, included in the device, that are configured to detect intensity of contacts with touch-sensitive surface 451. In some embodiments, while contact 10510 has an intensity between $IT_L$ and $IT_D$, the user is enabled to move the object associated with cursor 10504 by moving contact 10510 on the touch-sensitive surface.

In response to the request (e.g., the increase in intensity of contact from an intensity below $IT_D$ in FIG. 8B to an intensity above $IT_D$ in FIG. 8C), object 10506-1 is moved below object 10506-2 in the z-order. The change in z-order is, optionally, not visually displayed to the user if objects 10506-1 and 10506-2 do not overlap, as shown in FIG. 8C. In accordance with a determination that objects 10506-1 and 10506-2 do not overlap, no tactile output associated with the move of object 10506-1 below object 10506-2 is generated.

FIG. 8D shows objects 10506-1 and 10506-2 displayed, in a z-order in which object 10506-1 is in front of object 10506-2, on display 450. In FIG. 8D, objects 10506-1 and 10506-2 overlap, with object 10506-1 covering a part of object 10506-2. Cursor 10504 is displayed as located over object 10506-1. For example, in FIG. 8D, the device detected movement 10511 of contact 10512 down and to the right on the touch-sensitive surface 451 while cursor 10504 was over object 10506-1 and the intensity of contact 10512 was between $IT_L$ and $IT_D$, and in response to detecting the movement 10511 of contact 10512, the device moved cursor 10504 and object 10506-1 down and to the left on the display 450 in accordance with the movement of contact 10512 on the touch-sensitive surface.

FIG. 8D also shows contact 10512 detected on touch-sensitive surface 451. While contact 10512 is detected on touch-sensitive surface 451, a request to move object 10506-1 below object 10506-2 in the z-order is received by the device (e.g., as shown in FIG. 8C). The device optionally receives the request in the form of, for example, a gesture input performed on touch-sensitive surface 451 (e.g., a gesture performed with contact 10512) while cursor 10504 is located over object 10506-1, an increase in the intensity of contact 10512 above the intensity threshold while cursor 10504 is located over object 10506-1, or an input made using a keyboard or other input device (e.g., a keyboard shortcut, a selection of a menu option using the keyboard or other input device).

Figure 8E:
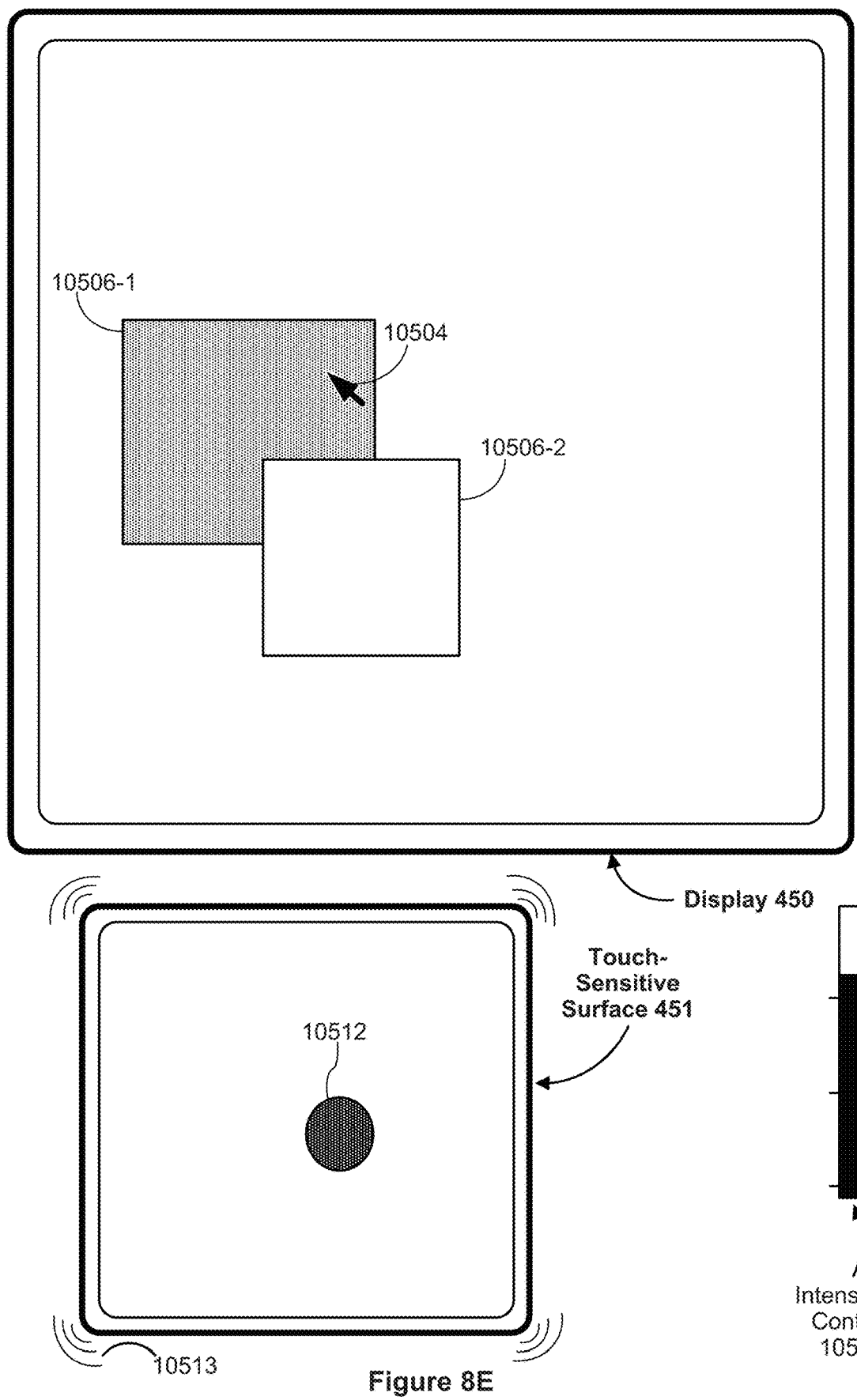

In response to the request (e.g., the increase in intensity of contact from an intensity below $IT_D$ in FIG. 8D to an intensity above $IT_D$ in FIG. 8E), object 10506-1 is moved below object 10506-2 in the z-order, as shown in FIG. 8E. With the change in z-order, object 10506-2 now covers a part of object 10506-1. In accordance with a determination that objects 10506-1 and 10506-2 overlap, a tactile output 10513 associated with the movement of object 10506-1 below object 10506-2 is generated in conjunction with the move of object 10506-1 below object 10506-2. The tactile output may be sensed by the user via contact 10512 as a tactile sensation. In some embodiments, the tactile output is generated by movement of touch-sensitive surface 451, and the movement includes a dominant movement component, which optionally has a waveform shape with a wavelength, such as a square, sine, squine, sawtooth, or triangle.

Many electronic devices display user interface objects that have a layer order (e.g., a z-order or front-to-back order of the user interface objects). A user typically interacts with such objects by repositioning them on the display, and overlapping objects are displayed on the display in accordance with their front-to-back order (e.g., an object that is "in front" of another object is displayed where the two objects overlap). In addition to repositioning the objects on the display, a user often wants to change the front-to-back order of the objects on the display.

Thus, when the relative z-order between two objects is changed, a tactile output is generated if the two objects overlap (e.g., 10513 in FIG. 8E), and a tactile output is not generated if the two objects do not overlap (e.g., as shown in FIG. 8C). The tactile output gives the user an indication that the change in z-order affects which object is covered by the other object.

Figure 8F:
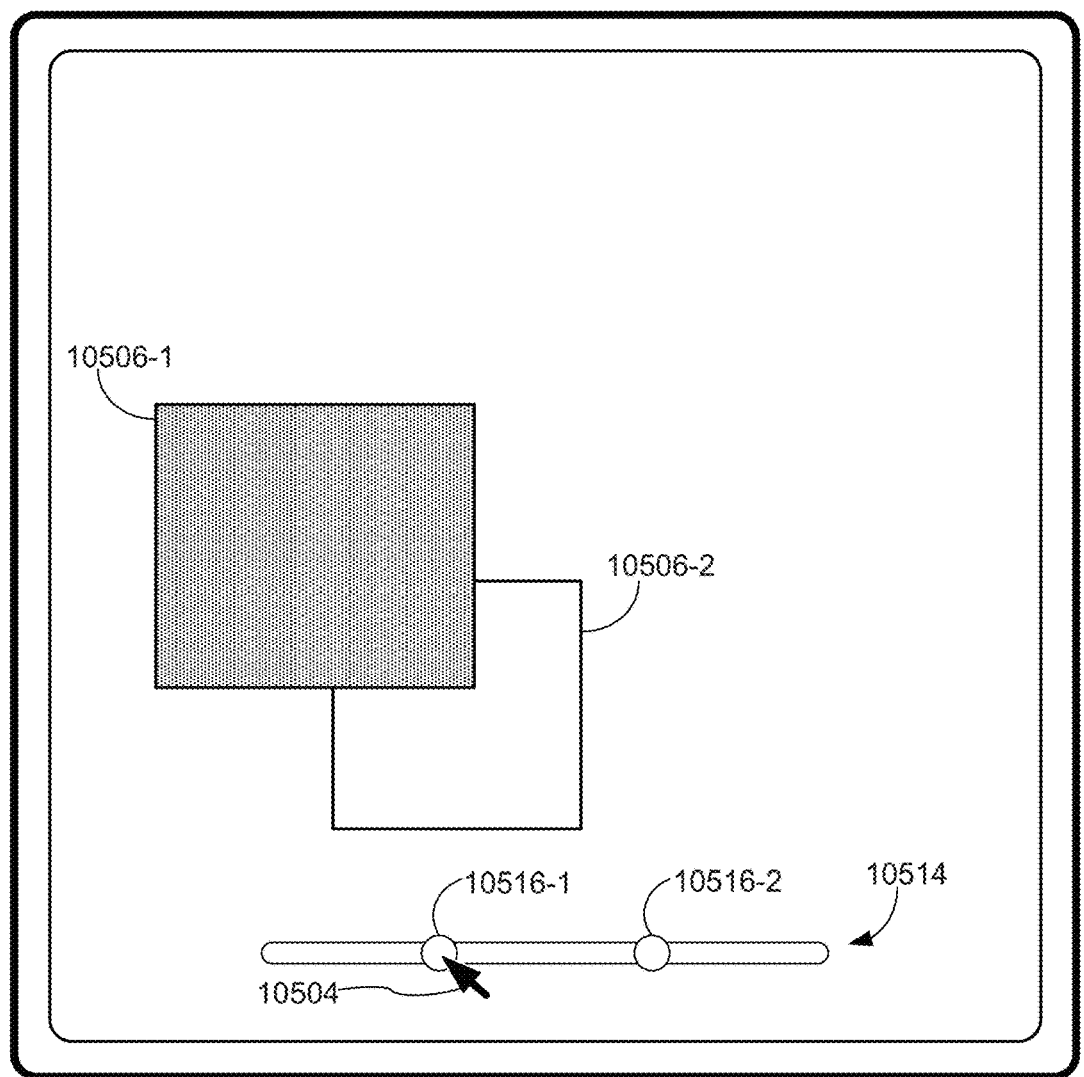
Figure 8F:
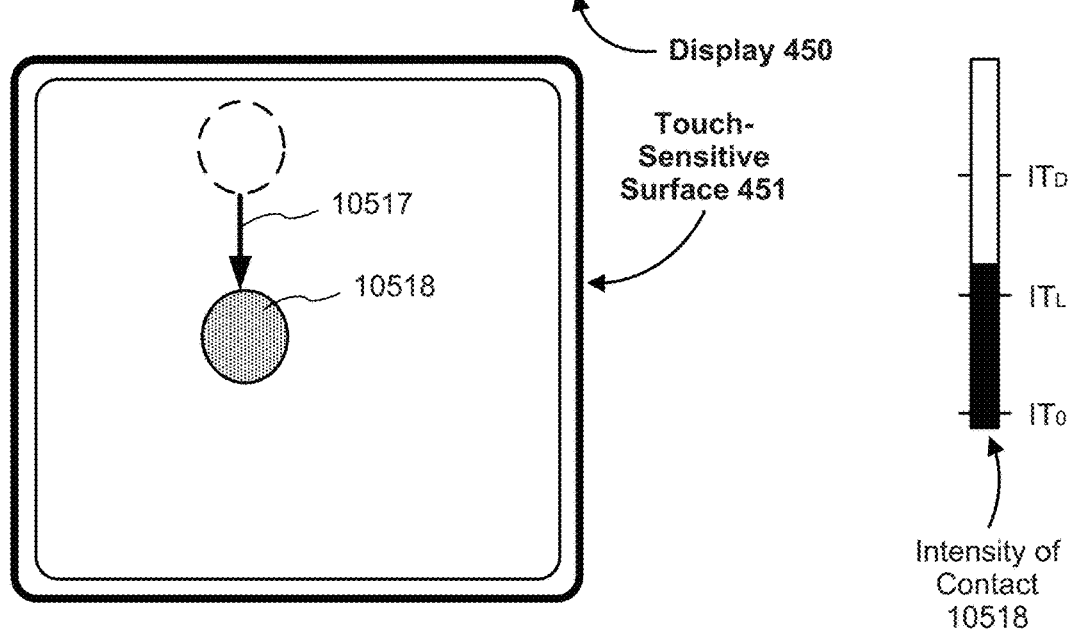

FIGS. 8F-8I illustrate an example of moving an object within the z-order using a control for changing the z-order. FIG. 8F shows objects 10506-1 and 10506-2, and cursor 10504, displayed on display 450. Objects 10506-1 and 10506-2 are displayed in a z-order, with object 10506-1 in front of object 10506-2 in the z-order. Z-order slider 10514 is also displayed on display 450. Z-order slider 10514 includes slider thumbs 10516-1 and 10516-2. Thumb 10516-1 corresponds to object 10506-1 and thumb 10516-2 corresponds to object 10506-2. The position of a thumb 10516 relative to the other thumbs on z-order slider 10514 corresponds to the corresponding object's position in the z-order. For example, as depicted in FIG. 8F, the further left a thumb 10516 is on z-order slider 10514, the further up front the corresponding object 10506 is in the z-order. Thus, thumb 10516-1 is to the left of thumb 10516-2, corresponding to the z-order of objects 10506-1 and 10506-2 as shown. It should be appreciated that the correspondence between being further left on z-order slider 10514 and the corresponding object being further up front in the z-order is a design choice; optionally, the further right a thumb 10516 is on z-order slider 10514, the further up front the corresponding object 10506 is in the z-order.

Figure 8G:
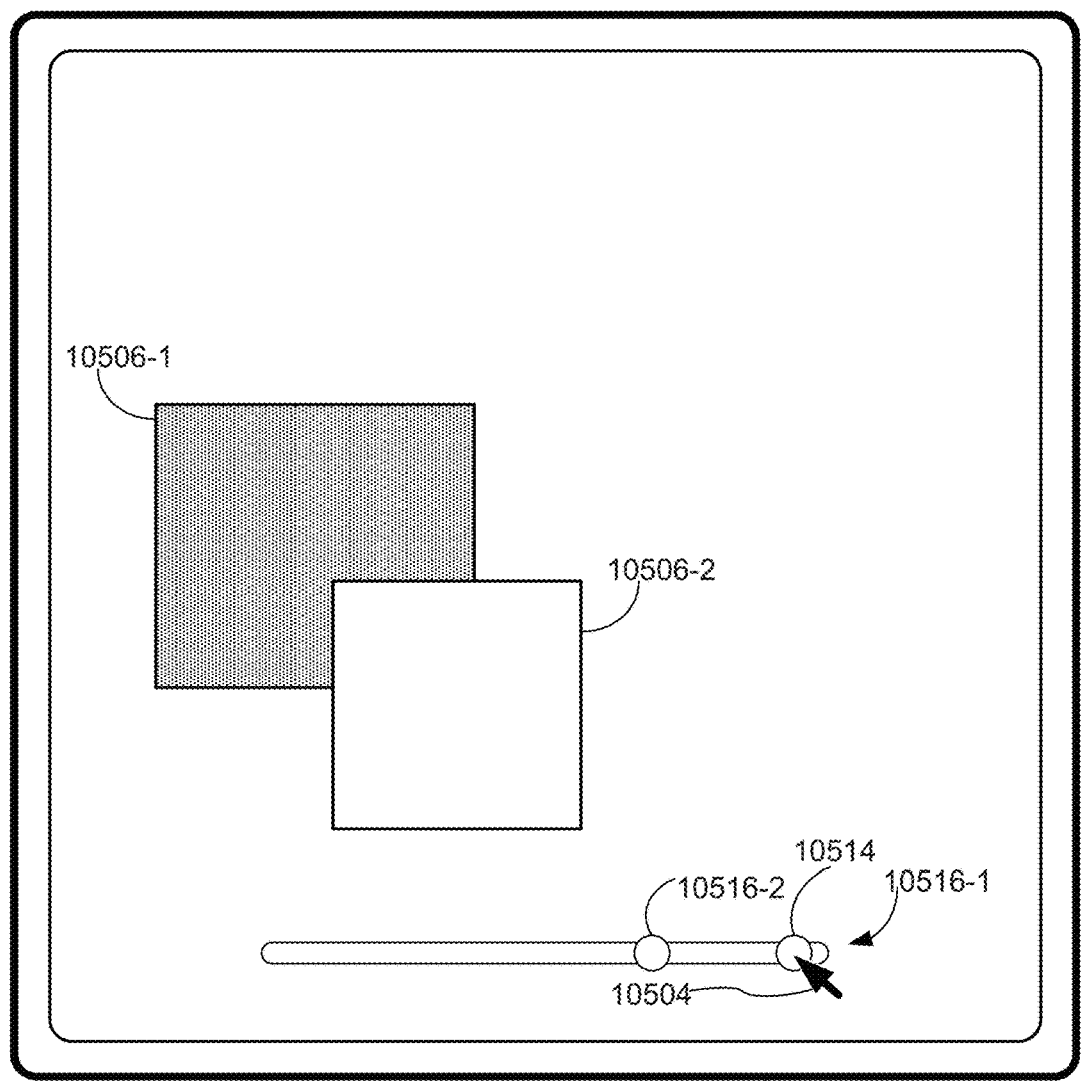
Figure 8G:
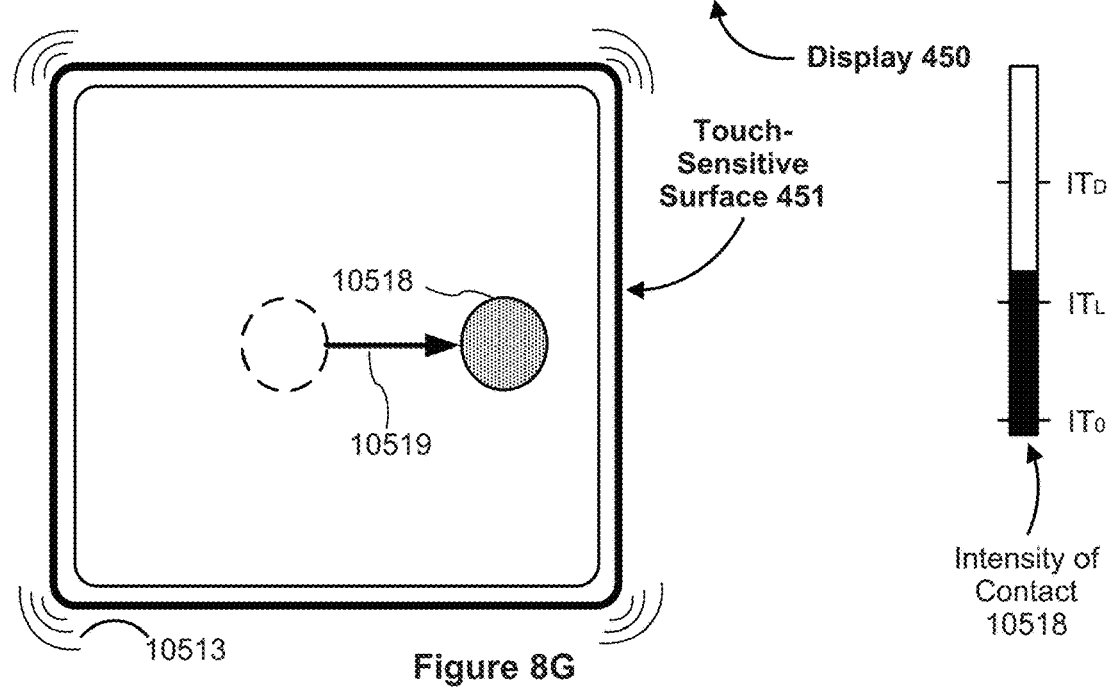

In FIG. 8F, the device detects movement 10517 of contact 10518 downward on the touch-sensitive surface 451, and in response to detecting the movement 10517 of contact 10518, the device moves cursor 10504 over thumb 10516-1. FIG. 8G also shows contact 10518 detected on touch-sensitive surface 451 while cursor 10504 is located over thumb 10516-1. The gesture including contact 10518 includes movement 10519 of a contact 10518 on touch-sensitive surface 451 while contact 10518 has an intensity between $IT_L$ and $IT_D$. In response to detection of the gesture including movement 10519 of contact 10518, thumb 10516-1 is moved rightward on slider 10514 past thumb 10516-2, so that thumb 10516-2 is to the left of thumb 10516-1 on slider 10514, as shown in FIG. 8G. In response to the movement of thumb 10516-1 to the right of thumb 10516-2, object 10506-1, which corresponds to thumb 10516-1, is moved downward, below object 10506-2 in the z-order. In accordance with a determination that objects 10506-1 and 10506-2 overlap, a tactile output 10513 associated with the move of object 10506-1 below object 10506-2 is generated in conjunction with the move of object 10506-1 below object 10506-2. The tactile output may be sensed by the user via contact 10518 as a tactile sensation. In some embodiments, the tactile output is generated by movement of touch-sensitive surface 451, and the movement includes a dominant movement component, which optionally has a waveform shape, such as a square, sine, squine, sawtooth, or triangle.

Figure 8H:
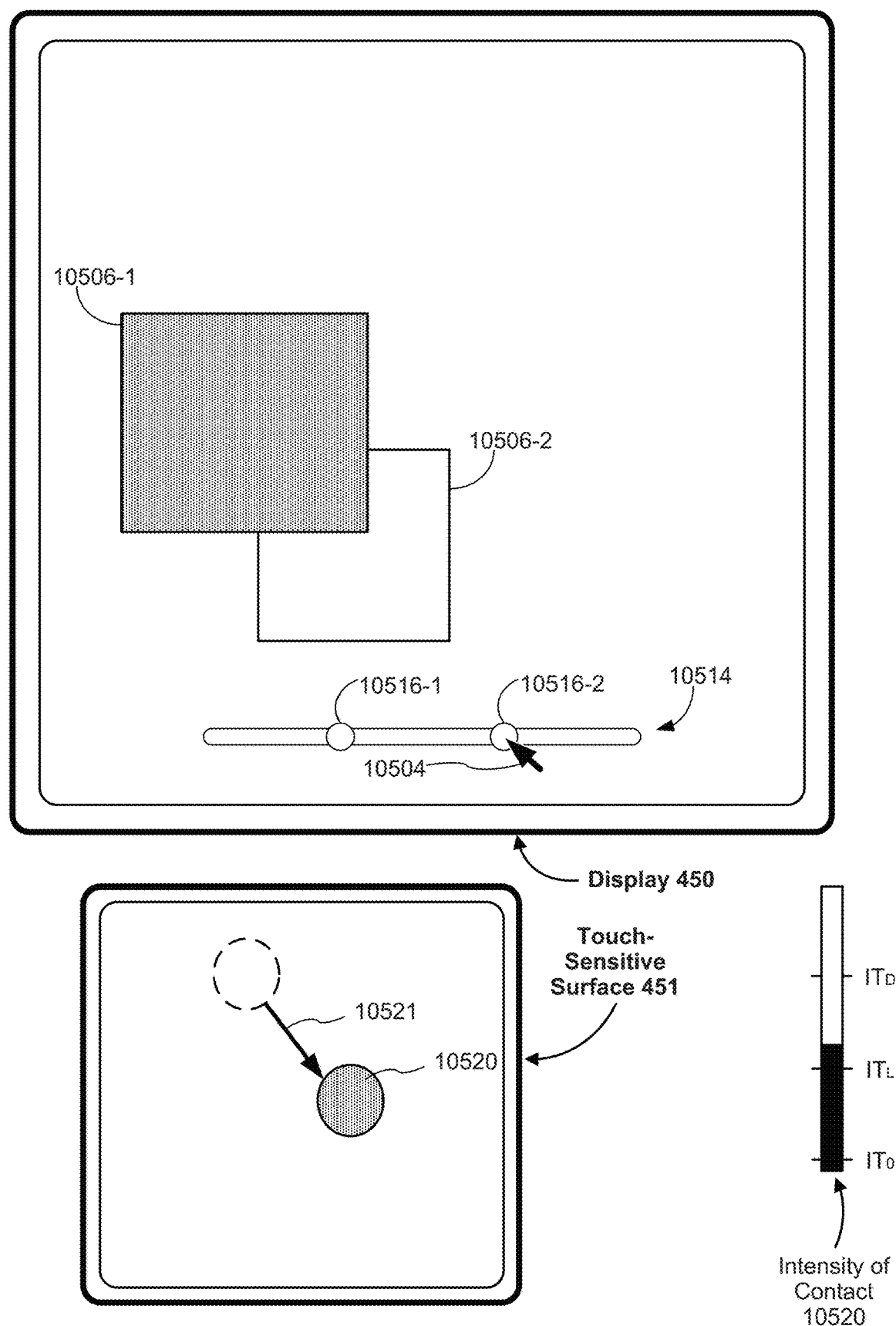
Figure 8I:
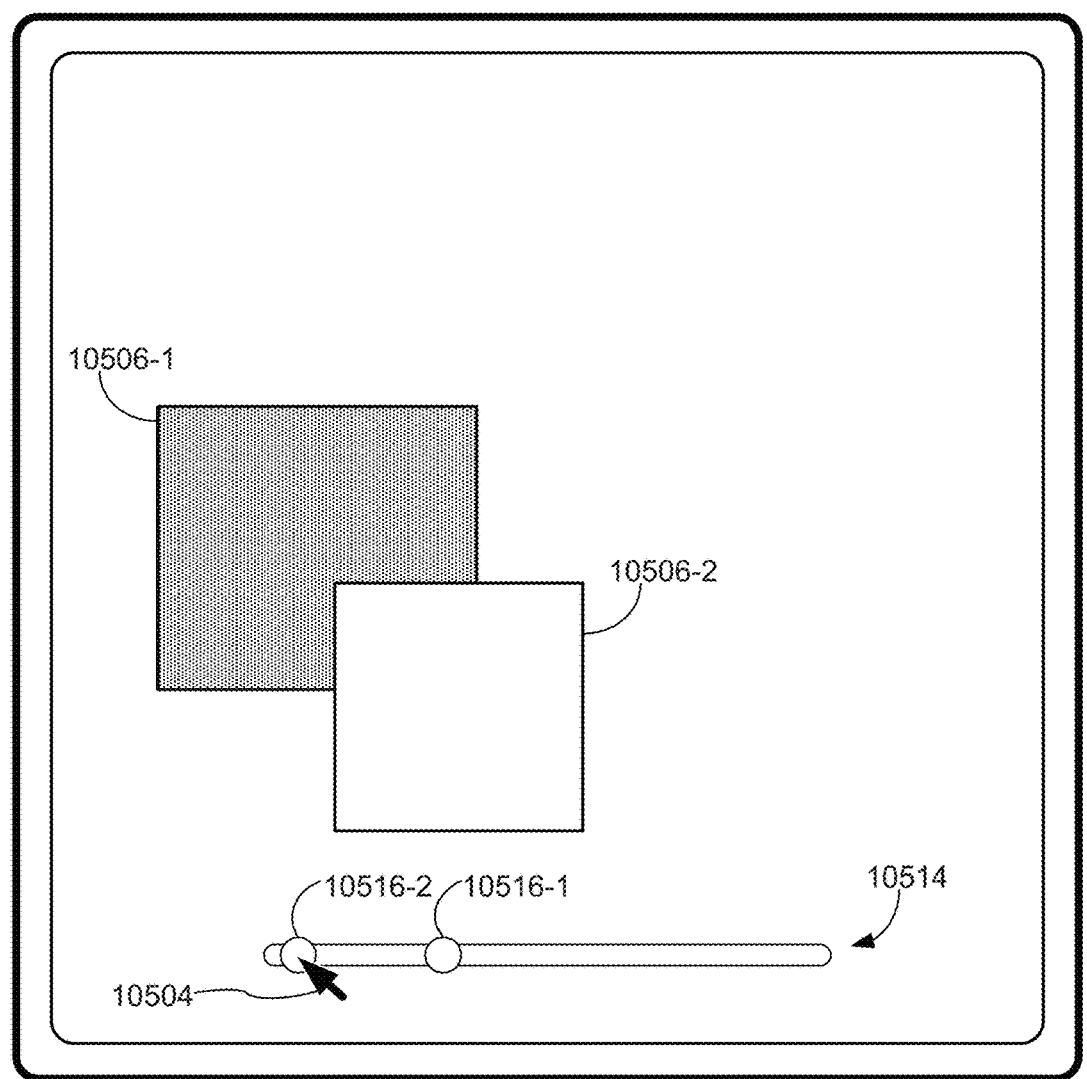
Figure 8I:
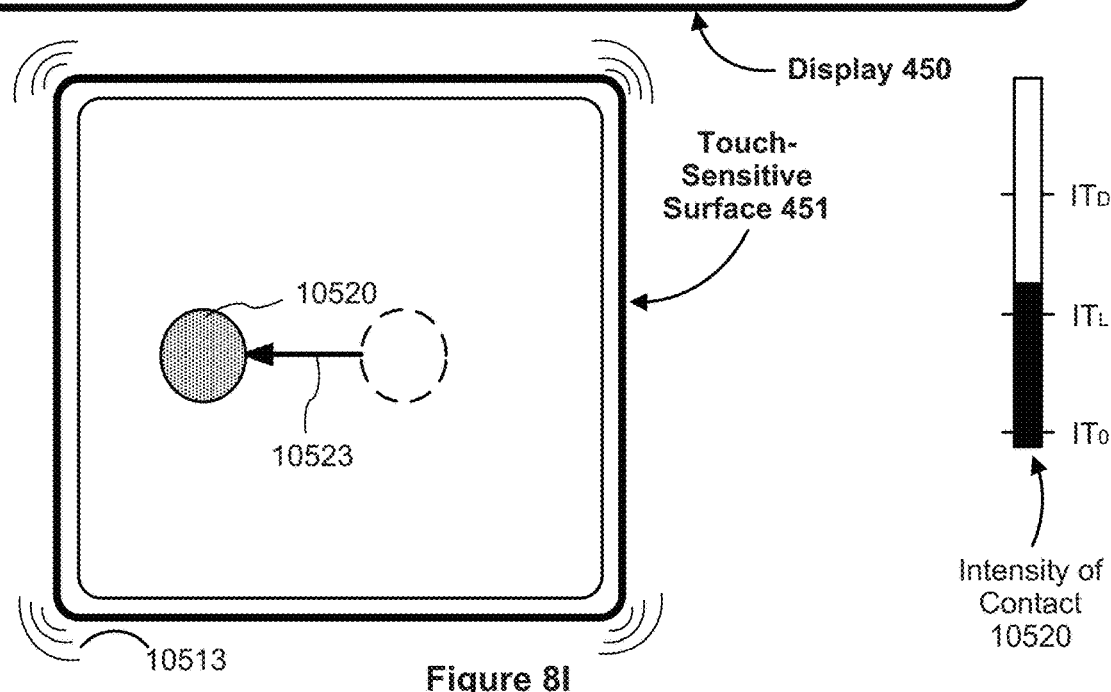

FIG. 8I shows objects 10506-1 and 10506-2 and slider 10514 displayed on display 450, with object 10506-1 in front of object 10506-2 in the z-order. In FIG. 8H, the device detects movement 10521 of contact 10520 downward and to the right on the touch-sensitive surface 451, and in response to detecting the movement 10521 of contact 10520, the device moves cursor 10504 over thumb 10516-2. FIG. 8H also shows cursor 10504, located over thumb 10516-2, displayed on display 450, and a gesture including movement 10523 of contact 10520 to the left detected on touch-sensitive surface 451 while cursor 10504 is located over thumb 10516-2. The gesture including contact 10520 includes movement 10523 of a contact on touch-sensitive surface 451. In response to detection of the gesture including contact 10520, thumb 10516-2 is moved leftward on slider 10514 past thumb 10516-1, so that thumb 10516-2 is to the left of thumb 10516-1 on slider 10514, as shown in FIG. 8I. In response to the movement of thumb 10516-2 to the left of thumb 10516-1, object 10506-2, which corresponds to thumb 10516-2, is moved upward, in front of object 10506-1 in the z-order. In accordance with a determination that objects 10506-1 and 10506-2 overlap, a tactile output 10513 associated with the move of object 10506-2 above object 10506-1 is generated in conjunction with the move of object 10506-2 above object 10506-1. The tactile output may be sensed by the user via contact 10520 as a tactile sensation. In some embodiments, the tactile output is generated by movement of touch-sensitive surface 451, and the movement includes a dominant movement component, which optionally has a waveform shape, such as a square, sine, squine, sawtooth, or triangle.

In some embodiments, the tactile output associated with the move of object 10506-1 below object 10506-2 in the z-order has a wavelength that is determined based on a position of object 10506-2 in the z-order prior to receiving the request to move object 10506-1 below object 10506-2 in the z-order.

Figure 8J:
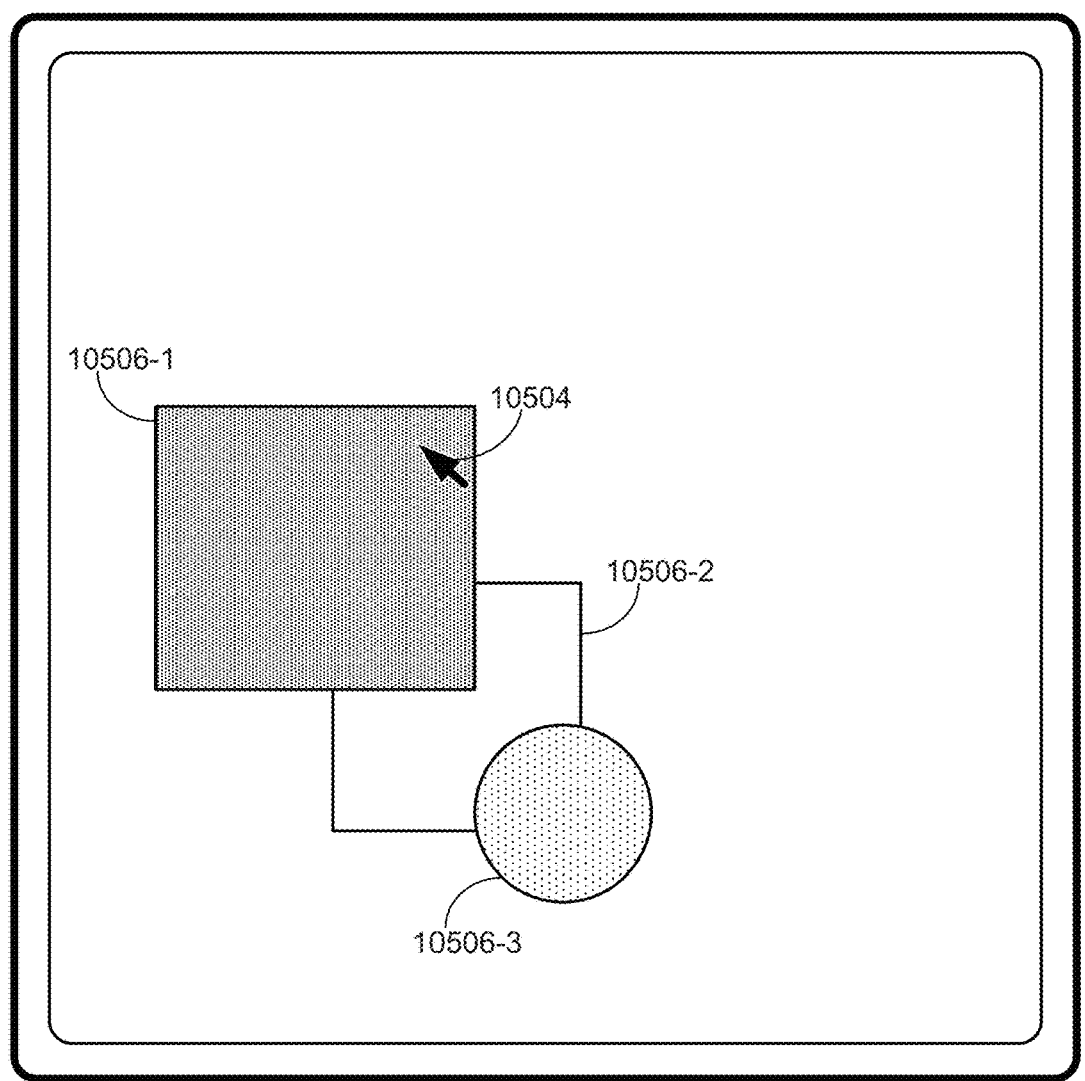
Figure 8J:
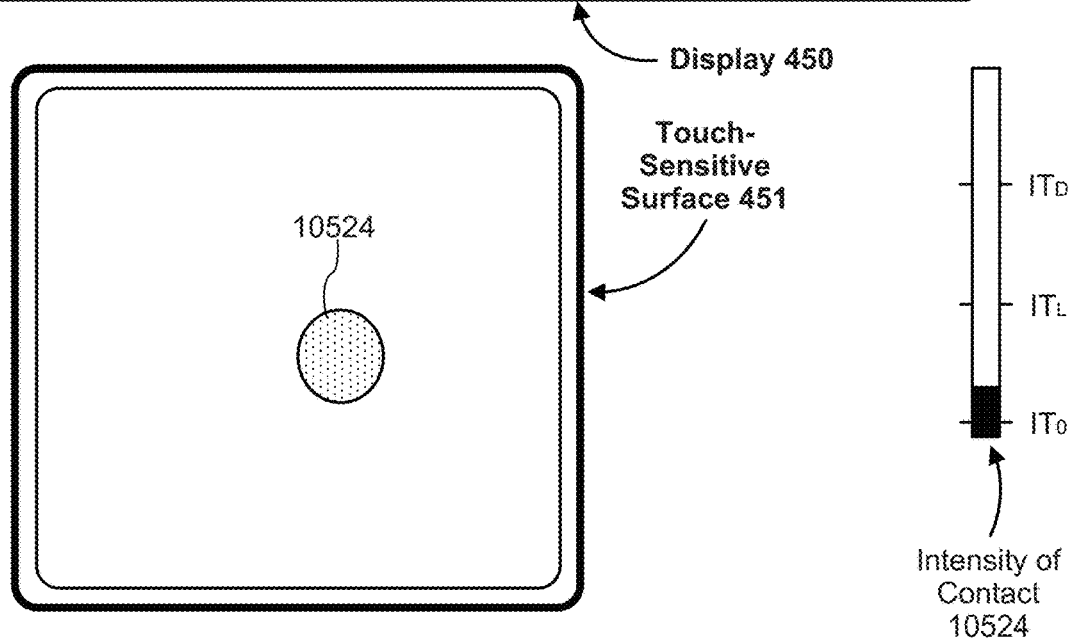

FIG. 8J shows user interface objects 10506-1, 10506-2, and 10506-3 displayed on display 450. Objects 10506-1, 10506-2, and 10506-3 are displayed with a z-order. In FIG. 8J, object 10506-1 is in front of objects 10506-2 and 10506-3. Object 10506-3 is in front of object 10506-2 but in back of object 10506-1. Thus, object 10506-3 is an intervening object between objects 10506-1 and 10506-2 in the z-order, even though there is no visual indication of this ordering in FIG. 8J. Objects 10506-1 and 10506-3 do not overlap, and objects 10506-1 and 10506-2 overlap. Cursor 10504 is displayed over object 10506-1.

FIG. 8J shows contact 10524 detected on touch-sensitive surface 451. While contact 10524 is detected on touch-sensitive surface 451, a request to move object 10506-1 below object 10506-2 in the z-order is received by the device (e.g., an increase in intensity of contact 10524 from an intensity below $IT_L$ in FIG. 8J to an intensity above $IT_D$ in FIG. 8L). The device optionally receives the request in the form of, for example, a gesture input performed on touch-sensitive surface 451 (e.g., a gesture performed with contact 10524) while cursor 10504 is located over object 10506-1, an increase in the intensity of contact 10524 above the intensity threshold while cursor 10504 is located over object 10506-1, or an input made using a keyboard or other input device (e.g., a keyboard shortcut, a selection of a menu option using the keyboard or other input device).

Figure 8K:
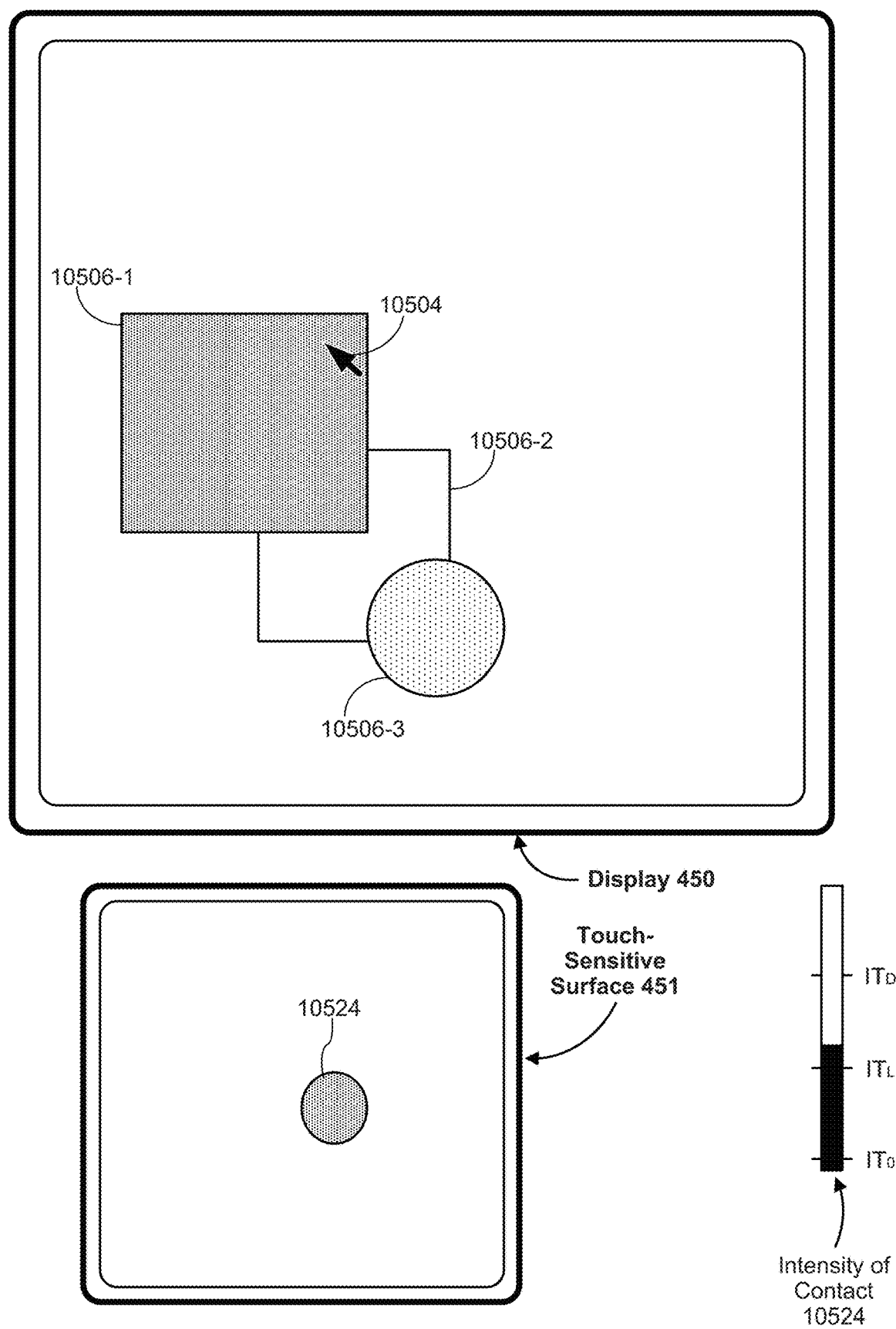
Figure 8L:
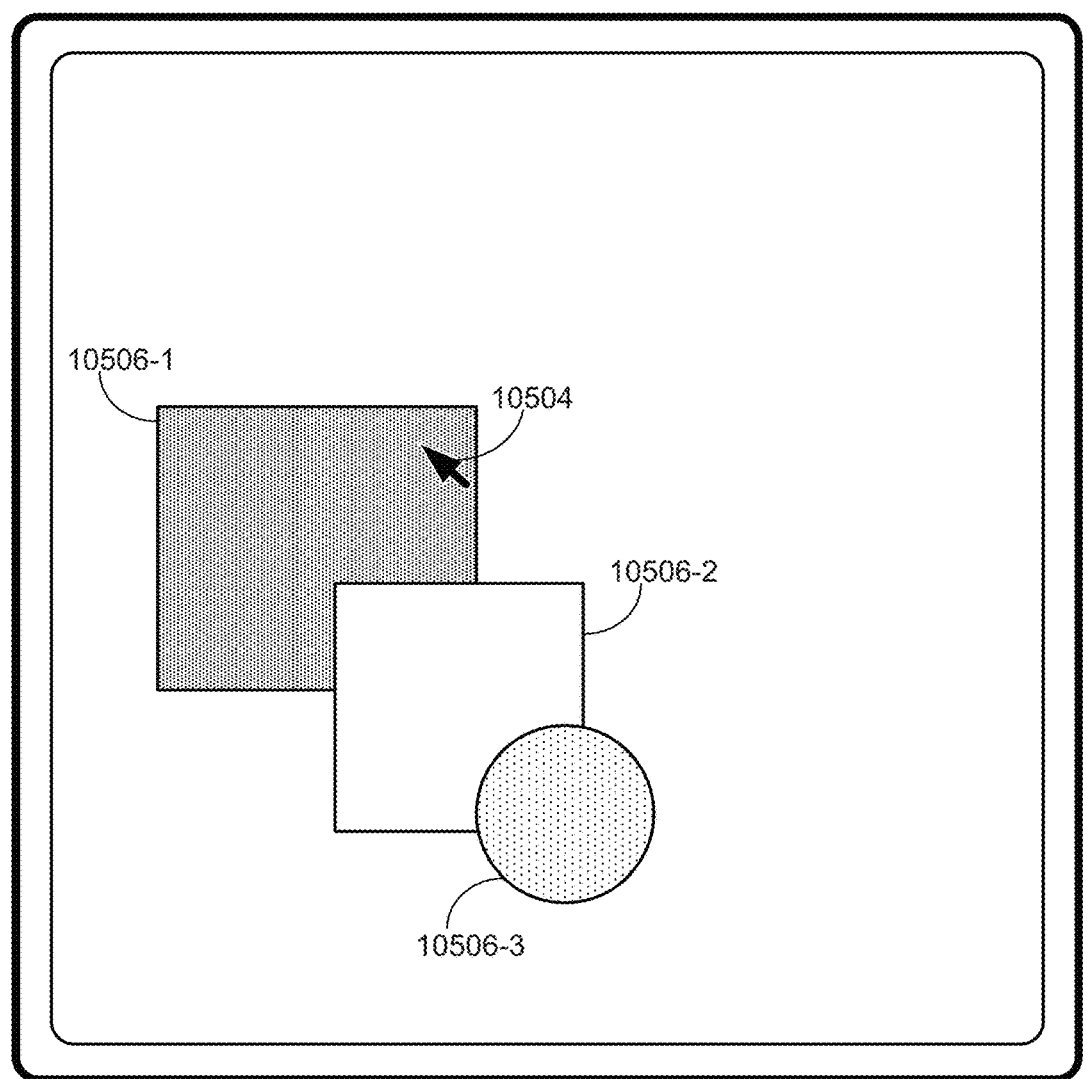
Figure 8L:
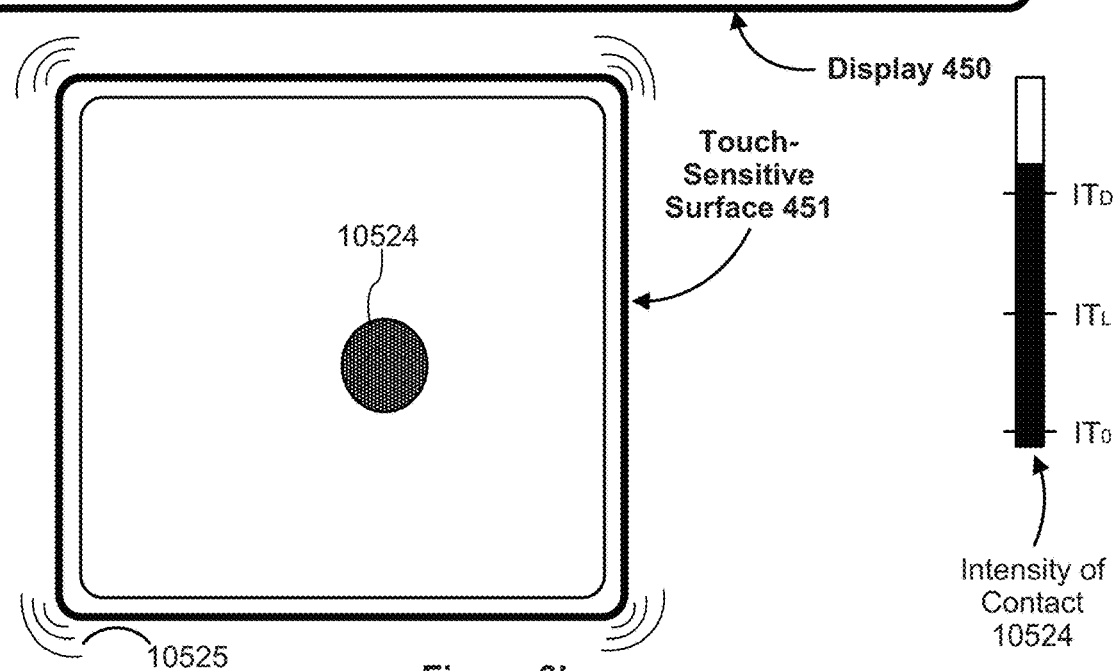

In response to the request, object 10506-1 is moved below intervening object 10506-3 (e.g., when contact 10524 reaches an intensity above $IT_L$ in FIG. 8K) and then below object 10506-2 (e.g., when contact 10524 reaches an intensity above $IT_D$ in FIG. 8M) in the z-order, as shown in FIG. 8K-8L. When object 10506-1 is moved below object 10506-3, in accordance with a determination that objects 10506-1 and 10506-3 do not overlap, no tactile output associated with the move of object 10506-1 below object 10506-3 is generated. When object 10506-1 is moved below object 10506-2, in accordance with a determination that objects 10506-1 and 10506-2 overlap, a tactile output 10525 associated with the move of object 10506-1 below object 10506-2 is generated in conjunction with the move of object 10506-1 below object 10506-2. The tactile output may be sensed by user via contact 10524 as a tactile sensation. In some embodiments, the tactile output is generated by movement of touch-sensitive surface 451, and the movement includes a dominant movement component, which optionally has a waveform shape, such as a square, sine, squine, sawtooth, or triangle.

Figure 8M:
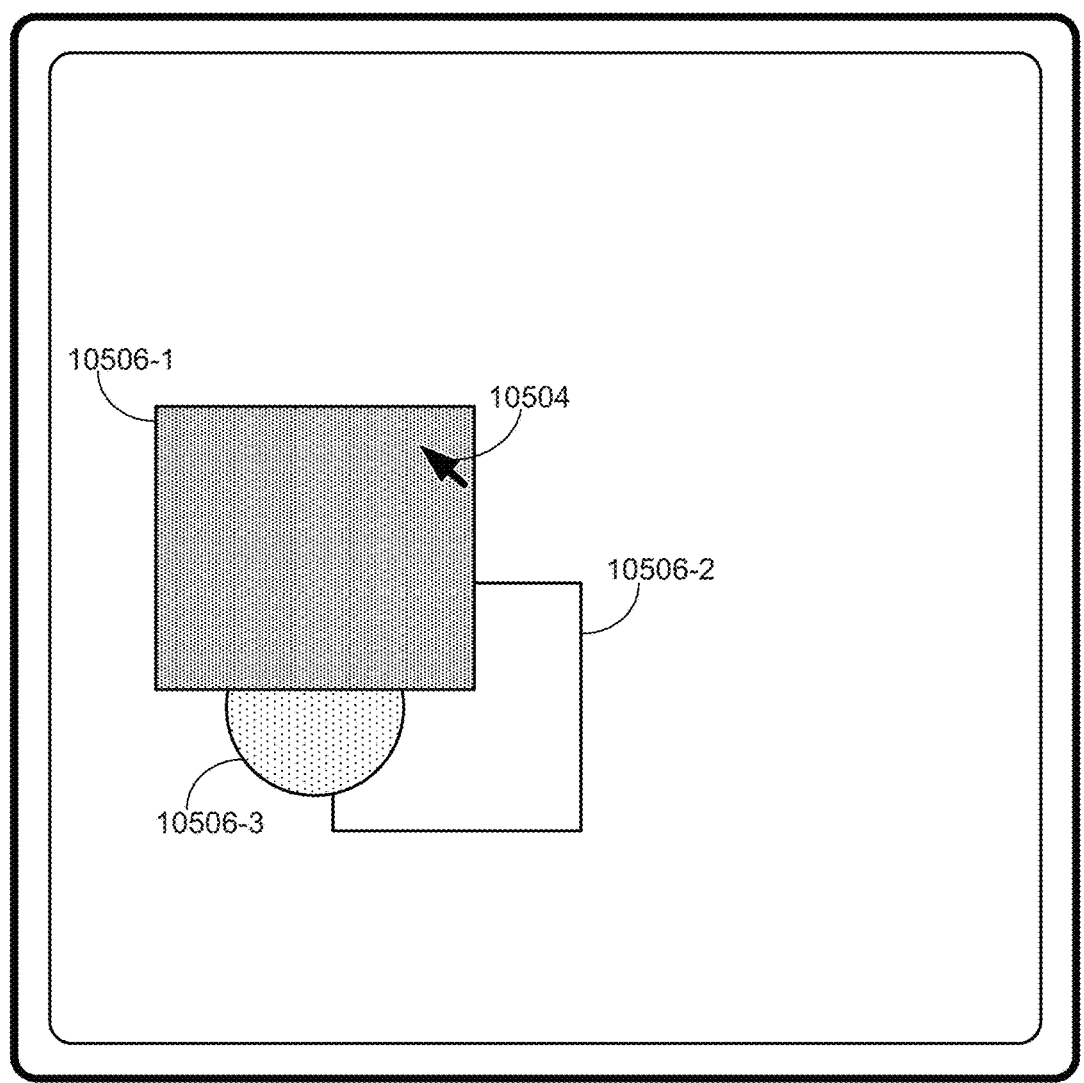
Figure 8M:
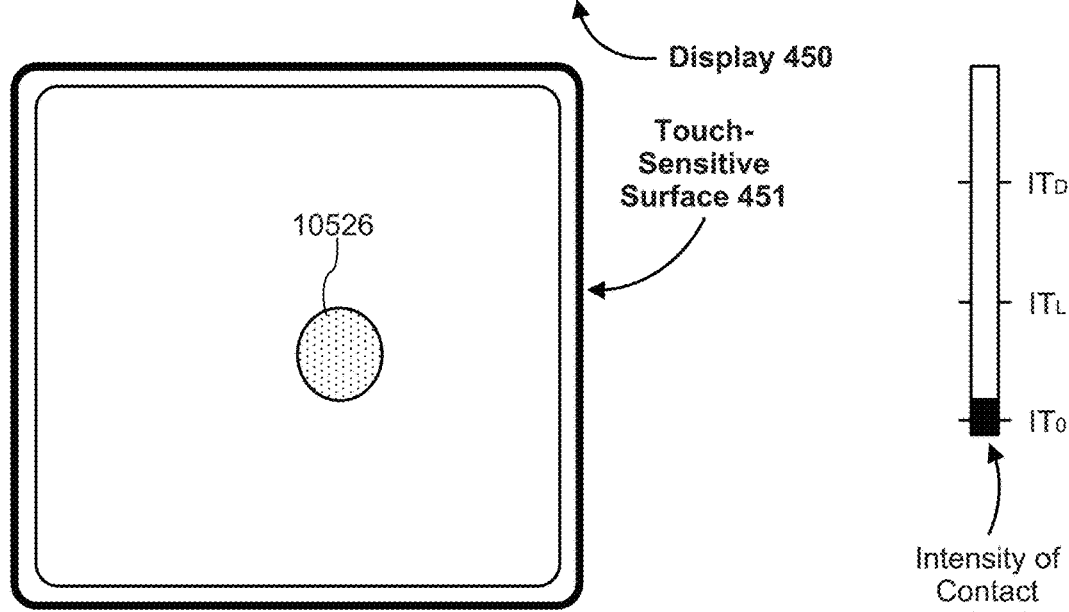

FIG. 8M shows user interface objects 10506-1, 10506-2, and 10506-3 displayed on display 450. Objects 10506-1, 10506-2, and 10506-3 are displayed with a z-order. In FIG. 8M, object 10506-1 is in front of objects 10506-2 and 10506-3. Object 10506-3 is in front of object 10506-2 but in back of object 10506-1. Thus, object 10506-3 is an intervening object between objects 10506-1 and 10506-2 within the z-order. Objects 10506-1, 10506-2, and 10506-3 overlap. Cursor 10504 is displayed over object 10506-1.

FIG. 8M shows contact 10526 detected on touch-sensitive surface 451. While contact 10526 is detected on touch-sensitive surface 451, a request to move object 10506-1 below object 10506-2 in the z-order is received by the device (e.g., an increase in intensity of contact 10526 from an intensity below $IT_L$ in FIG. 8M to an intensity above $IT_D$ in FIG. 8O). In some circumstances, the device receives the request in the form of, for example, a gesture input performed on touch-sensitive surface 451 (e.g., a gesture performed with contact 10526) while cursor 10504 is located over object 10506-1, an increase in the intensity of contact 10526 above the intensity threshold while cursor 10504 is located over object 10506-1, or an input made using a keyboard or other input device (e.g., a keyboard shortcut, a selection of a menu option using the keyboard or other input device).

Figure 8N:
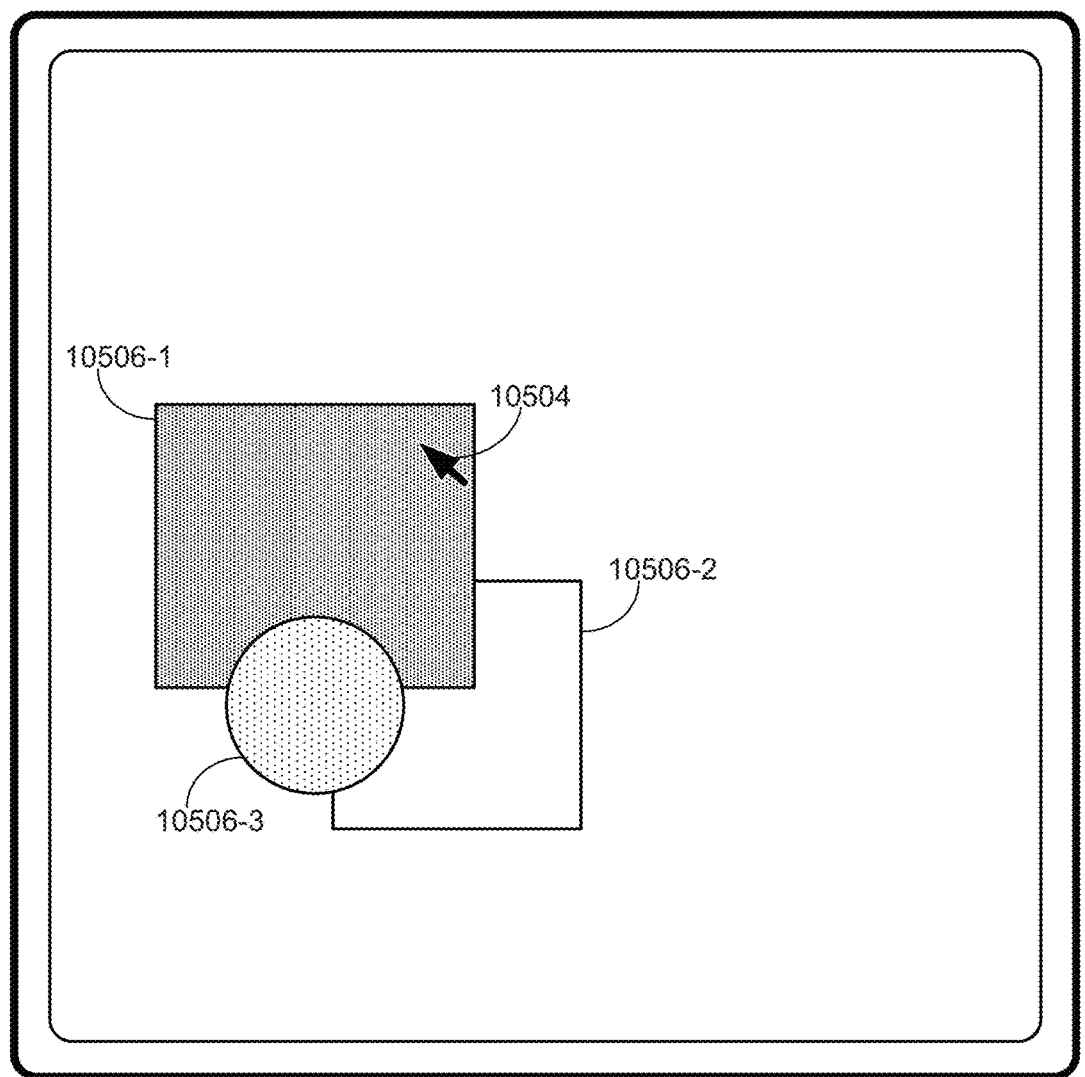
Figure 8N:
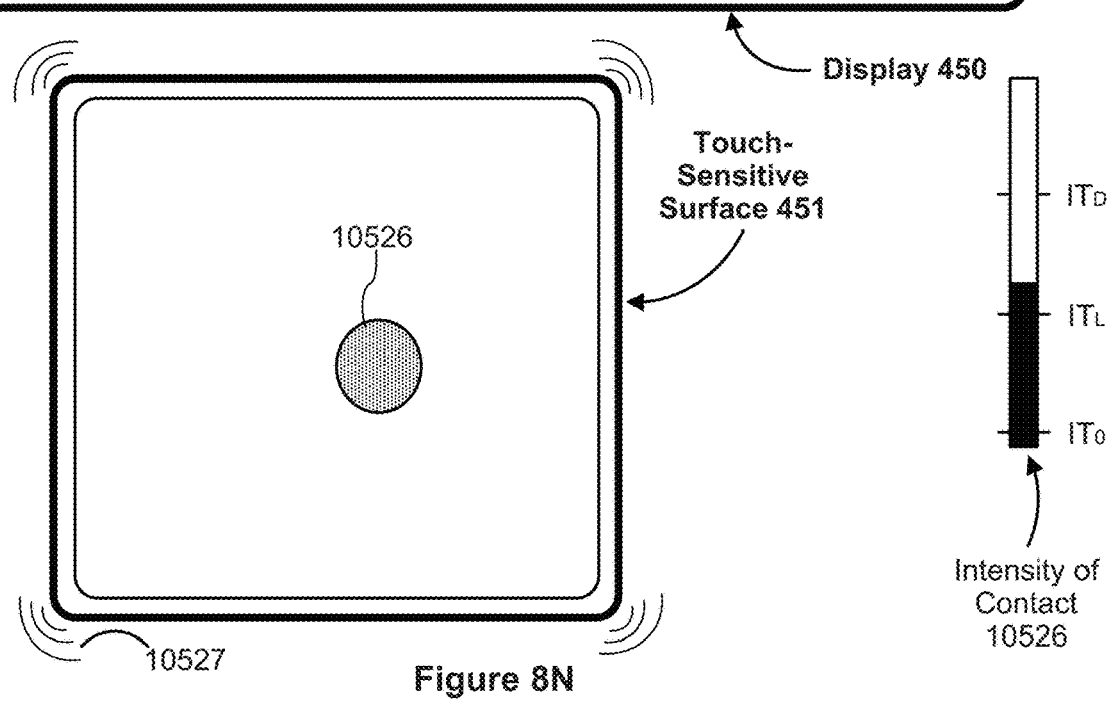
Figure 8O:
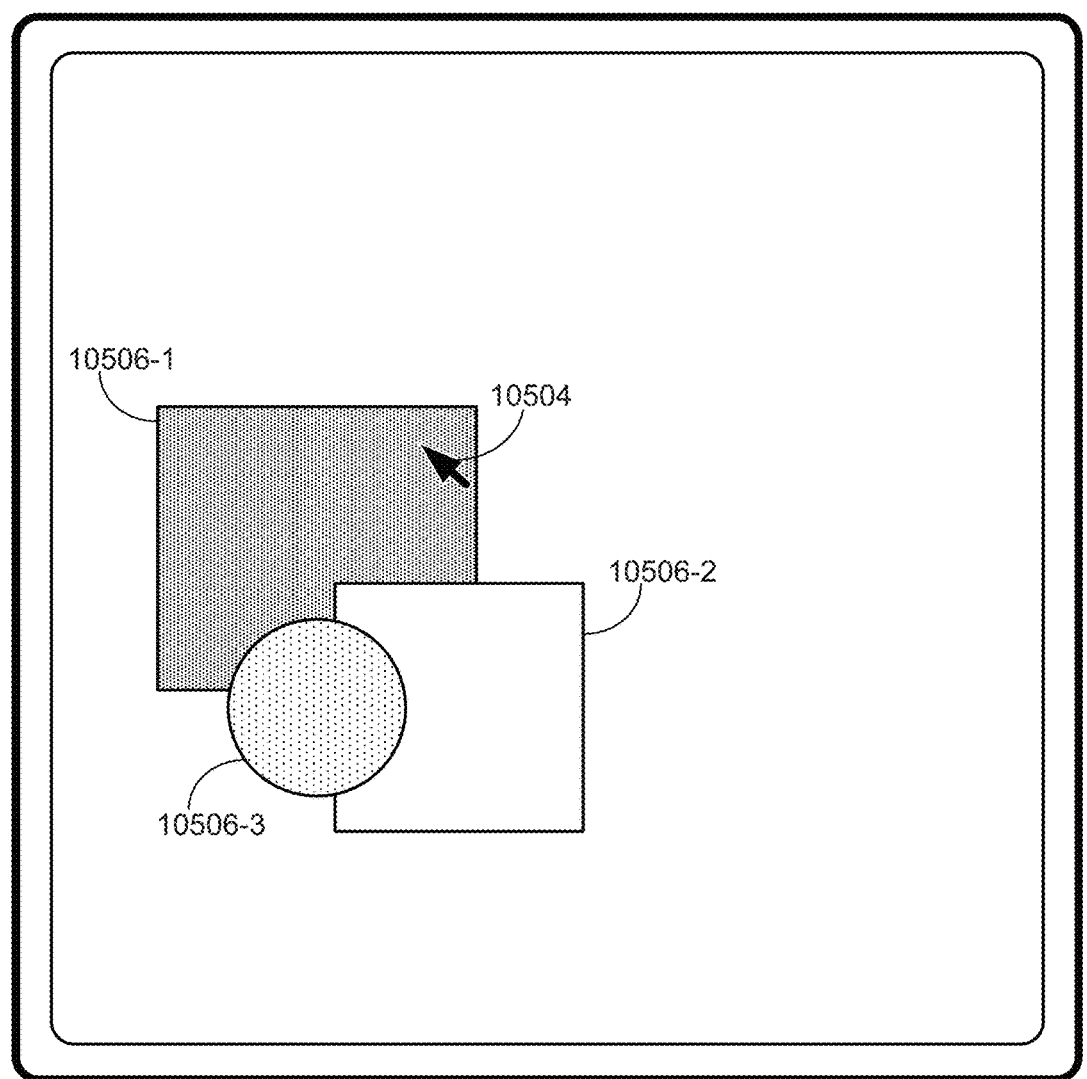
Figure 8O:
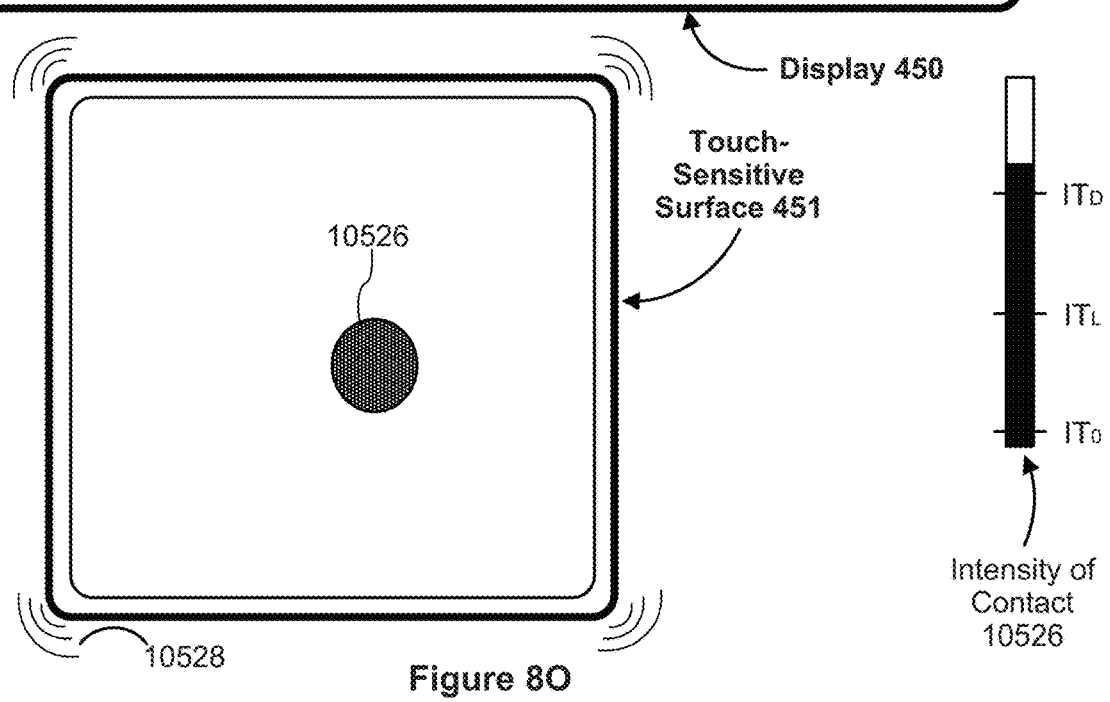

In response to the request, object 10506-1 is moved below object 10506-3 (e.g., when contact 10524 reaches an intensity above $IT_L$ in FIG. 8N) and then below object 10506-2 (e.g., when contact 10524 reaches an intensity above $IT_D$ in FIG. 8O) in the z-order, as shown in FIGS. 8N-8O. When object 10506-1 is moved below object 10506-3, in accordance with a determination that objects 10506-1 and 10506-3 overlap, a tactile output 10527 associated with the move of object 10506-1 below object 10506-3 is generated in conjunction with the move of object 10506-1 below object 10506-3. This tactile output associated with the move of object 10506-1 below object 10506-3 may be sensed by user via contact 10526 as a tactile sensation. When object 10506-1 is moved below object 10506-2, in accordance with a determination that objects 10506-1 and 10506-2 overlap, a tactile output 10528 associated with the move of object 10506-1 below object 10506-2 is generated in conjunction with the move of object 10506-1 below object 10506-2. This tactile output associated with the move of object 10506-1 below object 10506-2 may be sensed by user via contact 10526 as a tactile sensation. In some embodiments, the tactile outputs are generated by respective movements of touch-sensitive surface 451, and the respective movements each include a dominant movement component, which optionally has a waveform shape, such as a square, sine, squine, sawtooth, or triangle.

In some embodiments, the tactile output 10527 associated with the move of object 10506-1 below object 10506-3 (hereinafter "Tactile Output A") and the tactile output 10528 associated with the move of object 10506-1 below object 10506-2 after moving below object 10506-3 (hereinafter "Tactile Output B") are different. For example, the dominant movement component for Tactile Output A 10527 optionally has a different wavelength than the dominant movement component for Tactile Output B 10528. In some embodiments, the wavelength for Tactile Output A 10527 is determined based on a position of object 10506-3 in the z-order, and the wavelength for Tactile Output B 10528 is determined based on a position of object 10506-2 in the z-order.

In some embodiments, the wavelength of Tactile Output A 10527 is determined based on a number of user interface objects 10506, that object 10506-1 overlaps, that are between object 10506-1 and object 10506-3 in the z-order. In some embodiments, the wavelength of Tactile Output B 10528 is determined based on a number of user interface objects 10506, that object 10506-1 overlaps, that are between object 10506-1 and object 10506-2 in the z-order.

Object 10506-1 optionally overlaps multiple other user interface objects arranged in a respective z-order sequence, irrespective of whether object 10506-1 overlaps with object 10506-2. Thus, in some embodiments, the z-order includes object 10506-1, the multiple other user interface objects behind object 10506-1, and then object 10506-2. Thus, when object 10506-1 is moved below object 10506-2 in the z-order, in accordance with a request to move object 10506-1 below object 10506-2 in the z-order, object 10506-1 is moved below each of the multiple other user interface objects in sequence before being moved below object 10506-2. For each of the multiple other user interface objects that objects 10506-1 moves below, a tactile output is generated in conjunction with the move of object 10506-1 below the respective user interface object. Thus, as object 10506-1 is moved below the multiple other user interface objects, a sequence of tactile outputs is generated. In some embodiments, the sequence of tactile outputs is generated based on a mathematical progression. For example, each successive tactile output has a wavelength that is double the wavelength of the preceding tactile output. In some other embodiments, the sequence of tactile outputs is generated based on a musical progression. For example, each successive tactile output corresponds to a next note in a predefined musical scale or the same note in a lower octave.

Figure 8P:
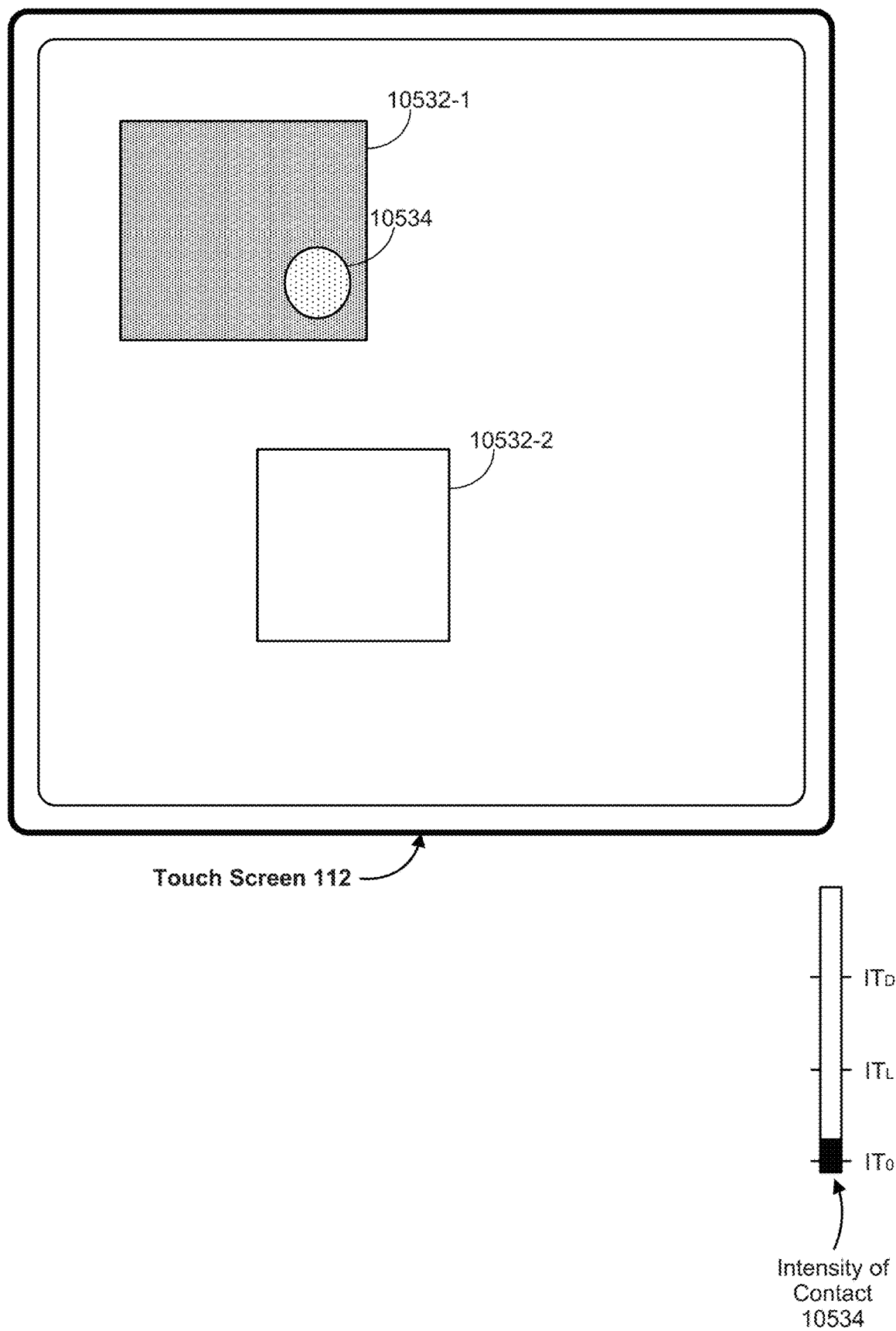
Figure 8Q:
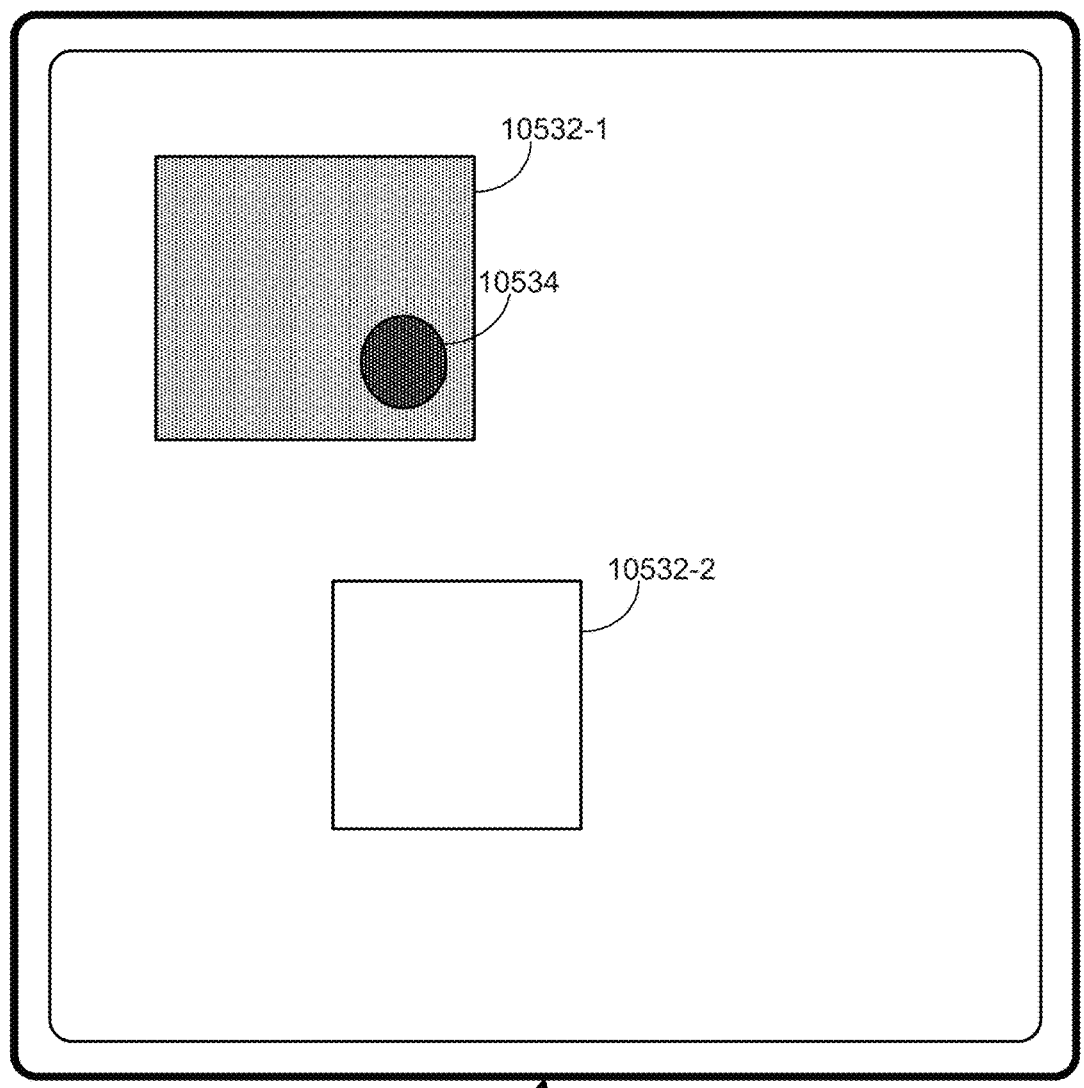
Figure 8Q:
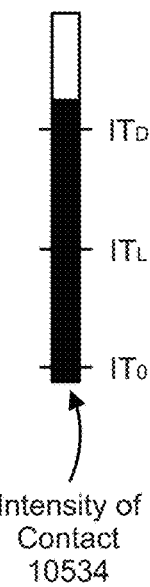
Figure 8R:
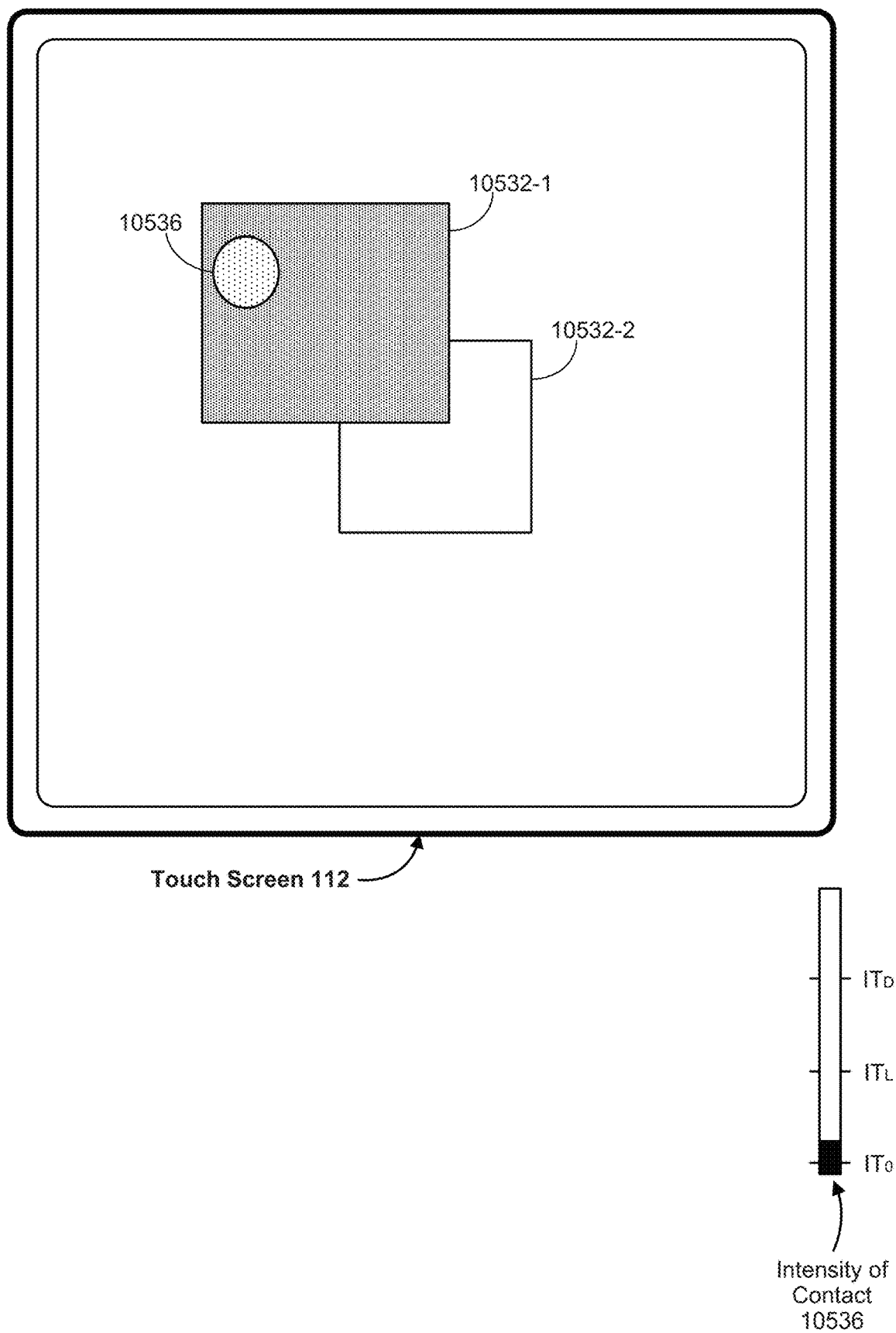
Figure 8S:
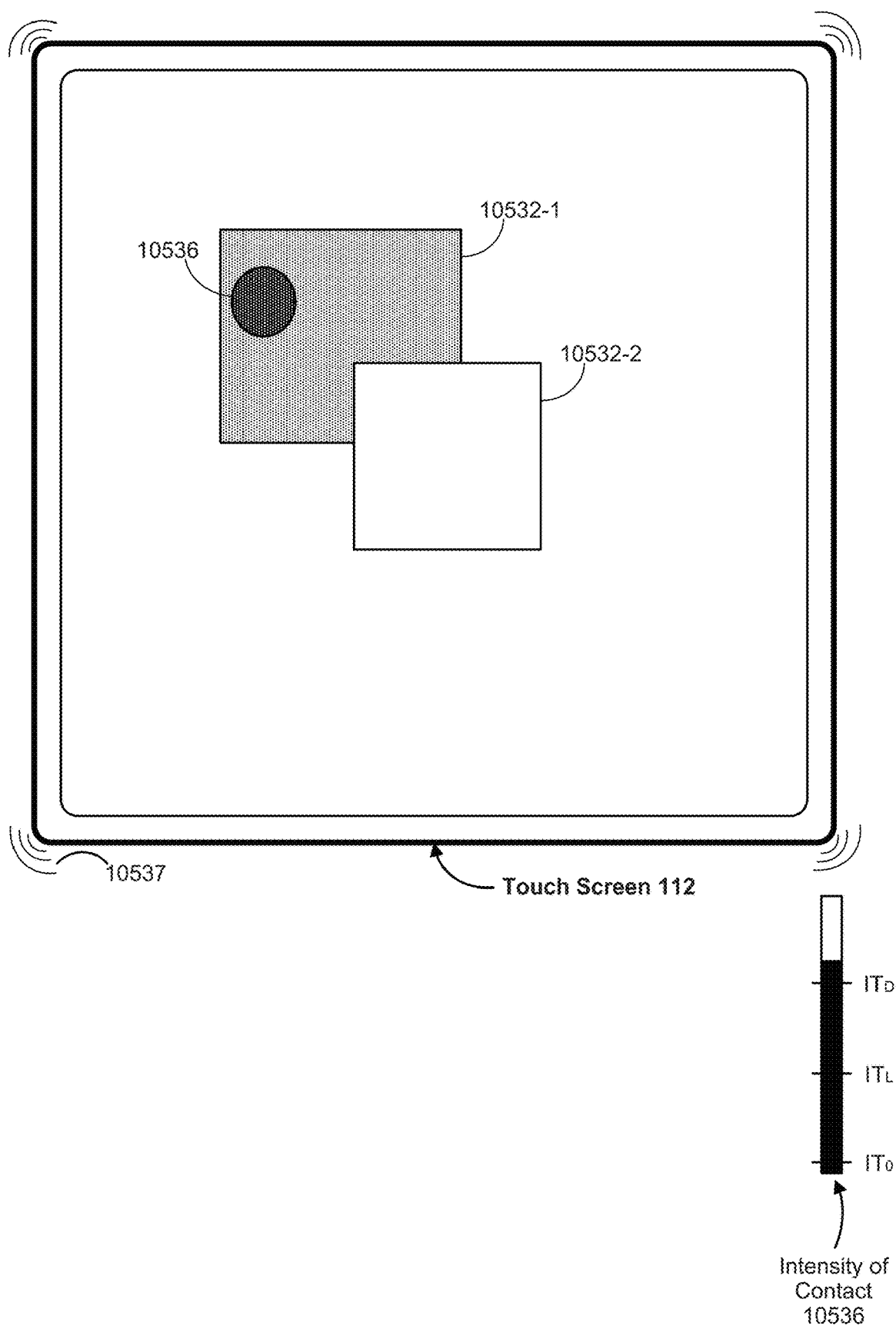
Figure 9B:
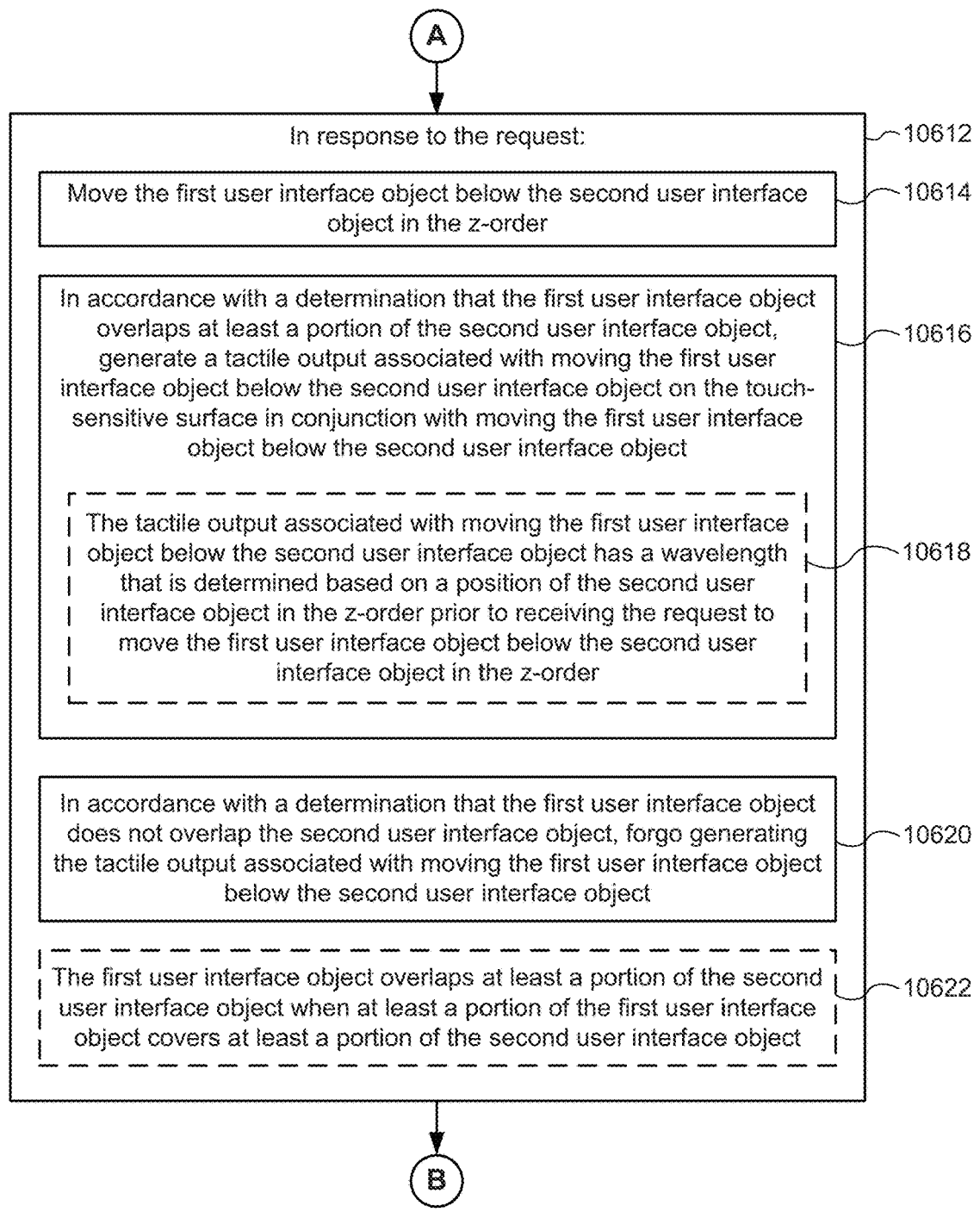
Figure 9C:
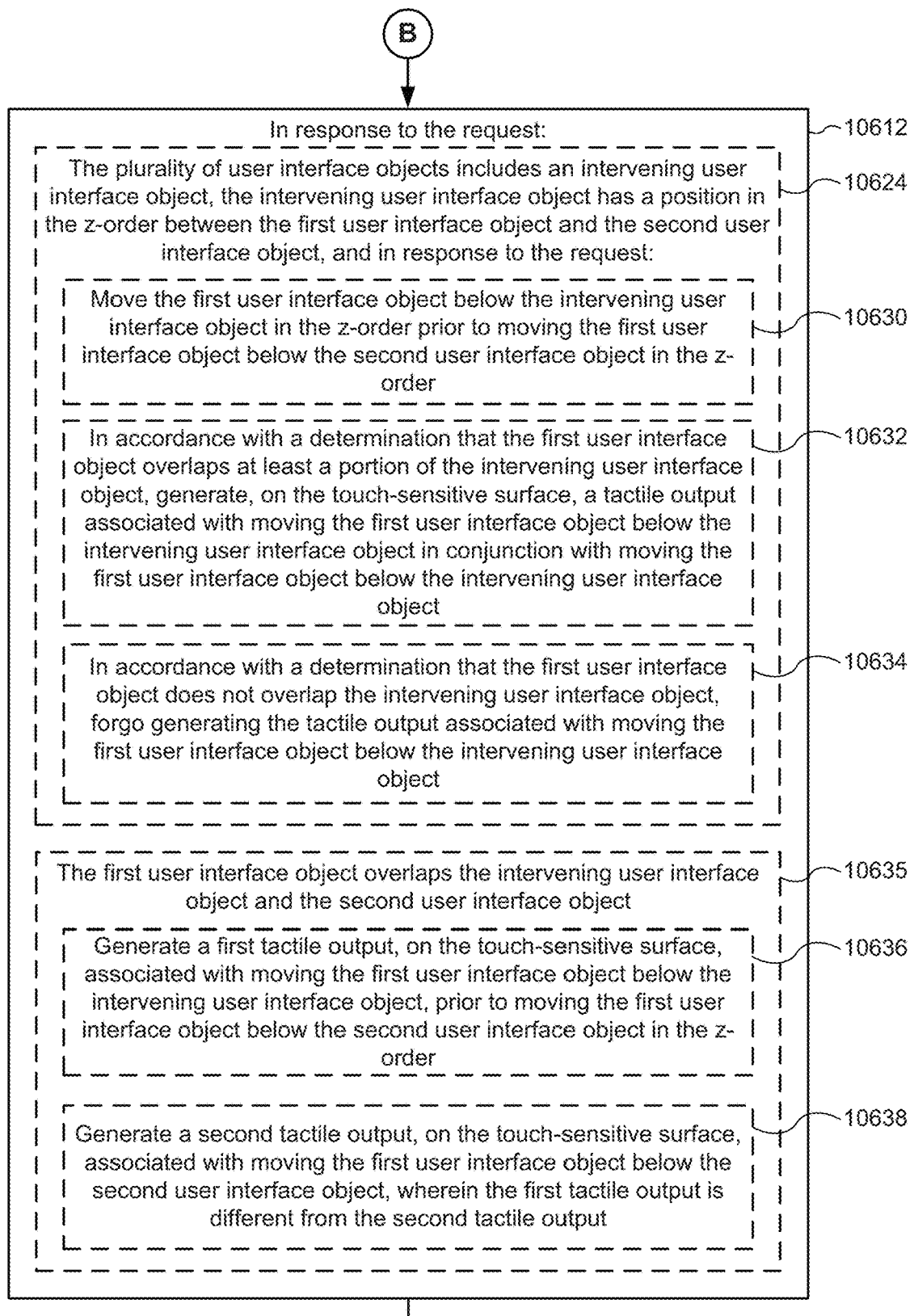

FIGS. 8P-8S illustrate an example of the user interfaces described above with reference to FIGS. 8A-8O implemented on a device with a touch-sensitive display (e.g., device 100 with touch screen 112). FIGS. 8P-8Q show objects 10532-1 and 10532-2 displayed on touch-sensitive display 112. Objects 10532-1 and 10532-2, which do not overlap, are displayed in a z-order, with object 10532-1 in front of object 10532-2 in the z-order.

FIG. 8P shows contact 10534 detected on touch-sensitive display 112 at a position over object 10532-1. While contact 10534 is detected on touch-sensitive display 112, a request to move object 10532-1 below object 10532-2 in the z-order is received by the device. The device optionally receives the request in the form of, for example, a gesture input performed on touch-sensitive display 112 (e.g., a gesture performed with contact 10534 over object 10532-1 or with another contact on touch-sensitive display 112) or an increase in the intensity of contact 10534 over object 10532-1 above the intensity threshold (e.g., an increase in intensity of contact 10534 from an intensity below $IT_D$ in FIG. 8P to an intensity above $IT_D$ in FIG. 8Q).

In response to the request, object 10532-1 is moved below object 10532-2 in the z-order, as shown in FIG. 8Q. In accordance with a determination that objects 10532-1 and 10532-2 do not overlap, no tactile output associated with the move of object 10532-1 below object 10532-2 is generated.

FIG. 8R shows overlapping objects 10532-1 and 10532-2 displayed on touch-sensitive display 112. Objects 10532-1 and 10532-2 are displayed in a z-order, with object 10532-1 in front of object 10532-2 in the z-order. FIG. 8R also shows contact 10536 detected on touch-sensitive display 112 at a position over object 10532-1. While contact 10536 is detected on touch-sensitive display 112, a request to move object 10532-1 below object 10532-2 in the z-order is received by the device. The device optionally receives the request in the form of, for example, a gesture input performed on touch-sensitive display 112 (e.g., a gesture performed with contact 10536 over object 10532-1 or with another contact on touch-sensitive display 112) or an increase in the intensity of contact 10536 over object 10532-1 above the intensity threshold (e.g., an increase in intensity of contact 10536 from an intensity below $IT_D$ in FIG. 8R to an intensity above $IT_D$ in FIG. 8S).

In response to the request, object 10532-1 is moved below object 10532-2 in the z-order, as shown in FIG. 8S. In accordance with a determination that objects 10532-1 and 10532-2 overlap, a tactile output 10537 associated with the move of object 10532-1 below object 10532-2 is generated in conjunction with the move of object 10532-1 below object 10532-2. The tactile output may be sensed by user via contact 10536 as a tactile sensation. In some embodiments, the tactile output is generated by movement of touch-sensitive display 112, and the movement includes a dominant movement component, which optionally has a waveform shape, such as a square, sine, squine, sawtooth, or triangle. In some embodiments, the tactile output associated with the move of object 10532-1 below object 10532-2 in the z-order has a wavelength that is determined based on a position of object 10532-2 in the z-order prior to receiving the request to move object 10532-1 below object 10532-2 in the z-order.

FIGS. 9A-9D are flow diagrams illustrating a method 10600 of indicating changes in the z-order of user interface objects in accordance with some embodiments. The method 10600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 10600 are, optionally, combined and/or the order of some operations is, optionally, changed.

As described below, the method 10600 provides an intuitive way to indicate changes in the z-order of user interface objects. The method reduces the cognitive burden on a user when indicating changes in the z-order of user interface objects, thereby creating a more efficient human-machine interface. For battery-operated electronic devices, enabling a user to perceive changes in the z-order of user interface objects faster and more efficiently conserves power and increases the time between battery charges.

The device displays (10602) a plurality of user interface objects on the display, where the plurality of user interface objects have a z-order, the plurality of user interface objects includes a first user interface object and a second user interface object, and the first user interface object is above the second user interface object in the z-order. Multiple user interface objects, such as objects 10506-1 and 10506-2, or objects 10532-1 and 10532-2, are, optionally, displayed with a z-order, as shown in FIG. 8A, 8D, or 8P, respectively. In FIGS. 8A and 8D, object 10506-1 is above object 10506-2 in the z-order. In FIG. 8P, object 10532-1 is above object 10532-2 in the z-order.

While detecting a contact (e.g., a finger contact) on the touch-sensitive surface, the device receives (10604) a request to move the first user interface object below the second user interface object in the z-order. For example, while a contact (e.g., contact 10510, FIG. 8A; contact 10512, FIG. 8D; contact 10518, FIG. 8F; contact 10520, FIG. 8H; contact 10524, FIG. 8J; contact 10526, FIG. 8M; contact 10534, FIG. 8Q; contact 10536, FIG. 8R), is detected on the touch-sensitive surface (e.g., touch-sensitive surface 451, touch-sensitive display 112), a request to move object 10506-1 below object 10506-2 is received.

In some embodiments, receiving the request to move the first user interface object below the second user interface object includes (10606), while a focus selector is over the first user interface object, detecting an increase in intensity of the contact above a respective intensity threshold (e.g., the deep press intensity threshold $IT_D$) Thus, the user is intuitively enabled to press the first user interface object "down" below the second user interface object in the z-order. For example, while contact cursor 10504 is located over object 10506-1, the intensity of contact 10510 (or contact 10512 or 10524 or 10526) is, optionally, increased from an intensity below $IT_D$ to an intensity above $IT_D$. In embodiments where the touch-sensitive surface is a touch-sensitive display (e.g., touch-sensitive display 112), receiving the request includes detecting an increase in intensity of the contact (e.g., an increase in intensity of contact 10534 or 10536 above the deep press intensity threshold $IT_D$) while the contact is over the first user object (e.g., object 10532-1).

In some embodiments, receiving the request to move the first user interface object below the second user interface object includes (10608), while displaying a control for changing a z-order of the first user interface object (e.g., a slider or other control that is separate/distinct from the first user interface object that determines a z-order of the first user interface object), detecting an input on the control that corresponds to moving the first user interface object downward in the z-order. The control for changing z-order is, optionally, slider 10514 (FIG. 8F). While z-order slider 10514 is displayed, an input corresponding to moving object 10506-1 downward (e.g., the gesture including movement 10519 of contact 10518 on touch-sensitive surface 451 while cursor 10504 is over slider thumb 10516-1) is detected. In response to detecting the gesture including movement 10519 of contact 10518 the device moves thumb 10516-1, which corresponds to object 10506-1, on slider 10514 that corresponds to moving object 10506-1 downward in the z-order.

In some embodiments, receiving the request to move the first user interface object below the second user interface object includes (10610), while displaying a control for changing a z-order of the second user interface object (e.g., a slider or other control that is separate/distinct from the second user interface object that determines a z-order of the first user interface object), detecting an input on the control that corresponds to moving the second user interface object upward in the z-order. The control for changing z-order is, optionally, slider 10514 (FIG. 8H). While z-order slider 10514 is displayed, an input corresponding to moving object 10506-2 upward (e.g., the gesture including movement 10523 of contact 10520 on touch-sensitive surface 451 while cursor 10504 is over slider thumb 10516-2) is detected. In response to detecting the gesture including movement 10523 of contact 10520, the device moves thumb 10516-2, which corresponds to object 10506-2, on slider 10514 that corresponds to moving object 10506-2 upward in the z-order.

In response (10612) to the request, the device moves (10614) the first user interface object below the second user interface object in the z-order. In response to the request, object 10506-1 (or 10532-1) is moved below object 10506-2 (or 10532-2) in the z-order, as shown in FIG. 8C (or 8E or 8G or 8I or 8L or 8O or 8Q or 8S).

In accordance with a determination that the first user interface object overlaps at least a portion of the second user interface object, the device generates (10616) a tactile output (e.g., 10513 in FIG. 8E, 8G or 8I; 10525 in FIG. 8L; 10528 in FIG. 8O; or 10537 in FIG. 8S) associated with moving the first user interface object below the second user interface object on the touch-sensitive surface in conjunction with moving the first user interface object below the second user interface object. If objects 10506-1 and 10506-2 (or objects 10532-1 and 10532-2) overlap, as shown in FIGS. 8D-8O or 8R-8S, a tactile output associated with the move of object 10506-1 (or object 10532-1) below object 10506-2 (or object 10532-2) is generated when object 10506-1 (or object 10532-1) is moved below object 10506-2 (or object 10532-2). In some embodiments, the tactile output associated with moving the first user interface object below the second user interface object has (10618) a wavelength that is determined based on a position of the second user interface object in the z-order prior to receiving the request to move the first user interface object below the second user interface object in the z-order (e.g., the lower the first user interface object is moved in z-order, the lower the pitch of the tactile output). For example, the tactile output associated with moving object 10506-1 below 10506-2 has a wavelength that is determined based on a position of object 10506-2 in the z-order prior to receiving the request to move object 10506-1 below object 10506-2 in the z-order.

In accordance with a determination that the first user interface object does not overlap the second user interface object, forgoes (10620) generating the tactile output associated with moving the first user interface object below the second user interface object. If objects 10506-1 and 10506-2 (or objects 10532-1 and 10532-2) do not overlap, as shown in FIGS. 8A-8C or 8P-8Q, no tactile output associated with the move of object 10506-1 (or object 10532-1) below object 10506-2 (or object 10532-2) is generated when object 10506-1 (or object 10532-1) is moved below object 10506-2 (or object 10532-2).

In some embodiments, the first user interface object overlaps (10622) at least a portion of the second user interface object when at least a portion of the first user interface object covers at least a portion of the second user interface object. In some embodiments, the first user interface object partially overlaps the second user interface object. In some embodiments, the first user interface object completely overlaps the second user interface object (e.g., the first user interface object covers all of the second user interface object). For example, in FIG. 8A, objects 10506-1 and 10506-2 do not overlap, and in FIG. 8D objects 10506-1 and 10506-2 overlap.

In some embodiments, the plurality of user interface objects includes (10624) an intervening user interface object, and the intervening user interface object has a position in the z-order between the first user interface object and the second user interface object. As shown in FIGS. 8J and 8M, for example, there is, optionally, an intervening object 10506-3 between objects 10506-1 and 10506-2 in the z-order. In some embodiments, when there is an intervening user interface object, in response (10612) to the request to move the first user interface object below the second user interface object in the z-order, the device moves (10630) the first user interface object below the intervening user interface object in the z-order prior to moving the first user interface object below the second user interface object in the z-order. In accordance with a determination that the first user interface object overlaps at least a portion of the intervening user interface object, the device generates (10632), on the touch-sensitive surface, a tactile output associated with moving the first user interface object below the intervening user interface object in conjunction with moving the first user interface object below the intervening user interface object. In accordance with a determination that the first user interface object does not overlap the intervening user interface object, the device forgoes generating the tactile output associated with moving the first user interface object below the intervening user interface object. In response to the request to move object 10506-1 below object 10506-2 in the z-order, object 10506-1 is moved below object 10506-3 on the way to being moved below object 10506-2 in the z-order, as shown in FIGS. 8J-8O. If objects 10506-1 and object 10506-3 do not overlap, as shown in FIGS. 8J-8K, no tactile output associated with the move of objects 10506-1 below object 10506-3 is generated. If objects 10506-1 and object 10506-3 overlap, as shown in FIGS. 8M-8N, a tactile output associated with the move of objects 10506-1 below object 10506-3 is generated.

In some embodiments, the first user interface object overlaps (10635) the intervening user interface object and the second user interface object, and in response (10612) to the request to move the first user interface object below the second user interface object in the z-order, the device generates (10636) a first tactile output, on the touch-sensitive surface, associated with moving the first user interface object below the intervening user interface object, prior to moving the first user interface object below the second user interface object in the z-order; and generates (10638) a second tactile output, on the touch-sensitive surface, associated with moving the first user interface object below the second user interface object, wherein the first tactile output is different from the second tactile output. For example, as shown in FIG. 8M, object 10506-1 overlaps with object 10506-3 and object 10506-2. In response to the request to move object 10506-1 below object 10506-2 in the z-order, object 10506-1 is moved below object 10506-3 and then moved below object 10506-2 in the z-order. As object 10506-1 overlaps with object 10506-3 and object 10506-2, Tactile Output A 10527 is generated for the move of object 10506-1 below object 10506-3, and Tactile Output B 10528 is generated for the move of object 10506-1 below object 10506-2. Tactile Output A 10527 and Tactile Output B 10528 are, optionally, different. For example, Tactile Output A 10527 and Tactile Output B 10528 optionally have different wavelengths or amplitude.

In some embodiments, the first tactile output is (10640) generated by movement of the touch-sensitive surface that includes a first dominant movement component (e.g., movement corresponding to an initial impulse of the first tactile output, ignoring any unintended resonance), the second tactile output is generated by movement of the touch-sensitive surface that includes a second dominant movement component (e.g., movement corresponding to an initial impulse of the second tactile output, ignoring any unintended resonance), and the first dominant movement component and the second dominant movement component have different wavelengths (e.g., while maintaining a same movement profile such as a same waveform shape such as square, sine, squine, sawtooth or triangle and/or while maintaining a same amplitude). Tactile Output A 10527 and Tactile Output B 10528 have respective dominant movement components that have different wavelengths. Thus, Tactile Output A 10527 for the move below object 10506-3 and Tactile Output B 10528 for the move below object 10506-2 may feel different to the user.

In some embodiments, the wavelength of the first tactile output is (10642) determined based on a position of the intervening user interface object in the z-order, and the wavelength of the second tactile output is determined based on a position of the second user interface object in the z-order (e.g., the tactile output that is generated when the first user interface object is moved past a respective user interface object is determined based on an absolute position of the respective user interface object in the z-order, which provides feedback to the user as to how far the first user interface object has been pushed down into the z-order). In FIGS. 8M-8O, for example, the wavelength of Tactile Output A 10527 is, optionally, determined based on the absolute position of object 10506-3 in the z-order, and the wavelength of Tactile Output B 10528 is, optionally, determined based on the absolute position of object 10506-2 in the z-order.

In some embodiments, the wavelength of the first tactile output is (10644) determined based on a number of user interface objects that the first user interface object overlaps that are between the first user interface object and the intervening user interface object in the z-order. In FIGS. 8M-8O, for example, the wavelength of Tactile Output A 10527 is, optionally, determined based on the number of user interface objects that overlap object 10506-1 and are between object 10506-1 and object 10506-3 in the z-order.

In some embodiments, the wavelength of the second tactile output is (10646) determined based on a number of user interface objects that the first user interface object overlaps that are between the first user interface object and the second user interface object in the z-order (e.g., the tactile output that is generated when the first user interface object is moved past a respective user interface object is determined based on how many other objects are between the first user interface object and the respective object, which provides feedback to the user as to how far the user interface object has been pushed down into a "local" z-order for objects that are in the same general area of the user interface and overlap each other). In FIGS. 8M-8O, for example, the wavelength of Tactile Output B 10528 is, optionally, determined based on the number of user interface objects that overlap object 10506-1 and are between object 10506-1 and object 10506-2 in the z-order.

In some embodiments, the first user interface overlaps (10648) a plurality of other user interface objects arranged in a respective z-order sequence and a next tactile output (e.g., a pitch/wavelength/intensity of the next tactile output) corresponding to movement of the first user interface object below a next user interface object in the z-order sequence is based on a mathematical progression from a prior tactile output corresponding to movement of the first user interface object below a prior user interface object in the z-order sequence (e.g., each successive tactile output doubles the wavelength of the prior tactile output).

In some embodiments, the first user interface overlaps (10650) a plurality of other user interface objects arranged in a respective z-order sequence and a next tactile output (e.g., a pitch/wavelength/intensity of the next tactile output) corresponding to movement of the first user interface object below a next user interface object in the z-order sequence is based on a musical progression from a prior tactile output corresponding to movement of the first user interface object below a prior user interface object in the z-order sequence (e.g., each successive tactile output corresponds to a next note in a predefined musical scale or the same note in a lower octave).

For example, in some circumstances, object 10506-1 overlaps multiple other user interface objects arranged in a respective z-order sequence irrespective of whether object 10506-1 overlaps with object 10506-2. Thus, in some embodiments, the z-order includes object 10506-1, the multiple other user interface objects behind object 10506-1, and then object 10506-2. Thus, when object 10506-1 is moved below object 10506-2 in the z-order, in accordance with a request to move object 10506-1 below object 10506-2 in the z-order, object 10506-1 is moved below each of the multiple other user interface objects in z-order sequence before being moved below object 10506-2. In this example, for each of the multiple other user interface objects that objects 10506-1 moves below, a tactile output is generated in conjunction with the move of object 10506-1 below the respective other user interface object. Thus, as object 10506-1 is moved below the multiple other user interface objects, a sequence of tactile outputs is generated. In some embodiments, the sequence of tactile outputs is generated based on a mathematical progression. For example, each successive tactile output has a wavelength that is double the wavelength of the preceding tactile output. In some other embodiments, the sequence of tactile outputs is generated based on a musical progression. For example, each successive tactile output corresponds to a next note in a predefined musical scale or the same note in a lower octave.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 10600 described above with respect to FIGS. 9A-9D. For example, the contacts, gestures, user interface objects, tactile outputs, intensity thresholds, and focus selectors described above with reference to method 10600 optionally has one or more of the characteristics of the contacts, gestures, user interface objects, tactile outputs, intensity thresholds, and focus selectors described herein with reference to other methods described herein (e.g., those listed in the fifth paragraph of the Description of Embodiments). For brevity, these details are not repeated here.

Figure 10:
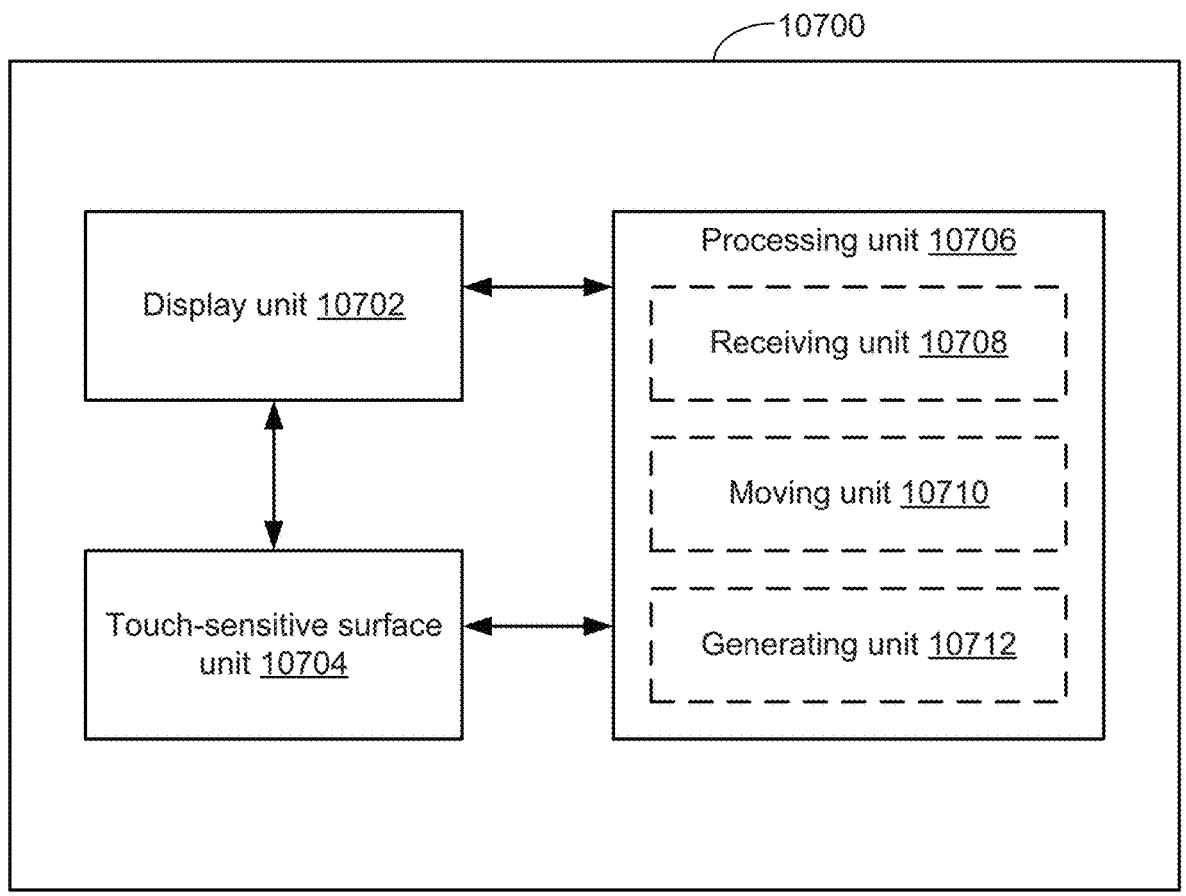
FIG. 10 is a functional block diagram of an electronic device in accordance with some embodiments.

In accordance with some embodiments, FIG. 10 shows a functional block diagram of an electronic device 10700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 10700 includes a display unit 10702 configured to display a plurality of user interface objects on the display unit 10702, where: the plurality of user interface objects have a z-order, the plurality of user interface objects includes a first user interface object and a second user interface object, and the first user interface object is above the second user interface object in the z-order; a touch-sensitive surface unit 10704 configured to receive contacts; and a processing unit 10706 coupled to the display unit 10702 and the touch-sensitive surface unit 10704. In some embodiments, the processing unit 10706 includes a receiving unit 10708, a moving unit 10710, and a generating unit 10712.

The processing unit 10706 is configured to: while detecting a contact on the touch-sensitive surface unit 10704, receive a request to move the first user interface object below the second user interface object in the z-order (e.g., with the receiving unit 10708); and in response to the request: move the first user interface object below the second user interface object in the z-order (e.g., with the moving unit 10710); in accordance with a determination that the first user interface object overlaps at least a portion of the second user interface object, generate a tactile output associated with moving the first user interface object below the second user interface object on the touch-sensitive surface unit 10704 in conjunction with moving the first user interface object below the second user interface object (e.g., with the generating unit 10712); and in accordance with a determination that the first user interface object does not overlap the second user interface object, forgo generating the tactile output associated with moving the first user interface object below the second user interface object (e.g., with the generating unit 10712).

In some embodiments, the first user interface object overlaps at least a portion of the second user interface object when at least a portion of the first user interface object covers at least a portion of the second user interface object.

In some embodiments, receiving the request to move the first user interface object below the second user interface object includes, while a focus selector is over the first user interface object, detecting an increase in intensity of the contact above a respective intensity threshold.

In some embodiments, receiving the request to move the first user interface object below the second user interface object includes, while displaying a control for changing a z-order of the first user interface object, detecting an input on the control that corresponds to moving the first user interface object downward in the z-order.

In some embodiments, receiving the request to move the first user interface object below the second user interface object includes, while displaying a control for changing a z-order of the second user interface object, detecting an input on the control that corresponds to moving the second user interface object upward in the z-order.

In some embodiments, the plurality of user interface objects includes an intervening user interface object, and the intervening user interface object has a position in the z-order between the first user interface object and the second user interface object. The processing unit 10706 is configured to: in response to the request to move the first user interface object below the second user interface object in the z-order: move the first user interface object below the intervening user interface object in the z-order prior to moving the first user interface object below the second user interface object in the z-order (e.g., with the moving unit 10710); in accordance with a determination that the first user interface object overlaps at least a portion of the intervening user interface object, generate, on the touch-sensitive surface unit 10704, a tactile output associated with moving the first user interface object below the intervening user interface object in conjunction with moving the first user interface object below the intervening user interface object (e.g., with the generating unit 10712); and in accordance with a determination that the first user interface object does not overlap the intervening user interface object, forgo generating the tactile output associated with moving the first user interface object below the intervening user interface object (e.g., with the generating unit 10712).

In some embodiments, the first user interface object overlaps the intervening user interface object and the second user interface object. The processing unit 10706 is configured to: in response to the request to move the first user interface object below the second user interface object in the z-order: generate a first tactile output, on the touch-sensitive surface unit 10704, associated with moving the first user interface object below the intervening user interface object, prior to moving the first user interface object below the second user interface object in the z-order (e.g., with the generating unit 10712); and generate a second tactile output, on the touch-sensitive surface unit 10704, associated with moving the first user interface object below the second user interface object, wherein the first tactile output is different from the second tactile output (e.g., with the generating unit 10712).

In some embodiments, the first tactile output is generated by movement of the touch-sensitive surface unit 10704 that includes a first dominant movement component, the second tactile output is generated by movement of the touch-sensitive surface unit 10704 that includes a second dominant movement component, and the first dominant movement component and the second dominant movement component have different wavelengths.

In some embodiments, the wavelength of the first tactile output is determined based on a position of the intervening user interface object in the z-order, and the wavelength of the second tactile output is determined based on a position of the second user interface object in the z-order.

In some embodiments, the wavelength of the first tactile output is determined based on a number of user interface objects that the first user interface object overlaps that are between the first user interface object and the intervening user interface object in the z-order.

In some embodiments, the wavelength of the second tactile output is determined based on a number of user interface objects that the first user interface object overlaps that are between the first user interface object and the second user interface object in the z-order.

In some embodiments, the tactile output associated with moving the first user interface object below the second user interface object has a wavelength that is determined based on a position of the second user interface object in the z-order prior to receiving the request to move the first user interface object below the second user interface object in the z-order.

In some embodiments, the first user interface overlaps a plurality of other user interface objects arranged in a respective z-order sequence and a next tactile output corresponding to movement of the first user interface object below a next user interface object in the z-order sequence is based on a mathematical progression from a prior tactile output corresponding to movement of the first user interface object below a prior user interface object in the z-order sequence.

In some embodiments, the first user interface overlaps a plurality of other user interface objects arranged in a respective z-order sequence and a next tactile output corresponding to movement of the first user interface object below a next user interface object in the z-order sequence is based on a musical progression from a prior tactile output corresponding to movement of the first user interface object below a prior user interface object in the z-order sequence.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9D are, optionally, implemented by components depicted in FIGS. 1A-1B or FIG. 10. For example, receiving operation 10604, moving operation 10614, generating operation 10616, and forgoing operation 10620 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Tactile Feedback Warning a User

Many electronic devices have graphical user interfaces that display user interface objects that can be manipulated by adjusting one or more associated parameter. For example, a graphical user interface optionally displays one or more user interface object (e.g., an image, media clip, audio clip, shape, application window, folder, menu or status bar) that the user can customize (e.g., enlarge, shrink, crop, rotate, increase volume, decrease volume or otherwise manipulate a visual or audio parameter) through a user interface (e.g., mouse, touch-sensitive surface or keyboard). Due to practical considerations, such as size constraints of an associated display, power constraints of an associated speaker and inherent properties of the user interface object (e.g., size, shape, length and volume), predefined adjustment limits are commonly assigned to these user interface object, limiting the extent to which their properties can be adjusted. Given the complexity of a user interface environment where predefined adjustment limits are applied to user interface objects, there is a need to provide feedback that enables the user to more efficiently and conveniently adjust the properties of these user interface objects with respect to the predefined adjustment limits and alert a user when the predefined adjustment limits have been reached or exceeded.

The embodiments described below provide improved methods and user interfaces for generating feedback to a user navigating a complex user interface. More specifically, these methods and user interfaces provide tactile feedback to the user when an action will result in the adjustment of a user interface object parameter beyond a predefined limit. The tactile feedback warns the user when their action will result in the adjustment of a user interface object parameter beyond a predefined adjustment limit. In this fashion, the methods and user interfaces provided below allow the user to more efficiently discern between allowed, forbidden and non-recommended parameter adjustments by providing tactile feedback, instead of or in addition to audible and/or visual feedback. Some methods for warning a user that a predefined adjustment limit has been exceeded rely on an audible or visual cue. However, there are many situations (e.g., at work, in a theatre an in various social situations) where the volume of an electronic device will be lowered or muted, rendering audible cues ineffective. Advantageously, the methods and user interfaces described below augment or replace audible feedback by providing tactile feedback indicating that a predefined adjustment limit has been or will be exceeded, rendering the warning effective even when the volume of the electronic device has been lowered or muted.

FIGS. 11A-11T illustrate exemplary user interfaces for providing feedback when an action will result in the adjustment of a parameter beyond a predefined limit in accordance with some embodiments. The user interfaces in these figures are used to illustrate the processes described below, including the processes in FIGS. 12A-12B.

FIG. 11A illustrates exemplary user interface 10808 displaying images 10814-10830 and a control icon 10802 (e.g., a thumb or handle of a control) for controlling a parameter (e.g., size) of the images in accordance with some embodiments. In FIG. 11A, user interface 10808 is displayed on display 450 of an electronic device that also includes touch-sensitive surface 451 and one or more sensors for detecting intensity of contacts with touch-sensitive surface. In some embodiments, touch-sensitive surface 451 is a touch screen display that is optionally display 450 or a separate display. User interface 10808 displays a control icon 10802 for controlling a parameter (e.g., size) associated with respective content (e.g., images 10814, 10816, 10818, 10820, 10822, 10824, 10826, 10828 and 10830 displayed on user interface 10808). In FIG. 11A, user interface 10808 also displays cursor 10806, controllable by the user through contacts on touch-sensitive surface 451. For example, detection of movement of a contact (e.g., a gesture) on touch-sensitive surface 451 corresponds to movement of cursor 10806 on user interface 10808. In FIG. 11A, user interface 10808 also displays sizing bar 10804, corresponding to a plurality of sizes for the displayed content (e.g., images). In FIG. 11A, the left and right boundaries of sizing bar 10804 correspond to predefined sizing limits for the displayed content (e.g., images). For example, when control icon 10802 is moved to the left boundary of sizing bar 10804, the displayed content (e.g., images) are displayed at a size corresponding to a predefined minimum size (e.g., the displayed images are shrunk to a smallest allowable size). Likewise, when control icon 10802 is moved to the right boundary of sizing bar 10804, the displayed content (e.g., images) are displayed at a size corresponding to a predefined maximum size (e.g., the displayed images are expanded to a largest allowable size).

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 11A-11T and FIGS. 12A-12B will be discussed with reference to display 450 and a separate touch-sensitive surface 451, however analogous operations are, optionally, performed on a device with a touch-sensitive display system 112 in response to detecting movement of the contacts described in FIGS. 11A-11T on the touch-sensitive display system 112 while displaying the user interfaces shown in FIGS. 11A-11T on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 10806.

Figure 11B:
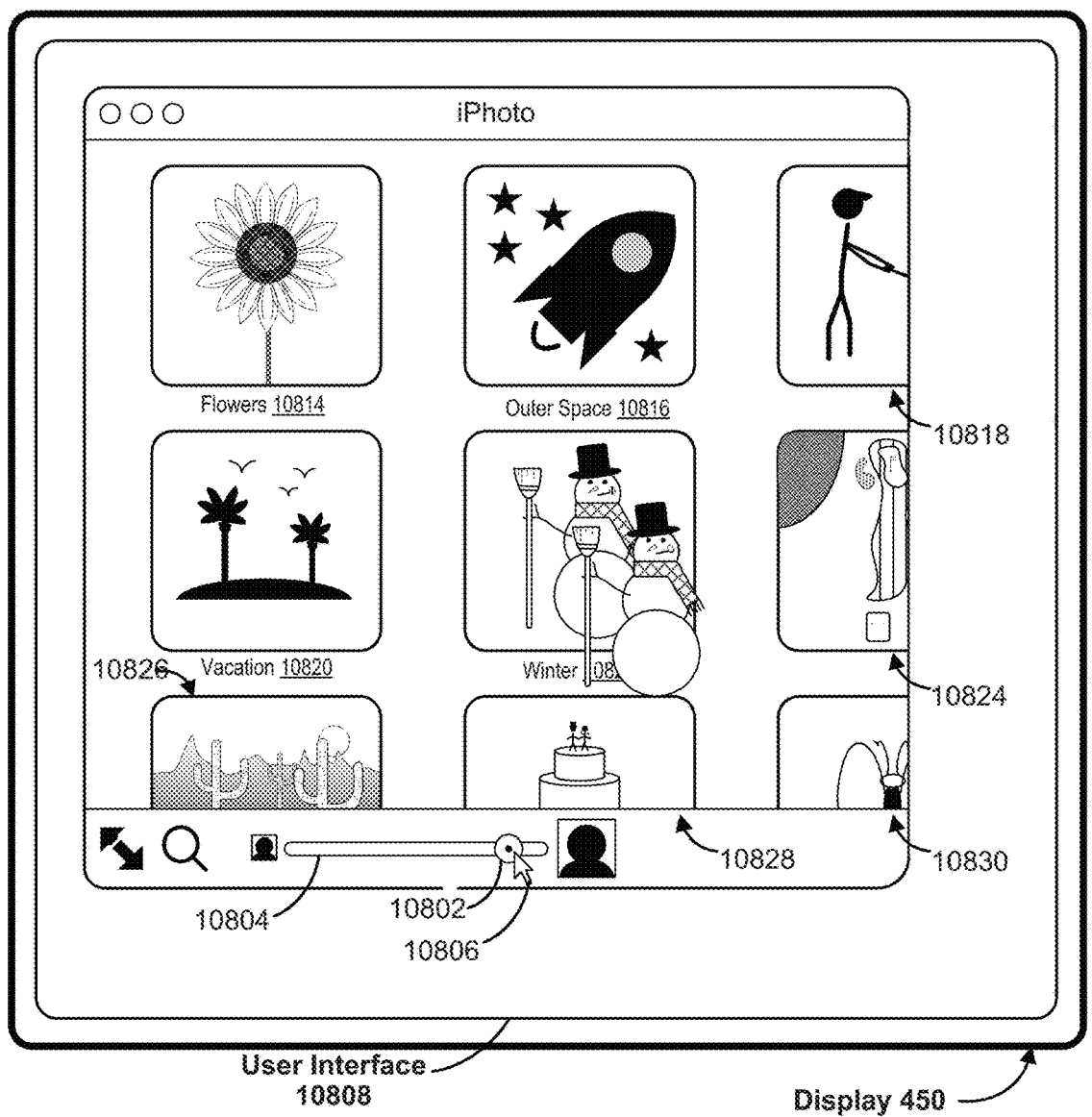
Figure 11B:
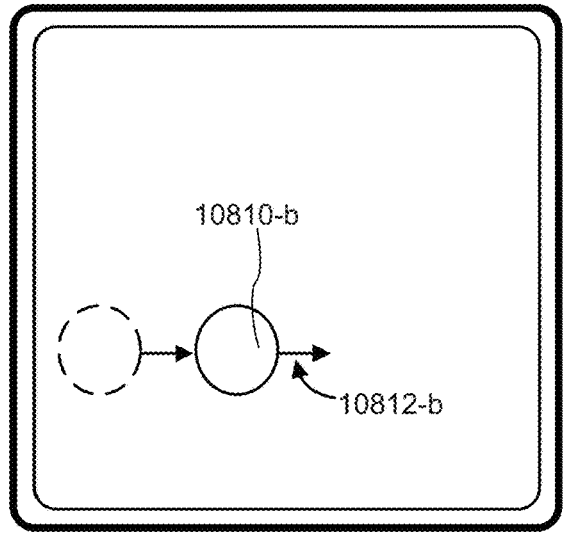
Figure 11C:
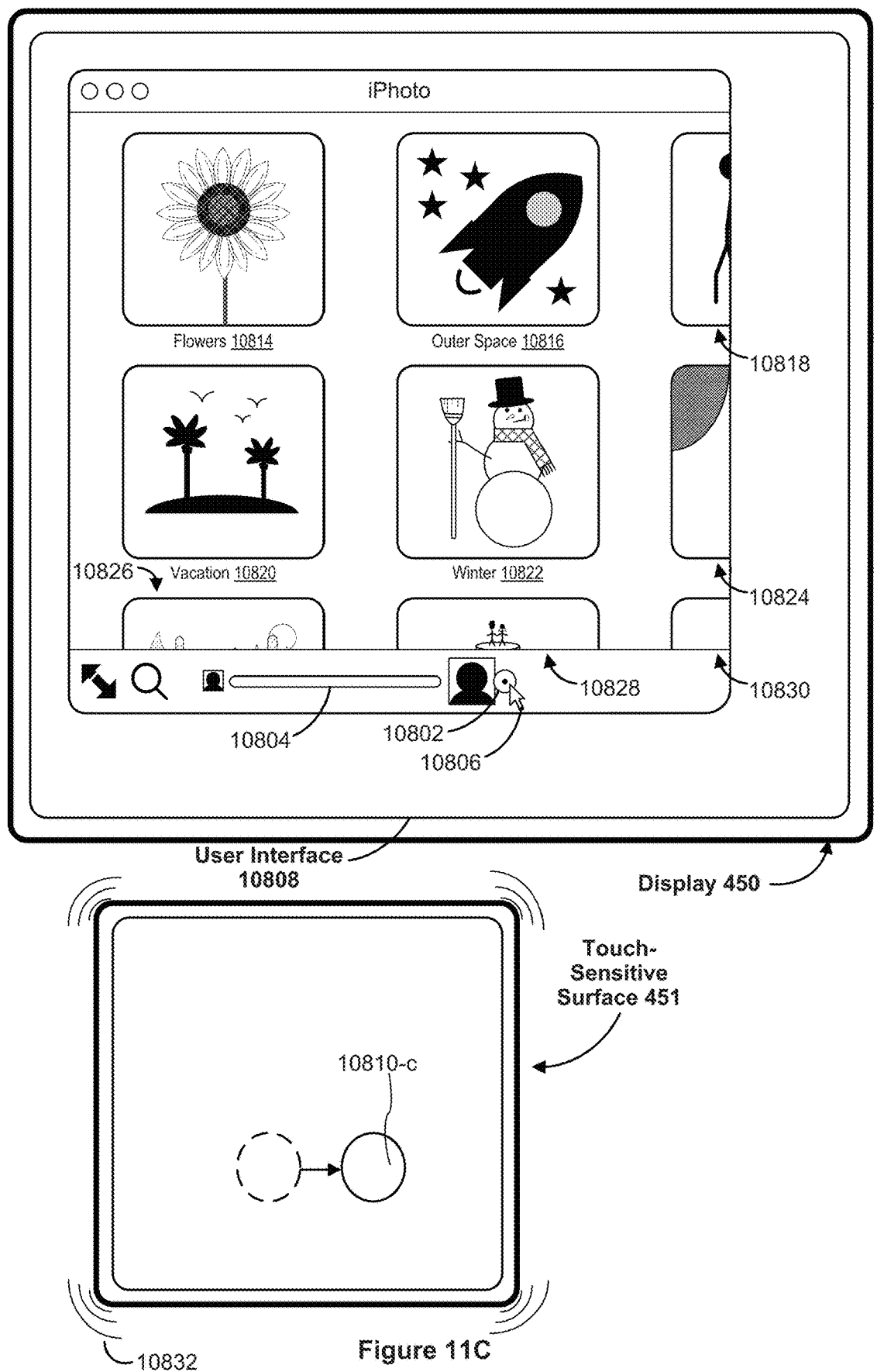
Figure 11D:
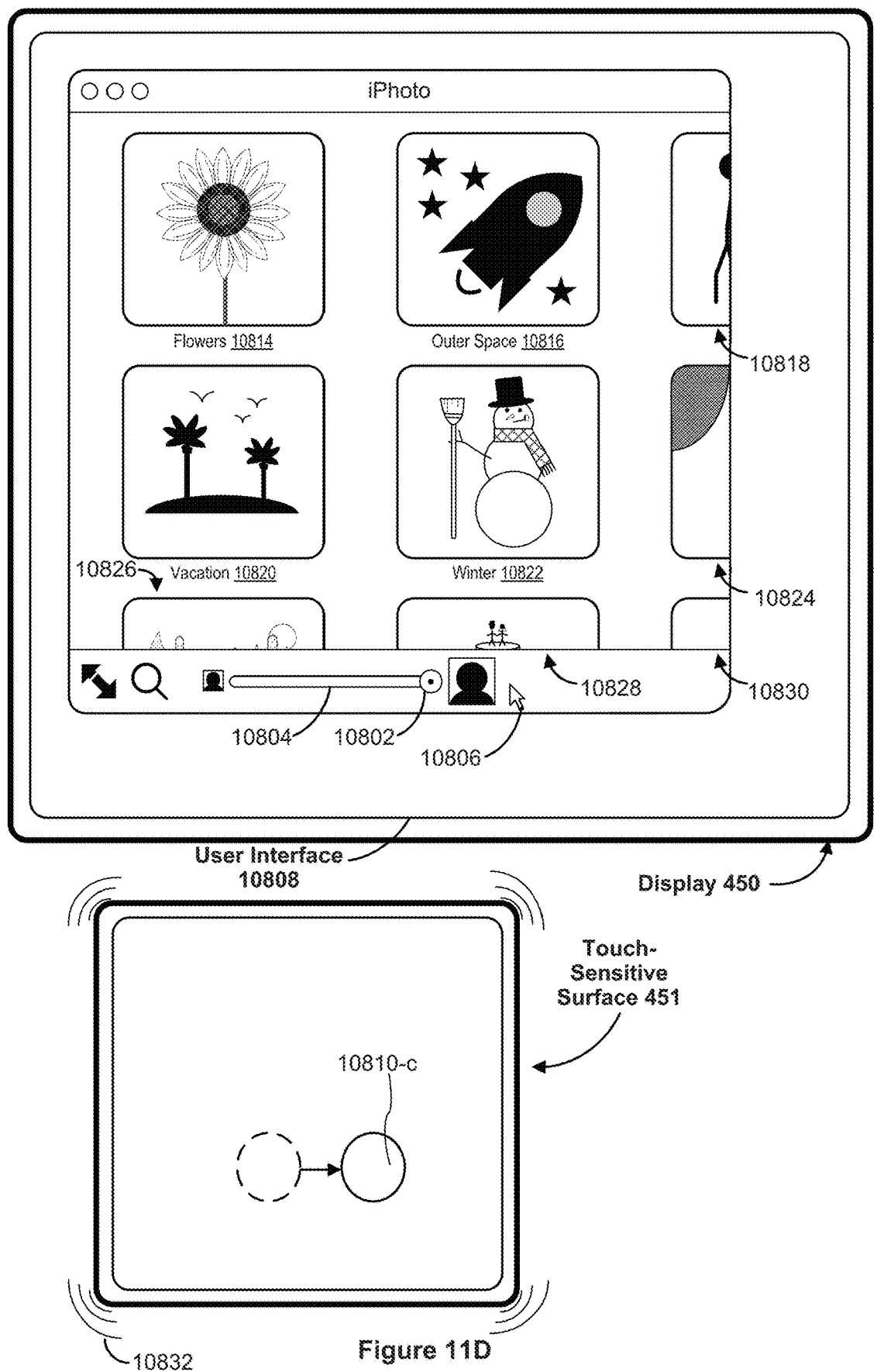
Figure 11E:
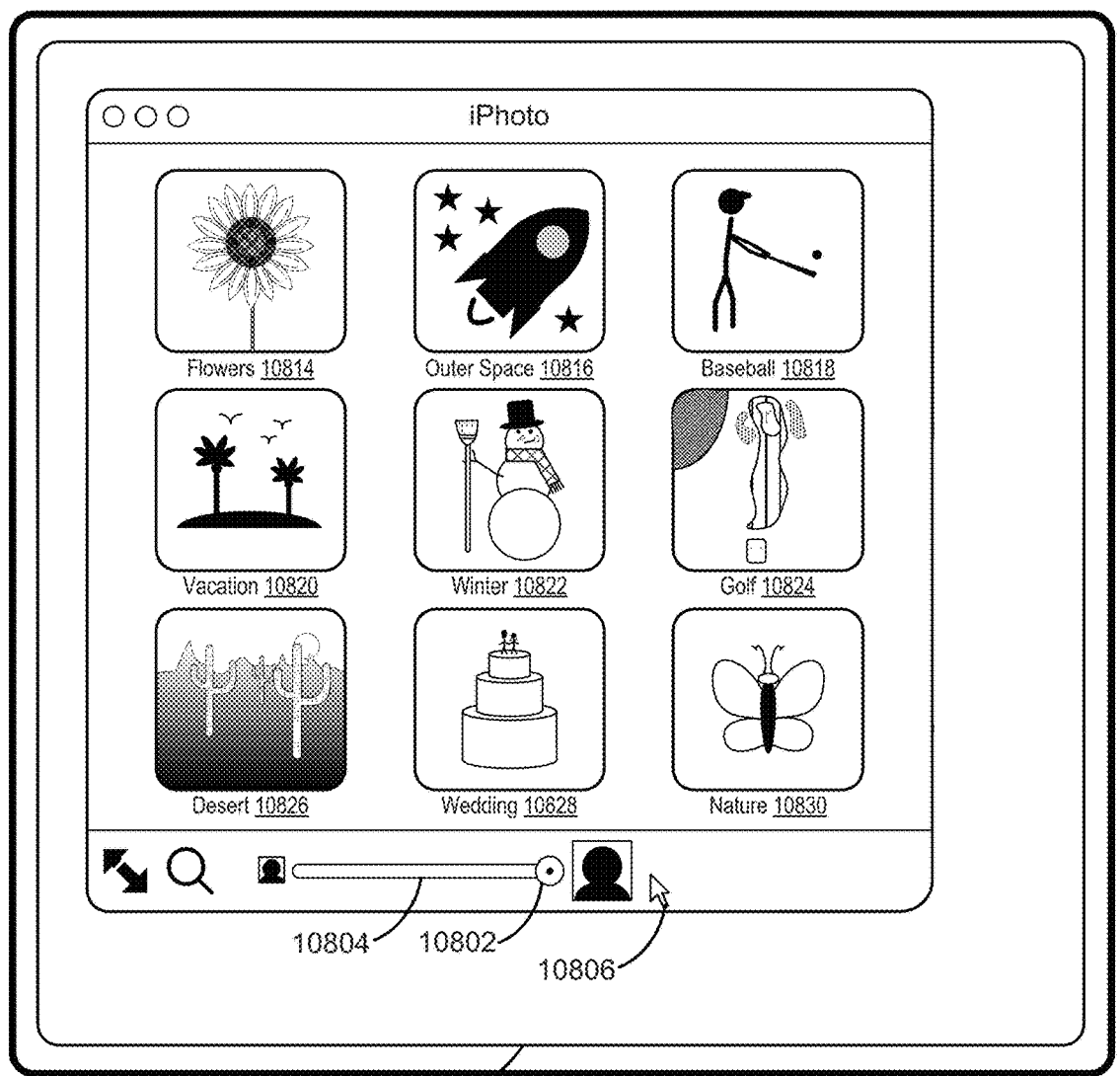
Figure 11E:
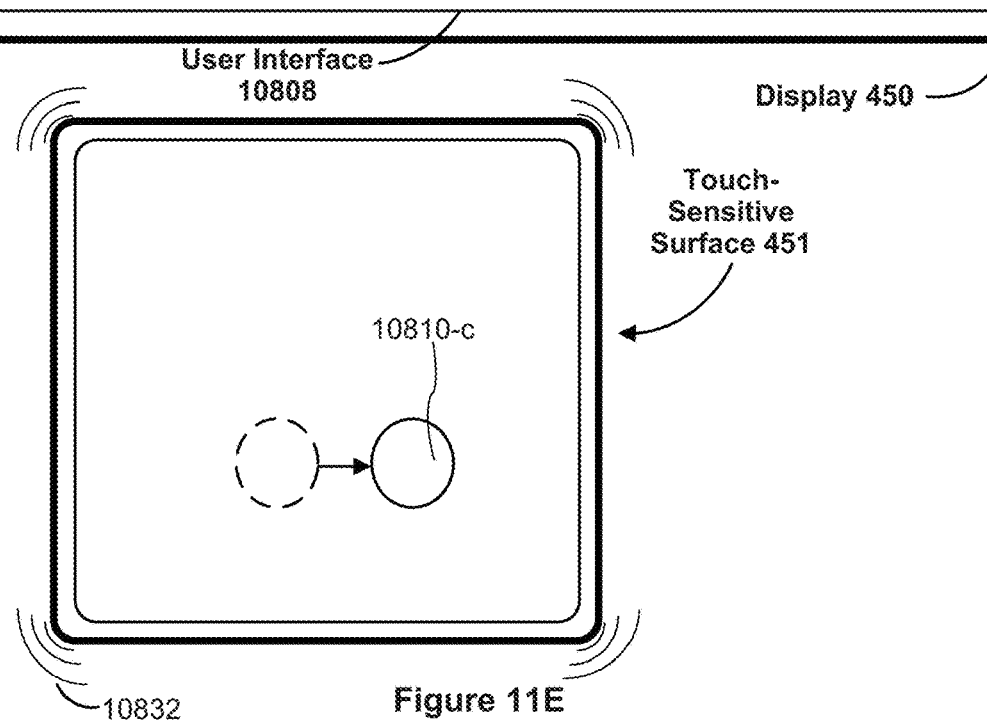
Figure 11F:
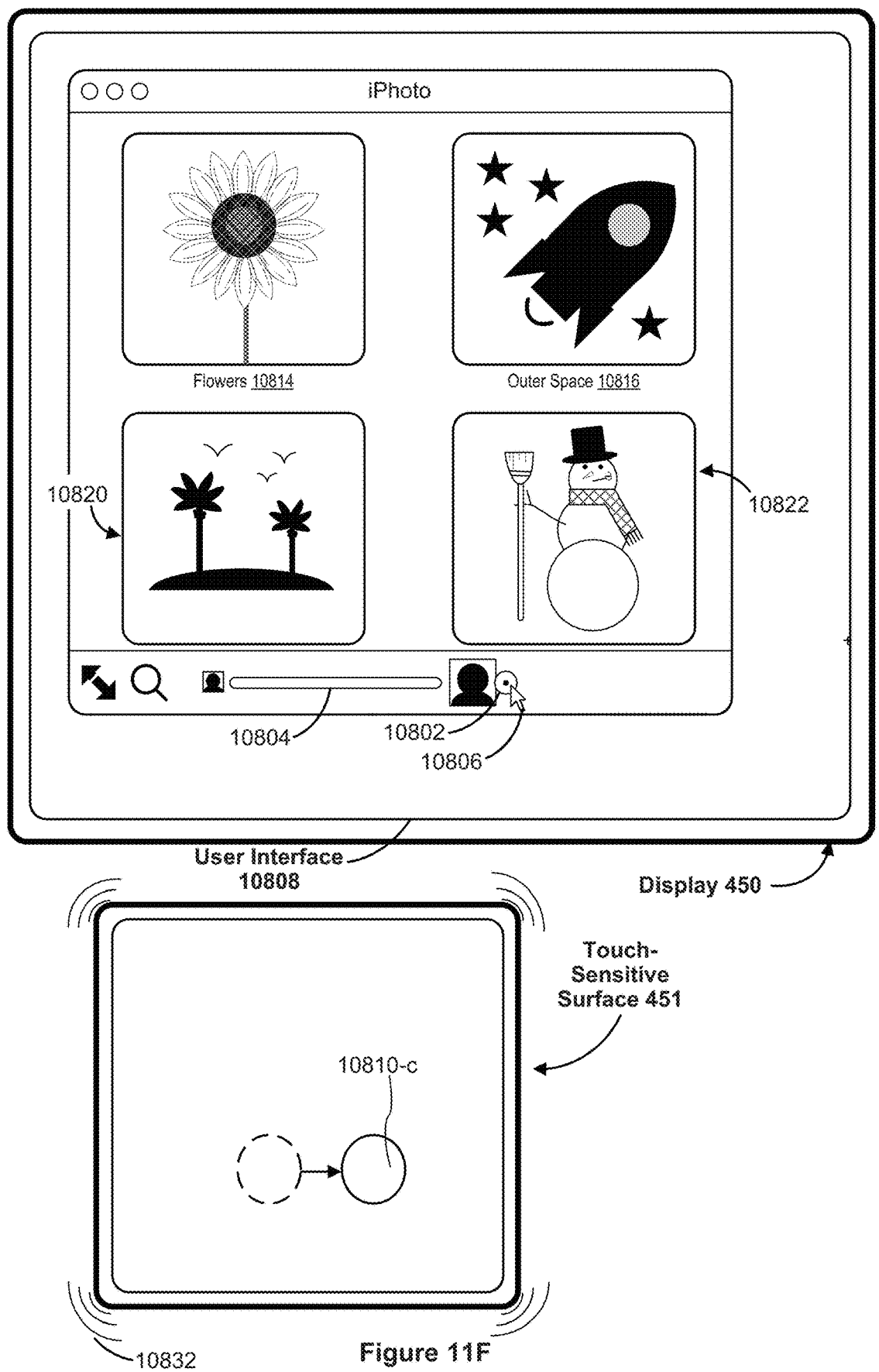
Figure 11G:
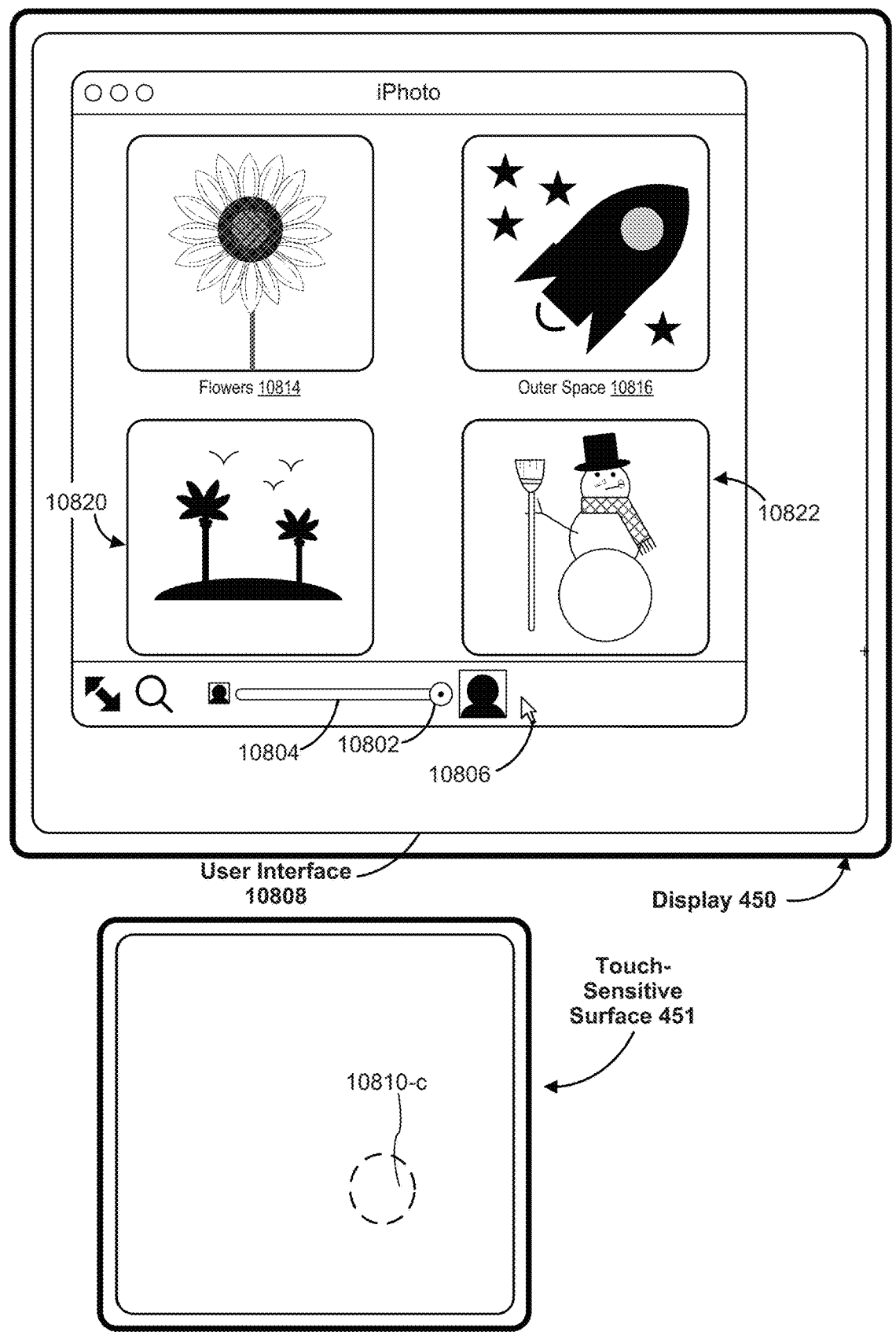
Figure 11H:
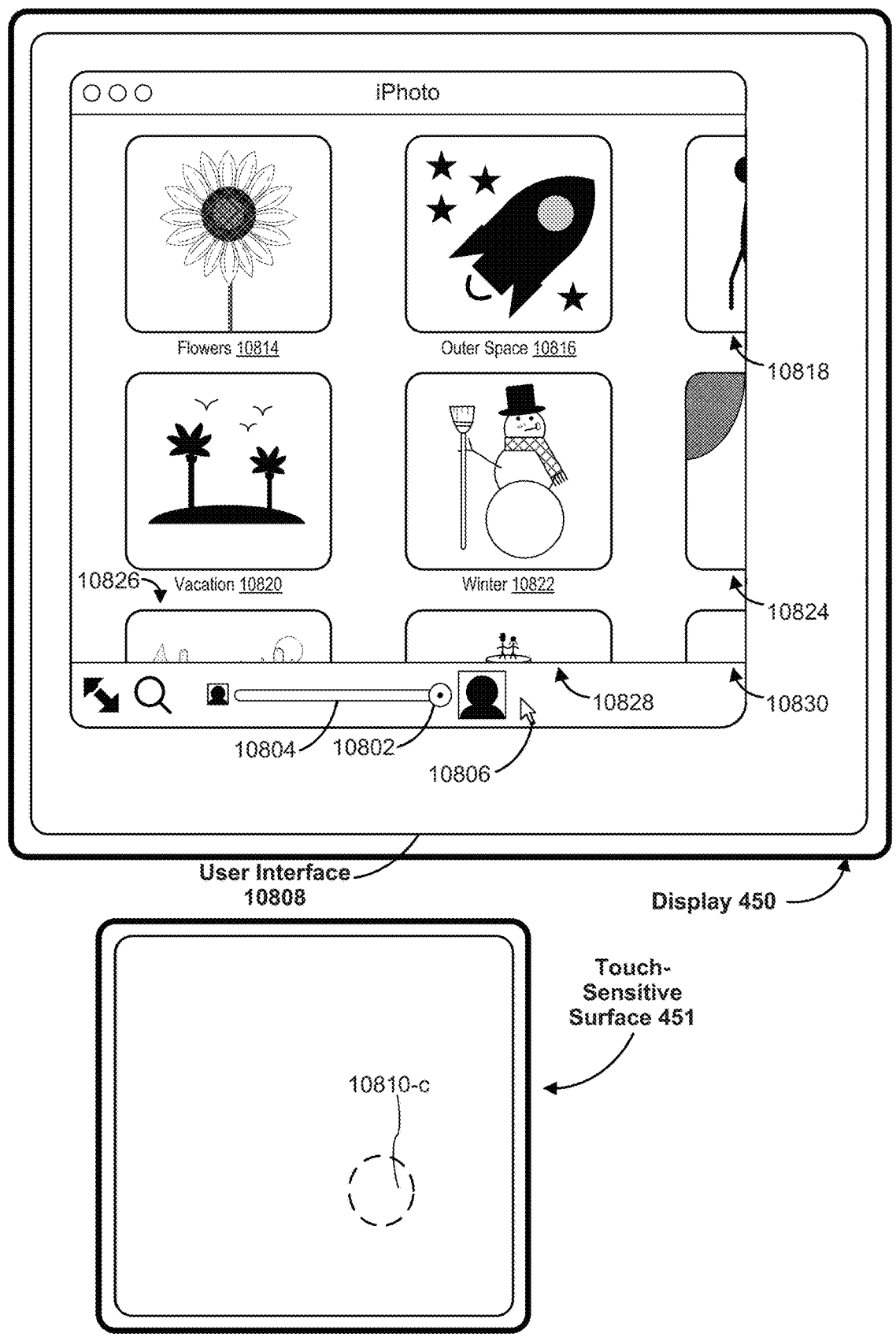

FIGS. 11A-11H illustrate that contact 10810 and a gesture including movement of contact 10810 are detected on touch-sensitive surface 451 (e.g., movement 10812-*a* of contact 10810 from location 10810-*a* in FIG. 11A to location 10810-*b* in FIG. 11B; movement 10812-*b* of contact 10810 from location 10810-*b* in FIG. 11B to location 10810-*c* in FIG. 11C, FIG. 11D, FIG. 11E or FIG. 11F; and/or liftoff of contact 10810 from location 10810-*c* in FIG. 11G or FIG. 11H). Contact 10810 is detected at a position on touch-sensitive surface 451 corresponding to an area on display 450 occupied by control icon 10802 (e.g., contact 10810 corresponds to a focus selector on the display, such as cursor 10806 which is at or near a location of user interface object 10802). In some embodiments, movement of contact 10810 on touch-sensitive surface 451 that corresponds to movement of focus selector (e.g., a cursor 10806) on display 450 (e.g., as illustrated in FIGS. 11A-11F).

FIGS. 11A-11B illustrate an example of a beginning of a gesture where the device adjusts a size of images 10814, 10816, 10818, 10820, 10822, 10824, 10826, 10828 and 10830 in accordance with movement 10812-*a* of contact 10810 that controls movement of cursor 10806 corresponding to movement of a control icon 10802 in sizing bar 10804. In FIG. 11B, the device does not generate a tactile output corresponding to exceeding the predefined adjustment limit (e.g., a size limit corresponding to the end of sizing bar 10804), because the predefined adjustment limit has not been exceeded. FIG. 11B illustrates an example where, in accordance with a determination that the adjustment of the parameter (e.g., size) would not cause one or more predefined adjustment limit to be exceeded (e.g., movement of control icon 10802 into a respective area of the display that is within a predefined adjustment limit indicated by the right boundary of sizing bar 10804), the electronic device adjusts the parameter without generating a tactile output on the touch-sensitive surface (e.g., the device increases the size of images 10814, 10816, 10818, 10820, 10822, 10824, 10826, 10828 and 10830 displayed in user interface 10808 to a size smaller than the predefined maximum size limit in accordance with the value of the parameter that corresponds to the current location of control icon 10802 in the respective area of the display). In contrast, FIGS. 11C-11F, described below, illustrate examples where, in accordance with a determination that the adjustment of the parameter (e.g., size) would cause one or more predefined adjustment limit to be exceeded (e.g., where the movement of contact 10810 on the touch-sensitive surface 451 corresponds to a size adjustment of the displayed pictures exceeding a predefined limit indicated by the right boundary of sizing bar 10804), tactile output generators 167 generate tactile outputs 10832 on touch-sensitive surface 451.

FIGS. 11B-11F illustrate various examples where the device detects a continuation of a gesture including movement 10812-*b* of contact 10810 that controls movement of cursor 10806 beyond an end of sizing bar 10804. In FIG. 11C, in response to detecting the continuation of the gesture including movement 10812-*b*, the device continues to increase the size of the images up to the predefined adjustment limit (e.g., a size limit) and moves control icon 10802 beyond an end of sizing bar 10804 in accordance with movement of cursor 10806. In FIG. 11D, in response to detecting the continuation of the gesture including movement 10812-*b*, the device continues to increase the size of the images up to the predefined adjustment limit (e.g., a size limit) and moves control icon 10802 up to an end of sizing bar 10804 in accordance with movement of cursor 10806. In FIG. 11E, in response to detecting the continuation of the gesture including movement 10812-*b*, the device cancels the increase in size of the images corresponding to the gesture and moves control icon 10802 up to an end of sizing bar 10804 in accordance with movement of cursor 10806. In FIG. 11F, in response to detecting the continuation of the gesture including movement 10812-*b*, the device continues to increase the size of the images beyond the predefined adjustment limit (e.g., a size limit) and moves control icon 10802 beyond an end of sizing bar 10804 in accordance with movement of cursor 10806.

FIGS. 11C and 11F illustrate examples where the device detects movement 10812-*b* of contact 10810 on touch-sensitive surface 451 that corresponds to movement of cursor 10806 and control icon 10802 past the right boundary of sizing bar 10804 displayed on display 450 (e.g., movement of cursor 10806 and control icon 10802 into a respective area of the display that corresponds to an parameter adjustment exceeding a predefined adjustment limit for the displayed content).

FIGS. 11D-11E illustrate examples where the device detects movement 10812-*b* of contact 10810 on touch-sensitive surface 451 that corresponds to movement of cursor 10806 past the right boundary of sizing bar 10804 displayed on display 450 (e.g., movement of control icon 10802 into a respective area of the display that corresponds to a parameter adjustment exceeding a predefined adjustment limit for the displayed content) and movement of control icon 10802 to the right boundary of sizing bar 10804 displayed on the display (e.g., movement of control icon 10802 into a respective area of the display that corresponds to an predefined adjustment limit for the displayed content, even though the extent of the movement 10812-*b* of contact 10810 corresponds to an adjustment of the parameter that exceeds the predefined adjustment limit).

FIGS. 11C-11F illustrate examples where, in accordance with a determination that the adjustment of the parameter (e.g., size) would cause one or more predefined adjustment limit to be exceeded (e.g., where the extent of the movement 10812-*b* of contact 10810 corresponds to a size adjustment of the displayed pictures exceeding a predefined limit indicated by the right boundary of sizing bar 10804), tactile output generators 167 generate tactile outputs 10832 on touch-sensitive surface 451 that indicate to the user that the gesture corresponds to an adjustment of the parameter that would exceed the predefined adjustment limit.

FIGS. 11C-11D illustrate examples where, in accordance with a determination that the adjustment of the parameter would cause the one or more predefined adjustment limits to be exceeded, the parameter is adjusted so that the predefined adjustment limit is reached (e.g., the size of images 10814, 10816, 10818, 10820, 10822, 10824, 10826, 10828 and 10830 displayed on user interface 10808 is increased to the predefined maximum size limit).

FIG. 11E illustrates an example where, in accordance with a determination that the adjustment of the parameter would cause the one or more predefined adjustment limits to be exceeded, adjustment of the parameter is cancelled (e.g., the size of images 10814, 10816, 10818, 10820, 10822, 10824, 10826, 10828 and 10830 displayed on user interface 10808 is adjusted back to the size the images were displayed at prior to detecting the movement 10812-*a* and 10812-*b* of contact 10810).

FIG. 11F illustrates an example where, in accordance with a determination that the adjustment of the parameter would cause the one or more predefined adjustment limits to be exceeded, the parameter is adjusted accordingly such that the predefined adjustment limit is exceeded (e.g., the size of images 10814, 10816, 10818, 10820, 10822, 10824, 10826, 10828 and 10830 displayed on user interface 10808 is increased past the predefined maximum size limit).

FIGS. 11G-11H illustrate various examples where the device detects liftoff of a contact 10810 used to perform one of the gestures described above with reference to FIGS. 11A-11F. FIG. 11G illustrates an example where, in response to liftoff of contact 10810 in FIG. 11F, adjustment of the parameter exceeding the predefined adjustment limit is not reversed (e.g., the size of images 10814, 10816, 10818, 10820, 10822, 10824, 10826, 10828 and 10830 displayed on user interface 10808, increased past the predefined maximum size limit in FIG. 11F, is maintained after liftoff of contact 10810). In this example, in response to detecting liftoff of contact 10810, the device moves control icon 10802 back to an end of scroll bar 10804. FIG. 11H illustrates an example where, in response to liftoff of contact 10810 in FIG. 11F, adjustment of the parameter exceeding the predefined adjustment limit is partially reversed to match the predefined adjustment limit (e.g., the size of images 10814, 10816, 10818, 10820, 10822, 10824, 10826, 10828 and 10830 displayed on user interface 10808, increased past the predefined maximum size limit in FIG. 11F, is shrunk back down to the predefined maximum size limit after liftoff of contact 10810). FIG. 11G illustrates an example where, in response to liftoff of contact 10810 in FIG. 11F, display of control icon 10802 is adjusted to correspond to the right boundary of sizing bar 10804 (e.g., movement of control icon 10802 back to the right boundary of sizing bar 10804).

Figure 11I:
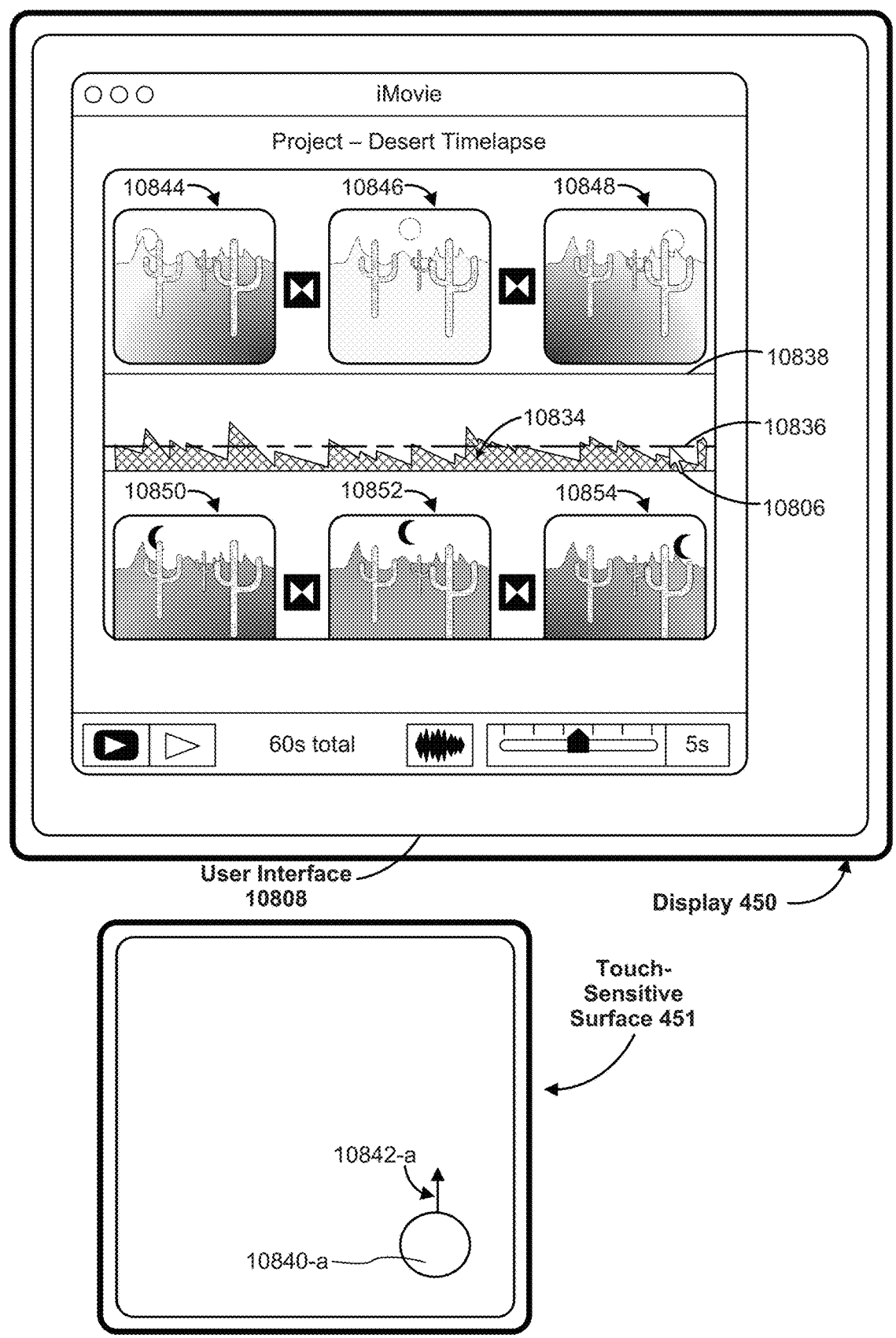
Figure 11J:
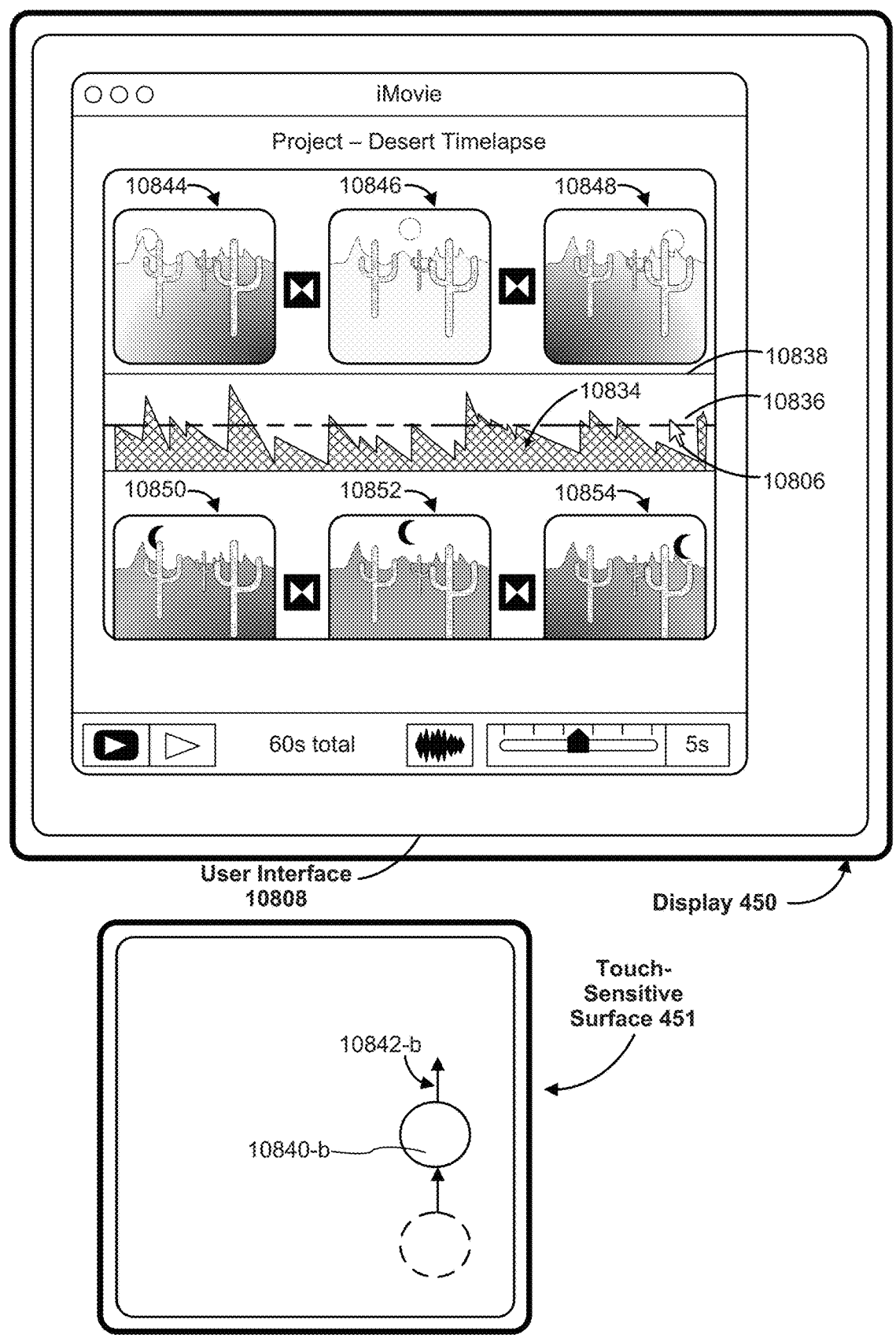
Figure 11K:
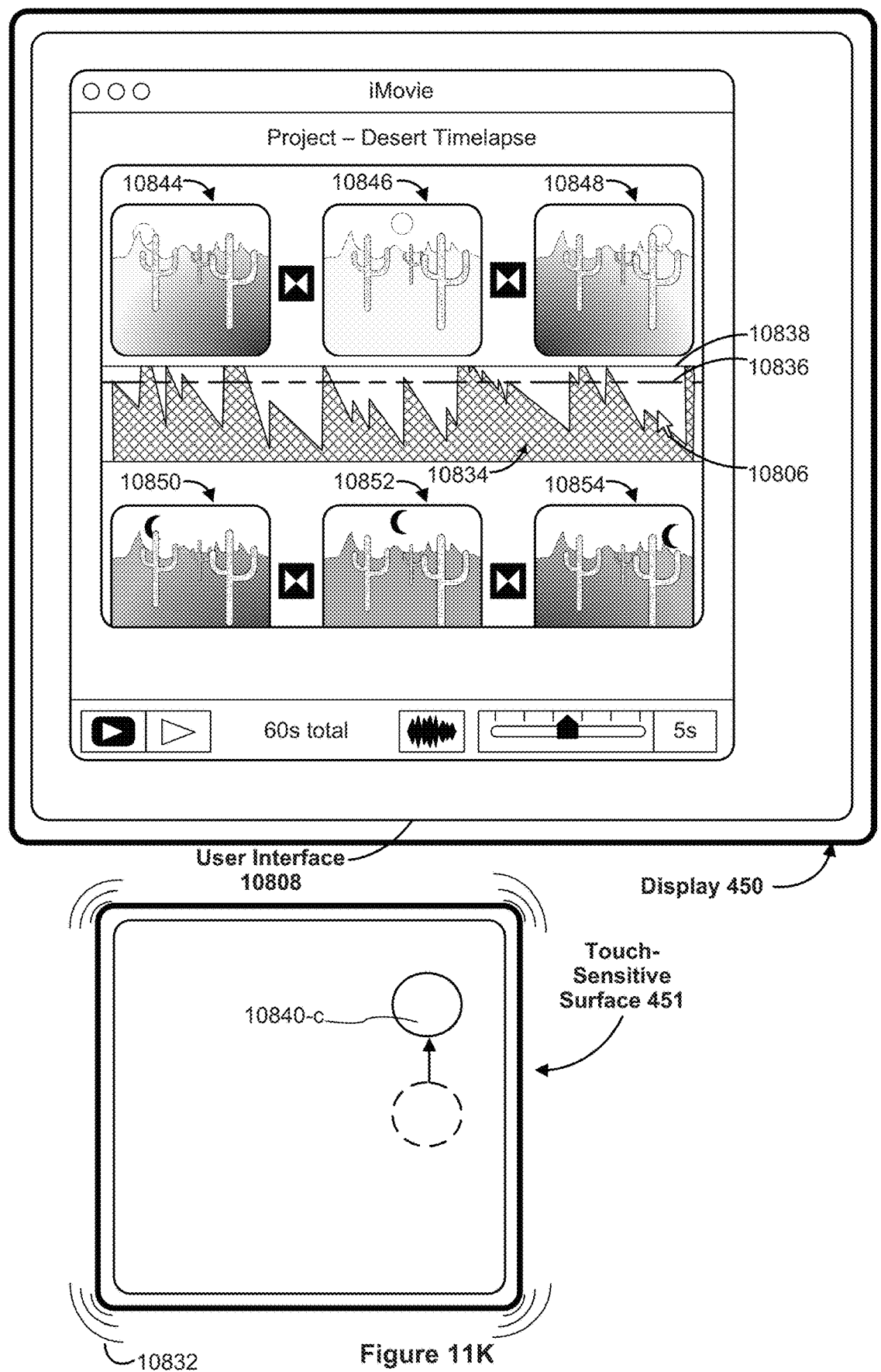

FIGS. 11I-11K illustrate a contact 10840 and a gesture including movement 10842 of contact 10840 that are detected on touch-sensitive surface 451 (e.g., movement

10842-*a* of contact 10840 from location 10840-*a* in FIG. 11I to location 10840-*b* in FIG. 11J and/or movement 10842-*b* of contact 10840 from location 10840-*b* in FIG. 11J to location 10840-*c* in FIG. 11K). Contact 10840 is detected at a position on touch-sensitive surface 451 corresponding to an area on display 450 occupied by control 10836 (e.g., contact 10840 corresponds to a focus selector on the display, such as cursor 10806 which is at or near a location of user interface object 10836). The gesture in FIGS. 11I-11K includes movement 10842 of contact 10840 on touch-sensitive surface 451 that corresponds to movement of a focus selector (e.g., a cursor 10806) on display 450.

In some embodiments, as illustrated in FIGS. 11I-11K, the content is a media clip (e.g., media clips 10844, 10846, 10848, 10850, 10852 and/or 10854) that includes audio (e.g., audio 10834), the parameter is a volume level (e.g., volume level 10836), the predefined adjustment limits include a clipping limit (e.g., clipping limit 10838), and the clipping limit is exceeded when a maximum volume that occurs in the content is above the clipping limit. For example, as illustrated in FIG. 11J, in response to detecting movement 10842-*a* of contact 10810 corresponding to adjustment of a parameter that would not cause a predefined adjustment limit to be exceeded (e.g., increasing volume level 10836 such that the maximum volume of audio 10834 does not exceed volume clipping limit 10838), the electronic device adjusts the parameter without generating a tactile output on the touch-sensitive surface. In contrast, as illustrated in FIG. 11K, in response to detecting movement 10842-*b* of contact 10810 corresponding to adjustment of the parameter that would cause the predefined adjustment limit to be exceeded (e.g., increasing volume level 10836 such that the maximum volume of audio 10834 exceeds volume clipping limit 10838), tactile output generators 167 generate tactile outputs 10832 on touch-sensitive surface 451.

Figure 11L:
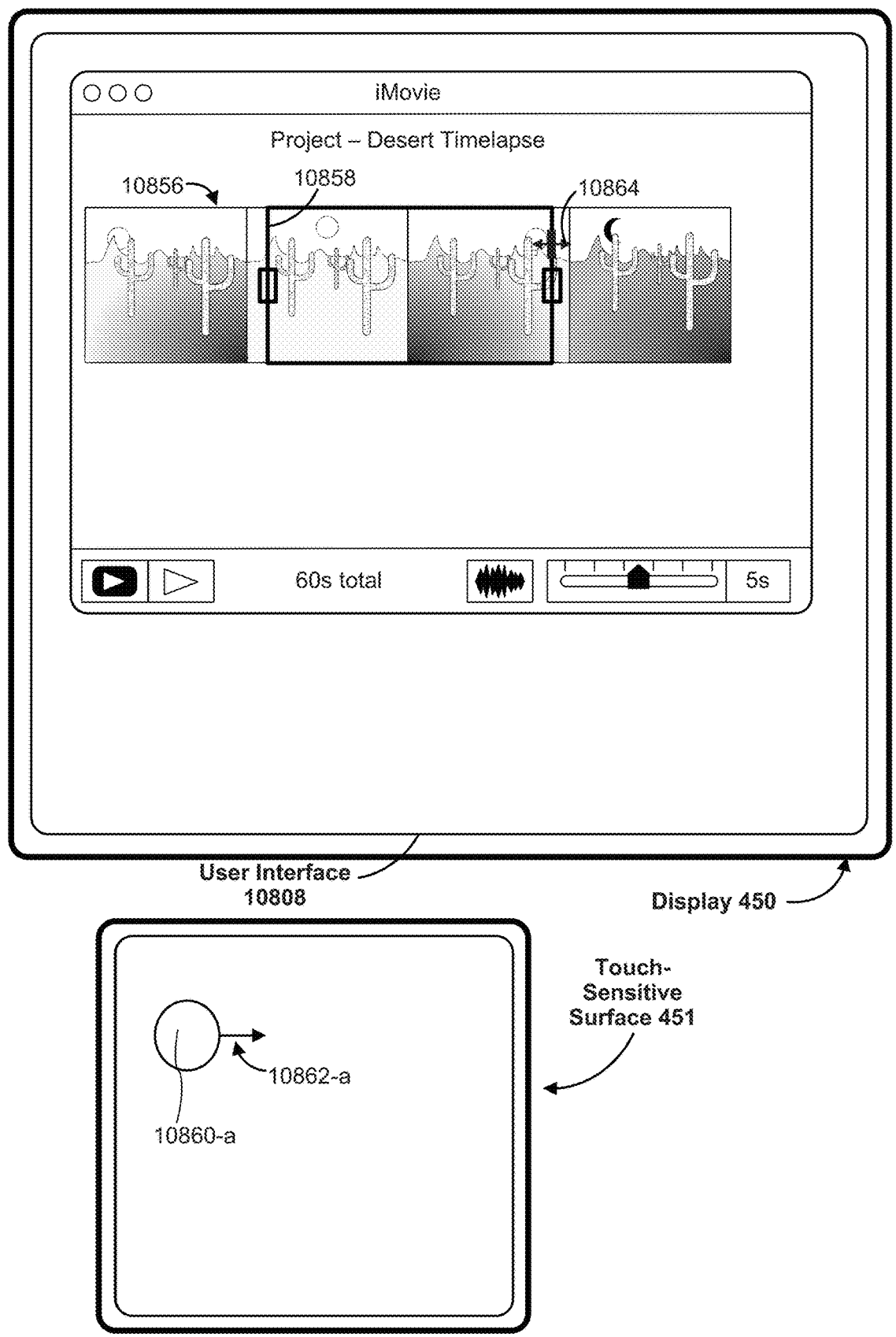
Figure 11M:
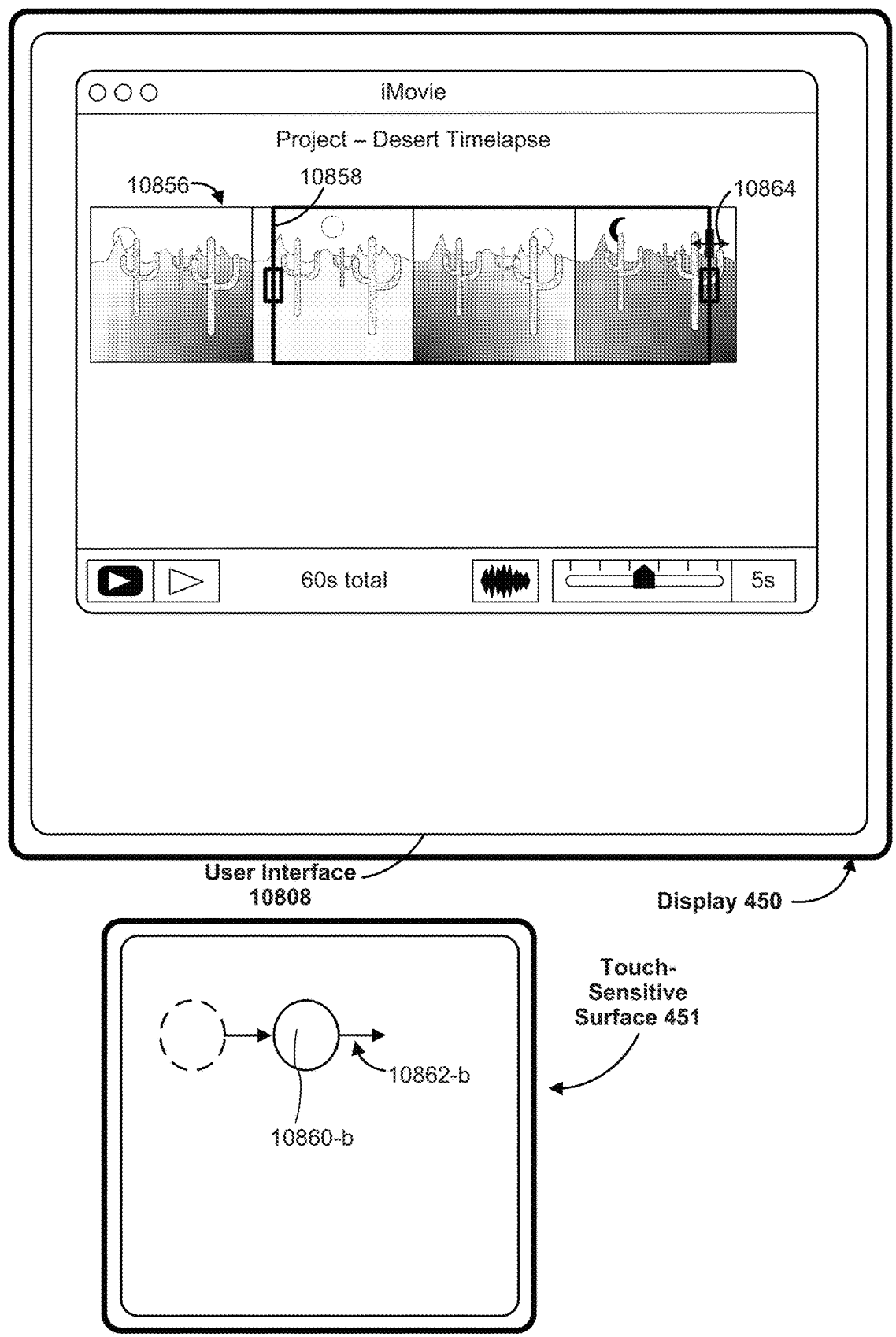
Figure 11N:
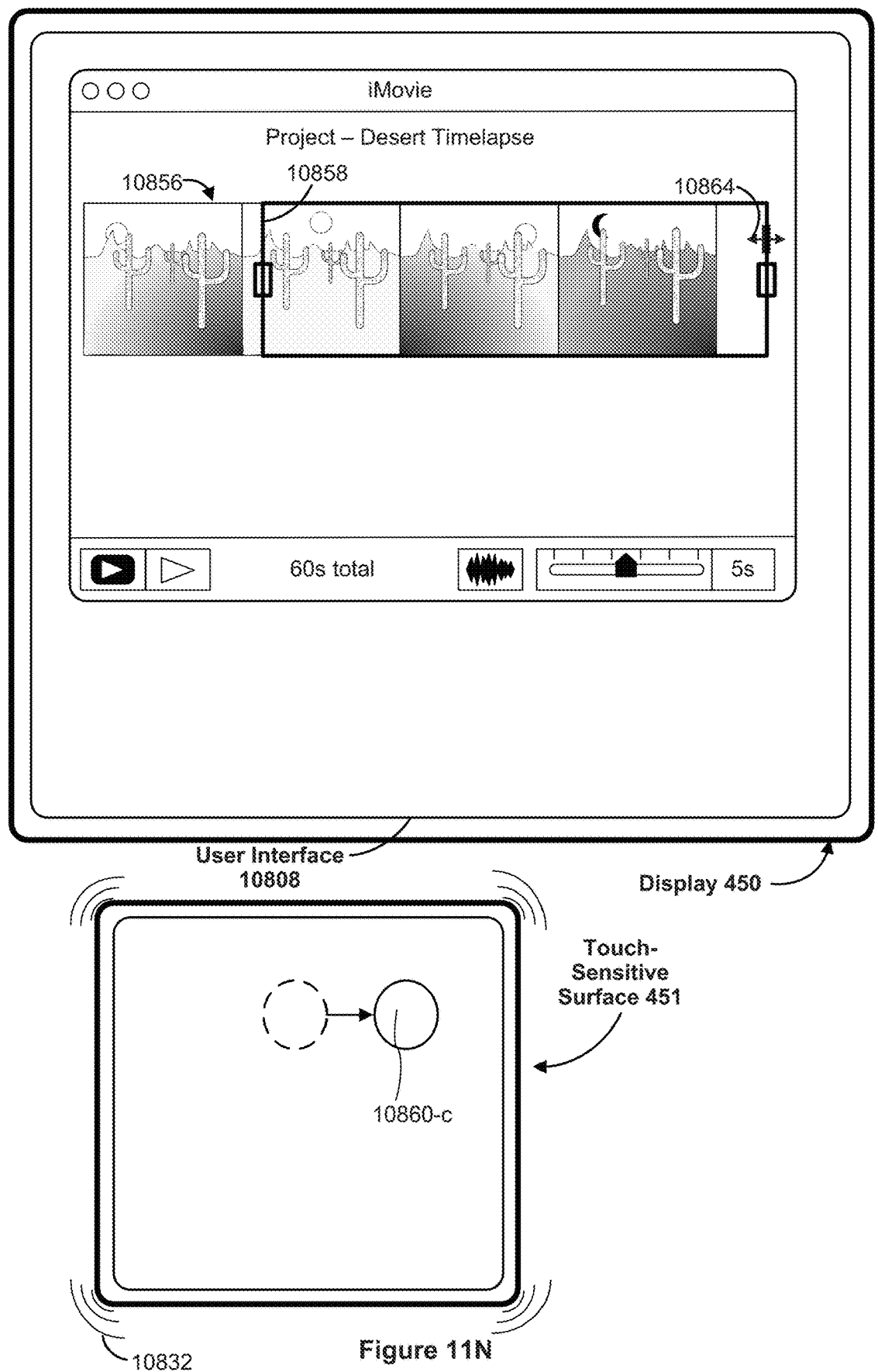

FIGS. 11L-11N illustrate a contact 10860 and a gesture including movement 10862 of contact 10860 that are detected on touch-sensitive surface 451 (e.g., movement 10862-*a* of contact 10860 from location 10860-*a* in FIG. 11L to location 10860-*b* in FIG. 11M and/or movement 10862-*b* of contact 10860 from location 10860-*b* in FIG. 11M to location 10860-*c* in FIG. 11N). Contact 10860 is detected at a position on touch-sensitive surface 451 corresponding to an area on display 450 occupied by control 10858 (e.g., contact 10860 corresponds to a focus selector on the display, such as cursor 10864 which is at or near a location of user interface object 10858). The gesture in FIGS. 11L-11N includes movement 10862 of contact 10860 on touch-sensitive surface 451 that corresponds to movement of a focus selector (e.g., a cursor 10864) on display 450).

In some embodiments, as illustrated in FIGS. 11L-11N, the content is a media clip (e.g., media clip 10856), the parameter is a cropping mask (e.g., cropping mask 10858), the predefined adjustment limits include a time-based content boundary (e.g., the right boundary of media clip 10856), and the time-based content boundary is exceeded when the cropping mask extends beyond the time-based content boundary. For example, as illustrated in FIG. 11M, in response to detecting movement 10862-*a* of contact 10860 corresponding to adjustment of a that would not cause a predefined adjustment limit to be exceeded (e.g., extending cropping mask 10864 to, but not past, the right boundary of media clip 10856), the electronic device adjusts the parameter (e.g., size of cropping mask 10858) without generating a tactile output on the touch-sensitive surface. In contrast, as illustrated in FIG. 11N, in response to detecting movement 10862-*b* of contact 10860 corresponding to adjustment of the parameter that would cause the predefined adjustment limit to be exceeded (e.g., extending cropping mask 10864 past the right boundary of media clip 10856), tactile output generators 167 generate tactile outputs 10832 on touch-sensitive surface 451.

Figure 11O:
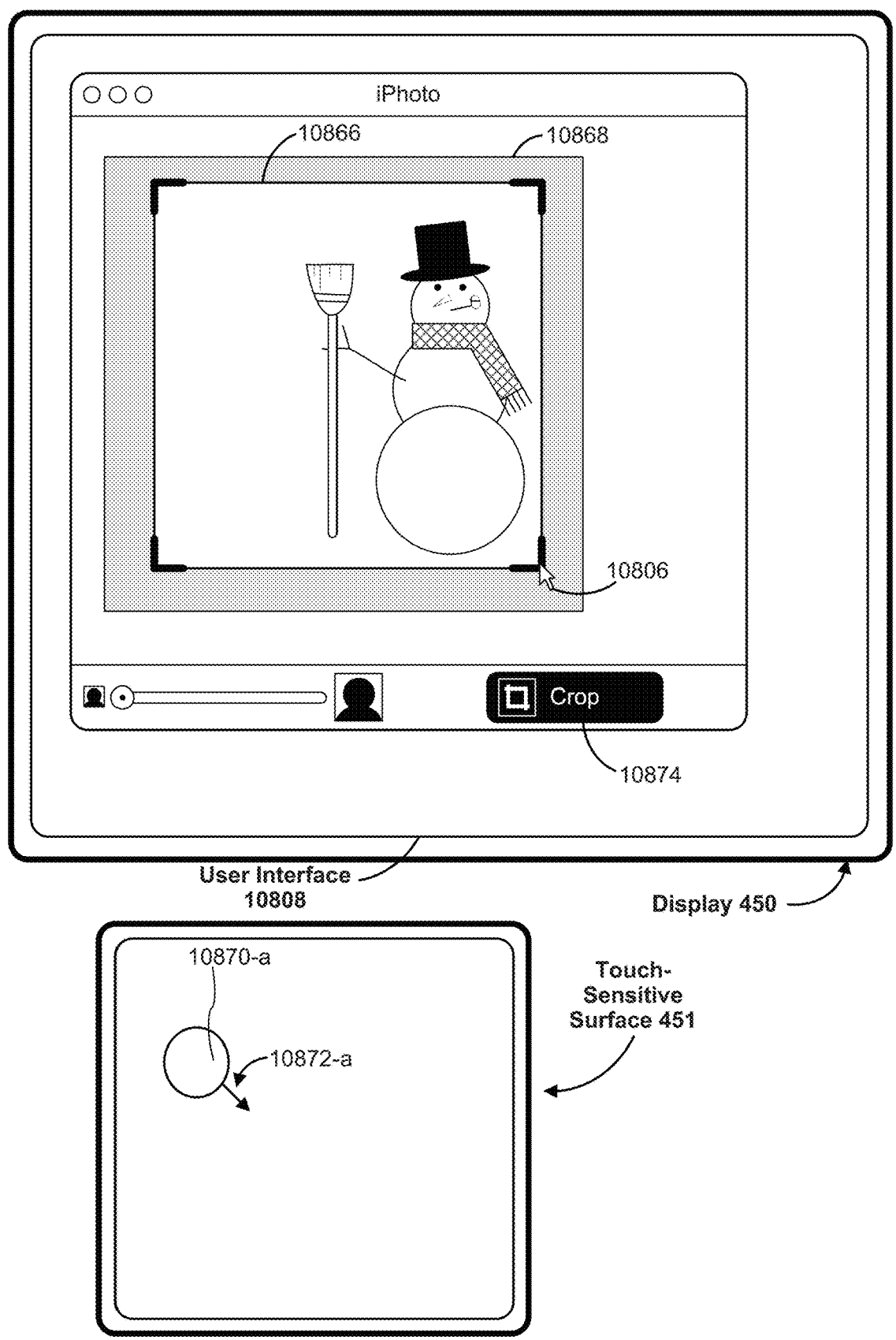
Figure 11P:
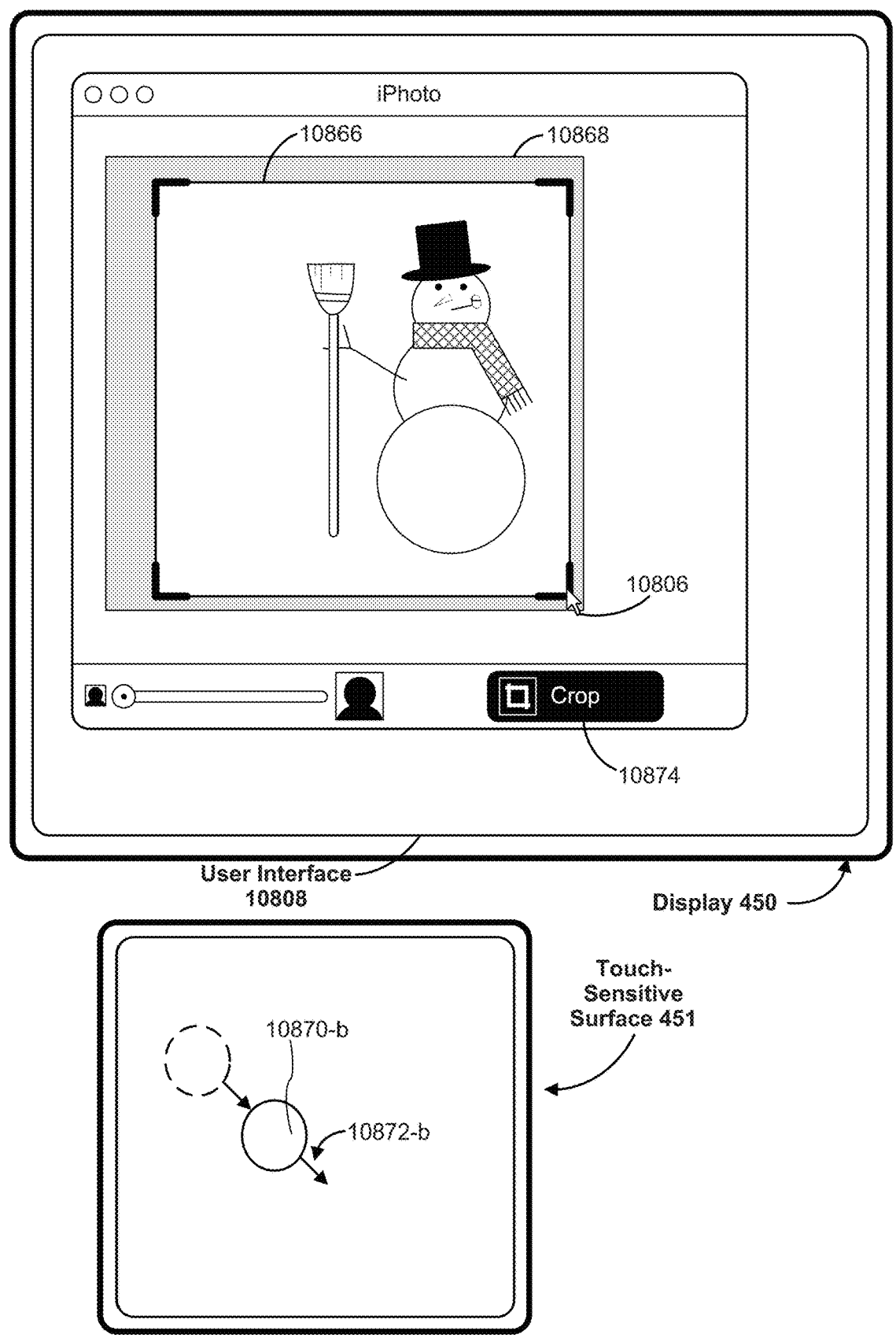
Figure 11Q:
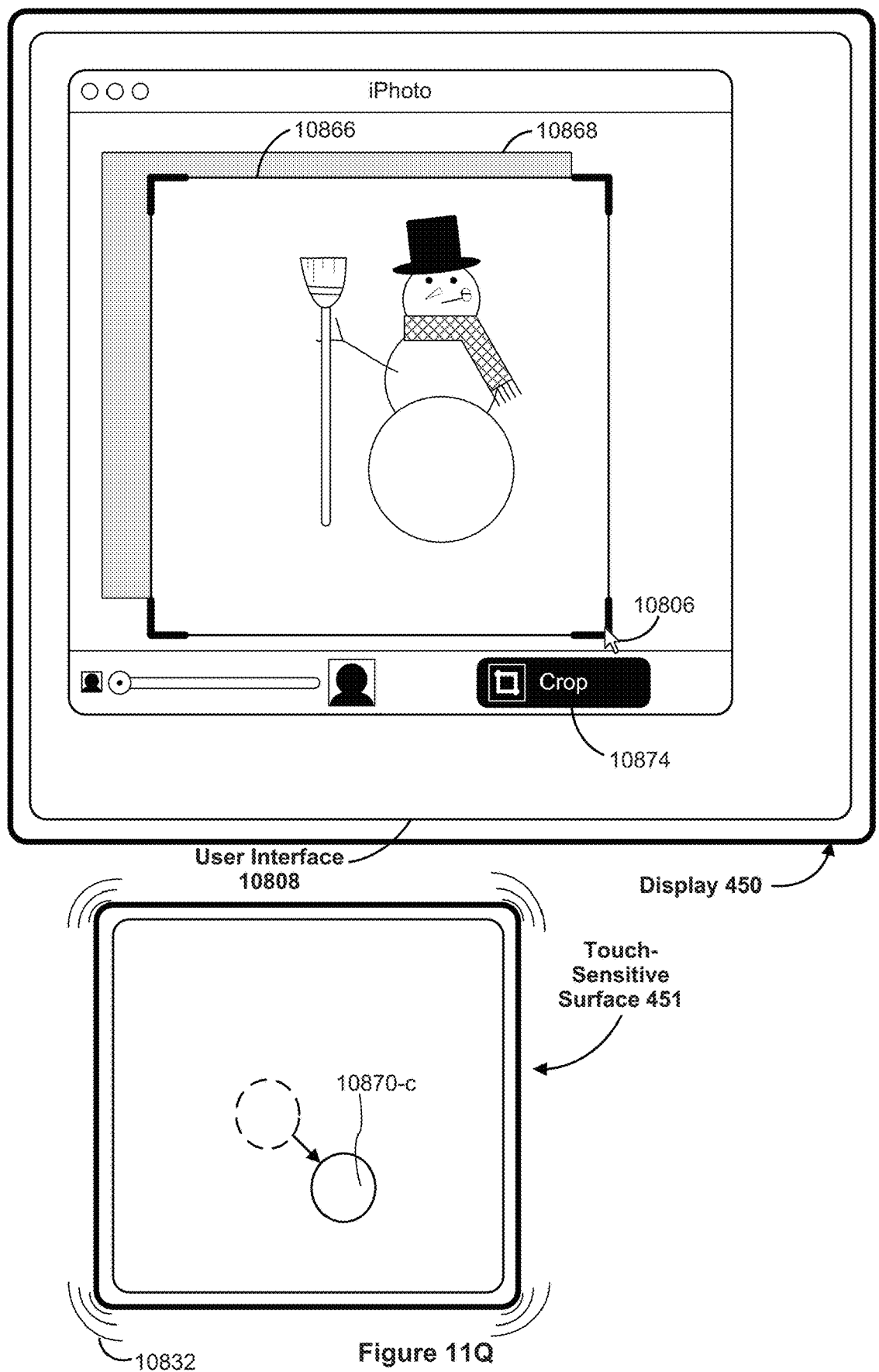

FIGS. 11O-11Q illustrate a contact 10870 and a gesture including movement 10872 of contact 10870 that are detected on touch-sensitive surface 451 (e.g., movement 10872-*a* of contact 10870 from location 10870-*a* in FIG. 11O to location 10870-*b* in FIG. 11P and/or movement 10872-*b* of contact 10870 from location 10870-*b* in FIG. 11P to location 10870-*c* in FIG. 11Q). Contact 10870 is detected at a position on touch-sensitive surface 451 corresponding to an area on display 450 occupied by control 10866 (e.g., contact 10870 corresponds to a focus selector on the display, such as cursor 10806 which is at or near a location of user interface object 10866). The gesture in FIGS. 11O-11Q includes movement 10872 of contact 10870 on touch-sensitive surface 451 that corresponds to movement of a focus selector (e.g., a cursor 10806) on display 450.

In some embodiments, as illustrated in FIGS. 11O-11Q, the content is an image (e.g., image 10868), the parameter is a cropping mask (e.g., cropping mask 10866), the predefined adjustment limits include a content boundary (e.g., an outer edge of image 10868), and the content boundary is exceeded when the cropping mask extends beyond the content boundary. For example, as illustrated in FIG. 11P, in response to detecting movement 10872-*a* of contact 10870 corresponding to adjustment of a parameter that would not cause a predefined adjustment limits to be exceeded (e.g., extending cropping mask 10866 to, but not past, the lower and right borders of image 10868), the electronic device adjusts the parameter (e.g., size of cropping mask 10866) without generating a tactile output on the touch-sensitive surface. In contrast, as illustrated in FIG. 11Q, in response to detecting movement 10872-*b* corresponding to adjustment of the parameter that would cause a predefined adjustment limits to be exceeded (e.g., extending cropping mask 10866 past the lower and right borders of image 10868), tactile output generators 167 generate tactile outputs 10832 on touch-sensitive surface 451.

Figure 11R:
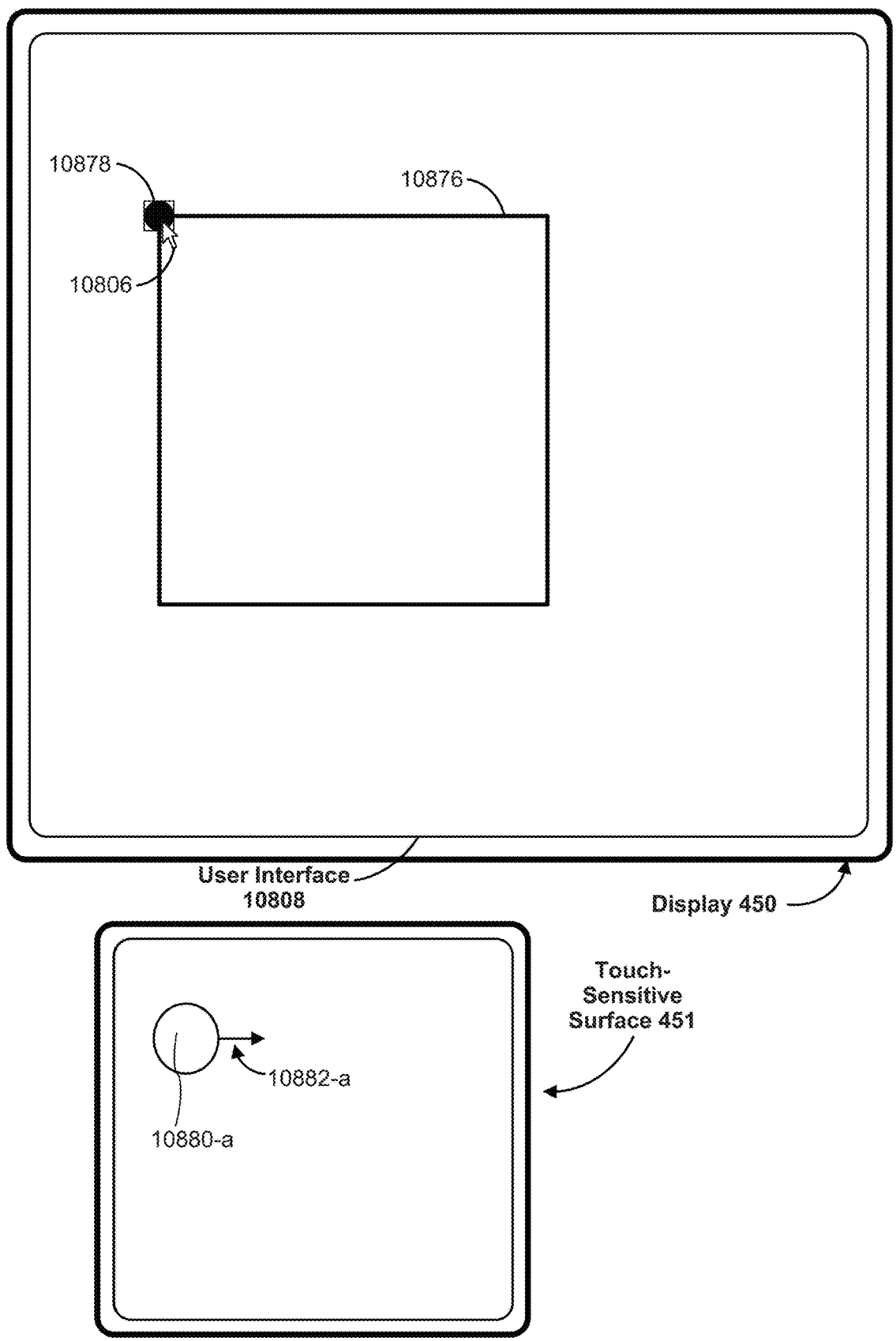
Figure 11S:
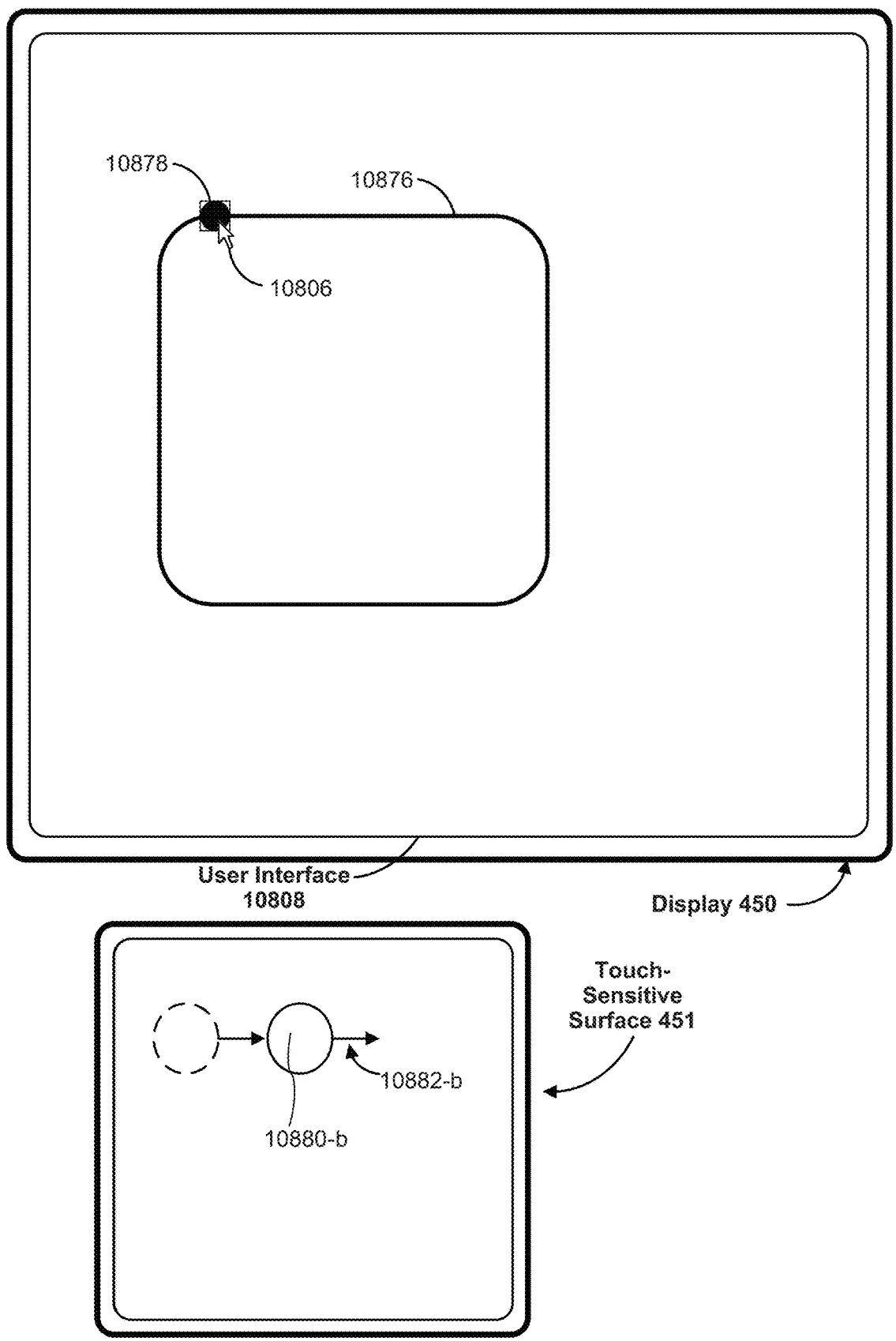
Figure 11T:
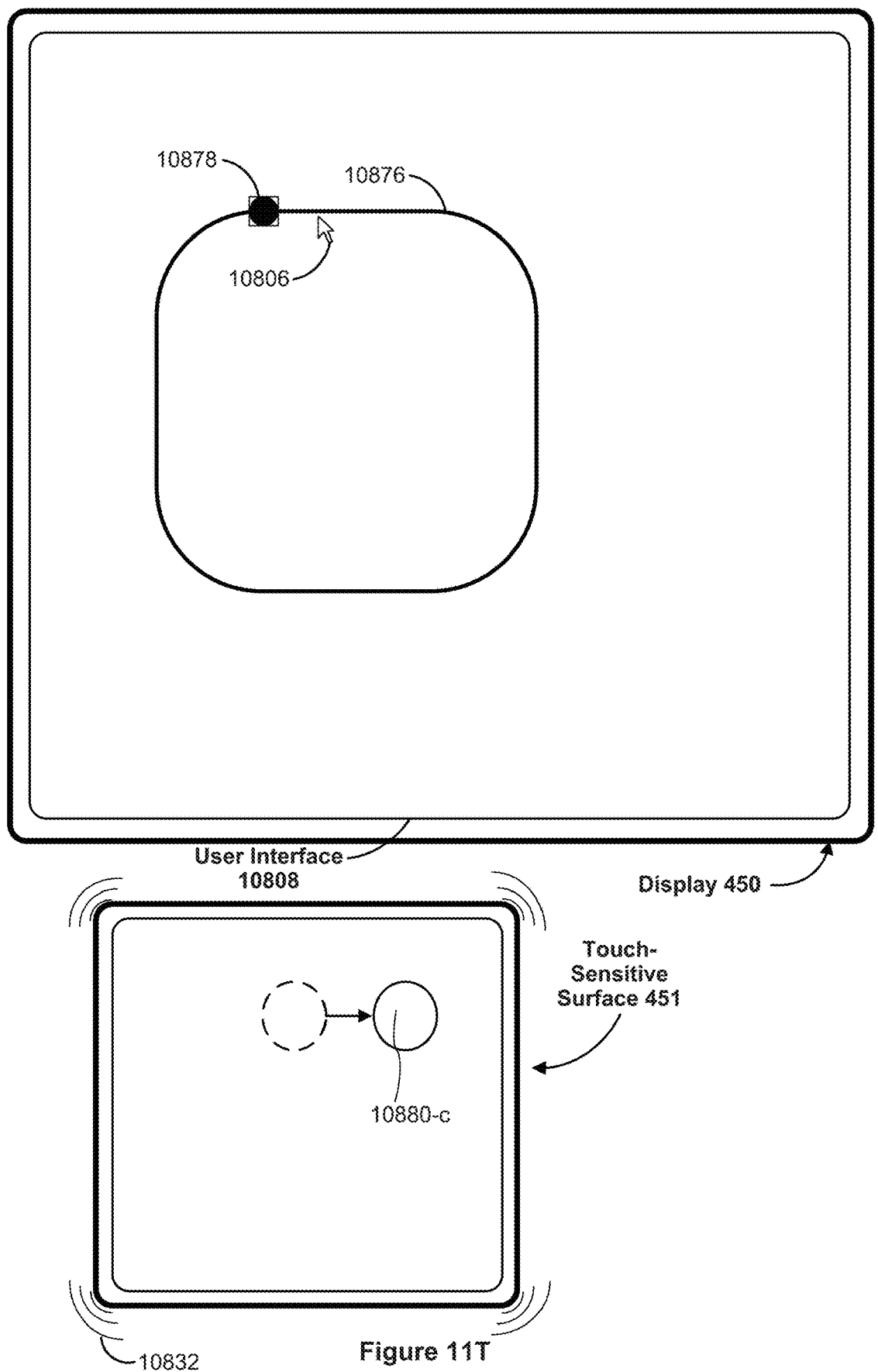
Figure 12A:
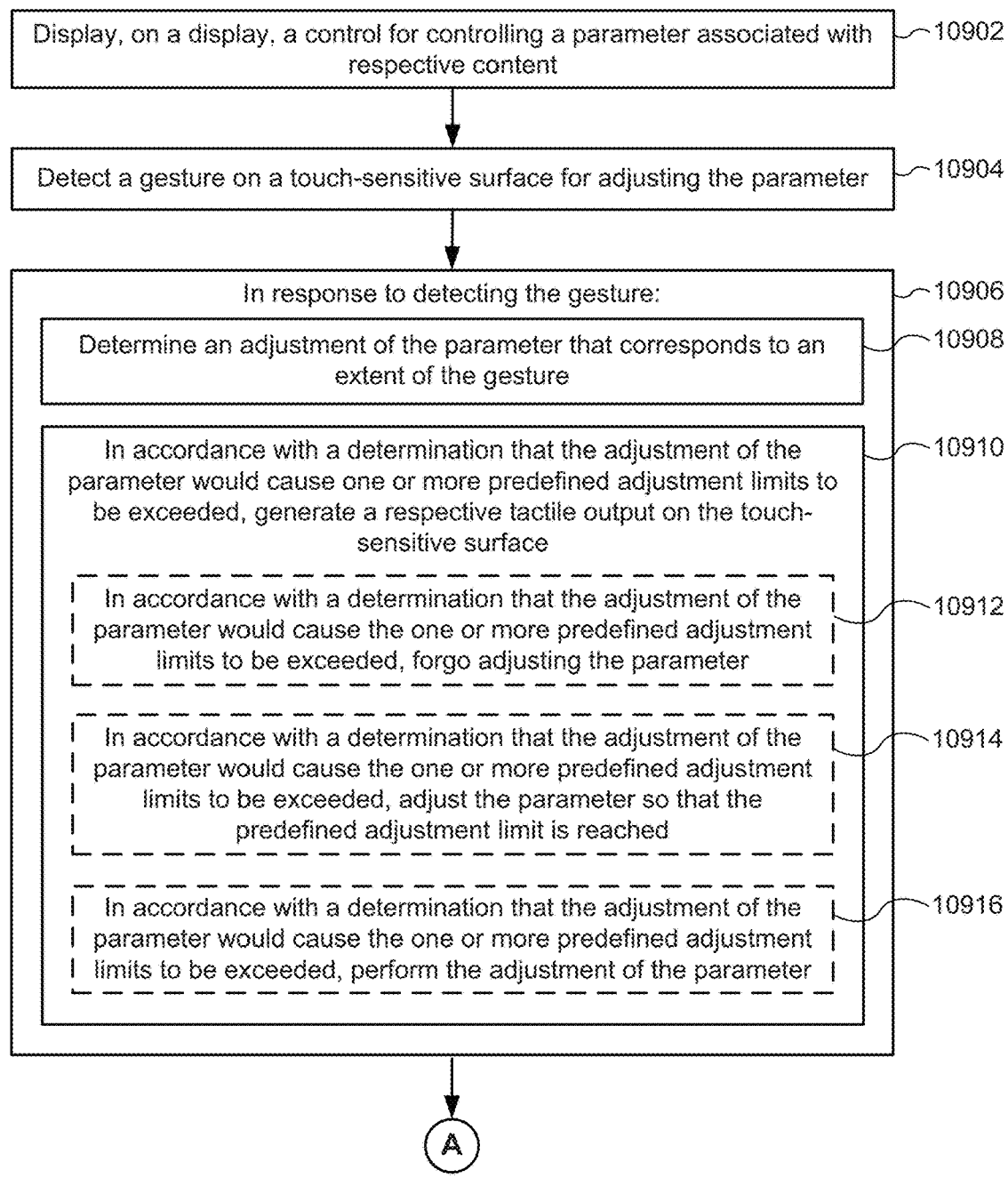
FIGS. 12A-12B are flow diagrams illustrating a method of providing feedback when an action will result in the adjustment of a parameter beyond a predefined limit in accordance with some embodiments.
Figure 12B:
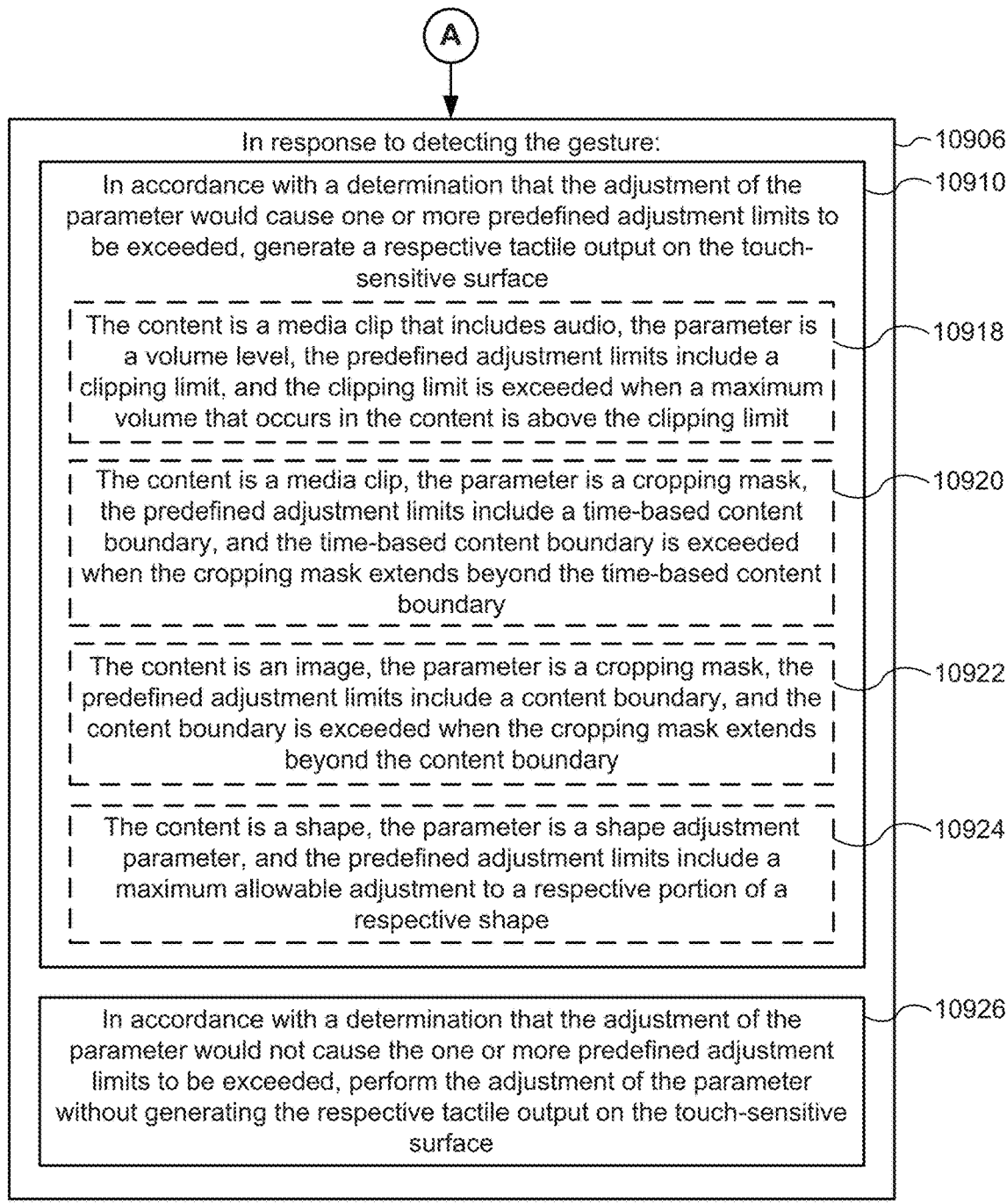

FIGS. 11R-11T illustrate a contact 10880 and a gesture including movement 10882 of contact 10880 that are detected on touch-sensitive surface 451 (e.g., movement 10882-*a* of contact 10880 from location 10880-*a* in FIG. 11R to location 10880-*b* in FIG. 11S and/or movement 10882-*b* of contact 10880 from location 10880-*b* in FIG. 11S to location 10880-*c* in FIG. 11T). Contact 10880 is detected at a position on touch-sensitive surface 451 corresponding to an area on display 450 occupied by control 10878 (e.g., contact 10880 corresponds to a focus selector on the display, such as cursor 10806 which is at or near a location of user interface object 10878). The gesture in FIGS. 11R-11T includes movement 10882 of contact 10880 on touch-sensitive surface 451 that corresponds to movement of a focus selector (e.g., a cursor 10806) on display 450.

In some embodiments, as illustrated in FIGS. 11R-11T, the content is a shape (e.g., square 10876), the parameter is a shape adjustment parameter (e.g., roundness of the corners on square 10876), and the predefined adjustment limits include a maximum allowable adjustment to a respective portion of a respective shape (e.g., maximum radius for rounding the corners of square 10876). For example, as illustrated in FIG. 11S, in response to detecting movement 10882-*a* corresponding to adjustment of a parameter that would not cause a predefined adjustment limits to be exceeded (e.g., rounding the corners of square 10876 using a radius that matches, but does not exceed, a predetermined maximum radius), the electronic device adjusts the parameter (e.g., roundness of the corners of square 10876) without generating a tactile output on the touch-sensitive surface. In contrast, as illustrated in FIG. 11T, in response to detecting movement 10882-*b* corresponding to adjustment of the parameter that would cause a predefined adjustment limits to be exceeded (e.g., rounding the corners of square 10876 using a radius that exceeds a predetermined maximum radius), tactile output generators 167 generate tactile outputs 10832 on touch-sensitive surface 451.

FIGS. 12A-12B are flow diagrams illustrating a method 10900 of providing feedback when an action will result in the adjustment of a parameter beyond a predefined limit in accordance with some embodiments. The method 10900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 10900 are, optionally, combined and/or the order of some operations is, optionally, changed.

As described below, the method 10900 provides an intuitive way to provide feedback when an action will result in the adjustment of a parameter beyond a predefined limit. The method reduces the cognitive burden on a user when detecting feedback when an action will result in the adjustment of a parameter beyond a predefined limit, thereby creating a more efficient human-machine interface. For battery-operated electronic devices, enabling a user to detect feedback when an action will result in the adjustment of a parameter beyond a predefined limit faster and more efficiently conserves power and increases the time between battery charges.

In some embodiments, the device displays (10902), on a display (e.g., display 450 in FIGS. 11A-11T), a control (e.g., a resizing control including sizing bar 10804 and control icon 10802 in FIGS. 11A-11H, control 10836 in FIGS. 11I-11K, control 10858 in FIGS. 11L-11N, control 10866 in FIGS. 11O-11Q, or control 10878 in FIGS. 11R-11T) for controlling a parameter associated with respective content (e.g., the size of images 10814, 10816, 10818, 10820, 10822, 10824, 10826, 10828 and 10830 in FIGS. 11A-11H, the volume level of audio 10834 in FIGS. 11I-11K, cropping mask 10858 applied to media clip 10856 in FIGS. 11L-11N, cropping mask 10866 applied to image 10868 in FIGS. 11O-11Q, or the roundness of the corners of square 10876 in FIGS. 11R-11T).

In some embodiments, while the device displays the control, the device detects (10904) a gesture (e.g., movement 10812 of contact 10810 in FIGS. 11A-11H, movement 10842 of contact 10840 in FIGS. 11I-11K, movement 10862 of contact 10860 in FIGS. 11L-11N, movement 10872 of contact 10870 in FIGS. 11O-11Q, or movement 10882 of contact 10880 in FIGS. 11R-11T) on a touch-sensitive surface (e.g., touch-sensitive surface 451) for adjusting the parameter.

In some embodiments, in response (10906) to detecting the gesture: the device determines (10908) an adjustment of the parameter that corresponds to an extent of the gesture (e.g., an extent of lateral movement, an extent of rotation, or an extent of increase/decrease in intensity of a contact detected on the touch-sensitive surface).

In response (10906) to detecting the gesture: in accordance with a determination that the adjustment of the parameter would cause one or more predefined adjustment limits to be exceeded, the device generates (10910) a respective tactile output (e.g., tactile outputs 10832 in FIGS. 11C-11F, FIG. 11K, FIG. 11N, FIG. 11Q or FIG. 11T) on the touch-sensitive surface (e.g., touch-sensitive surface 451).

In some embodiments, in response (10906) to detecting the gesture: in accordance with a determination that the adjustment of the parameter would cause one or more predefined adjustment limits to be exceeded, the device forgoes (10912) adjusting the parameter (e.g., adjustment of the parameter is cancelled if the requested adjustment exceeds the adjustment limits for the parameter). For example, as illustrated in FIGS. 11C and 11E, where a gesture including movement 10812-*b* of contact 10810 that corresponds to a size adjustment of images 10814, 10816, 10818, 10820, 10822, 10824, 10826, 10828 and 10830 that would exceed the predefined adjustment limit corresponding to the right boundary of sizing bar 10804, the images are displayed at a magnification corresponding to the size of the images prior to the gesture, as shown in FIG. 11E.

In some embodiments, in response (10906) to detecting the gesture: in accordance with a determination that the adjustment of the parameter would cause the one or more predefined adjustment limits to be exceeded, the device adjusts (10914) the parameter so that the predefined adjustment limit is reached (e.g., the extent of the adjustment of the parameter is limited by the predetermined adjustment limit). For example, as illustrated in FIGS. 11C-11D, where the gesture including movement 10812-*b* of contact 10810 corresponds to a size adjustment of images 10814, 10816, 10818, 10820, 10822, 10824, 10826, 10828 and 10830 that would exceed the predefined adjustment limit corresponding to the right boundary of sizing bar 10804, the images are displayed at a magnification corresponding to the predefined maximum size adjustment limit, as shown in FIG. 11D. In some embodiments, the parameter is adjusted to a respective predefined adjustment limit, but the respective predefined adjustment limit is not exceeded (e.g., a thumb on a slider is adjusted to the end of the slider, but no further).

In some embodiments, in response (10906) to detecting the gesture: in accordance with a determination that the adjustment of the parameter would cause the one or more predefined adjustment limits to be exceeded, the device performs (10916) the adjustment of the parameter (e.g., the extent of the adjustment of the parameter is not limited by the predetermined adjustment limit). For example, as illustrated in FIG. 11F, where the gesture including movement 10812-*b* of contact 10810 corresponds to a size adjustment of images 10814, 10816, 10818, 10820, 10822, 10824, 10826, 10828 and 10830 that would exceed the predefined adjustment limit corresponding to the right boundary of sizing bar 10804, the images are displayed at a magnification corresponding to the size exceeding the predefined maximum size adjustment limit (e.g., even if adjusting the parameter in this way causes the one or more predefined adjustment limits to be exceeded), as shown in FIG. 11F. For example, a user is allowed to extend a cropping mask outside of a canvas (e.g., as shown in FIG. 11Q) or beyond an end of a media clip (e.g., as shown in FIG. 11N), but the device warns the user that cropping while the cropping mask is outside of the canvas or beyond the end of the media clip will add blank content to the respective content.

In some embodiments, the content is (10918) a media clip (e.g., media clips 10844, 10846, 10848, 10850, 10852 and/or 10854 in FIGS. 11I-11K) that includes audio (e.g., audio 10834 in FIGS. 11I-11K), the parameter is a volume level (e.g., volume level 10836 in FIGS. 11I-11K), the predefined adjustment limits include a clipping limit (e.g., clipping limit 10838 in FIGS. 11I-11K), and the clipping limit is exceeded when a maximum volume that occurs in the content is above the clipping limit (e.g., when the tallest peaks of audio 10834 exceed clipping limit 10838 in FIG. 11K). In some embodiments, the clipping limit is an analog clipping limit (e.g., the sound is limited by the physical/electrical characteristics of an amplifier such that sounds above the clipping limit would push an amplifier to create a signal with more power than its power supply can produce and thus the amplifier amplifies the signal only up to its maximum capacity). In some embodiments, the clipping limit is a digital clipping limit (e.g., the signal is restricted by the predetermined range digital representations of the sound and a sound with amplitude above the range of chosen digital representations will be represented as a maximum digital representation).

In some embodiments, the content is (10920) a media clip (e.g., media clip 10856 in FIGS. 11L-11N), the parameter is a cropping mask (e.g., cropping mask 10858 in FIGS. 11L-11N), the predefined adjustment limits include a time-based content boundary (e.g., the right boundary of media clip 10856 in FIGS. 11L-11N), and the time-based content boundary is exceeded when the cropping mask extends beyond the time-based content boundary (e.g., the user tries to perform an operation that corresponds to cropping the media clip before the beginning time of the media clip, or after the end time of the media clip). For example, as illustrated in FIG. 11N, the time-based content boundary is exceeded when cropping mask 10858 extends past the right time-based content boundary of media clip 10856.

In some embodiments, the content is an image (e.g., image 10868 in FIGS. 11O-11Q), the parameter is a cropping mask (e.g., cropping mask 10866 in FIGS. 11O-11Q), the predefined adjustment limits include a content boundary (e.g., an outer edge of image 10868 in FIGS. 11O-11Q), and the content boundary is exceeded when the cropping mask extends beyond the content boundary (e.g., beyond the border of an image). For example, as illustrated in FIG. 11Q, the content boundary is exceeded when cropping mask 10866 extends beyond the lower and right borders of image 10868.

In some embodiments, the content is a shape (e.g., square 10876 in FIG. 11R), the parameter is a shape adjustment parameter (e.g., a parameter corresponding to the roundness of the corners on square 10876 in FIGS. 11R-11T), and the predefined adjustment limits include a maximum allowable adjustment to a respective portion of a respective shape (e.g., maximum radius for rounding the corners of square 10876 in FIGS. 11R-11T). In some embodiments, the shape adjustment parameter is, for example, roundness of a shape corner, opacity or line width. In some embodiments, the predefined adjustment limit is, for example, a maximum radius for rounding a corner, a minimum/maximum opacity, or a minimum/maximum line width.

In response (10906) to detecting the gesture: in accordance with a determination that the adjustment of the parameter would not cause the one or more predefined adjustment limits to be exceeded, the device performs (10926) the adjustment of the parameter without generating the respective tactile output (e.g., a tactile output corresponding to exceeding the predefined adjustment limit) on the touch-sensitive surface (e.g., touch-sensitive surface 451). For example, as illustrated in FIGS. 11B, 11J, 11M, 11P and 11S, where a gesture corresponds to an adjustment of the parameter that does not exceed a predefined adjustment limit, the adjustment is performed and no tactile output is generated on the touch-sensitive surface.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 10900 described above with respect to FIGS. 12A-12B. For example, the contacts, gestures, user interface objects, tactile sensations and focus selectors described above with reference to method 10900 optionally have one or more of the characteristics of the contacts, gestures, user interface objects, tactile sensations and focus selectors described herein with reference to other methods described herein (e.g., those listed in the fifth paragraph of the Description of Embodiments). For brevity, these details are not repeated here.

Figure 13:
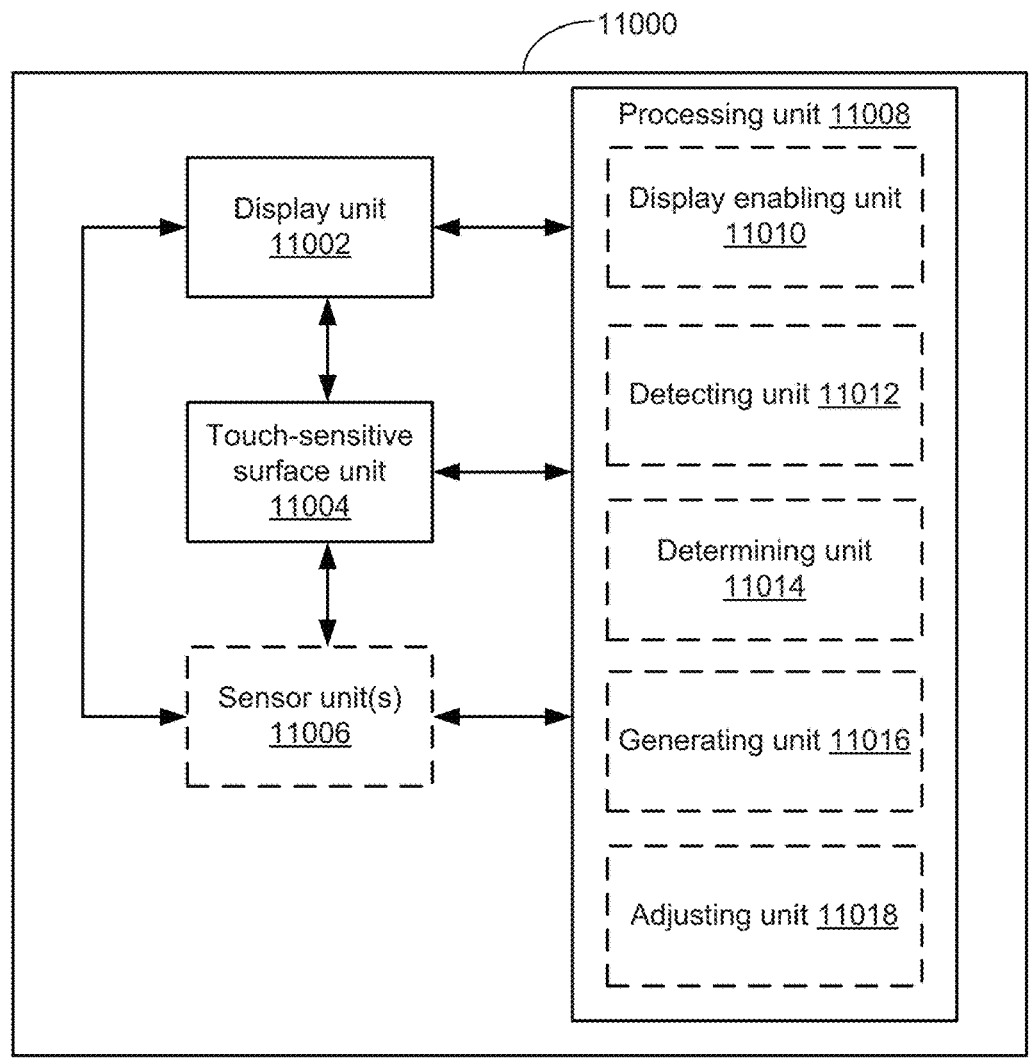
FIG. 13 is a functional block diagram of an electronic device in accordance with some embodiments.

In accordance with some embodiments, FIG. 13 shows a functional block diagram of an electronic device 11000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 11000 includes a display unit 11002 configured to display a control for controlling a parameter associated with respective content, a touch-sensitive surface unit 11004 configured to receive user contacts, optionally one or more sensor units 11006 configured to detect intensity of contacts with the touch-sensitive surface unit 11004; and a processing unit 11008 coupled to the display unit 11002, the touch-sensitive surface unit 11004 and optionally the one or more sensor units 11006. In some embodiments, the processing unit 11008 includes a display enabling unit 11010, a detecting unit 11012, a determining unit 11014, a generating unit 11016, and an adjusting unit 11018.

In some embodiments, the processing unit 11008 is configured to enable display (e.g., with the display enabling unit 11010) of a control for controlling a parameter associated with respective content. In some embodiments, the processing unit 11008 is further configured to detect a gesture on the touch-sensitive surface unit 11004 for adjusting the parameter (e.g., with the detecting unit 11012); and in response to detecting the gesture: the processing unit 11008 is configured determine an adjustment of the parameter that corresponds to an extent of the gesture (e.g., with the determining unit 11014); in accordance with a determination that the adjustment of the parameter would cause one or more predefined adjustment limits to be exceeded, the processing unit 11008 is configured to generate a respective tactile output on the touch-sensitive surface unit (e.g., with the generating unit 11016); and in accordance with a determination that the adjustment of the parameter would not cause the one or more predefined adjustment limits to be exceeded, the processing unit 11008 is configured to perform the adjustment of the parameter (e.g., with the adjusting unit 11018) without generating the respective tactile output on the touch-sensitive surface unit 11004.

In some embodiments, the processing unit 11008 is further configured to, in accordance with a determination that the adjustment of the parameter would cause the one or more predefined adjustment limits to be exceeded, forgo adjusting the parameter (e.g., with the adjusting unit 11018).

In some embodiments, the processing unit 11008 is further configured to, in accordance with a determination that the adjustment of the parameter would cause the one or more predefined adjustment limits to be exceeded, adjust the parameter so that the predefined adjustment limit is reached (e.g., with the adjusting unit 11018).

In some embodiments, the processing unit 11008 is further configured to, in accordance with a determination that the adjustment of the parameter would cause the one or more predefined adjustment limits to be exceeded, perform the adjustment of the parameter (e.g., with the adjusting unit 11018).

In some embodiments, the content is a media clip that includes audio, the parameter is a volume level, the predefined adjustment limits include a clipping limit and the clipping limit is exceeded when a maximum volume that occurs in the content is above the clipping limit.

In some embodiments, the content is a media clip, the parameter is a cropping mask, the predefined adjustment limits include a time-based content boundary and the time-based content boundary is exceeded when the cropping mask extends beyond the time-based content boundary.

In some embodiments, the content is an image, the parameter is a cropping mask, the predefined adjustment limits include a content boundary and the content boundary is exceeded when the cropping mask extends beyond the content boundary.

In some embodiments, the content is a shape, the parameter is a shape adjustment parameter and the predefined adjustment limits include a maximum allowable adjustment to a respective portion of a respective shape.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12B are, optionally, implemented by components depicted in FIGS. 1A-1B or FIG. 13. For example, detection operation 10904 and determination operations 10908, 10910, 10912, 10914, 10916 and 10926 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface, adjustment of a parameter associated with respective content, or generation of a tactile output (e.g., corresponding to a determination that an adjustment of a parameter would cause one or more predefined adjustment limits to be exceeded). When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Tactile Feedback Corresponding to a Clock

Many electronic devices have graphical user interfaces that include a representation of a clock. For example, many cellular phones, laptops, and tablets have a representation of a clock prominently displayed on the graphical user interface. There is often a need to provide efficient and convenient ways for users to receive feedback corresponding to the clock. The embodiments below improve on existing methods by generating tactile outputs for the user that correspond to the clock (e.g., a 'tick tock' pattern of tactile outputs) indicating that a focus selector is over the representation of the clock and, optionally, providing an indication of the rate at which time is passing.

FIGS. 14A-14J illustrate exemplary user interfaces for providing tactile feedback corresponding to a clock in accordance with some embodiments. The user interfaces in these figures are used to illustrate the processes described below, including the processes described below with reference to FIGS. 15A-15B.

Figure 14A:
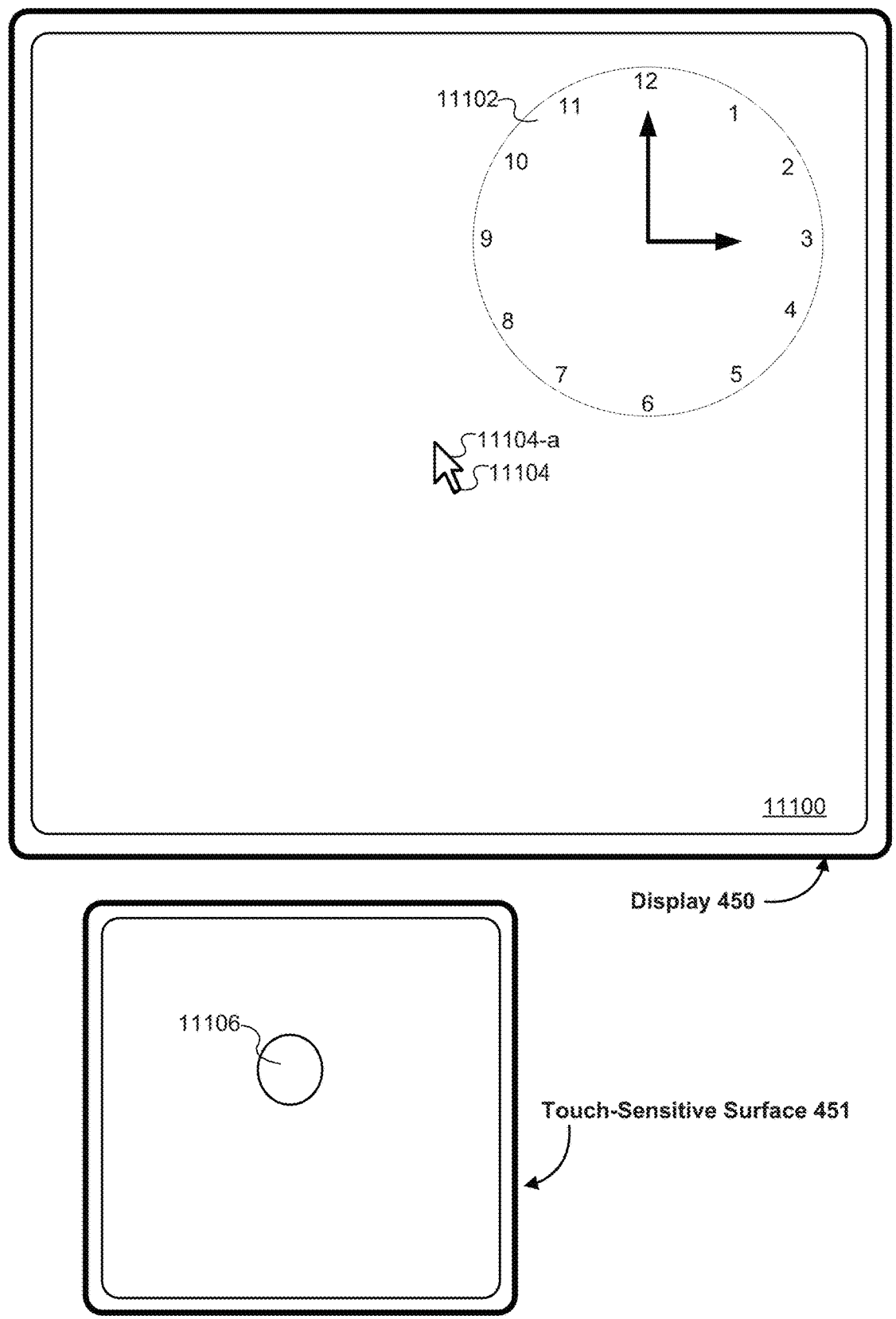
FIGS. 14A-14J illustrate exemplary user interfaces for providing tactile feedback corresponding to a clock in accordance with some embodiments.

FIG. 14A illustrates an example of a user interface that includes a representation of a clock. User interface 11100 is displayed on display 450 of a device (e.g., device 300) and is responsive to contacts (e.g., a finger contact) on touch-sensitive surface 451. User interface 11100 includes representation 11102 of a clock. FIG. 14A further illustrates contact 11106 on touch-sensitive surface 451 and, per some embodiments, a displayed representation of focus selector (e.g., a cursor 11104), at position 11104-a, corresponding to contact 11106.

In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 14A-14J and FIGS. 15A-15B will be discussed with reference to display 450 and a separate touch-sensitive surface 451, however analogous operations are, optionally, performed on a device with a touch-sensitive display system 112 in response to detecting the contacts described in FIGS. 14A-14J on the touch-sensitive display system 112 while displaying the user interfaces shown in FIGS. 14A-14J on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 11104.

Figure 14B:
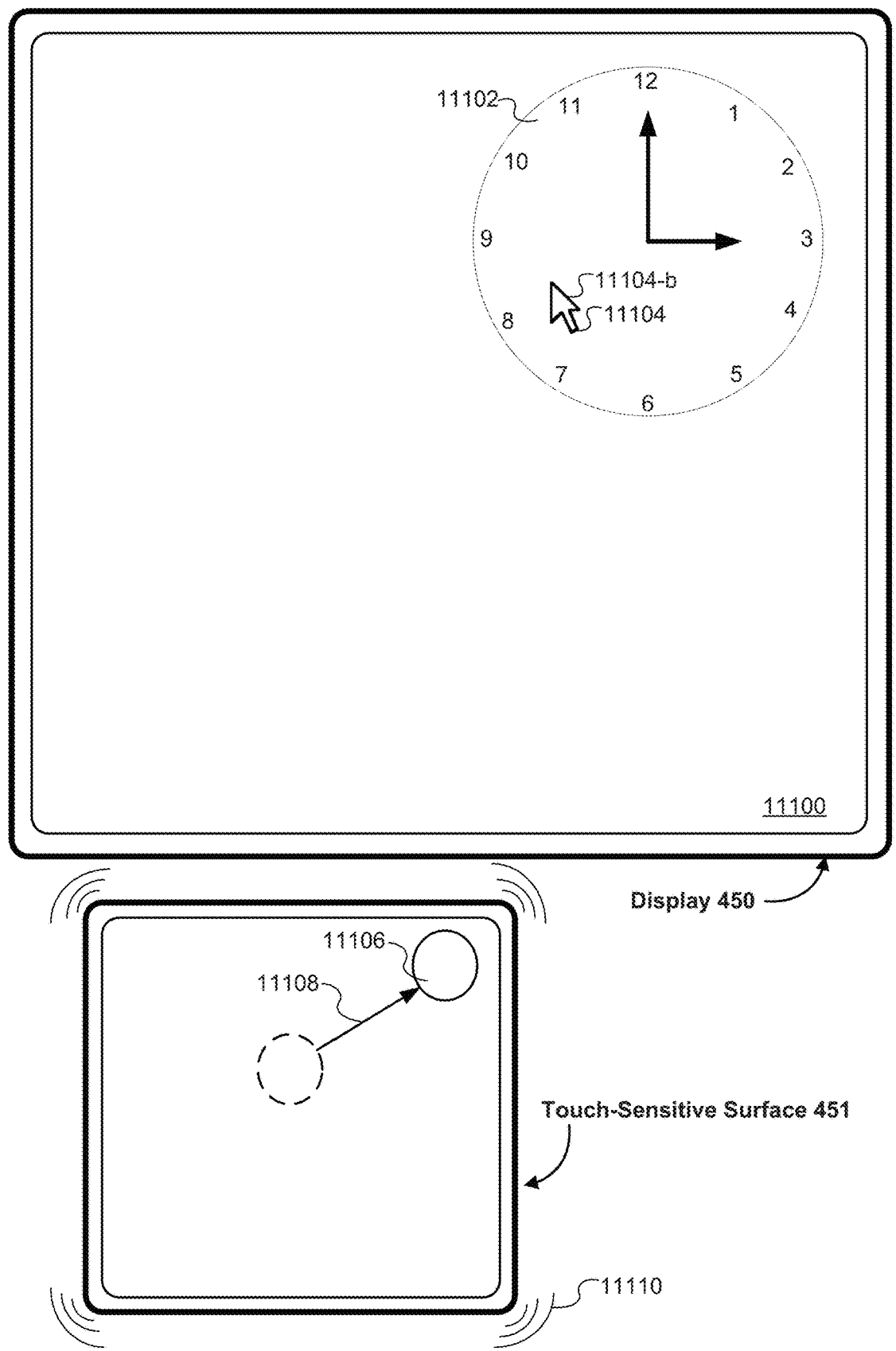

FIGS. 14A and 14B illustrate an example of detecting a focus selector over a representation of a clock. In this example, contact 11106 and movement 11108 of contact 11106 are detected on touch-sensitive surface 451. Movement of a focus selector (e.g., cursor 11104), corresponding to movement 11108, causes the focus selector (e.g., cursor 11104) to move to from position 11104-a in FIG. 14A that is not over representation 11102 of a clock to position 11104-*b* in FIG. 14B that is over the representation 11102 of the clock and the device starts to provide tactile feedback 11110 (e.g., generating tactile outputs corresponding to a tick tock sensation) on touch-sensitive surface 451.

Figure 14C:
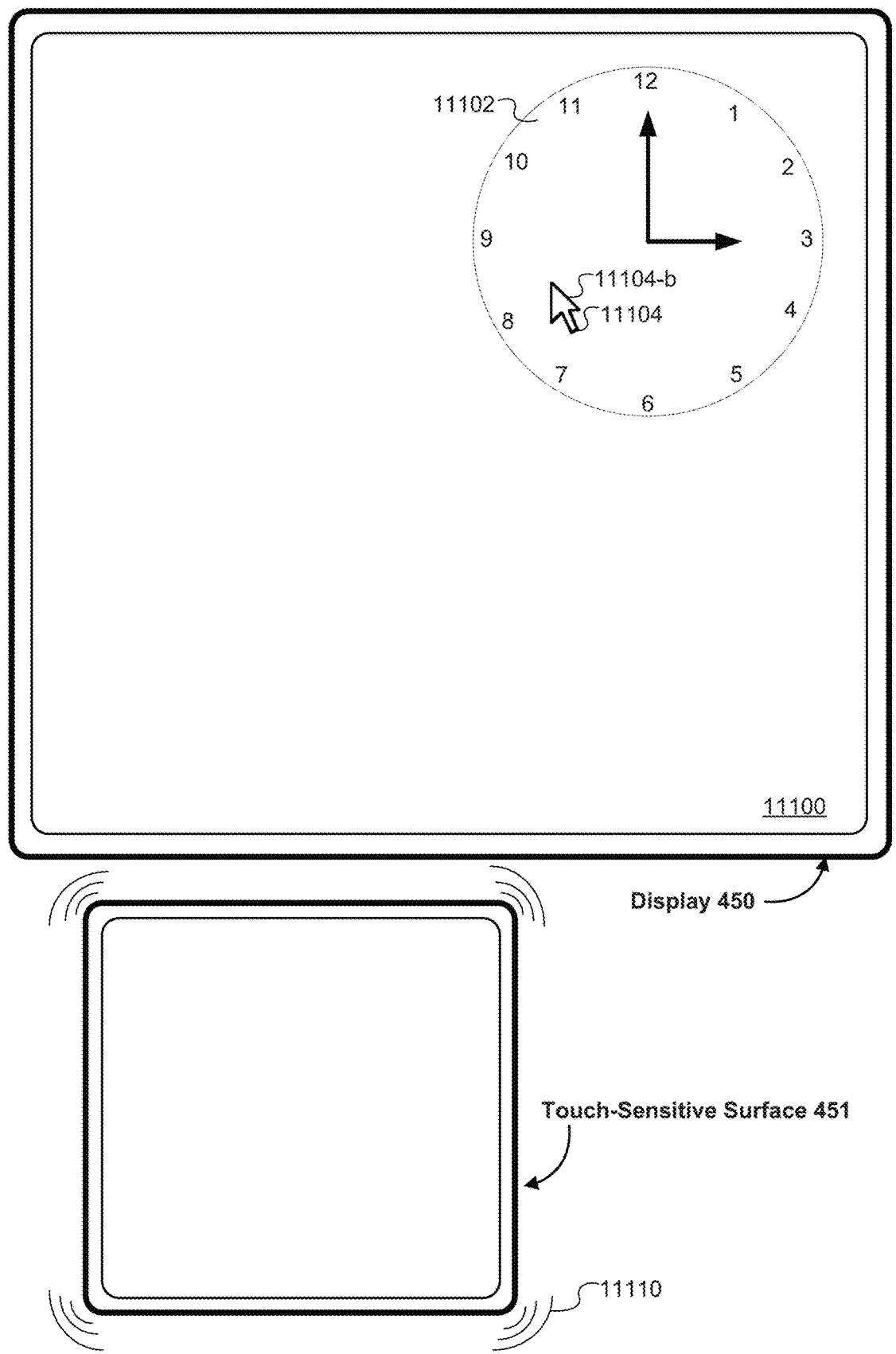

FIG. 14C illustrates an example of continuing to provide tactile feedback while detecting a focus selector over a representation of a clock. In this example, cursor 11104 at position 11104-*b* is over representation 11102 of a clock and tactile feedback 11110 continues to be provided on touch-sensitive surface 451. As discussed below with reference to FIG. 14B, tactile feedback 11110 includes a regular pattern of tactile outputs on touch-sensitive surface 451.

Figure 14D:
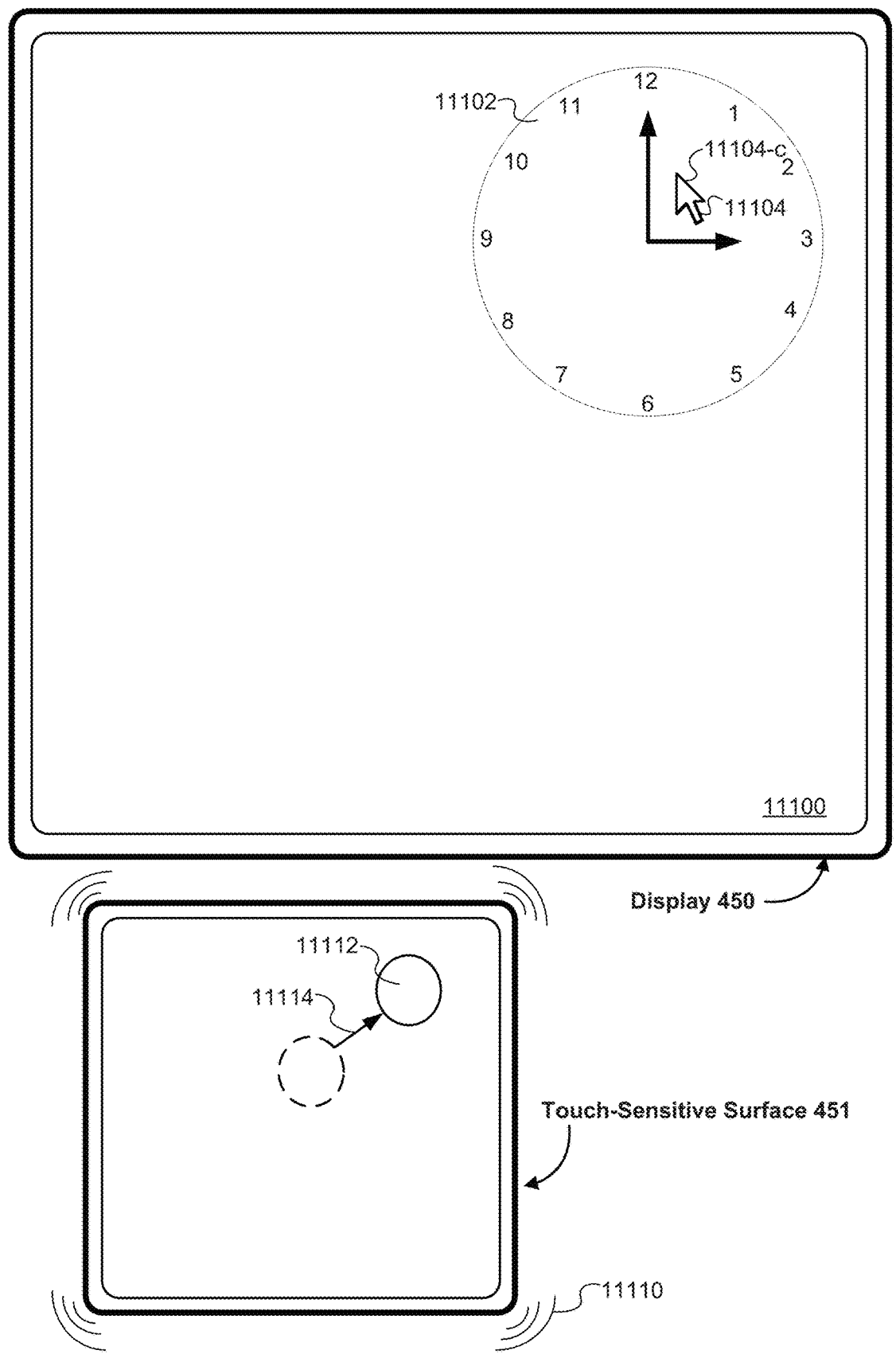

FIGS. 14C and 14D illustrate an example of movement of a focus selector that maintains the focus selector over a representation of a clock. In this example, a focus selector (e.g., cursor 11104) is initially at position 11104-*b* as shown in FIG. 14C. As shown in FIG. 14D, contact 11112 and movement 11114 are detected on touch-sensitive surface 451 and the corresponding movement of cursor 11104 causes cursor 11104 to move to position 11104-*c*. Since cursor 11104 is over representation 11102 of a clock when at position 11104-*c*, tactile feedback 11110 is provided on touch-sensitive surface 451. In some embodiments, the period of the regular pattern of tactile feedback is not based on movement of a focus selector (e.g., cursor 11104) that maintains the focus selector (e.g., cursor 11104) over representation 11102 of the clock. For example, in some embodiments, while the cursor 11104 remains over representation 11102 of the clock, the period of the regular pattern of tactile feedback is independent of movement of cursor 11104.

Figure 14E:
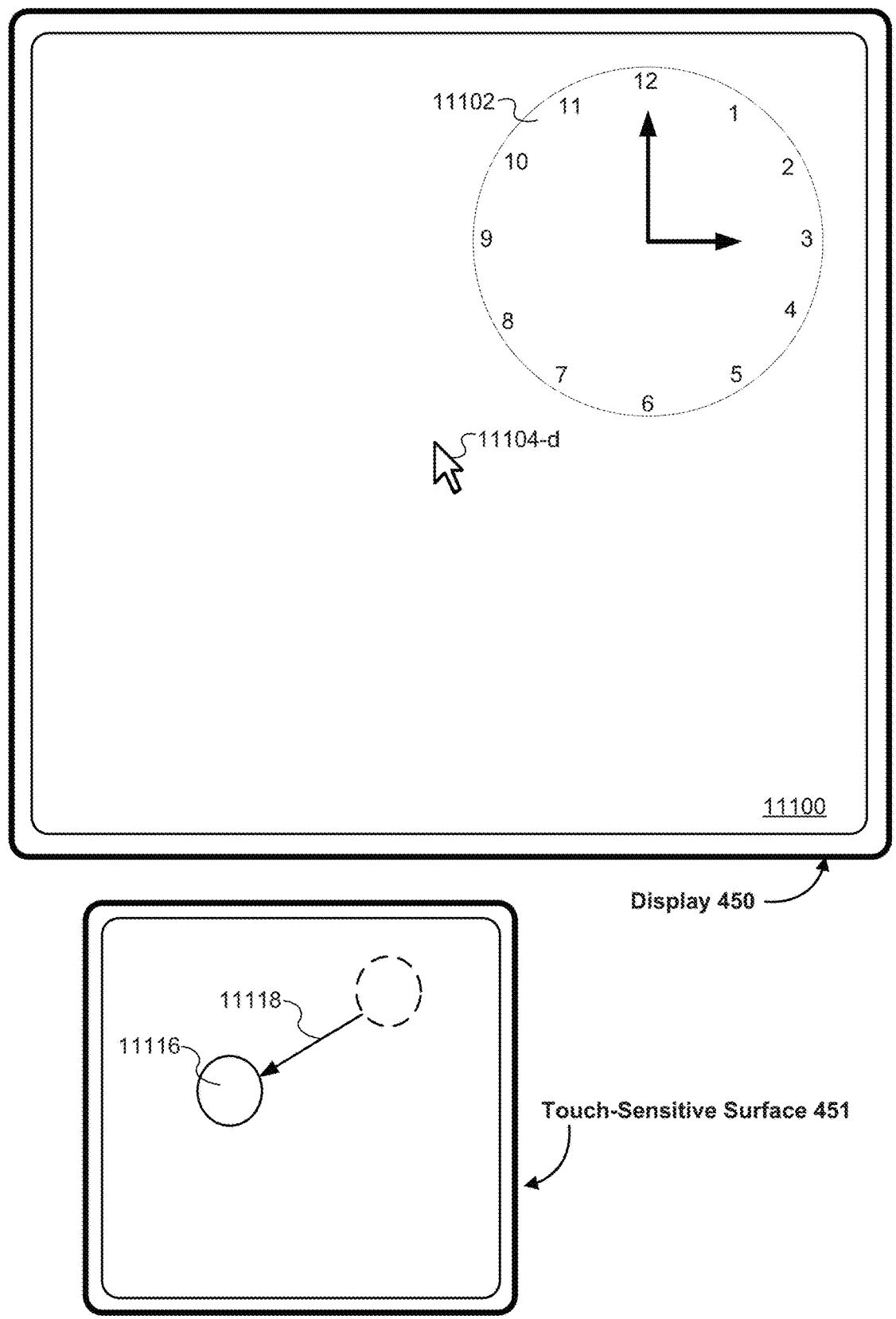

FIGS. 14D and 14E illustrate an example of movement of a focus selector away from a representation of a clock and therefore ceasing to provide tactile feedback corresponding to the clock. In this example, cursor 11104 is initially at position 11104-*c* as shown in FIG. 14D. As shown in FIG. 14E, contact 11116 and movement 11118 are detected on touch-sensitive surface 451 and the corresponding movement of cursor 11104 causes cursor 11104 to move to position 11104-*d*. Since cursor 11104 is no longer over representation 11102 of a clock when at position 11104-*d*, tactile feedback is no longer provided on touch-sensitive surface 451.

Figure 14F:
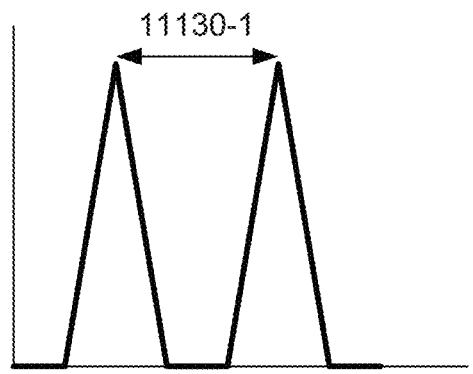
Figure 14G:
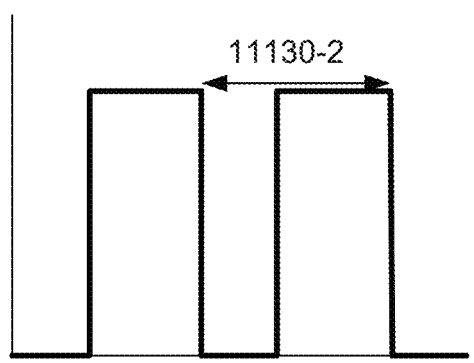
Figure 14H:
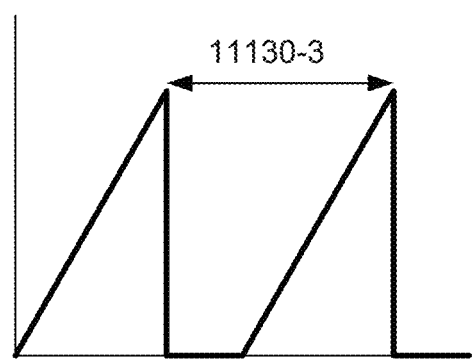

FIGS. 14F-14H illustrate example waveforms of movement profiles for generating the tactile feedback. FIG. 14F illustrates a triangle waveform with period 11130-1. FIG. 14G illustrates a square waveform with period 11130-2 and FIG. 14H illustrates a sawtooth waveform with period 11130-3. In some embodiments, one of the movement profiles illustrated in FIGS. 14F-14H will be utilized when generating tactile feedback 11110 corresponding to a clock, as discussed above. In these examples, since the regular pattern comprises repetition of single waveform, the period of the regular pattern is the same as the period of the individual waveform in the regular pattern. In some embodiments, the period (e.g., from peak to peak or leading edge to leading edge) of the regular pattern is 1 second.

Figure 14I:
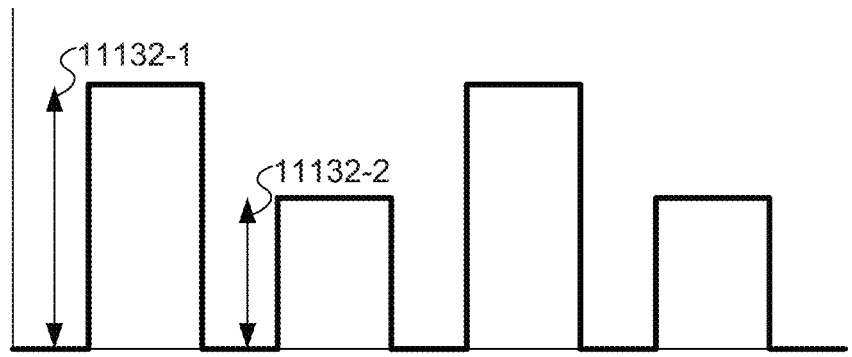
Figure 14J:
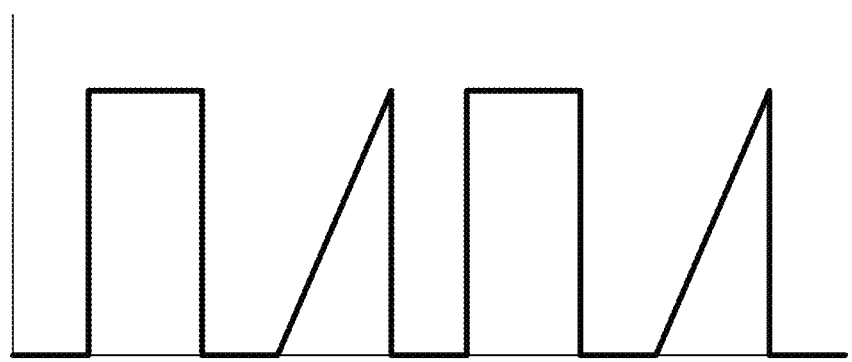

Per some embodiments, FIGS. 14I-14J illustrate example waveforms of movement profiles that include an alternating sequence of outputs. In some embodiments, tactile feedback 11110 includes an alternating sequence of tactile outputs that have different output characteristics. FIG. 14I illustrates an alternating sequence of square waves with approximately the same period and with different amplitudes 11132-1 and 11132-2. FIG. 14J illustrates an alternating sequence of square and sawtooth waves with approximately the same period and amplitudes. In some embodiments, the period (e.g., from peak to peak or leading edge to leading edge of outputs with the same movement profile) of the regular pattern is 2 seconds, so that the time between two successive outputs is 1 second or approximately 1 second (e.g., the time between a tick and a tock is 1 second and the time between a tock and a tick is 1 second).

In some embodiments, the tactile feedback 11110 includes other regular patterns of tactile outputs on touch-sensitive surface 451 than the ones shown in FIGS. 14F-14J. For example, the regular pattern can be a sequence of component waveforms, having a sequence of length L (where L is an integer greater than 0), that is repeatedly generated. In some embodiments, at least one component in the sequence of component waveforms is distinct from at least one of the other components in at least one respect (e.g., amplitude, period and/or shape). In some embodiments, each component waveform in the sequence of component waveforms is distinct from the other components in at least one respect (e.g., amplitude, period and/or shape), while in other embodiments, some components ("repeated components") in the sequence are the same (e.g., every Nth component in the sequence of L components is the same), while other components are different from the repeated components. In these embodiments, the period of the regular pattern is the period to generate the sequence of component waveforms (i.e., from the start time of a first instance of the regular pattern until the start time of a next instance of the regular pattern).

Figure 15A:
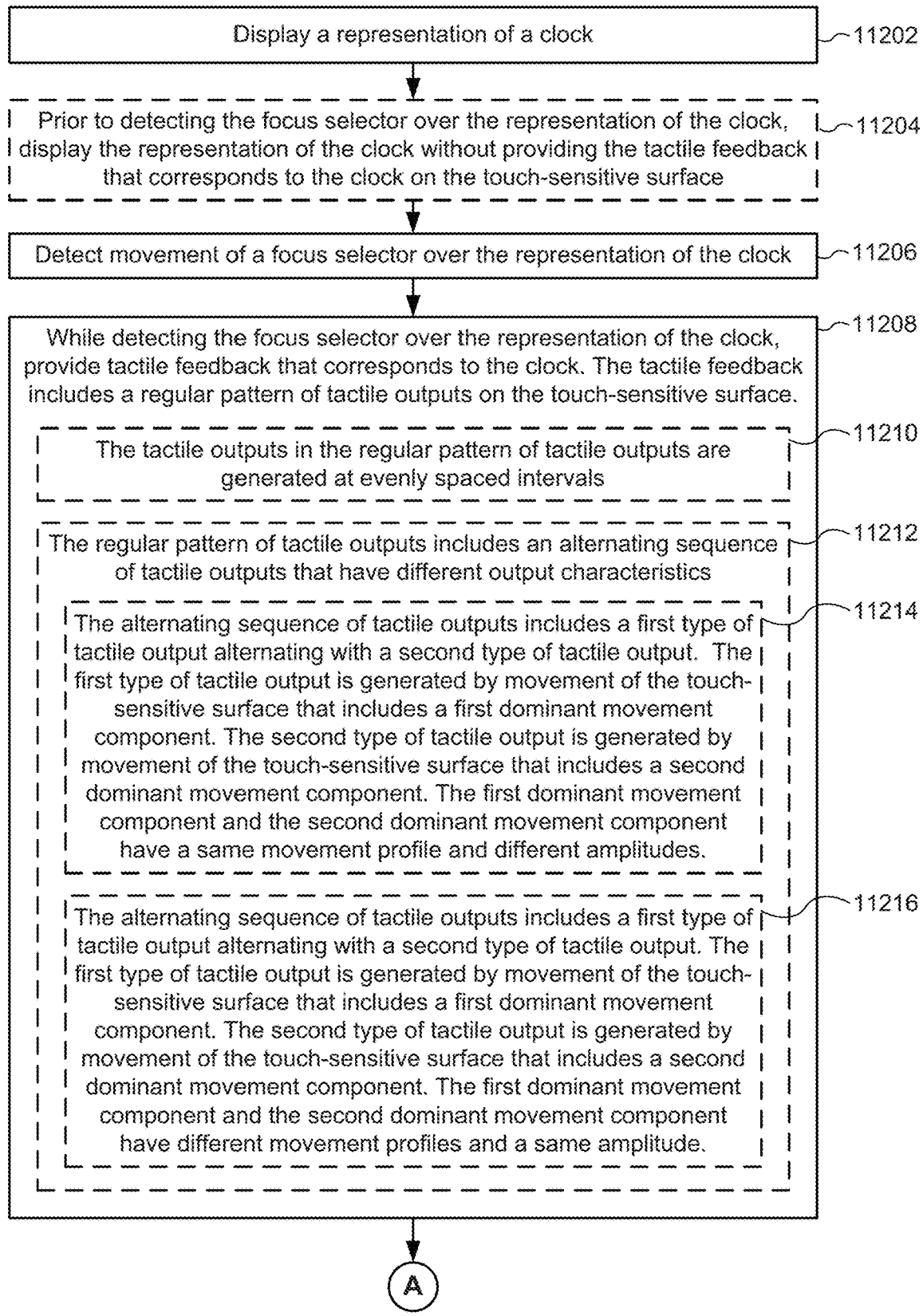
FIGS. 15A-15B are flow diagrams illustrating a method of providing tactile feedback corresponding to a clock in accordance with some embodiments.
Figure 15B:
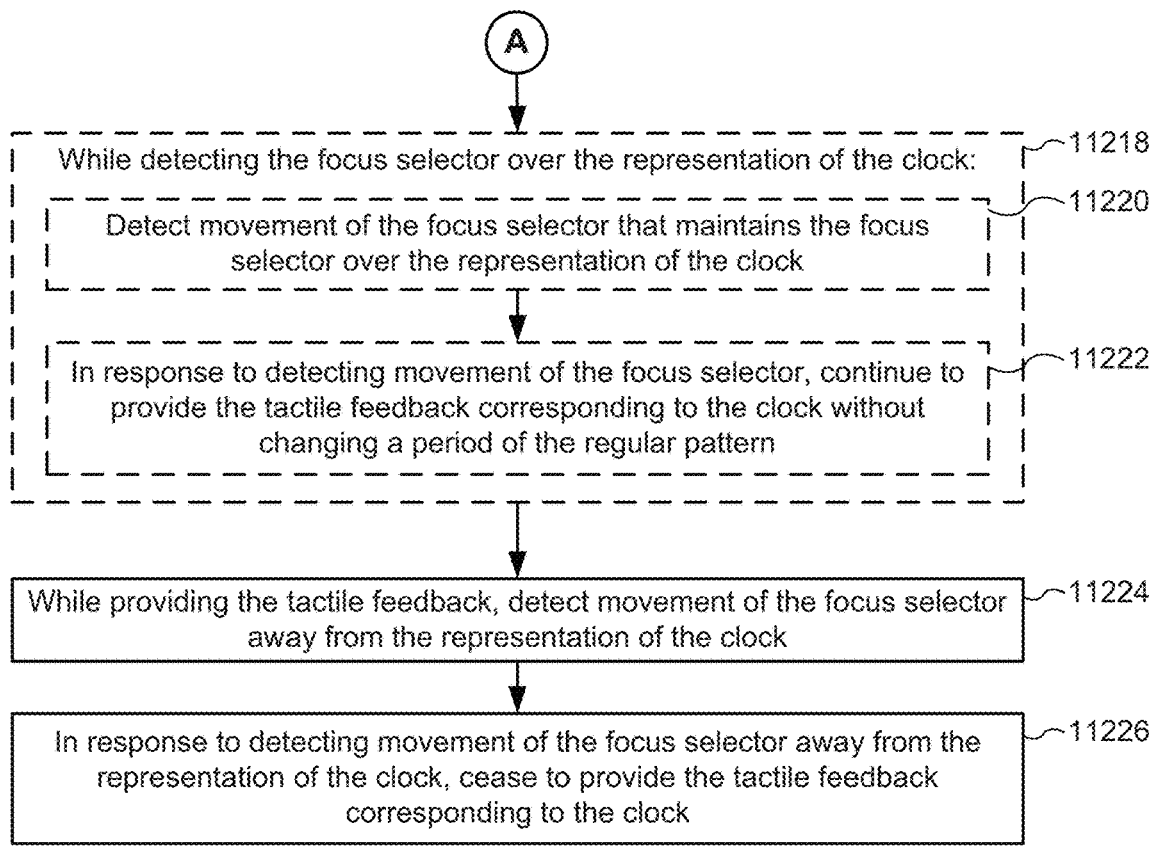

FIGS. 15A-15B are flow diagrams illustrating a method 11200 of providing tactile feedback corresponding to a clock in accordance with some embodiments. Method 11200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 11200 are, optionally, combined and/or the order of some operations is, optionally, changed.

As described below, the method 11200 provides an intuitive way to provide tactile feedback corresponding to a clock. The method reduces the cognitive burden on a user when displaying a clock, thereby creating a more efficient human-machine interface. For battery-operated electronic devices, enabling a user to interact with a clock faster and more efficiently conserves power and increases the time between battery charges.

The device displays (11202) a representation of a clock. FIG. 14A, for example, shows representation 11102 of a clock, displayed in graphical user interface 11100. In some embodiments, prior to detecting the focus selector over the representation of the clock, the device displays (11204) the representation of the clock without providing the tactile feedback that corresponds to the clock on the touch-sensitive surface (e.g., a tick-tock output corresponding to the clock is not generated prior to the focus selector moving over the clock). In FIG. 14A, for example, cursor 11104 is at position 11104-*a* and is not over representation 11102 of the clock and therefore tactile feedback 11110 is not generated by the device.

While displaying the representation of the clock, the device detects (11206) movement of a focus selector over the representation of the clock. As shown in FIG. 14B, for example, cursor 11104 moves to position 11104-*b* over representation 11102 of the clock from a position 11104-*a* that was not over the representation of the clock. While detecting the focus selector over the representation of the clock, the device provides (11208) tactile feedback that corresponds to the clock, where the tactile feedback includes a regular pattern of tactile outputs on the touch-sensitive surface. For example, FIG. 14C shows cursor 11104 at position 11104-*b* over representation 11102 of the clock and tactile feedback 11110 provided on touch-sensitive surface 451, where the tactile feedback includes a regular pattern of tactile outputs, such as those described above with reference to FIGS. 14F-14J.

In some embodiments, the tactile outputs in the regular pattern of tactile outputs are generated at evenly spaced intervals (11210). For example, in some embodiments, the regular pattern of tactile outputs will have a period of one second. In some other embodiments the regular pattern of tactile outputs will have a period of 0.5 seconds, 2 seconds, or other length of time between 0.25 seconds and ten seconds.

In some embodiments, the regular pattern of tactile outputs on the touch-sensitive surface includes one of the regular patterns described above with reference to FIGS. 14F-14J. For example, in some embodiments, the regular pattern of tactile outputs on the touch-sensitive surface includes an alternating sequence of tactile outputs that have different output characteristics (11212). For example, in some embodiments, the pattern of tactile outputs on the touch-sensitive surface will generate a tick-tock sensation where "tick" tactile outputs and "tock" tactile outputs are selected so as to produce "tick" sensations that correspond to "tick" tactile outputs feel different to a user than "tock" sensations that correspond to "tock" tactile outputs. FIGS. 14I-14J, for example, illustrate example waveforms of movement profiles that include an alternating sequence of outputs.

In some embodiments, the alternating sequence of tactile outputs includes a first type of tactile output alternating with a second type of tactile output (11214) with a different amplitude. For example, in some embodiments, various combinations of the waveforms of movement profiles illustrated in FIGS. 14F-14H would be utilized. In some embodiments, the first type of tactile output is generated by movement of the touch-sensitive surface that includes a first dominant movement component (e.g., movement corresponding to an initial impulse of the first tactile output, ignoring any unintended resonance). In some embodiments, the second type of tactile output is generated by movement of the touch-sensitive surface that includes a second dominant movement component (e.g., movement corresponding to an initial impulse of the second tactile output, ignoring any unintended resonance). In some embodiments, the first dominant movement component and the second dominant movement component have a same movement profile (e.g., same waveform shape such as square, sine, squine, sawtooth or triangle; and/or approximately the same width/period) and different amplitudes. FIG. 14I, for example, illustrates an example waveform of movement profiles with alternating square waves having different amplitudes 11132-1 and 11132-2.

In some embodiments, the alternating sequence of tactile outputs includes a first type of tactile output alternating with a second type of tactile output (11216) with a different movement profile. For example, in some embodiments, various combinations of the waveforms of movement profiles illustrated in FIGS. 14F-14H would be utilized. In some embodiments, the first type of tactile output is generated by movement of the touch-sensitive surface that includes a first dominant movement component (e.g., movement corresponding to an initial impulse of the first tactile output, ignoring any unintended resonance). In some embodiments, the second type of tactile output is generated by movement of the touch-sensitive surface that includes a second dominant movement component (e.g., movement corresponding to an initial impulse of the second tactile output, ignoring any unintended resonance). In some embodiments, the first dominant movement component and the second dominant movement component have different movement profiles (e.g., different waveform shapes such as square, sine, squine, sawtooth or triangle; and/or different width/period) and a same amplitude. FIG. 14J, for example, illustrates an example waveform of movement profiles with alternating square waves and sawtooth waves with the same amplitude.

In some embodiments, while detecting (11218) the focus selector over the representation of the clock, the device detects (11220) movement of the focus selector that maintains the focus selector over the representation of the clock and in response to detecting movement of the focus selector, the device continues to provide (11222) the tactile feedback corresponding to the clock without changing a period of the regular pattern. In some embodiments, the period of the regular pattern of tactile outputs is not changed based on movement of the focus selector while over the representation of the clock. For instance, per these embodiments, the period of tactile feedback 11110 would not change when cursor 11104 moves from position 11104-*b* in FIG. 14C to position 11104-*c* in FIG. 14D.

While providing the tactile feedback, the device detects (11224) movement of the focus selector away from the representation of the clock. FIG. 14E, for example, shows cursor 11104 moving to position 11104-*d* away from representation 11102 of the clock. In response to detecting movement of the focus selector away from the representation of the clock, the device ceases (11226) to provide the tactile feedback corresponding to the clock. For example, this is illustrated in FIGS. 14D-14E. In FIG. 14D, cursor 11104 is at position 11104-*b* over representation 11102 of the clock and the device provides tactile feedback 11110. However, in FIG. 14E, cursor 11104 moves to position 11104-*d* away from representation 11102 of the clock and the device ceases to generate tactile feedback 11110.

It should be understood that the particular order in which the operations in FIGS. 15A-15B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 11200 described above with respect to FIGS. 15A-15B. For example, the contacts, focus selectors, and tactile feedback (e.g., tactile outputs) described above with reference to method 11200 optionally has one or more of the characteristics of contacts, focus selectors, and tactile feedback (e.g., tactile outputs) described herein with reference to other methods described herein (e.g., those listed in the fifth paragraph of the Description of Embodiments). For brevity, these details are not repeated here.

Figure 16:
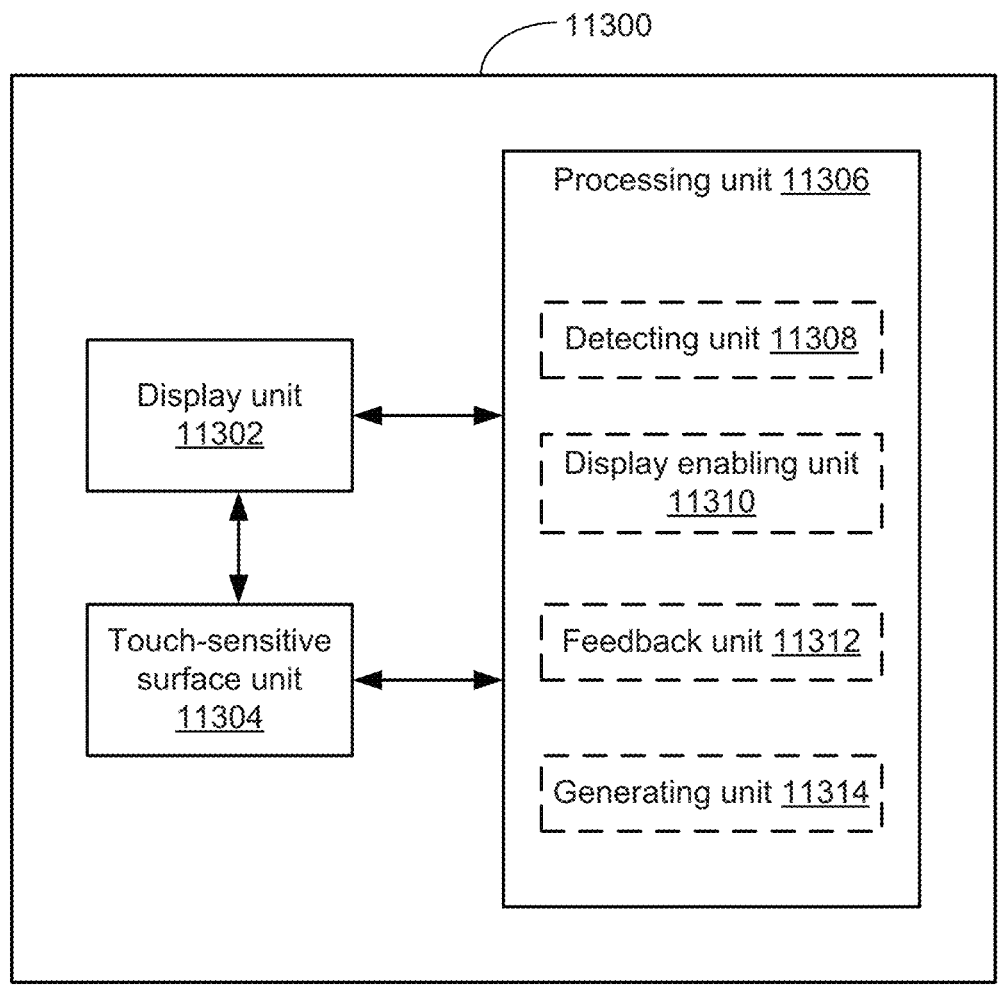
FIG. 16 is a functional block diagram of an electronic device in accordance with some embodiments.

In accordance with some embodiments, FIG. 16 shows a functional block diagram of an electronic device 11300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 11300 includes a display unit 11302 configured to display a representation of a clock; a touch-sensitive surface unit 11304; and a processing unit 11306 coupled to the display unit 11302 and the touch-sensitive surface unit 11304. In some embodiments, the processing unit includes detecting unit 11308, display enabling unit 11310, feedback unit 11312, and generating unit 11314.

The processing unit 11306 is configured to: detect movement of a focus selector over the representation of the clock (e.g., with the detecting unit 11308), while detecting the focus selector over the representation of the clock, provide tactile feedback (e.g., with the feedback unit 11312) that corresponds to the clock, where the tactile feedback includes a regular pattern of tactile outputs on the touch-sensitive surface unit. The processing unit is further configured to, while providing the tactile feedback, detect movement of the focus selector away from the representation of the clock (e.g., with the detecting unit 11308), and in response to detecting movement of the focus selector away from the representation of the clock, cease to provide the tactile feedback (e.g., with the feedback unit 11312) corresponding to the clock.

In some embodiments, the tactile outputs in the regular pattern of tactile outputs are generated at evenly spaced intervals (e.g., with the generating unit 11314).

In some embodiments, the processing unit 11306 is further configured to, while detecting the focus selector over the representation of the clock (e.g., with detecting unit 11308), detect movement of the focus selector that maintains the focus selector over the representation of the clock (e.g., with the detecting unit 11308), and in response to detecting movement of the focus selector, continue to provide the tactile feedback corresponding to the clock (e.g., with feedback unit 11312) without changing a period of the regular pattern.

In some embodiments, the processing unit 11306 is further configured to, prior to detecting the focus selector over the representation of the clock, display the representation of the clock on the display unit (e.g., with the display enabling unit 11310) without providing the tactile feedback that corresponds to the clock on the touch-sensitive surface unit.

In some embodiments, the regular pattern of tactile outputs on the touch-sensitive surface unit includes an alternating sequence of tactile outputs that have different output characteristics.

In some embodiments, the alternating sequence of tactile outputs includes a first type of tactile output alternating with a second type of tactile output, the first type of tactile output is generated by movement of the touch-sensitive surface unit (e.g., with the generating unit 11314) that includes a first dominant movement component, the second type of tactile output is generated by movement of the touch-sensitive surface unit (e.g., with the generating unit 11314) that includes a second dominant movement component, and the first dominant movement component and the second dominant movement component have a same movement profile and different amplitudes.

In some embodiments, the alternating sequence of tactile outputs includes a first type of tactile output alternating with a second type of tactile output, the first type of tactile output is generated by movement of the touch-sensitive surface unit (e.g., with the generating unit 11314) that includes a first dominant movement component, the second type of tactile output is generated by movement of the touch-sensitive surface unit (e.g., with the generating unit 11314) that includes a second dominant movement component, and the first dominant movement component and the second dominant movement component have different movement profiles and a same amplitude.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15B are, optionally, implemented by components depicted in FIGS. 1A-1B or FIG. 16. For example, detection operations 11206, 11220 and 11224 and tactile feedback operation 11208 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Tactile Feedback Corresponding to Beats of a Piece of Music

Many electronic devices have graphical user interfaces that display application windows showing representations of a piece of music (e.g., a graphical representation of a piece of cover art for an album of the piece of music, a region indicating that a piece of music is being currently being played or notes of a piece of music in a graphical representation of a music score corresponding to a piece of music). For example, a media player application window (e.g., an audio or video player) optionally includes a display region that provides information on a selected piece of music (e.g., the name, composer, artist, associated album, recording date, publisher and/or length of the piece of music). Likewise, a composing application window optionally displays an interactive representation of the musical score of a piece of music being composed, allowing the user to manipulate the piece of music by adding, removing or changing notes displayed in the score. Given the complexity of user interface environment that includes application windows corresponding to applications having both audio and visual components (e.g., music playback, music composition, video playback or video composition applications), there is a need to provide feedback that enables the user to more efficiently and conveniently navigate through the user interface environment.

The embodiments described below provide improved methods and user interfaces for generating feedback to a user navigating a complex user interface environment. More specifically, these methods and user interfaces provide feedback that corresponds to beats of a piece of music represented on a display. The tactile feedback provides the user with a sense of the beat of the piece of music. In this fashion, the methods and user interfaces provided below allow the user to more efficiently and conveniently achieve an understanding of the beat of the music, as well as a greater understanding of the piece of music as a whole, by providing tactile feedback, instead of or in addition to audible and/or visual feedback. For example, in some embodiments, a user searching for a piece of music with a specific beat (e.g., to accompany a visual display or to listen to while running) moves a focus selector over a representation of the piece of music on the display, a receives tactile feedback corresponding to the beat of the music, without having to listen to the music. Likewise, in some embodiments, a user composing a piece of music moves a focus selector over a representation of the musical piece they are composition and receives tactile feedback corresponding to the beat of the music, expediting the composition process.

Some methods for sensing the beat of a piece of music rely on the user listening to the piece of music and picking-up the beat themselves. Other methods for sensing the beat of a piece of music rely on the user detecting a visual cue (e.g., a flash or pulse on a display) corresponding to the beat of the music. However, there are many situations (e.g., at work, in a theatre and in various social situations) where the volume of an electronic device will be lowered or muted, rendering audible cues ineffective. Advantageously, the methods and user interfaces described below augment or replace audible by providing tactile feedback indicating that a user interface object has been selected and/or activated.

FIGS. 17A-17L illustrate exemplary user interfaces for providing feedback that corresponds to beats of a piece of music in accordance with some embodiments. The user interfaces in these figures are used to illustrate the processes described below, including the processes in FIGS. 18A-18B. FIGS. 17A-17B, 17G-17I and 17K-17L include intensity diagrams that show the current intensity of the contact on the touch-sensitive surface relative to a plurality of intensity thresholds including a contact detection intensity threshold (e.g., "$IT_0$") and a light press intensity threshold (e.g., "$IT_L$"). In some embodiments, operations similar to those described below with reference to $IT_L$ are performed with reference to a different intensity threshold (e.g., "$IT_D$"). In some embodiments, the operations described below are not dependent on an intensity of the contact. FIGS. 17C, 17E-17G and 17J include musical scores and waveform diagrams that show the amplitude (e.g., a high amplitude "$A_H$" or low amplitude "$A_L$") and shape (e.g., square or sawtooth) of the waveform corresponding to tactile output generated on the touch-sensitive surface in response to a tactile output generating event (e.g., selection or playback of a beat in a piece of music). These musical scores and waveform diagrams are typically not part of the displayed user interface, but are provided to aid in the interpretation of the figures.

Figure 17A:
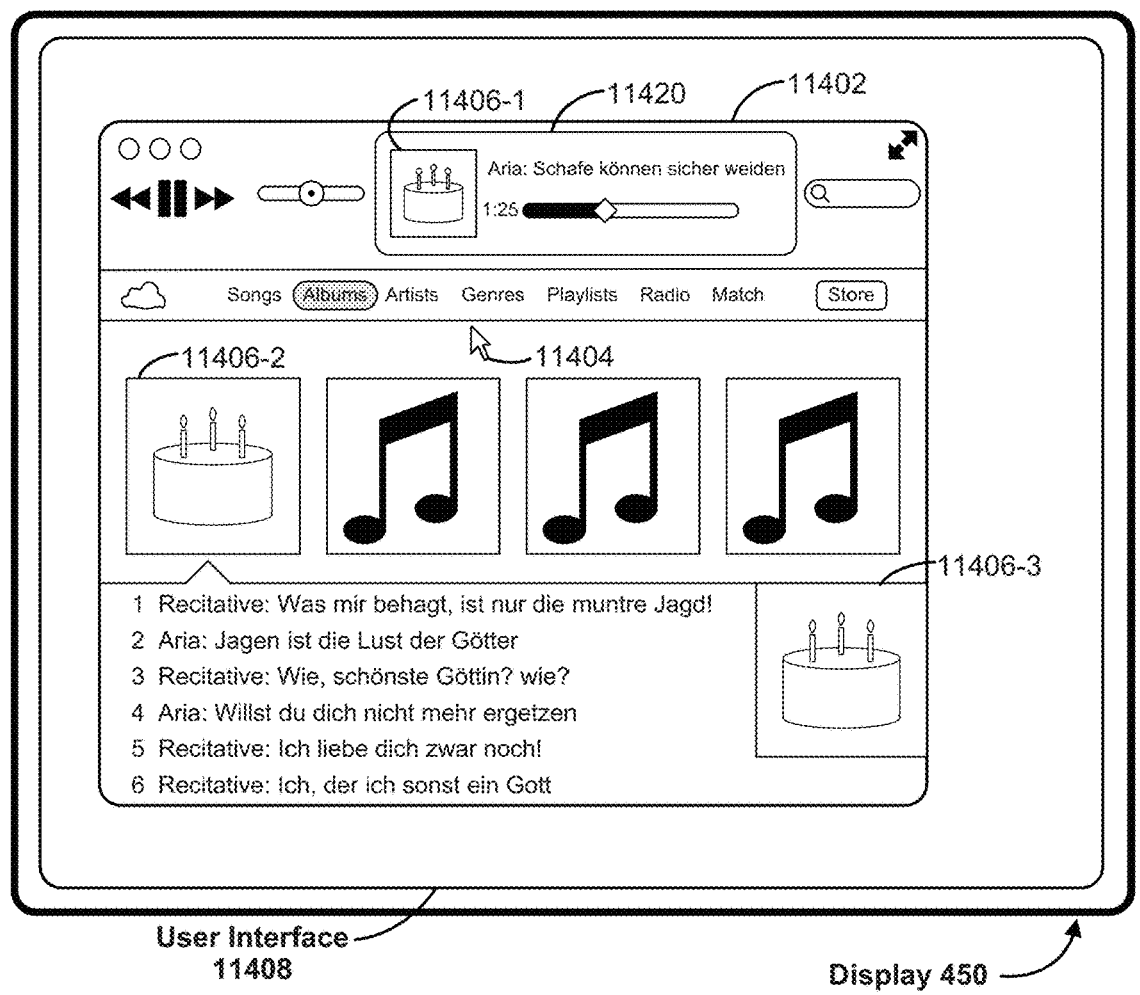
FIGS. 17A-17L illustrate exemplary user interfaces for providing feedback that corresponds to beats of a piece of music in accordance with some embodiments.
Figure 17A:
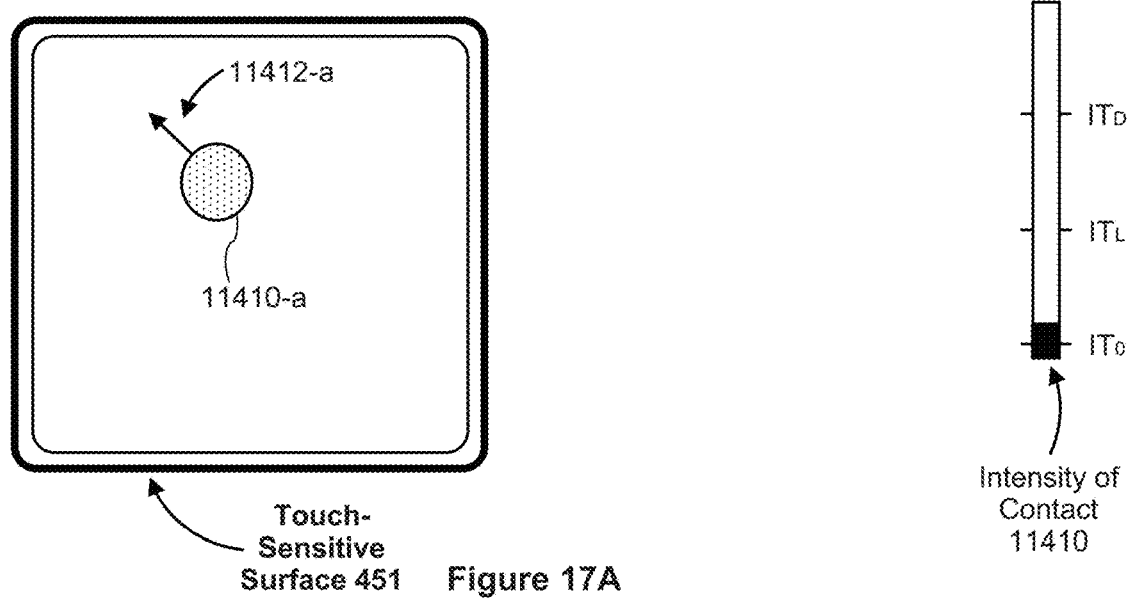
Figure 17B:
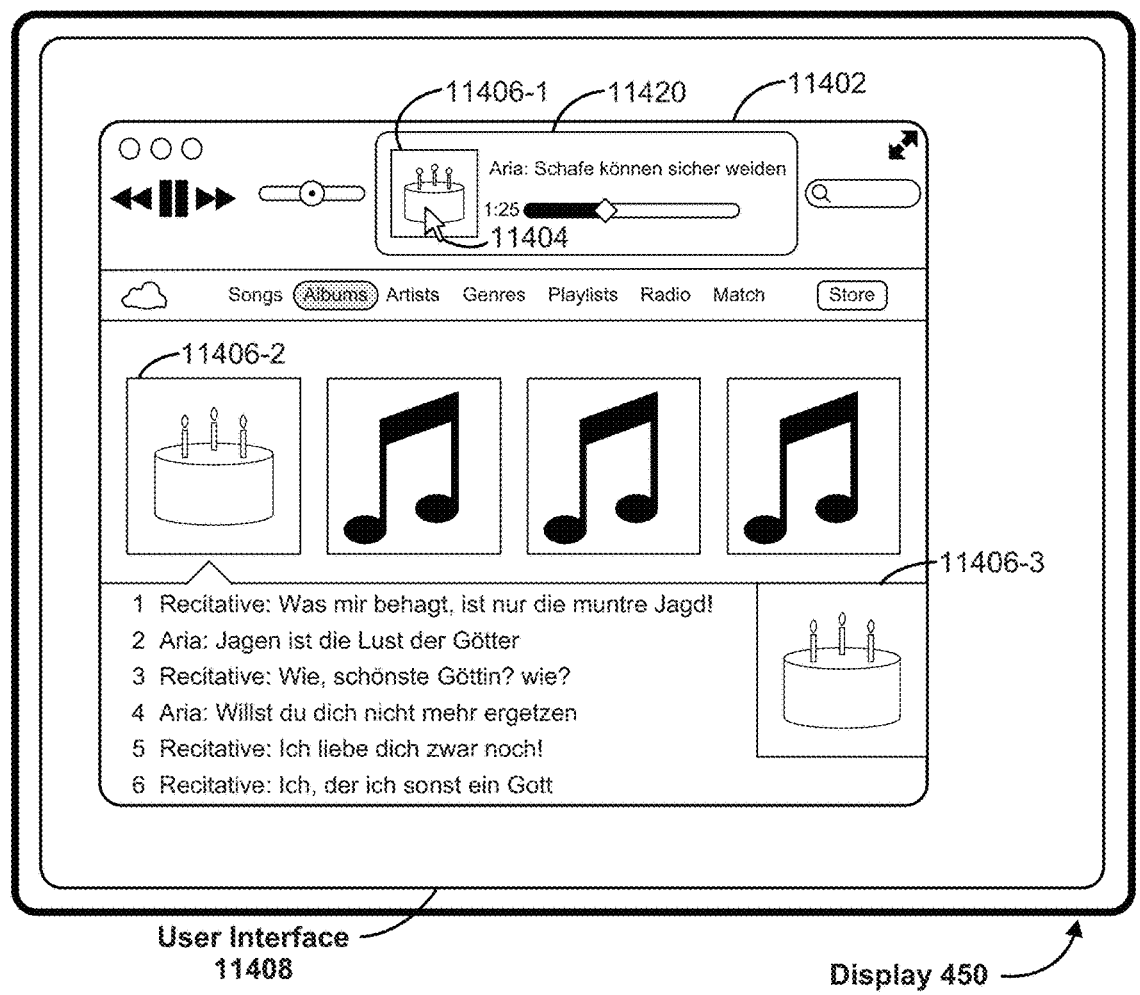
Figure 17B:
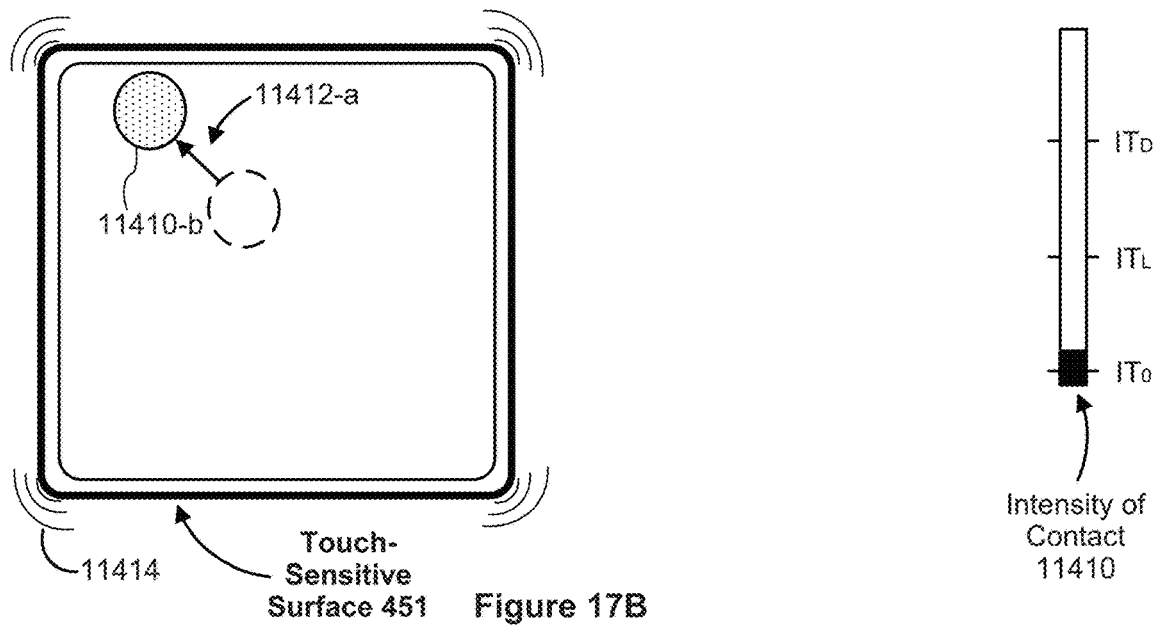
Figure 18A:
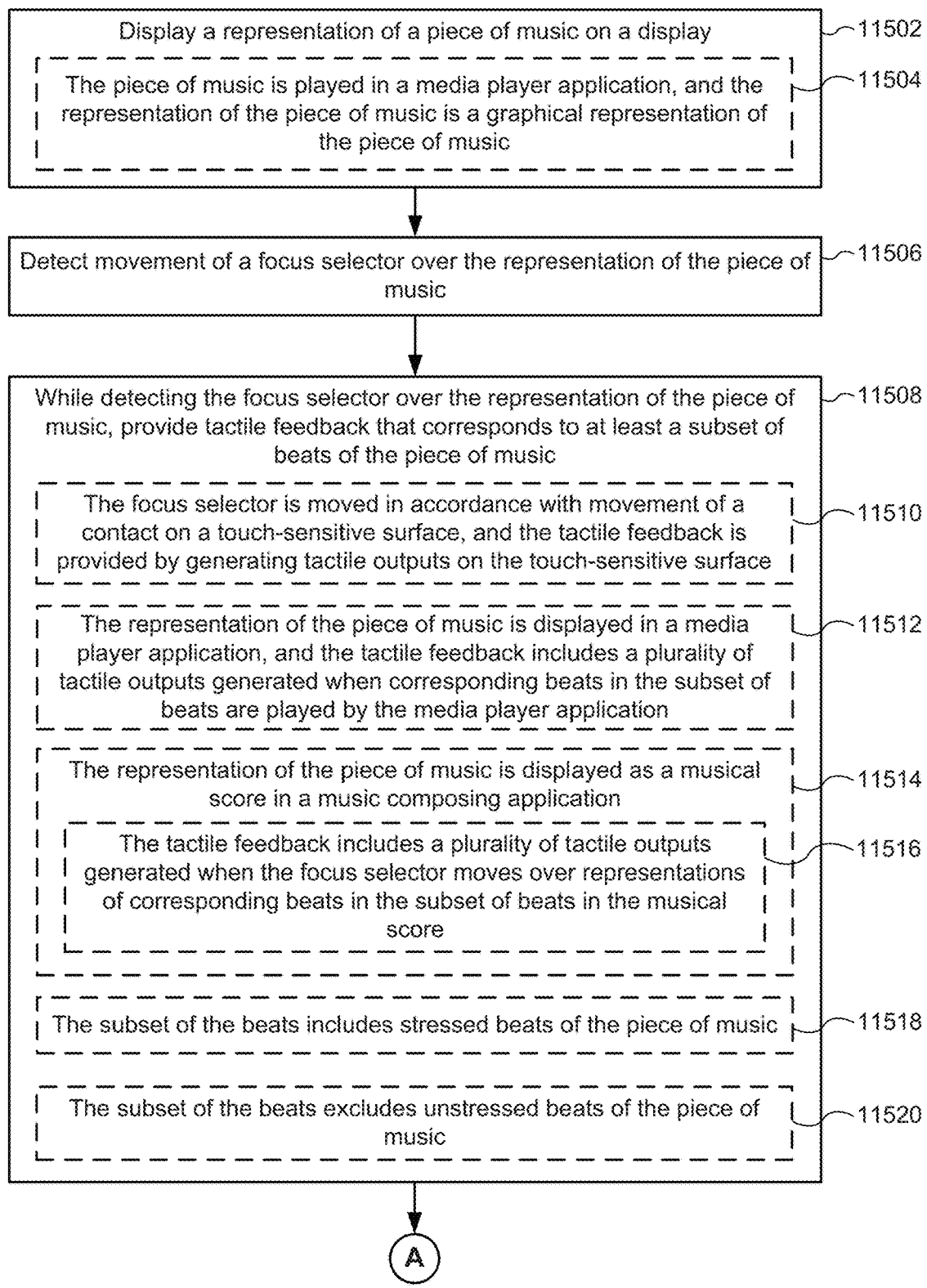
FIGS. 18A-18B are flow diagrams illustrating a method of providing feedback that corresponds to beats of a piece of music in accordance with some embodiments.
Figure 18B:
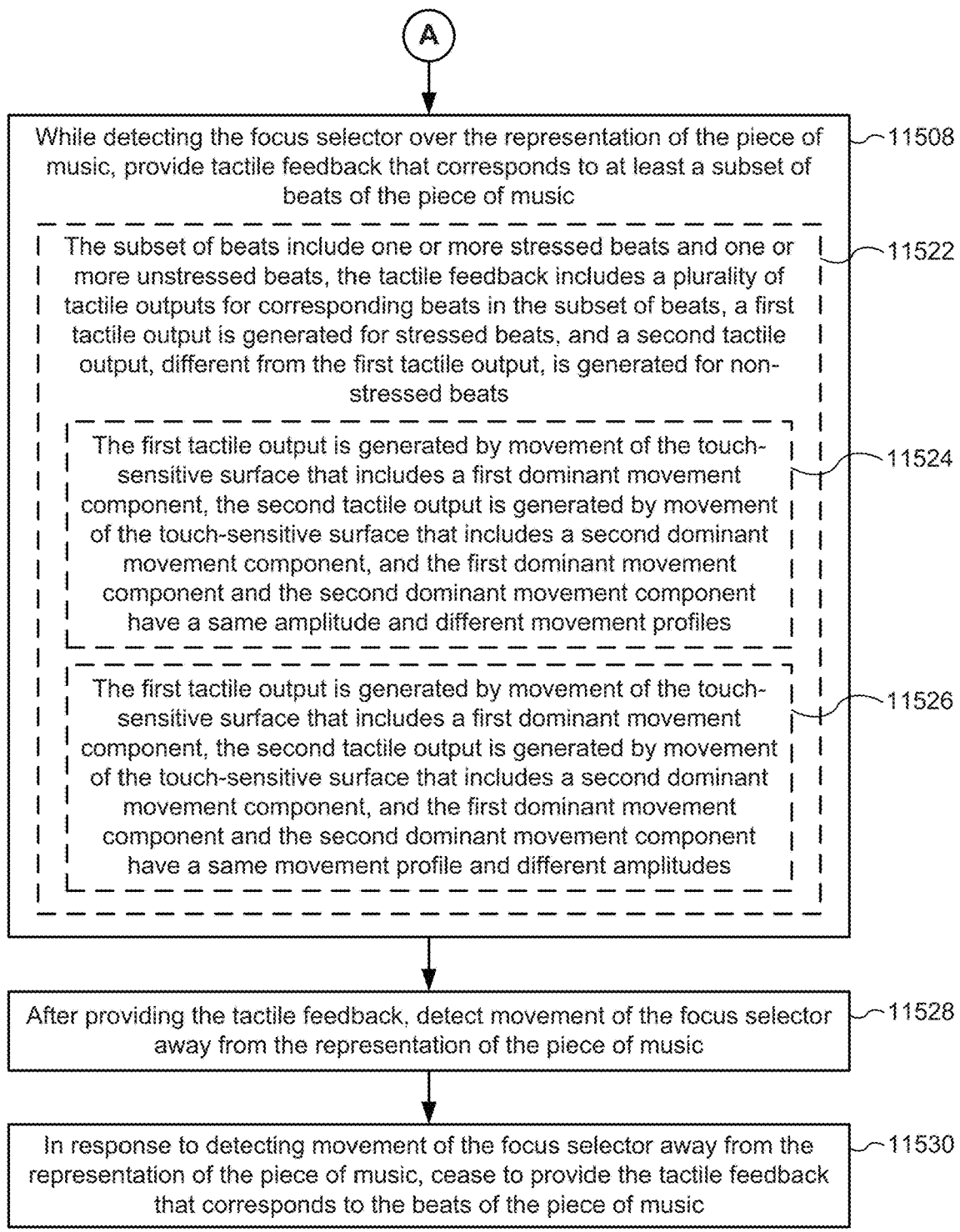

FIG. 17A illustrates exemplary user interface 11408 displaying one or more user interface objects, for example, user interface 11408 displays media player window 11402 that includes representations of a piece of music (e.g., graphical representations 11406-1, 11406-2, and 11406-3 of a piece of cover art for a musical album) and cursor 11404 (e.g., a displayed representation of a focus selector). In FIG. 17A, user interface 11408 is displayed on display 450 of an electronic device that also includes touch-sensitive surface 451 and one or more sensors for detecting intensity of contacts with touch-sensitive surface. In some embodiments, touch-sensitive surface 451 is a touch screen display that is optionally display 450 or a separate display.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 17A-17O and 18A-18B will be discussed with reference to display 450 and a separate touch-sensitive surface 451, however analogous operations are, optionally, performed on a device with a touch-sensitive display system 112 in response to detecting movement of the contacts described in FIGS. 17A-17O on the touch-sensitive display system 112 while displaying the user interfaces shown in FIGS. 17A-17O on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 11404.

FIGS. 17A-17G illustrate various embodiments where user interface 11408 displays representations 11406 of a piece of music on display 450. User interface 11408 also displays cursor 11404, controlled by contact 11410 on touch-sensitive surface 451 and movement 11412 thereof. In some embodiments, cursor 11404 moves over representation 11406 of a piece of music, and in response, tactile generators 167 provide tactile feedback (e.g., tactile outputs 11414) that corresponds to at least a subset of beats in the piece of music (e.g., beats 11418). In some embodiments, after the tactile feedback has been provided, cursor 11404 moves away from representation 11406 of a piece of music, and in response, tactile generators 167 cease to provide tactile feedback corresponding to beats in the piece of music.

Figure 17C:
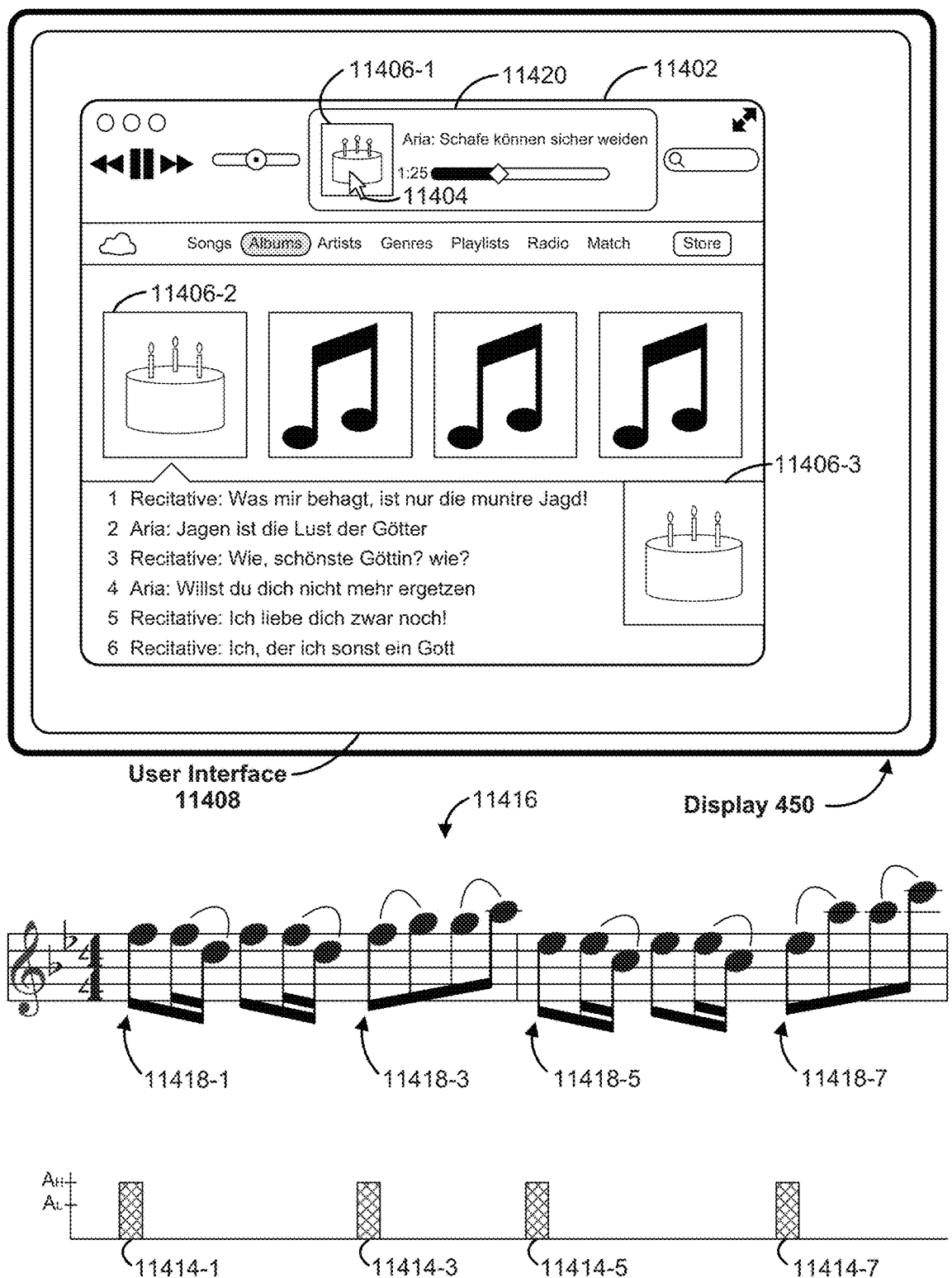
Figure 17D:
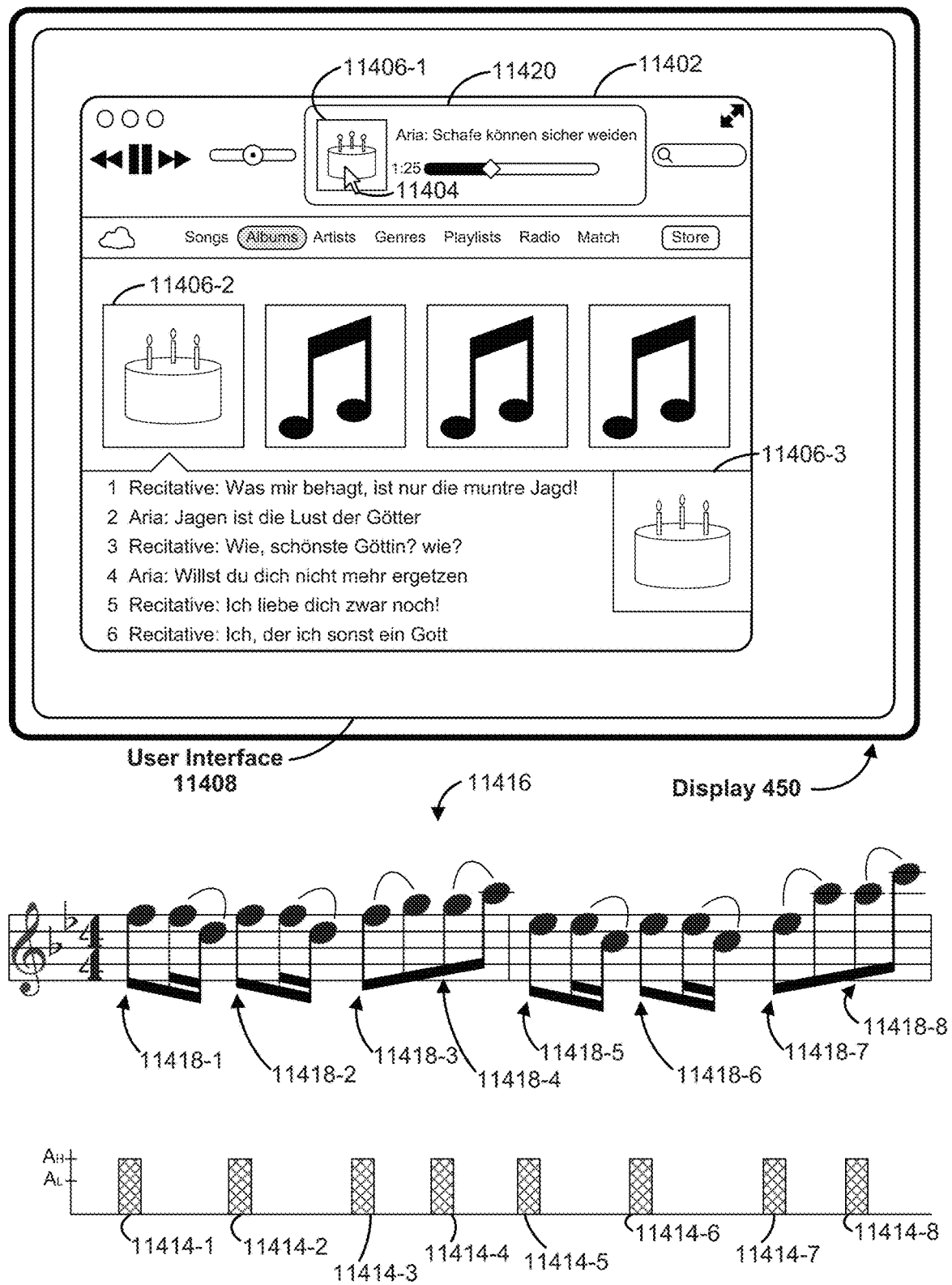
Figure 17E:
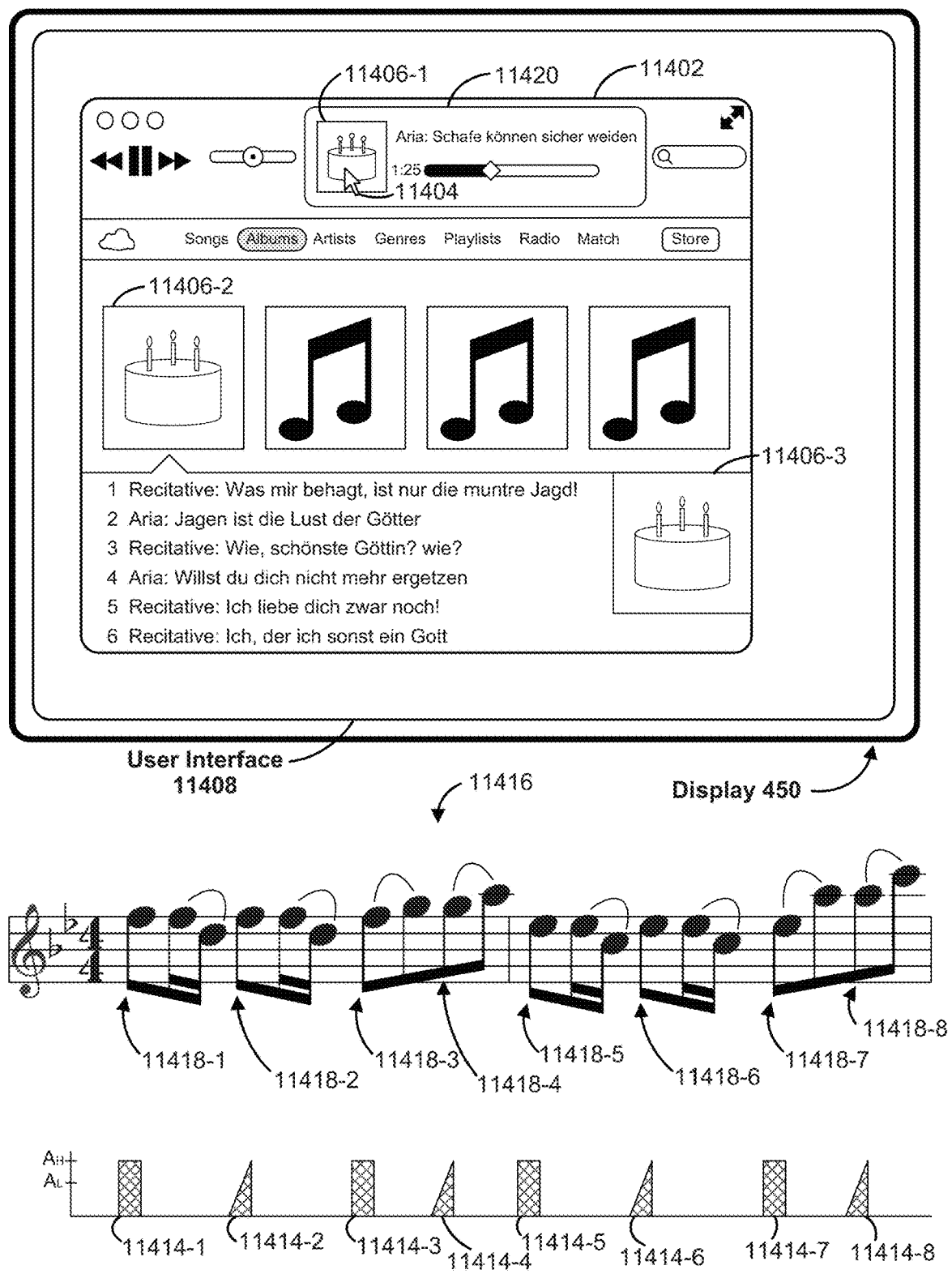
Figure 17F:
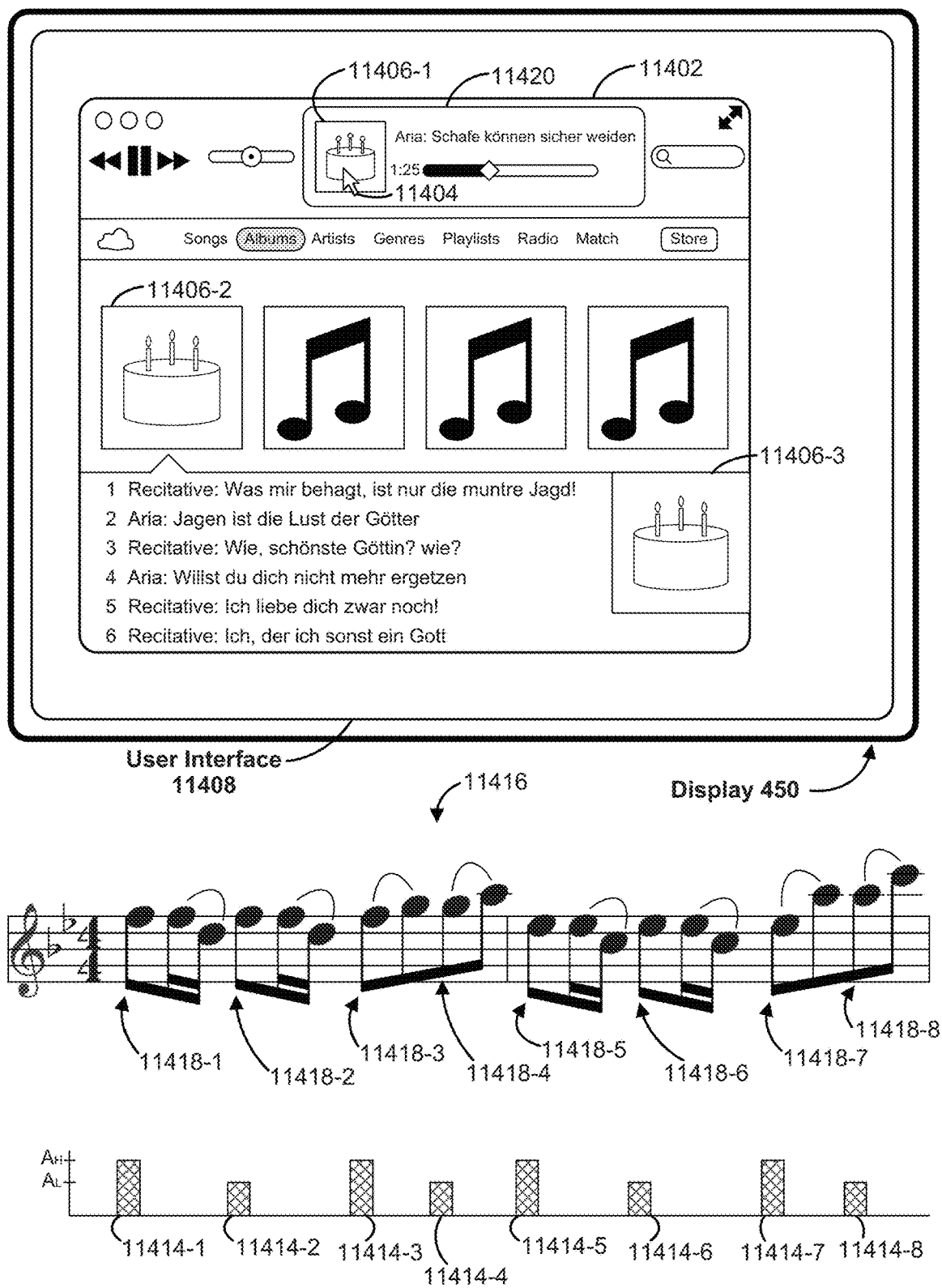
Figure 17G:
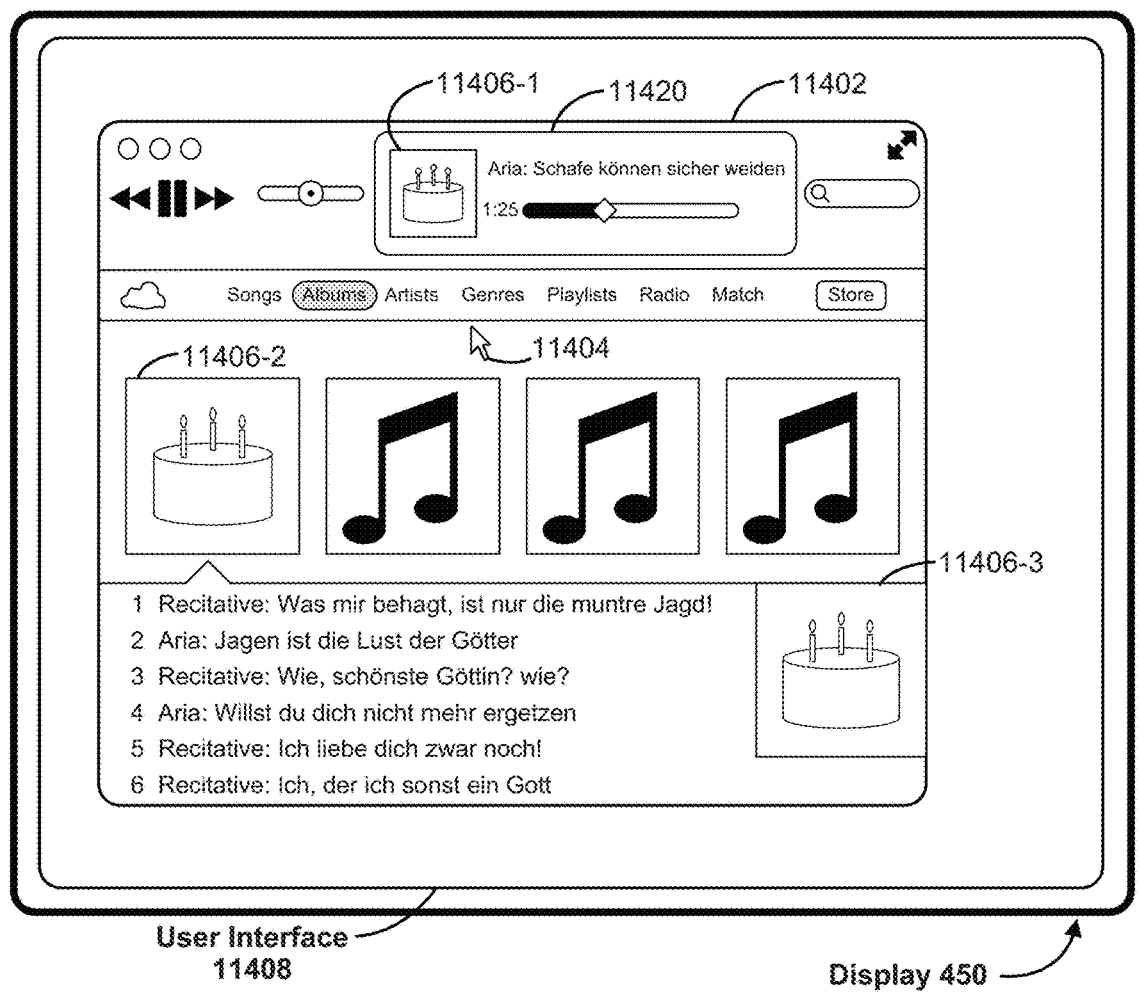
Figure 17G:
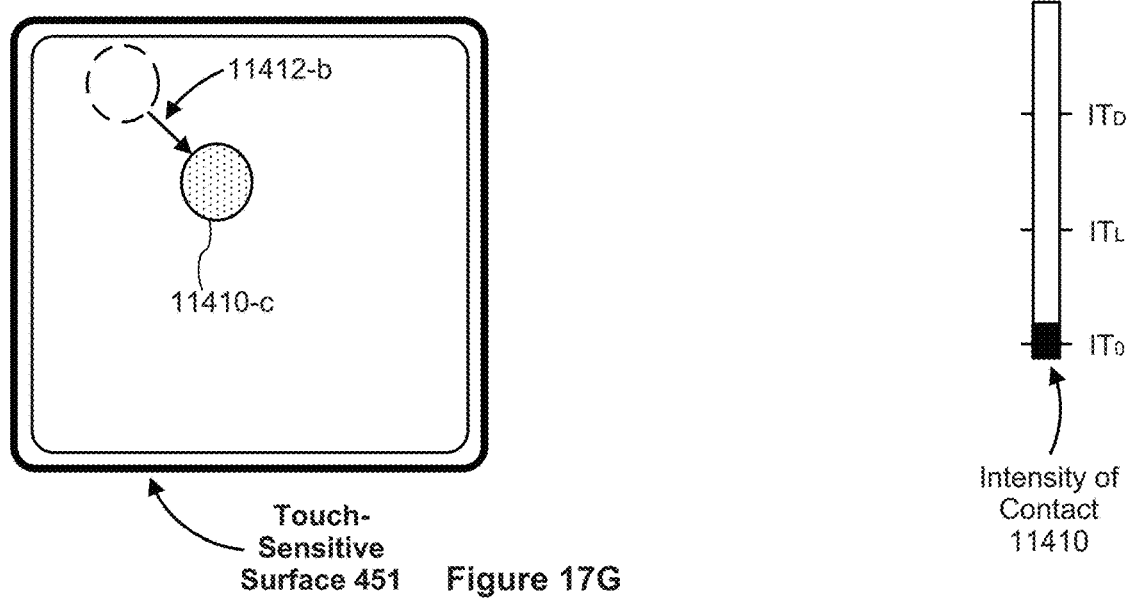
Figure 17H:
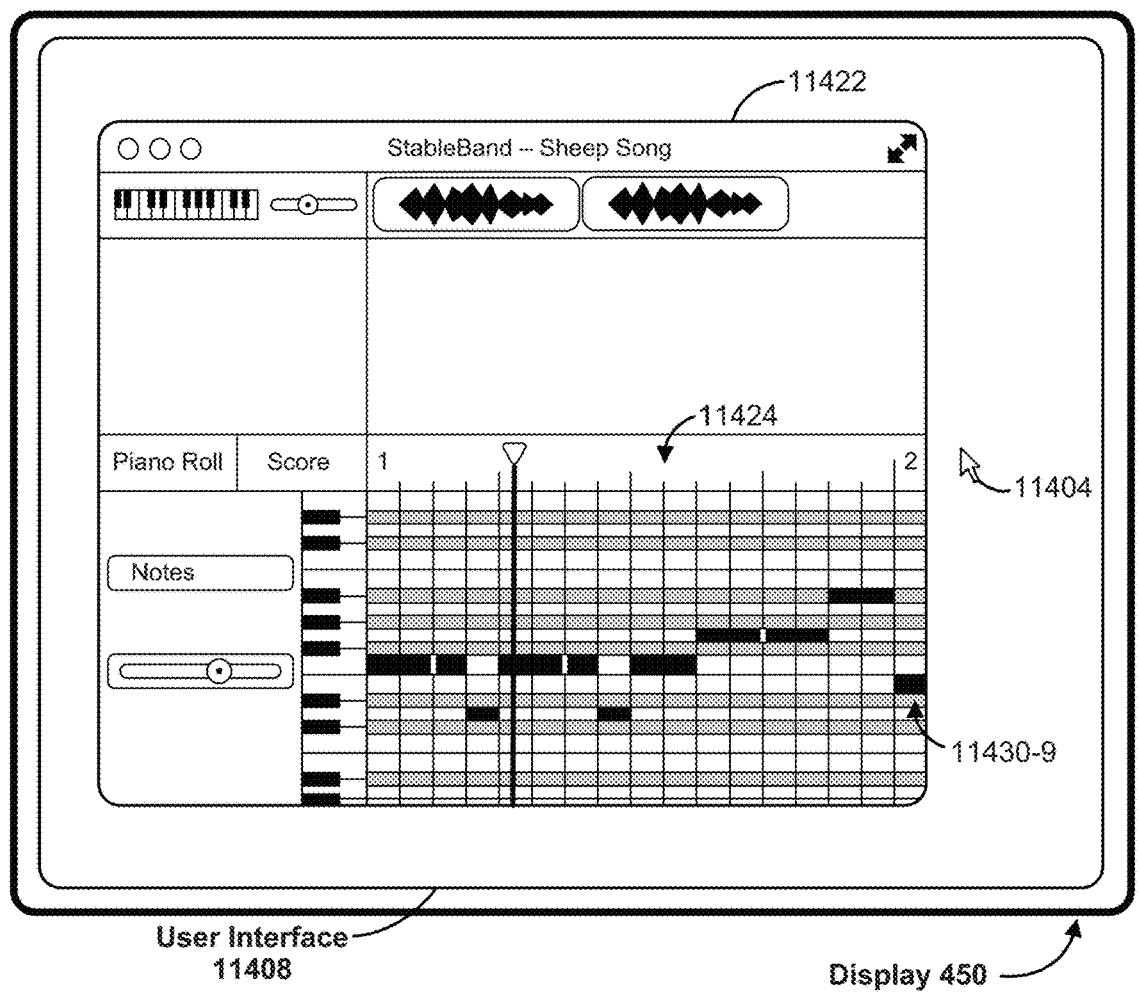
Figure 17H:
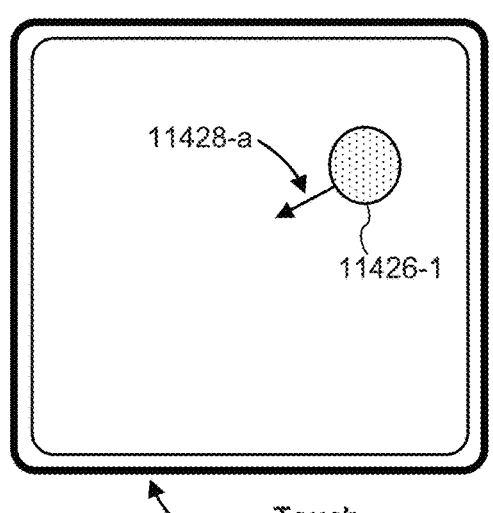
Figure 17H:
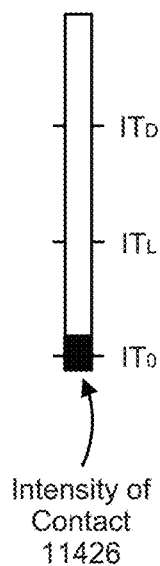

FIGS. 17A-17G illustrate that contact 11410, corresponding to cursor 11404 displayed on display 450, and a gesture including movement 11412 of contact 11410 (e.g., movement 11412-a of contact 11410 from location 11410-a in FIG. 17A to location 11410-b in FIGS. 17B-17F and/or movement 11412-b of contact 11410 from location 11410-b in FIGS. 17B-17F to location 11410-c in FIG. 17G) are detected on touch-sensitive surface 451. Contact 11410 is detected at a position on touch-sensitive surface 451 corresponding to an area on display 450 occupied by focus selector 11404 (e.g., contact 11410 corresponds to a focus selector on the display, such as cursor 11404 which is at or near a location of user interface object 11402). In some embodiments, movement of contact 11410 on touch-sensitive surface 451 corresponds to movement of focus selector (e.g., a cursor 11404) on display 450 (e.g., as illustrated in FIGS. 17A-17G).

FIGS. 17A-17F illustrate various examples of a beginning of a gesture where cursor 11404 moves over representation 11406 of a piece of music, in accordance with movement 11412-a of contact 11410 on touch-sensitive surface 451, corresponding to cursor 11404 on display 450. In FIGS.

17B-17F, while focus selector 11404 remains over representation 11406 of a piece of music, the device generates tactile outputs 11414 (e.g., via tactile output generators 167), corresponding to a subset of beats (e.g., beats 11418 shown in FIGS. 17C-17F) of the piece of music.

In some embodiments, as illustrated in FIGS. 17A-17G, the piece of music is being played in a media player application (e.g., illustrated as media player application window 11402). In some embodiments, as illustrated in FIGS. 17A-17G, the representation of the piece of music is a graphical representation of the piece of music (e.g., images 11406 of cover art corresponding to an album of the piece of music).

FIGS. 17C-17F illustrate various embodiments where representation 11406 of the piece of music is displayed in media player application window 11402 and tactile feedback (e.g., tactile outputs 11414-1, 11414-3, 11414-5, and 11414-7 in FIGS. 17C-17F) are generated when corresponding beats (e.g., beats 11418-1, 11418-3, 11418-5, and 11418-7 in FIGS. 17C-17F) in a subset of beats (e.g., a subset of all of the beats in piece of music 11416) are played by the media player application. FIGS. 17C-17F also illustrate various embodiments, where the subset of beats (e.g., those beats that correspond to tactile feedback provided to the user) include stressed beats on every other beat, including the first (e.g., beat 11418-1), third (e.g., beat 11418-3), fifth (e.g., beat 11418-5) and seventh (e.g., beat 11418-7) beats of the piece of music.

FIG. 17C illustrates an embodiment where the subset of beats excludes unstressed beats, including the second (e.g., beat 11418-2), fourth (e.g., beat 11418-4), sixth (e.g., beat 11418-6) and eighth (e.g., beat 11418-8) beats of the piece of music (e.g., piece of music 11416). In contrast, FIGS. 17D-17F, described below, illustrate various embodiments, where the subset of beats includes both stressed beats (e.g., every odd beat 11418) and unstressed beats (e.g., every even beat 11418) of the piece of music. FIG. 17D illustrates an embodiment, where the tactile outputs 11414 are substantially the same, regardless of whether they correspond to a stressed beat or an unstressed beat. In contrast, FIGS. 17E-17F, described below, illustrate various embodiments, where first tactile outputs 11414 corresponding to stressed beats (e.g., odd number beats 11418) are substantially different from second tactile outputs 11414 corresponding to unstressed beats (e.g., even number beats 11418).

For example, FIG. 17E illustrates an embodiment where first tactile outputs 11414 corresponding to stressed beats 11418 have a same or substantially same amplitude (e.g., high amplitude "$A_H$") but a substantially different movement profile (e.g., square waveform shape 11436 as compared to sawtooth waveform shape 11434) as second tactile outputs 11414 corresponding to unstressed beats 11418 of the piece of music. In contrast, FIG. 17F illustrates an embodiment, where first tactile outputs 11414 corresponding to stressed beats 11418 have a substantially different amplitude (e.g., high amplitude "$A_H$" as compared to low amplitude "$A_L$") but substantially a same movement profile (e.g., square waveform shape 11434) as second tactile outputs 11414 corresponding to unstressed beats 11418 of the piece of music.

FIGS. 17B-17G illustrate various embodiments where after providing tactile feedback, as illustrated in FIGS. 17B-17F, the device detects movement 11412-b of contact 11410 on touch sensitive surface 451 that corresponds to movement of cursor 11404 away from representation 11406 of the piece of music. As illustrated in FIG. 17G, in response to the movement of cursor 11404 away from representation 11406 of the piece of music, tactile generators 167 cease providing tactile outputs 11414, corresponding to beats of the piece of music.

FIGS. 17H-17L illustrate various embodiments where user interface 11408 displays music composition application window 11422, which includes representation 11424 of a musical score, on display 450. User interface 11408 also displays cursor 11404, controlled by contact 11426 on touch-sensitive surface 451 and movement 11428 thereof. In some embodiments, cursor 11404 moves over representation 11424 of a musical score, and in response, tactile generators 167 provide tactile feedback (e.g., tactile outputs 11414) that corresponds to at least a subset of beats in the piece of music (e.g., beats 11418). In some embodiments, after the tactile feedback has been provided, cursor 11404 moves away from representation 11424 of the musical score, and in response, tactile generators 167 cease to provide tactile feedback corresponding to beats in the piece of music.

Figure 17I:
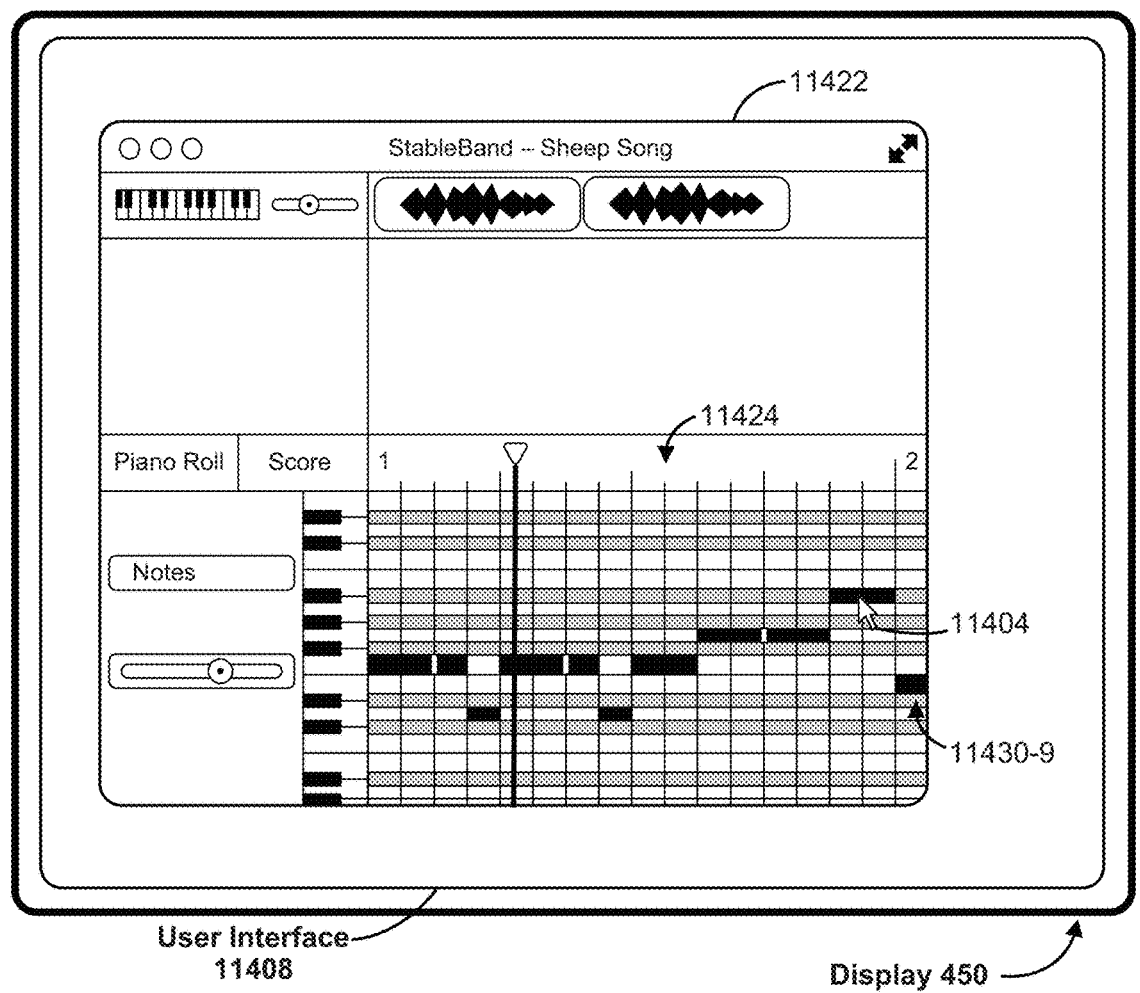
Figure 17I:
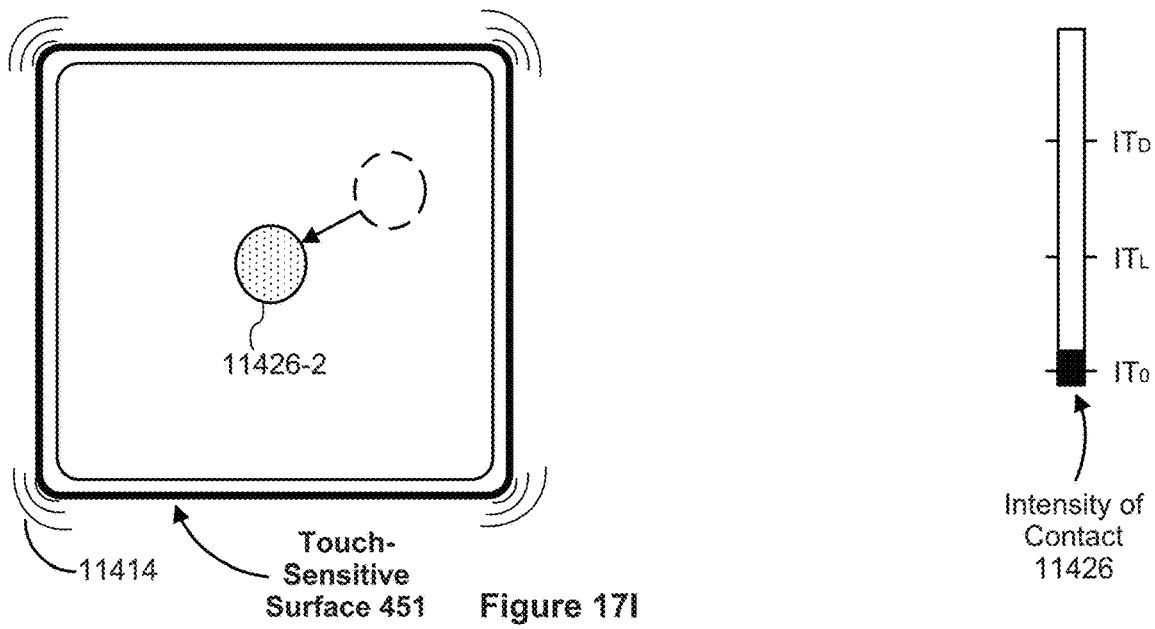
Figure 17J:
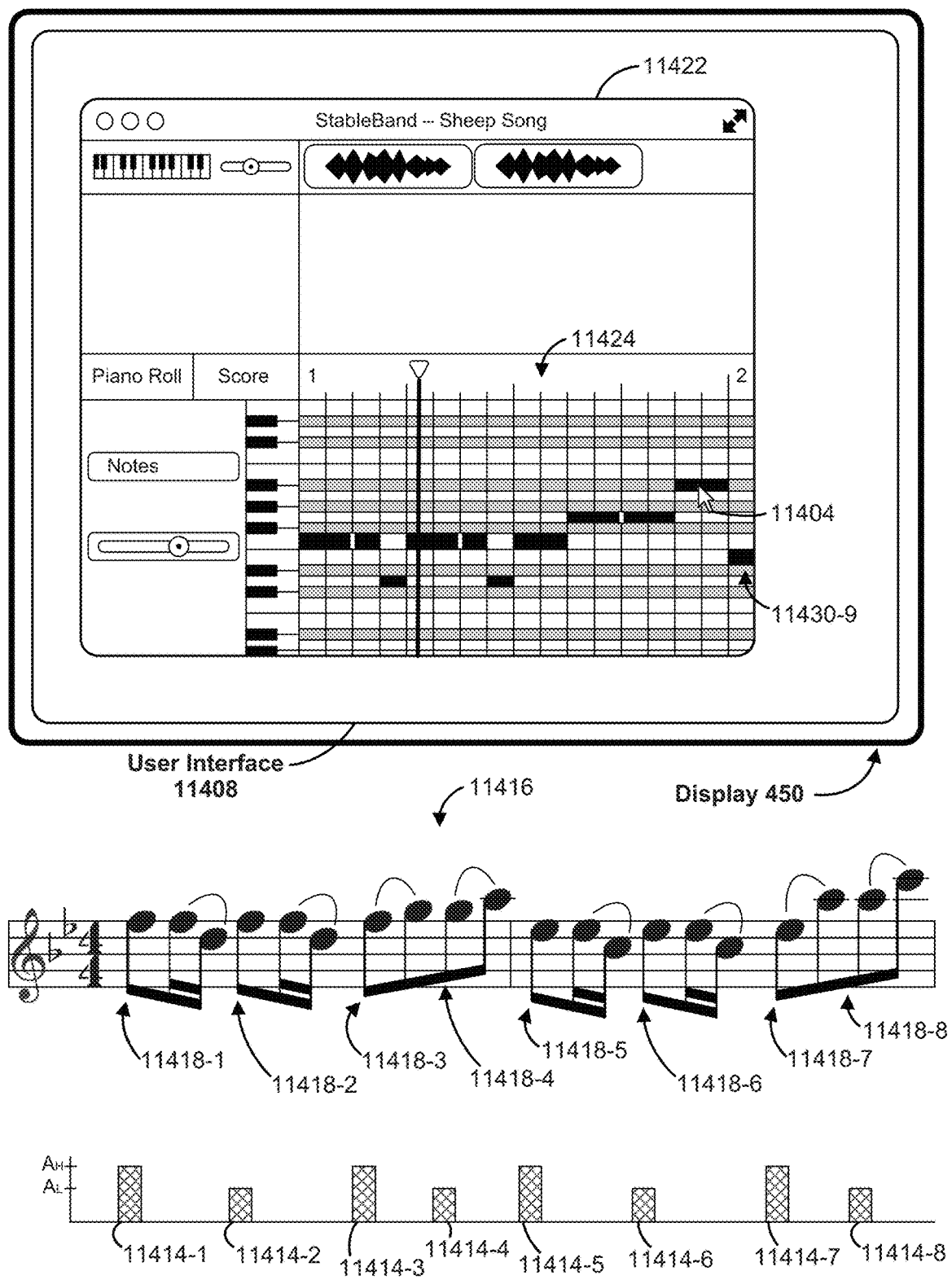

In some embodiments, as illustrated in FIGS. 17I-17J, movement of cursor 11404 over representation 11424 of a musical score, in accordance with movement 11428-a of contact 11426 on touch-sensitive surface 451, while the piece of music (e.g., a composition) is being played back by the composition application, results in the generation of tactile outputs 11414 corresponding to beats 11418 of the piece of music when the beats are played by the media application. Although FIG. 17J illustrates that first tactile outputs 11414 corresponding to stressed beats 11418 (e.g., the odd numbered tactile outputs 11414 and beats 11418, respectively) and second tactile outputs 11414 corresponding to unstressed beats 11418 (e.g., the even numbered tactile outputs 11414 and beats 11418, respectively) feel substantially different (e.g., have a substantially different amplitude, but a same or substantially same square waveform movement profile), in some embodiments, the first tactile outputs and second tactile outputs are generated with substantially the same amplitude and movement profile and thus will feel substantially the same to a user. In some embodiments, the second tactile outputs corresponding to unstressed beats are excluded (e.g., are not generated by the device).

Figure 17K:
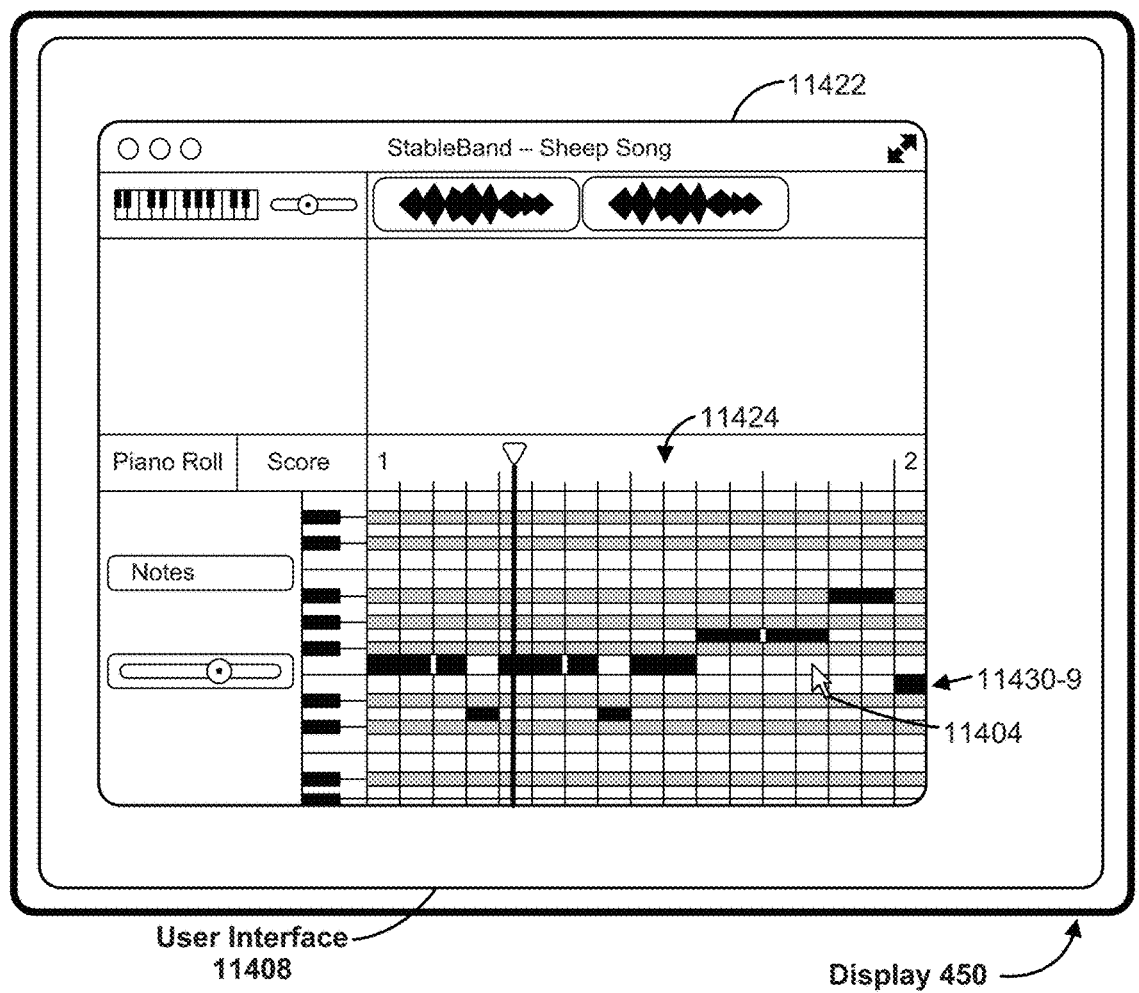
Figure 17K:
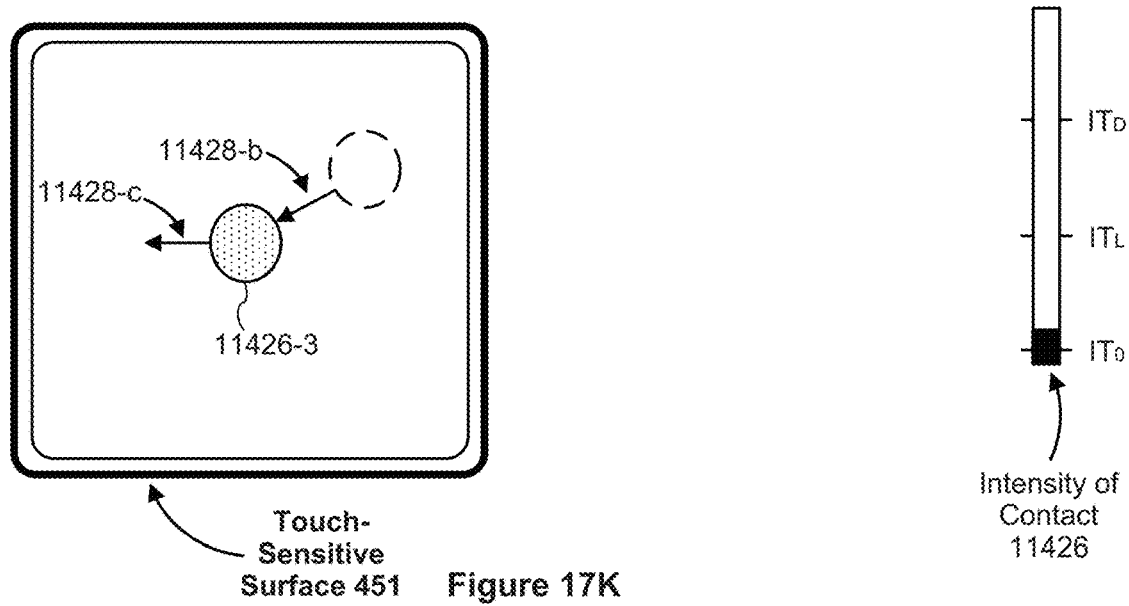
Figure 17L:
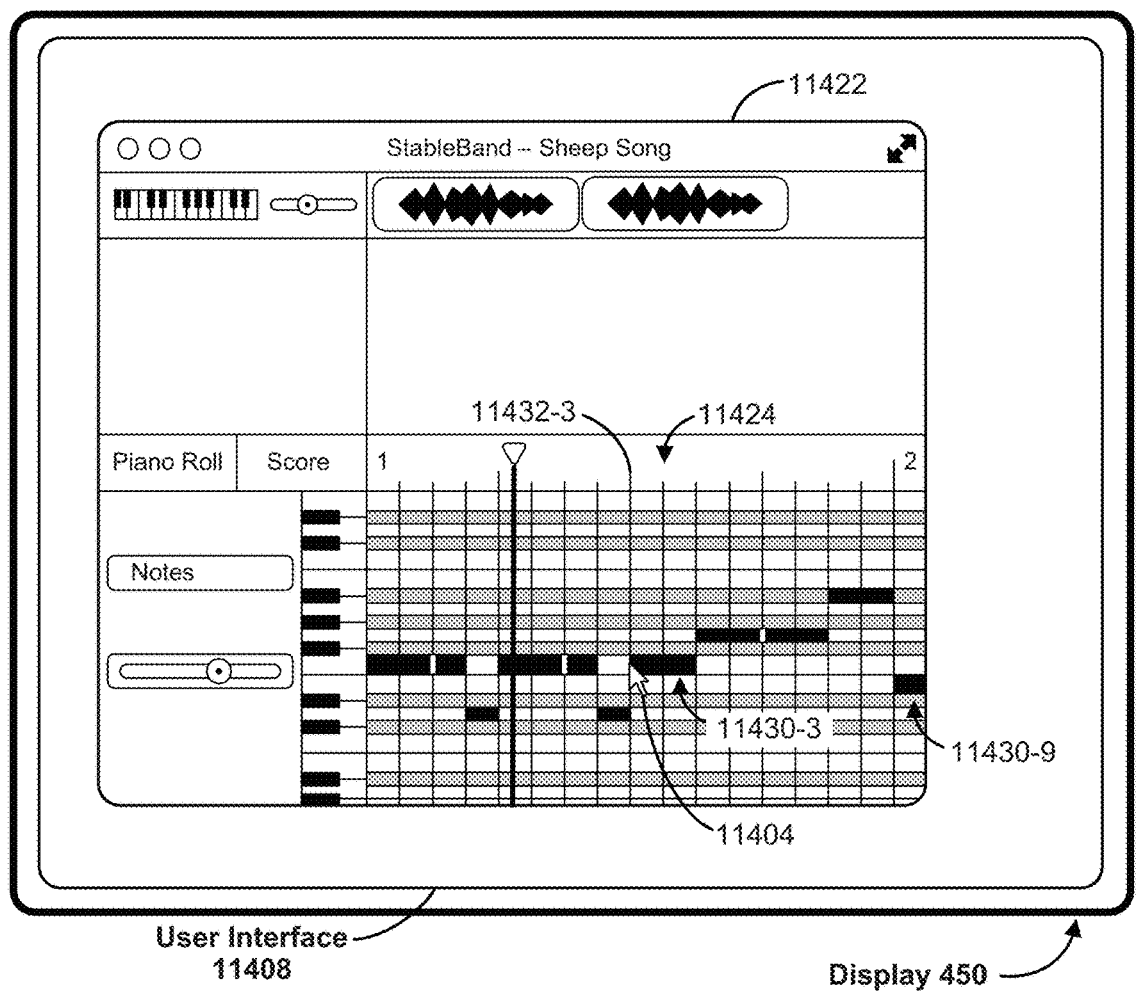
Figure 17L:
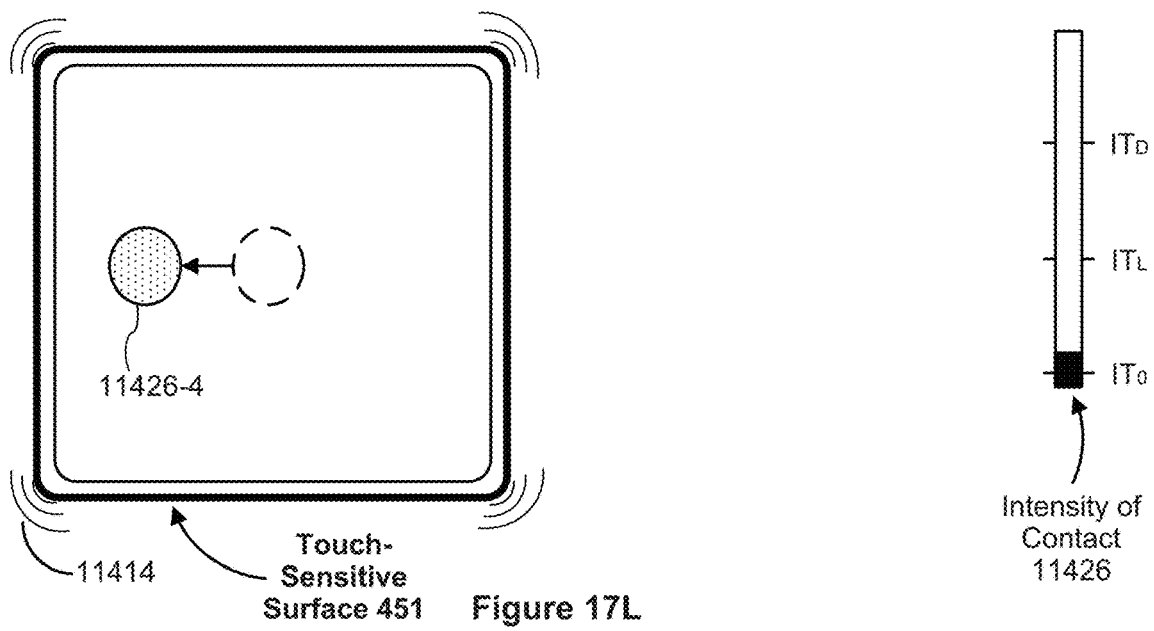

In some embodiments, as illustrated in FIGS. 17K-17L, movement of cursor 11404 over a representation 11430-3 of corresponding beat 11418-3 in musical score 11424, in accordance with movement 11428-c of contact 11426 on touch-sensitive surface 451, results in the generation of tactile feedback (e.g., tactile output 11414-3). For example, FIG. 17K illustrates an embodiment where cursor 11404, in accordance with movement 11428-b of contact 11426 from position 11426-1 to position 11426-3 on touch-sensitive surface 451, moves over representation 11424 of a musical score on display 450 and tactile feedback is not generated because the cursor is displayed at a position not corresponding to a representation of a beat in the piece of music. In contrast, as illustrated in FIG. 17L, in accordance with movement 11428-c of contact 11426 from position 11426-3 to position 11426-d on touch-sensitive surface 451, cursor 11404 moves over representation 11430-3 of beat 11418-3 in representation 11424 of the musical score and tactile feedback (e.g., tactile output 11414-3) is generated on touch-sensitive surface 451, regardless of whether or not music corresponding to representation 11424 of the score of the piece of music is concurrently being played by the music composition application.

Figure 17M:
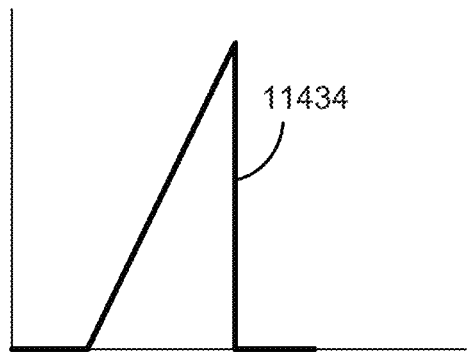
FIGS. 17M-17O illustrate exemplary waveforms of movement profiles for generating tactile outputs in accordance with some embodiments.
Figure 17N:
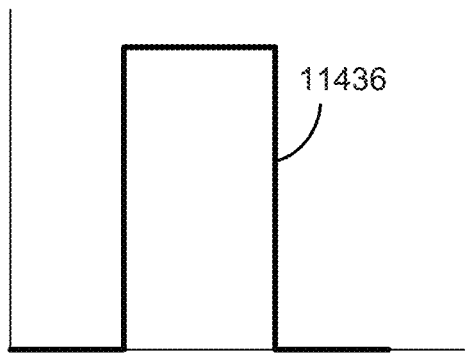
Figure 17O:
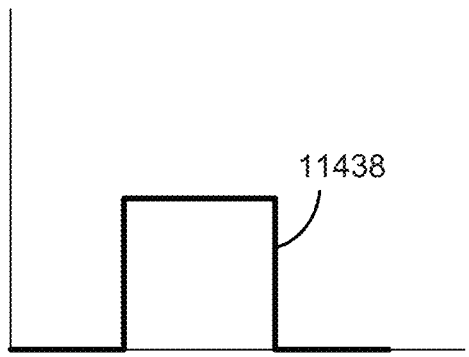

FIGS. 17M-17O illustrate example waveforms of movement profiles for generating these tactile outputs. FIG. 17M illustrates a sawtooth waveform 11434. FIG. 17N illustrates a square waveform 11436 and FIG. 17O illustrates a square waveform 11438 that has a lower amplitude than the square waveform of FIG. 17F. Sawtooth waveform 11434 has a different movement profile from square waveforms 11436 and 11438 and substantially the same amplitude as square waveform 11436. Square waveform 11436 has a substantially same movement profile and substantially different amplitude than square waveform 11438.

FIGS. 18A-18B are flow diagrams illustrating a method 11500 of providing feedback that corresponds to beats of a piece of music in accordance with some embodiments. The method 11500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 11500 are, optionally, combined and/or the order of some operations is, optionally, changed.

As described below, the method 11500 provides an intuitive way to provide feedback that corresponds to beats of a piece of music. The method reduces the cognitive burden on a user when detecting feedback that corresponds to beats of a piece of music, thereby creating a more efficient human-machine interface. For battery-operated electronic devices, enabling a user to detect feedback that corresponds to beats of a piece of music faster and more efficiently conserves power and increases the time between battery charges.

In some embodiments, the device displays (11502) a representation of a piece of music (e.g., representations 11406 of a piece of cover art corresponding to a piece of music in FIGS. 17A-17G or representation 11424 of a musical score corresponding to a piece of music in FIGS. 17H-17L) on a display (e.g., display 450 in FIGS. 17A-17L). In some embodiments, the piece of music (e.g., music 11416 in FIGS. 17C-17F and 17J) is played (11504) in a media player application (e.g., media player application window 11402 in FIGS. 17A-17G), and the representation of the piece of music is a graphical representation of the piece of music (e.g., representations 11406 of a piece of cover art for an album of the piece of music in FIGS. 17A-17G). In some embodiments, the representation of the piece of music is a piece of cover art for an album of the piece of music (e.g., representations 11406). In some embodiments, the representation of the piece of music is a "now playing" region of the media player application (e.g., region 11420 of media player application window 11402) including a name and play time of the piece of music.

In some embodiments, while the device displays the representation of a piece of music, the device detects (11506) movement of a focus selector (e.g., cursor 11404 in FIGS. 17A-17L) over the representation of the piece of music.

In some embodiments, while detecting the focus selector over the representation of the piece of music, the device provides (11508) tactile feedback (e.g., tactile outputs 11414 in FIGS. 17B-17F, 17I-17J and 17L) that corresponds to at least a subset of beats (e.g., beats 11418 in FIGS. 17C-17F and 17J) of the piece of music (e.g., piece of music 11416 in FIGS. 17C-17F and 17J). In some embodiments, the representation of the piece of music is a representation of the musical notes (e.g., a musical score). In some embodiments, the representation of the piece of music includes visual media corresponding to the piece of music (e.g., an image, a video, a text description of the piece of music or an album/video including the piece of music, or an audio visualizer associated with the piece of music). For example, the tactile feedback corresponding to a piece of music is generated while a focus selector (e.g., a displayed cursor or a contact) is over an album cover for the piece of music, over a composer or artist image for the piece of music, or over a currently playing video that includes the piece of music as currently playing audio content (e.g., the background music in a movie or the music in a music video).

In some embodiments, after providing the tactile feedback, the device detects (11528) movement of the focus selector away from the representation of the piece of music (e.g., movement of cursor 11404, corresponding to movement 11412-b of contact 11410-c on touch-sensitive surface 451, in FIG. 17G).

In some embodiments, in response to detecting movement of the focus selector away from the representation of the piece of music, the device ceases (11530) to provide the tactile feedback (e.g., tactile outputs 11414) that corresponds to the beats of the piece of music.

In some embodiments, the focus selector (e.g., cursor 11404 in FIGS. 17A-17L) is moved (11510) in accordance with movement (e.g., movements 11412 in FIGS. 17A-17G or movements 11428 in FIGS. 17H-17L) of a contact (e.g., contact 11410 in FIGS. 17A-17G or contact 11426 in FIGS. 17H-17L) on a touch-sensitive surface (e.g., touch-sensitive surface 451), and the tactile feedback is provided by generating tactile outputs (e.g., tactile outputs 11414 in FIGS. 17B-17F, 17I-17J and 17L) on the touch-sensitive surface. In some embodiments, the contact is the focus selector (e.g., when the device has a touch screen, the focus selector is, optionally, contact 11410). In some embodiments, the contact corresponds to a cursor or selection box that is displayed on the display.

In some embodiments, the representation of the piece of music (e.g., representations 11406 of a piece of cover art for an album of the piece of music in FIGS. 17A-17G) is displayed (11512) in a media player application (e.g., media player application window 11402 in FIGS. 17A-17G), and the tactile feedback includes a plurality of tactile outputs (e.g., tactile outputs 11414) generated when corresponding beats (e.g., beats 11418) in the subset of beats are played by the media player application (e.g., the touch-sensitive surface generates tactile outputs in time with music being played in the media player application).

In some embodiments, the representation of the piece of music is displayed (11514) as a musical score (e.g., representation 11424 of a score of the piece of music in FIGS. 17H-17L) in a music composing application (e.g., music composition application window 11422 in FIGS. 17H-17L). For example, by displaying a representation of notes (e.g., black bar 11430-9, corresponding to the note played at beat 11418-9 of piece of music 11416, in FIGS. 17H-17L) of the piece of music (e.g., music 11416) in a representation of a musical score (e.g., representation 11424 of a musical score) corresponding to the piece of music.

In some embodiments, while the representation of the piece of music is displayed as a musical score in a music composing application, the tactile feedback includes (11516) a plurality of tactile outputs (e.g., tactile outputs 11414) generated when the focus selector moves over representations of corresponding beats (e.g., beat 11418-3 represented as vertical line 11432-3 or beat representation 11430-3 in FIG. 17L) in the subset of beats in the musical score. In some embodiments, the focus selector moves in accordance with movement of a contact on the touch-sensitive surface (e.g., movement 11428-c of contact 11426 on touch-sensitive surface 451 in FIGS. 17K-17L), and thus the tactile outputs (e.g., tactile outputs 11414) are generated in accordance with movement of the contact on the touch-sensitive surface.

In some embodiments, the subset of beats (e.g., beats 11418) includes (11518) stressed beats in the piece of music (e.g., even numbered beats 11418 in piece of music 11416 in FIGS. 17C-17F and 17J). In some embodiments, a beat is the basic unit of time in music (e.g., a quarter note in a piece of music having a 4/4 time signature or an eighth note in a piece of music having a 6/8 time signature), where a stressed beat is a stronger, louder or otherwise more emphatic beat of a plurality of beats. Some typical beat patterns include stressing every fourth beat (e.g., as commonly done in music having a 4/8 time signature), stressing every other beat (e.g., as commonly done in music having a 4/4 time signature) or stressing every third beat (e.g., as commonly done in music having a 3/4 or 6/8 time signature, such as a waltz). A beat that is not stressed is sometimes referred to as an unstressed beat. In some embodiments, a beat is a subunit of the basic unit of time in music (e.g., an eighth note in music having a 4/4 or 3/4 time signature).

In some embodiments, the subset of beats excludes (11520) unstressed beats of the piece of music. For example, as illustrated in FIG. 17C, the subset of beats 11418 includes stressed beats (e.g., odd numbered beats 11418) but excludes unstressed beats (e.g., even numbered beats 11418), and tactile outputs 11414 are only generated corresponding to the stressed beats.

In some embodiments, where tactile feedback corresponding to at least a subset of beats of the piece of music is provided (11508) while detecting the focus selector over the representation of the piece of music, the subset of beats include (11522) one or more stressed beats (e.g., odd numbered beats 11418) and one or more unstressed beats (e.g., even numbered beats 11418), the tactile feedback includes a plurality of tactile outputs (e.g., tactile outputs 11414) for corresponding beats in the subset of beats, a first tactile output is generated for stressed beats, and a second tactile output, different from the first tactile output, is generated for non-stressed beats (e.g., even numbered tactile outputs 11414 and odd numbered tactile outputs 11414 feel substantially different to the user, as represented in FIGS. 17E-17F and 17J). In contrast, in some embodiments, a first tactile output corresponding to a stressed beat and a second tactile output corresponding to an unstressed beat are substantially the same (e.g., odd numbered tactile outputs 11414 corresponding to odd numbered stressed beats 11418 and even numbered tactile outputs 11414 corresponding to even numbered unstressed beats 11418 feel substantially the same to the user, as represented in FIG. 17D). In some embodiments, the first tactile output is more prominent (e.g., has a larger amplitude) than the second tactile output. In some embodiments, the second tactile output is more prominent (e.g., has a larger amplitude) than the first tactile output.

In some embodiments, the first tactile output is generated (11524) by movement of the touch-sensitive surface that includes a first dominant movement component, the second tactile output is generated by movement of the touch-sensitive surface that includes a second dominant movement component, and the first dominant movement component and the second dominant movement component have a same or substantially same amplitude (e.g., high amplitude "$A_H$" of all tactile outputs 11414 in FIG. 17E) and substantially different movement profiles (e.g., square waveform shape 11436 of odd numbered tactile outputs 11414 and sawtooth waveform shape 11434 of even numbered tactile outputs 11414 in FIG. 17E). In some embodiments, movement of the touch-sensitive surface corresponds to an initial impulse, ignoring any unintended resonance. In some embodiments, the movement profiles differ in their waveform shape (e.g., square, sine, squine, triangle or sawtooth waveform shape), waveform pulse width and/or waveform pulse period (e.g., frequency). For example, as illustrated in FIG. 17E, a "detent" that is generated on the touch-sensitive surface corresponding to a stressed beat of the music has a square waveform movement profile (e.g., square waveform 11436 of odd numbered tactile outputs 11414 in FIG. 17E), whereas a "click" that is generated on the touch-sensitive surface corresponding to an unstressed beat of the music has a sawtooth waveform movement profile (e.g., sawtooth waveform 11434 of even numbered tactile outputs 11414 in FIG. 17E), or vice versa.

In some embodiments, the first tactile output is generated (11526) by movement of the touch-sensitive surface that includes a first dominant movement component, the second tactile output is generated by movement of the touch-sensitive surface that includes a second dominant movement component, and the first dominant movement component and the second dominant movement component have a same or substantially same movement profile (e.g., square waveforms 11434 of odd numbered tactile outputs 11414 and square waveform 11436 of even numbered tactile outputs 11414 in FIGS. 17F and 17J) and substantially different amplitudes (e.g., high amplitude "$A_H$" of odd numbered tactile outputs 11414 is greater than low amplitude "$A_L$" of even numbered tactile outputs 11414 in FIGS. 17F and 17J). In some embodiments, movement of the touch-sensitive surface corresponds to an initial impulse, ignoring any unintended resonance. In some embodiments, the movement profiles differ in their waveform shape (e.g., square, sine, squine, triangle or sawtooth waveform shape), waveform pulse width and/or waveform pulse period (e.g., frequency). For example, as illustrated in FIGS. 17F and 17J, a "detent" that is generated on the touch-sensitive surface corresponding to a stressed beat of the music has a greater amplitude than a "detent" that is generated on the touch-sensitive surface corresponding to an unstressed beat of the music (e.g., high amplitude "$A_H$" of odd numbered tactile outputs 11414 in FIGS. 17F and 17J is greater than low amplitude "$A_L$" of even numbered tactile output 11414 in FIGS. 17F and 17J), or vice versa.

In some embodiments, after providing tactile feedback, the device detects (11528) movement of the focus selector away from the representation of the piece of music. For example, as illustrated in FIG. 17G, in accordance with detection of movement 11412-b of contact 11410 from position 11410-b to position 11410-c on touch-sensitive surface 451, corresponding to movement of cursor 11404 away from representation 11406 of a piece of music. In some embodiments, in response to detecting movement of the focus selector away from the representation of the piece of music, the device ceases (11530) to provide tactile feedback that corresponds to the beats of the piece of music. For example, as illustrated in FIG. 17G, when cursor 11404 moves away from representation 11406 of a piece of music, tactile output generators 167 stop generating tactile outputs 11414 on touch-sensitive surface 451 because the cursor is no longer positioned over the representation of the piece of music.

It should be understood that the particular order in which the operations in FIGS. 18A-18B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 11500 described above with respect to FIGS. 18A-18B. For example, the contacts, gestures, user interface objects, tactile sensations and focus selectors described above with reference to method 11500 optionally have one or more of the characteristics of the contacts, gestures, user interface objects, tactile sensations and focus selectors described herein with reference to other methods described herein (e.g., those listed in the fifth paragraph of the Description of Embodiments). For brevity, these details are not repeated here.

Figure 19:
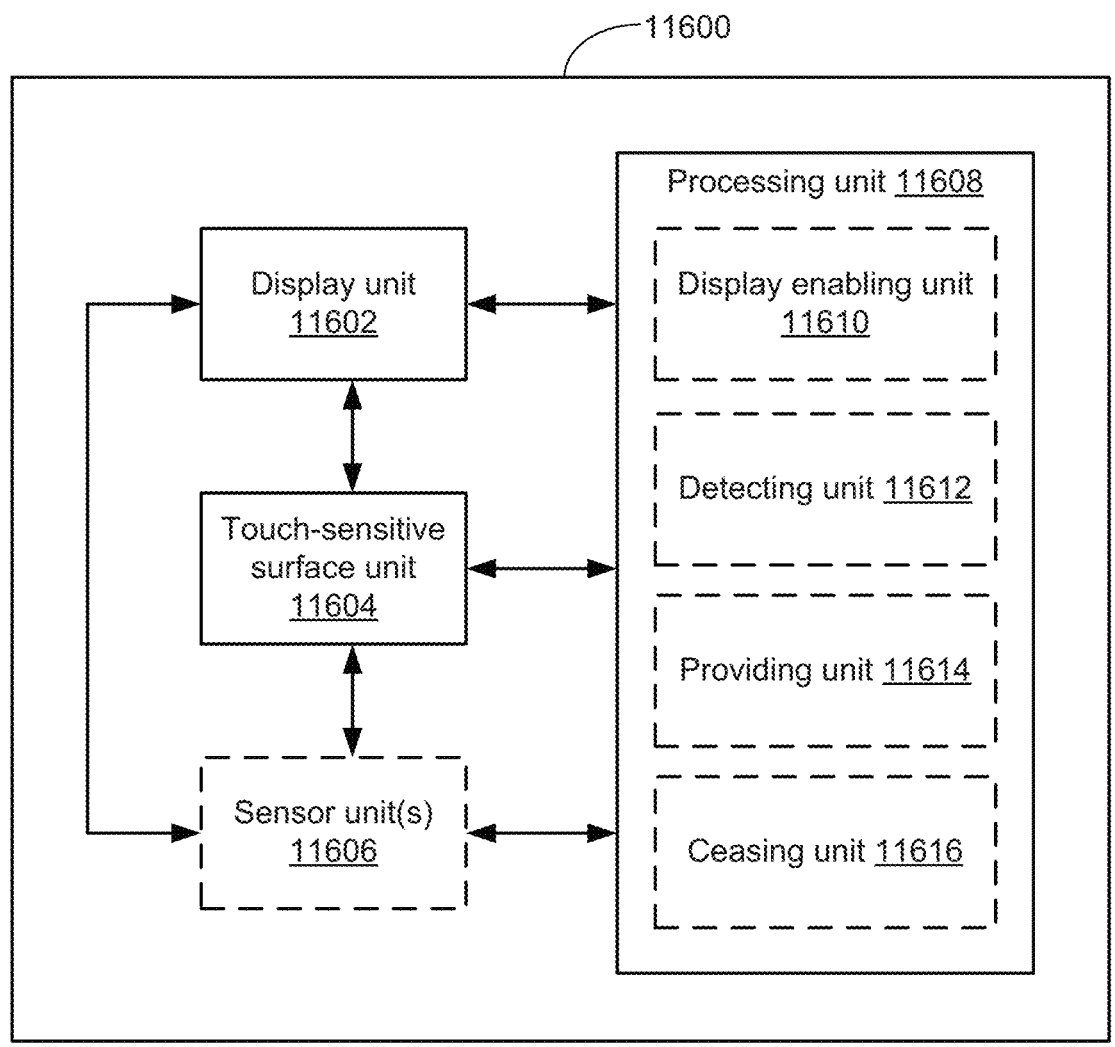
FIG. 19 is a functional block diagram of an electronic device in accordance with some embodiments.

In accordance with some embodiments, FIG. 19 shows a functional block diagram of an electronic device 11600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 11600 includes a display unit 11602 configured to display one or more user interface objects, a touch-sensitive surface unit 11604 configured to receive user contacts, optionally one or more sensor units 11606 configured to detect intensity of contacts with the touch-sensitive surface unit 11604; and a processing unit 11608 coupled to the display unit 11602, the touch-sensitive surface unit 11604 and optionally the one or more sensor units 11606. In some embodiments, the processing unit 11608 includes a display enabling unit 11610, a detecting unit 11612, a providing unit 11614, and a ceasing unit 11616.

In some embodiments, the processing unit 11608 is configured to enable display (e.g., with the display enabling unit 11610) of a representation of a piece of music on display unit 11602. In some embodiments, the processing unit 11608 is configured to detect movement of a focus selector over the representation of the piece of music (e.g., with detecting unit 11612); and while detecting the focus selector over the representation of the piece of music, the processing unit 11608 is configured to provide tactile feedback that corresponds to at least a subset of beats of the piece of music (e.g., with providing unit 11614). In some embodiments, after providing the tactile feedback, the processing unit 11608 is configured to detect movement of the focus selector away from the representation of the piece of music (e.g., with the detecting unit 11612); and in response to detecting movement of the focus selector away from the representation of the piece of music, the processing unit 11608 is configured to cease to provide the tactile feedback that corresponds to the beats of the piece of music (e.g., with the ceasing unit 11616).

In some embodiments, the processing unit 11608 is configured to enable display of movement of the focus selector (e.g., with the display enabling unit 11610) in accordance with movement of a contact on touch-sensitive surface unit 11604, and the tactile feedback is provided by generating tactile outputs on the touch-sensitive surface unit 11604 (e.g., with the providing unit 11614).

In some embodiments, the piece of music is currently being played in a media player application; and the representation of the piece of music is a graphical representation of the piece of music.

In some embodiments, the processing unit 11608 is configured to display the representation of the piece of music in a media player application (e.g., with the display enabling unit 11610), and the tactile feedback includes a plurality of tactile outputs generated when corresponding beats in the subset of beats are played by the media player application.

In some embodiments, the processing unit 11608 is configured to display the representation of the piece of music as a musical score in a music composing application (e.g., with the display enabling unit 11610).

In some embodiments, the tactile feedback includes a plurality of tactile outputs generated when the focus selector moves over representations of corresponding beats in the subset of beats in the musical score.

In some embodiments, the subset of the beats includes stressed beats of the piece of music.

In some embodiments, the subset of the beats excludes unstressed beats of the piece of music.

In some embodiments, the subset of beats include one or more stressed beats and one or more unstressed beats, the tactile feedback includes a plurality of tactile outputs for corresponding beats in the subset of beats, the processing unit 11608 is configured to generate a first tactile output for stressed beats (e.g., with the providing unit 11614), and the processing unit 11608 is configured to generate a second tactile output, different from the first tactile output, for non-stressed beats (e.g., with the providing unit 11614).

In some embodiments, the first tactile output is generated by movement of the touch-sensitive surface unit 11604 that includes a first dominant movement component, the second tactile output is generated by movement of the touch-sensitive surface unit 11604 that includes a second dominant movement component, and the first dominant movement component and the second dominant movement component have a same amplitude and different movement profiles.

In some embodiments, the first tactile output is generated by movement of the touch-sensitive surface unit 11604 that includes a first dominant movement component, the second tactile output is generated by movement of the touch-sensitive surface unit 11604 that includes a second dominant movement component, and the first dominant movement component and the second dominant movement component have a same amplitude and different movement profiles.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 18A-18B are, optionally, implemented by components depicted in FIGS. 1A-1B or FIG. 19. For example, detection operations 11506 and 11528 and providing operation 11508 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface or display of a focus selector over a representation of a piece of music on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. In some embodiments, event handler 190 accesses a respective tactile output generator 167 to generate a tactile output. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A method, comprising:
   at an electronic device with a touch-sensitive surface and a display:
   displaying a representation of a clock on the display;
   detecting an input directed to the representation of the clock, wherein the representation of the clock is displayed prior to and while detecting the input directed to the representation of the clock;
   while detecting the input directed to the representation of the clock, and in response to detecting the input directed to the representation of the clock, providing tactile feedback that corresponds to advancement of time on the clock, wherein the tactile feedback includes a regular pattern of tactile outputs on the touch-sensitive surface;
   while providing the tactile feedback, detecting that the input is no longer directed to the representation of the clock; and
   while continuing to detect the input, in response to detecting that the input is no longer directed to the representation of the clock, ceasing to provide the tactile feedback corresponding to advancement of time on the clock.

2. The method of claim 1, wherein tactile outputs in the regular pattern of tactile outputs are generated at evenly spaced intervals.

3. The method of claim 1, including, while detecting the input directed to the representation of the clock:
   detecting movement of the input that maintains the input directed to the representation of the clock; and
   in response to detecting movement of the input, continuing to provide the tactile feedback corresponding to advancement of time on the clock without changing a period of the regular pattern of tactile outputs on the touch-sensitive surface.

4. The method of claim 1, including, prior to detecting the input being directed to the representation of the clock, displaying the representation of the clock without providing the tactile feedback that corresponds to advancement of time on the clock on the touch-sensitive surface.

5. The method of claim 1, wherein the regular pattern of tactile outputs on the touch-sensitive surface includes an alternating sequence of tactile outputs that have different output characteristics.

6. The method of claim 5, wherein:
   the alternating sequence of tactile outputs includes a first type of tactile output alternating with a second type of tactile output;
   the first type of tactile output is generated by movement of the touch-sensitive surface that includes a first dominant movement component;
   the second type of tactile output is generated by movement of the touch-sensitive surface that includes a second dominant movement component; and
   the first dominant movement component and the second dominant movement component have a same movement profile and different amplitudes.

7. The method of claim 5, wherein:
   the alternating sequence of tactile outputs includes a first type of tactile output alternating with a second type of tactile output;
   the first type of tactile output is generated by movement of the touch-sensitive surface that includes a first dominant movement component;
   the second type of tactile output is generated by movement of the touch-sensitive surface that includes a second dominant movement component; and
   the first dominant movement component and the second dominant movement component have different movement profiles and a same amplitude.

8. An electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
   displaying a representation of a clock on the display;
   detecting an input directed to the representation of the clock wherein the representation of the clock is displayed prior to and while detecting the input directed to the representation of the clock;

while detecting the input directed to the representation of the clock, and in response to detecting the input directed to the representation of the clock, providing tactile feedback that corresponds to advancement of time on the clock, wherein the tactile feedback includes a regular pattern of tactile outputs on the touch-sensitive surface;

while providing the tactile feedback, detecting that the input is no longer directed to the representation of the clock; and while continuing to detect the input, in response to detecting that the input is no longer directed to the representation of the clock, ceasing to provide the tactile feedback corresponding to advancement of time on the clock.

9. The electronic device of claim 8, wherein tactile outputs in the regular pattern of tactile outputs are generated at evenly spaced intervals.

10. The electronic device of claim 8, wherein the one or more programs include instructions for, while detecting the input directed to the representation of the clock:

detecting movement of the input that maintains the input directed to the representation of the clock; and in response to detecting movement of the input, continuing to provide the tactile feedback corresponding to advancement of time on the clock without changing a period of the regular pattern of tactile outputs on the touch-sensitive surface.

11. The electronic device of claim 8, wherein the one or more programs include instructions for, prior to detecting the input being directed to the representation of the clock, displaying the representation of the clock without providing the tactile feedback that corresponds to advancement of time on the clock on the touch-sensitive surface.

12. The electronic device of claim 8, wherein the regular pattern of tactile outputs on the touch-sensitive surface includes an alternating sequence of tactile outputs that have different output characteristics.

13. The electronic device of claim 12, wherein:

the alternating sequence of tactile outputs includes a first type of tactile output alternating with a second type of tactile output;

the first type of tactile output is generated by movement of the touch-sensitive surface that includes a first dominant movement component;

the second type of tactile output is generated by movement of the touch-sensitive surface that includes a second dominant movement component; and the first dominant movement component and the second dominant movement component have a same movement profile and different amplitudes.

14. The electronic device of claim 12, wherein:

the alternating sequence of tactile outputs includes a first type of tactile output alternating with a second type of tactile output;

the first type of tactile output is generated by movement of the touch-sensitive surface that includes a first dominant movement component;

the second type of tactile output is generated by movement of the touch-sensitive surface that includes a second dominant movement component; and the first dominant movement component and the second dominant movement component have different movement profiles and a same amplitude.

15. A non-transitory computer readable storage medium storing one or more programs, the one or more programs comprising instructions, which when executed by an electronic device with a display and a touch-sensitive surface cause the electronic device to:

display a representation of a clock on the display;

detect an input directed to the representation of the clock, wherein the representation of the clock is displayed prior to and while detecting the input directed to the representation of the clock;

while detecting the input directed to the representation of the clock, and in response to detecting the input directed to representation of the clock, provide tactile feedback that corresponds to advancement of time on the clock, wherein the tactile feedback includes a regular pattern of tactile outputs on the touch-sensitive surface;

while providing the tactile feedback, detect that the input is no longer directed to the representation of the clock; and while continuing to detect the input, in response to detecting that the input is no longer directed to the representation of the clock, cease to provide the tactile feedback corresponding to advancement of time on the clock.

16. The non-transitory computer readable storage medium of claim 15, wherein tactile outputs in the regular pattern of tactile outputs are generated at evenly spaced intervals.

17. The non-transitory computer readable storage medium of claim 15, wherein the one or more programs include instructions, which when executed by the electronic device, cause the electronic device to, while detecting the input directed to the representation of the clock:

detect movement of the input that maintains the input directed to the representation of the clock; and in response to detecting movement of the input, continue to provide the tactile feedback corresponding to advancement of time on the clock without changing a period of the regular pattern of tactile outputs on the touch-sensitive surface.

18. The non-transitory computer readable storage medium of claim 15, wherein the one or more programs include instructions, which when executed by the electronic device, cause the electronic device to, prior to detecting the input being directed to the representation of the clock, display the representation of the clock without providing the tactile feedback that corresponds to advancement of time on the clock on the touch-sensitive surface.

19. The non-transitory computer readable storage medium of claim 15, wherein the regular pattern of tactile outputs on the touch-sensitive surface includes an alternating sequence of tactile outputs that have different output characteristics.

20. The non-transitory computer readable storage medium of claim 19, wherein:

the alternating sequence of tactile outputs includes a first type of tactile output alternating with a second type of tactile output;

the first type of tactile output is generated by movement of the touch-sensitive surface that includes a first dominant movement component;

the second type of tactile output is generated by movement of the touch-sensitive surface that includes a second dominant movement component; and the first dominant movement component and the second dominant movement component have a same movement profile and different amplitudes.

21. The non-transitory computer readable storage medium of claim 19, wherein:
- the alternating sequence of tactile outputs includes a first type of tactile output alternating with a second type of tactile output;
- the first type of tactile output is generated by movement of the touch-sensitive surface that includes a first dominant movement component;
- the second type of tactile output is generated by movement of the touch-sensitive surface that includes a second dominant movement component; and
- the first dominant movement component and the second dominant movement component have different movement profiles and a same amplitude.

* * * * *